INVOICE

| QUANTITY ORDERED | QUANTITY SHIPPED | QUANTITY BACK ORDERED | DESCRIPTION | PRICE | GROSS AMOUNT | DISCOUNT % | NET AMOUNT |
|---|---|---|---|---|---|---|---|
| 55 | 50 | 5 | Brass Pulleys No. 3 | 43.50 | 2175.00 | 15.0 | 1848.75 |
| 1500 | 1250 | 250 | Belaying Pins | 126.00M | 157.50 | | 157.50 |
| 144 | 144 | | Fenders | 8.67 | 1248.48 | 10.0 | 1123.63 |
| 200— | 200— | | Cleats — Returned For Credit | 0.80— | 160.00CR | | 160.00CR |
| | | | | | | | 2969.88◊ |
| | | | Discount | | | 15.5 | 460.33CR |
| | | | | | | | 2509.55◊ |
| | | | Sales Tax: State | | | 4.0 | 100.38 |
| | | | City | | | 0.5 | 12.55 |
| | | | Freight | | | | 346.93# |
| | | | Total | | | | 2969.41* |
| | | | Daily Gross Amount Total | | 3420.98* | | |
| | | | Daily Freight Total | | 346.93* | | |
| | | | Daily Net Amount Total | | 2969.41** | | |
| | | | Daily Ret'd For Credit Gross Total | | | | 160.00CR |

Fig. 2

Aug. 9, 1966 W. SOULE, JR., ETAL 3,265,874
DATA PROCESSING DEVICES AND SYSTEMS
Filed Dec. 27, 1961 55 Sheets-Sheet 4

Fig. 3b₁

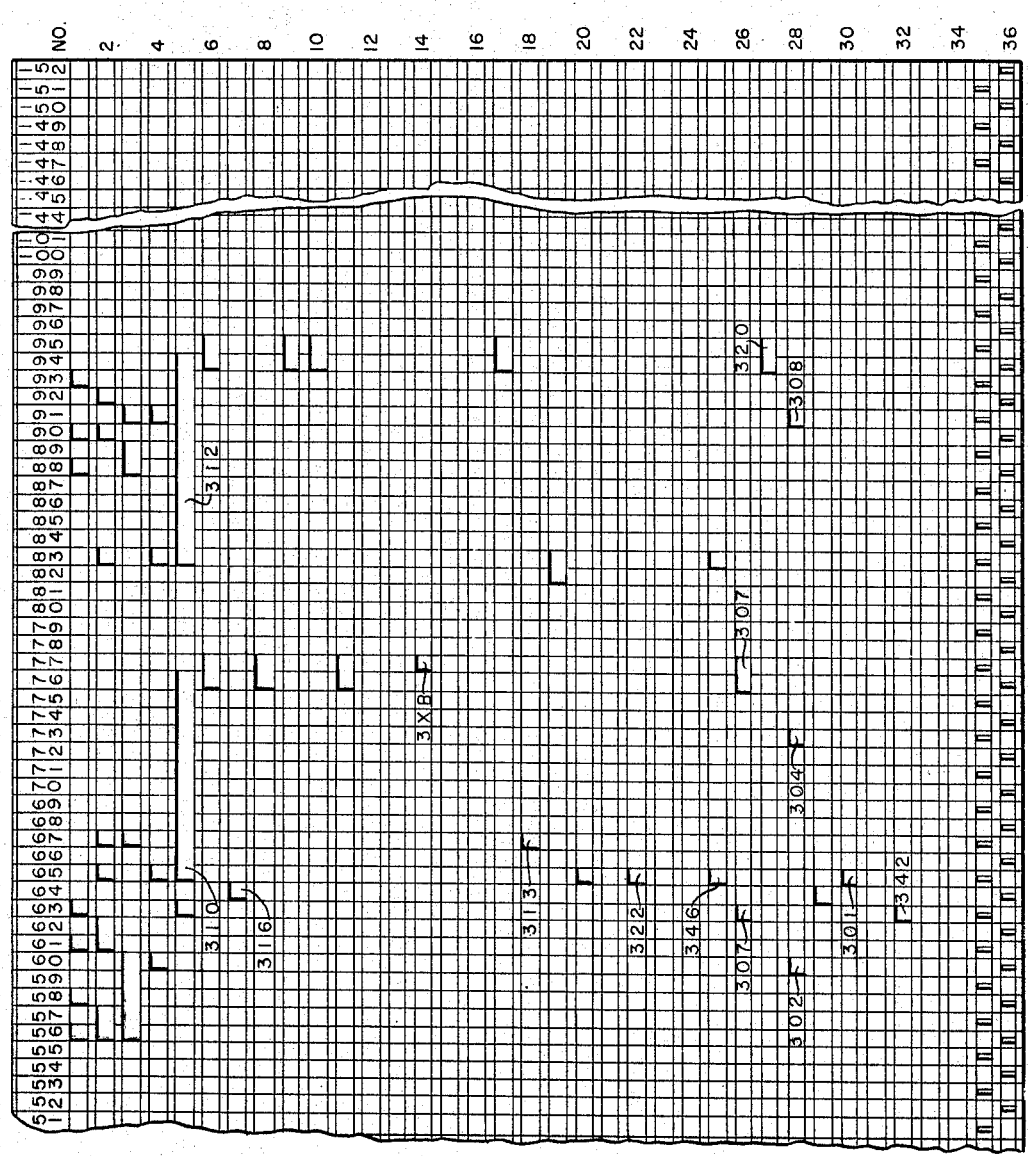
Fig. 3b2

Aug. 9, 1966   W. SOULE, JR., ET AL   3,265,874
DATA PROCESSING DEVICES AND SYSTEMS
Filed Dec. 27, 1961   55 Sheets-Sheet 6

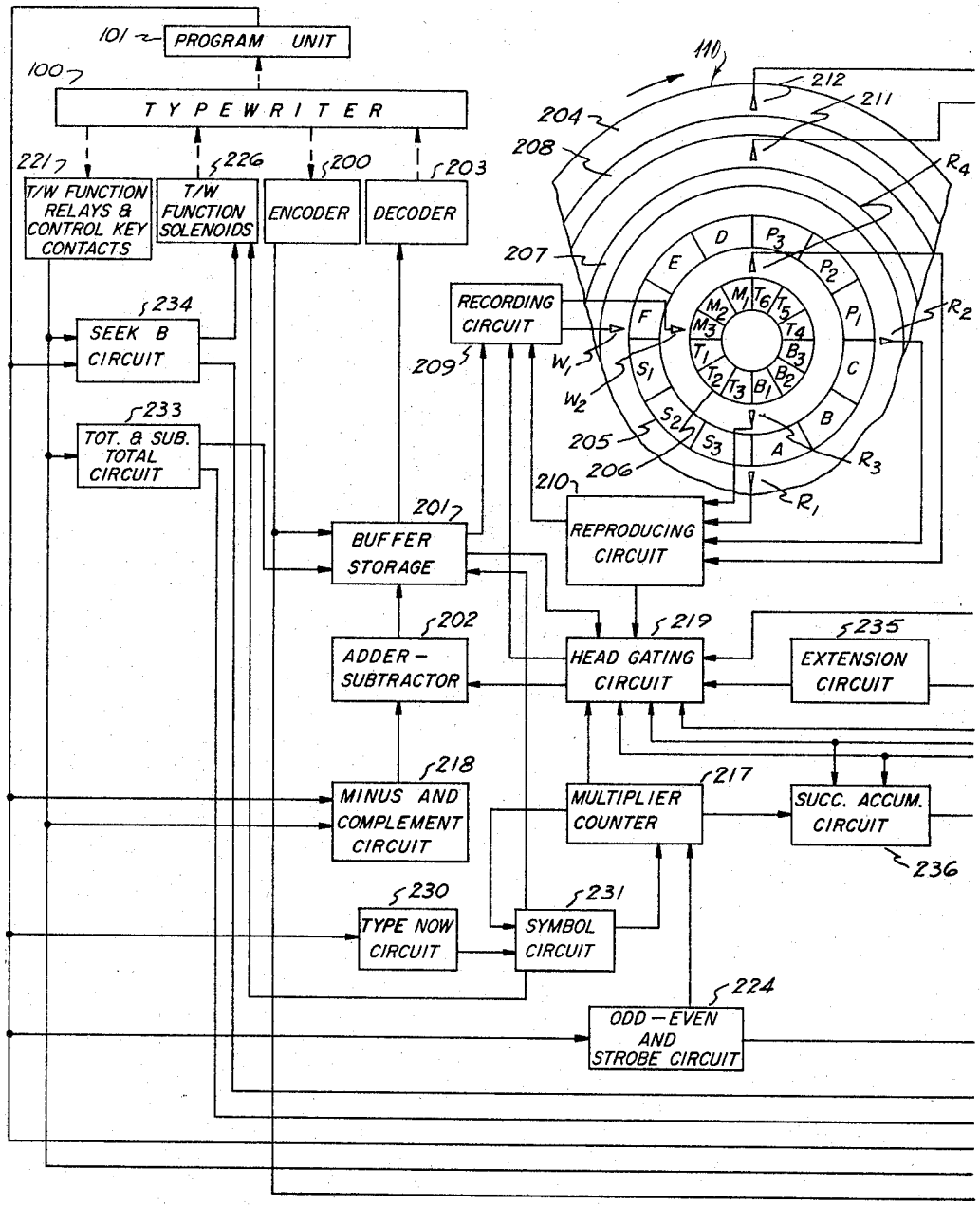
Fig_5(a)_
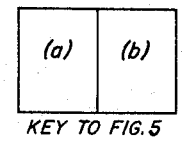
KEY TO FIG.5

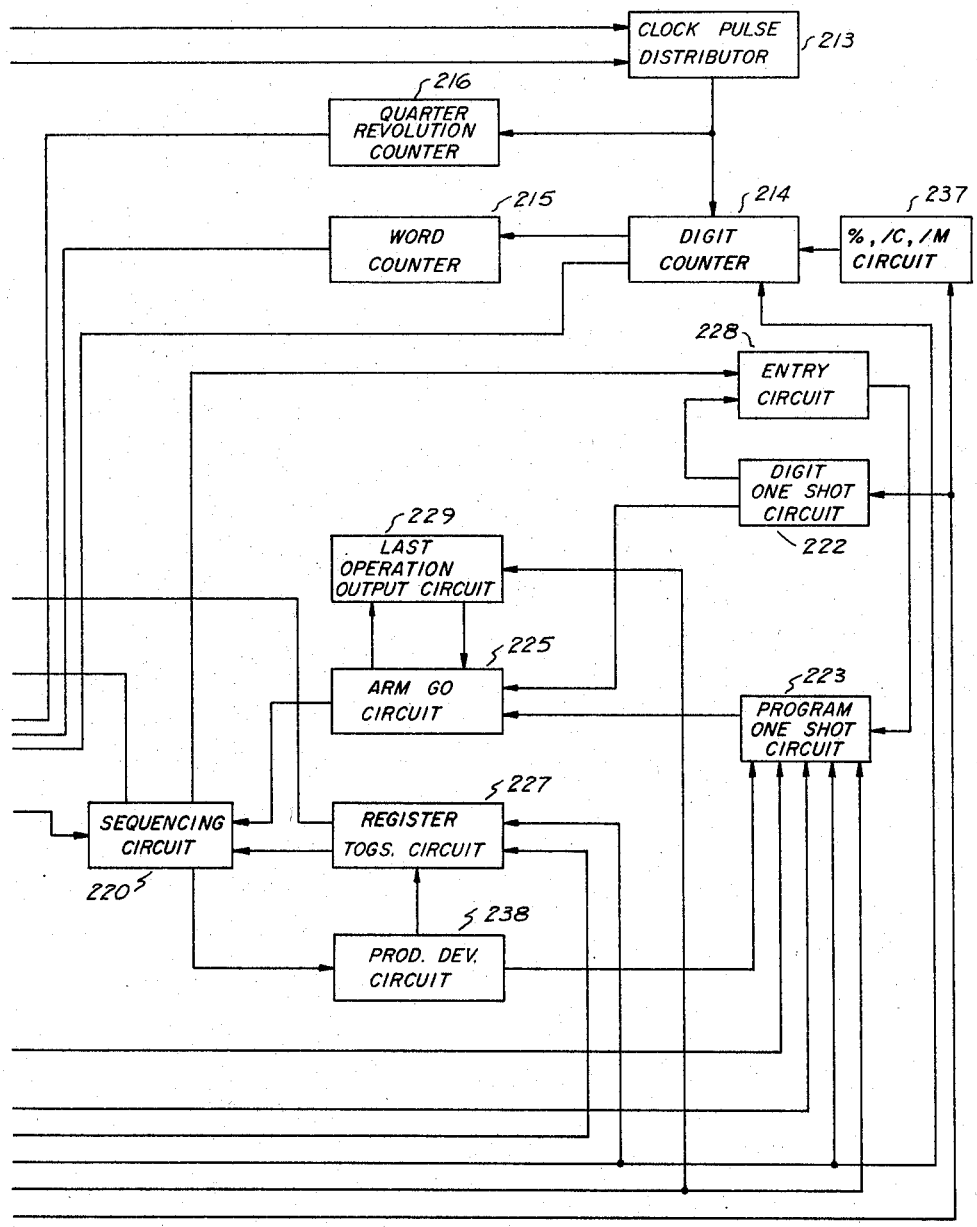
fig_5(b)

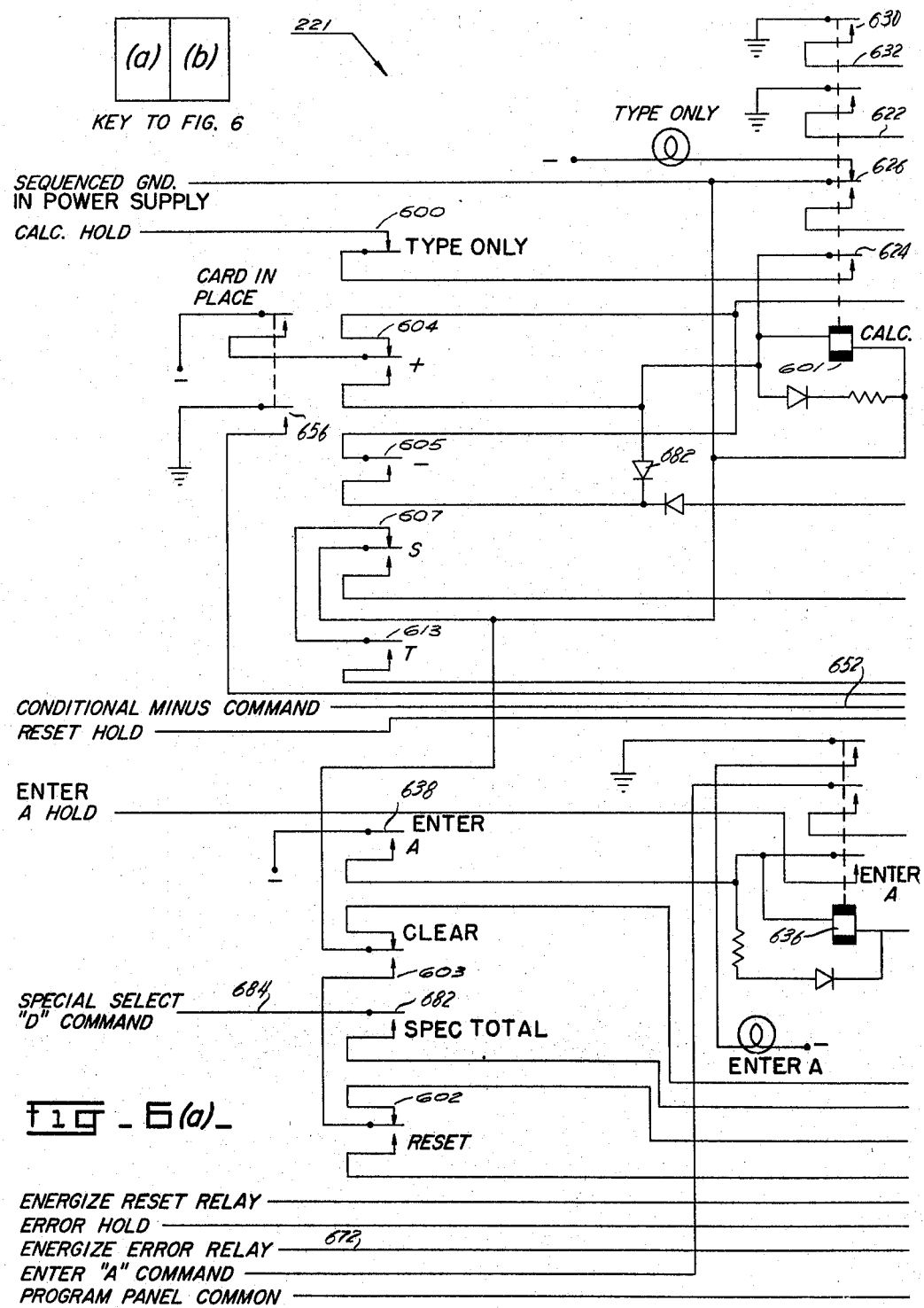

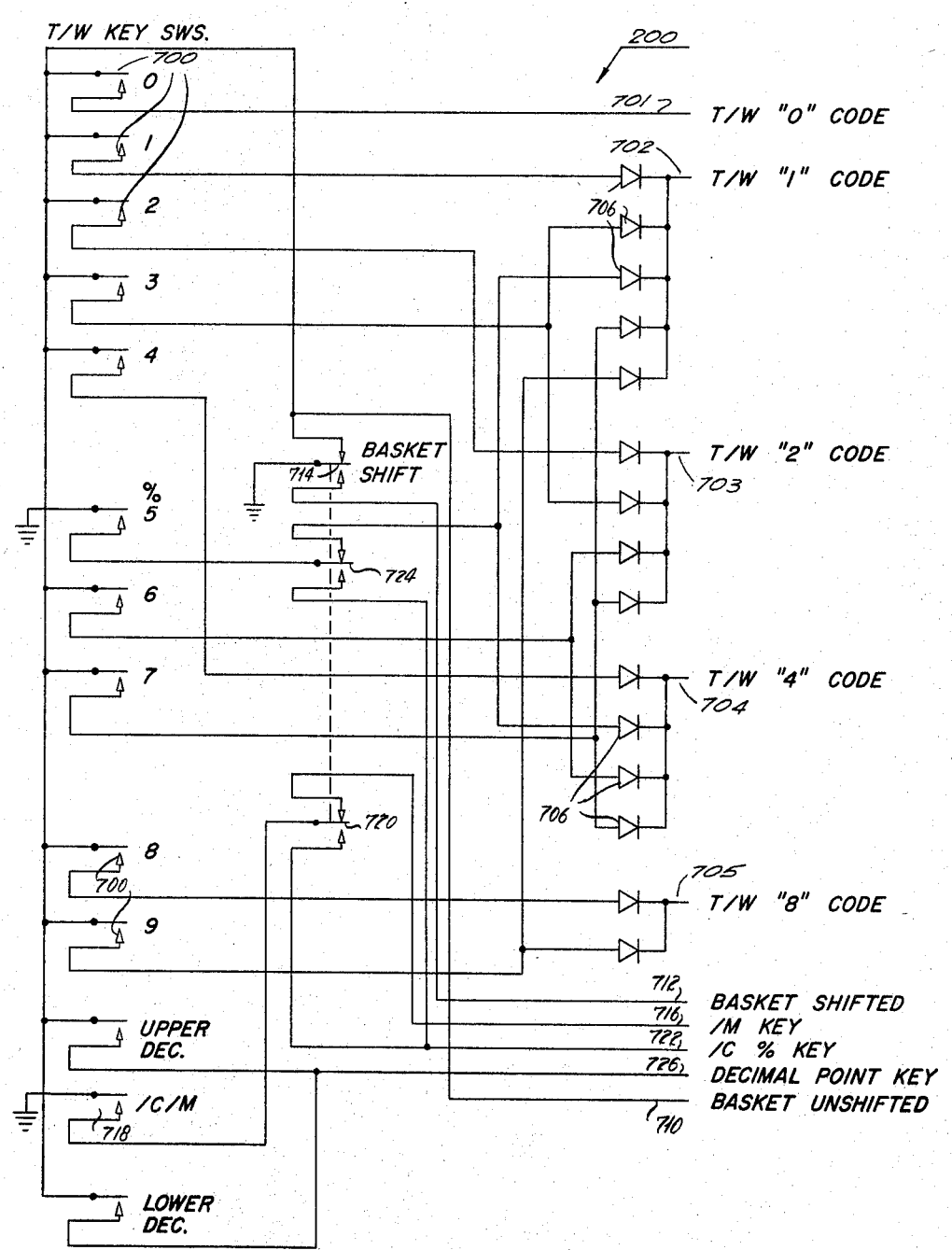
fig_7_

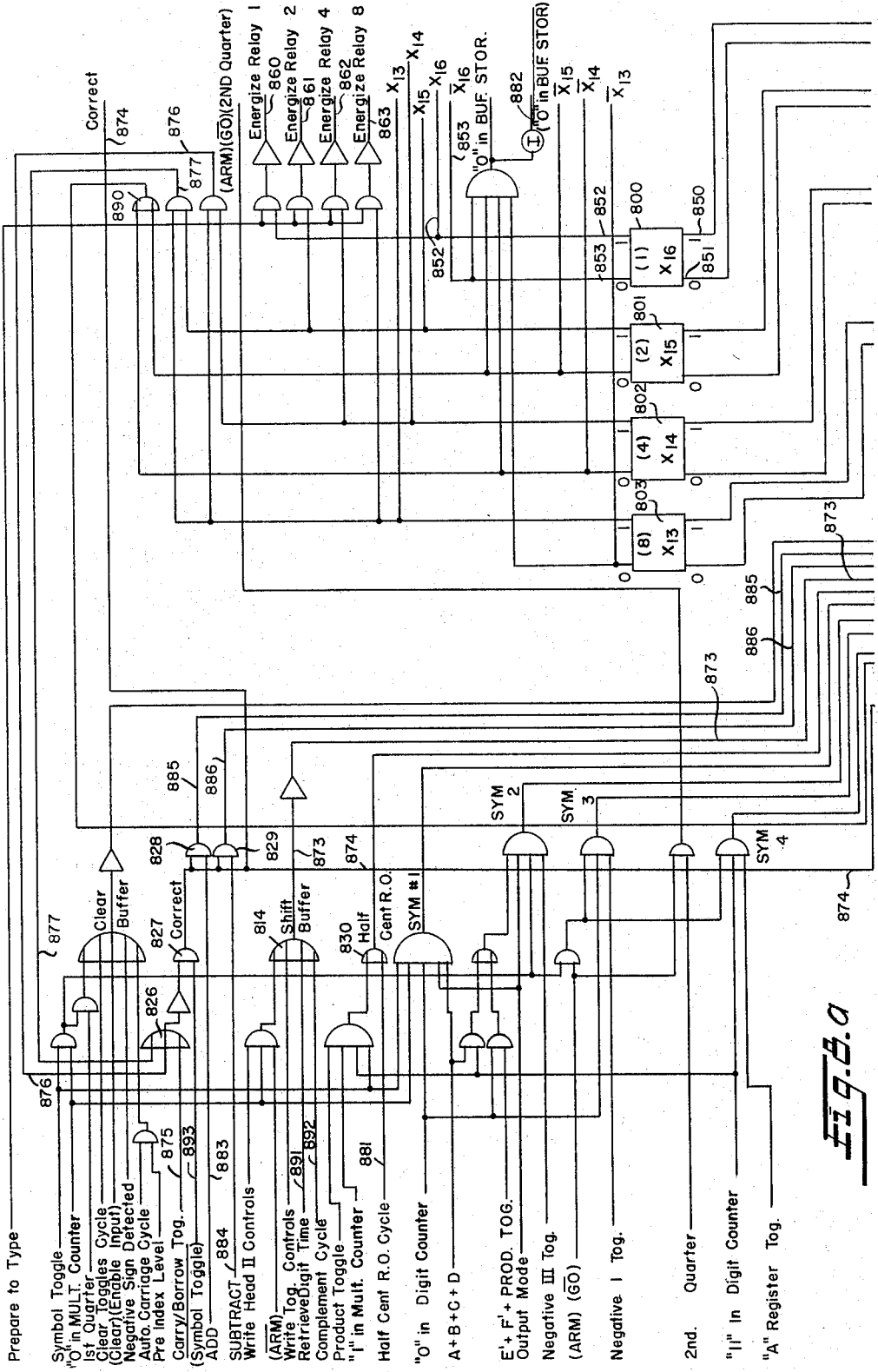

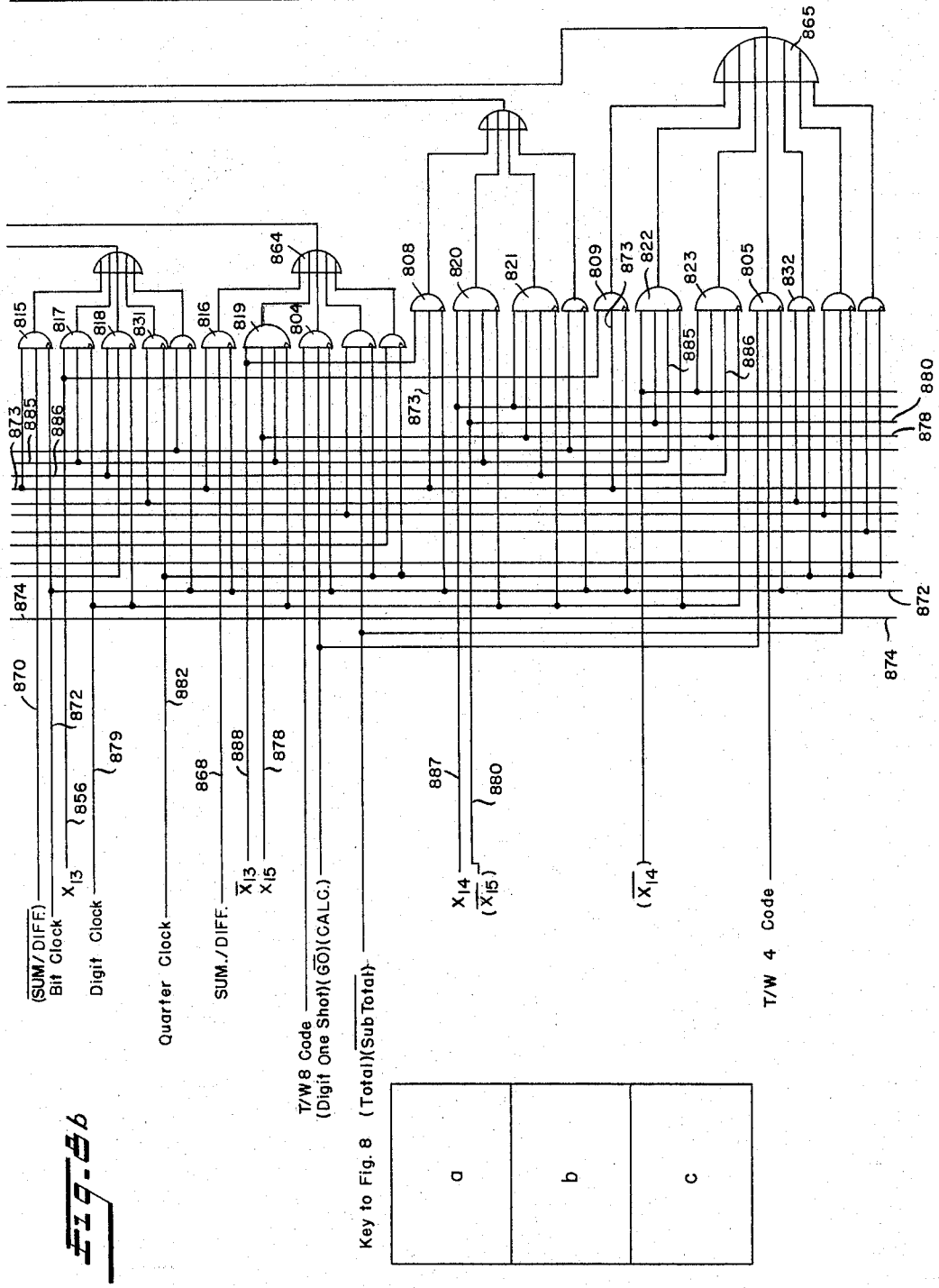

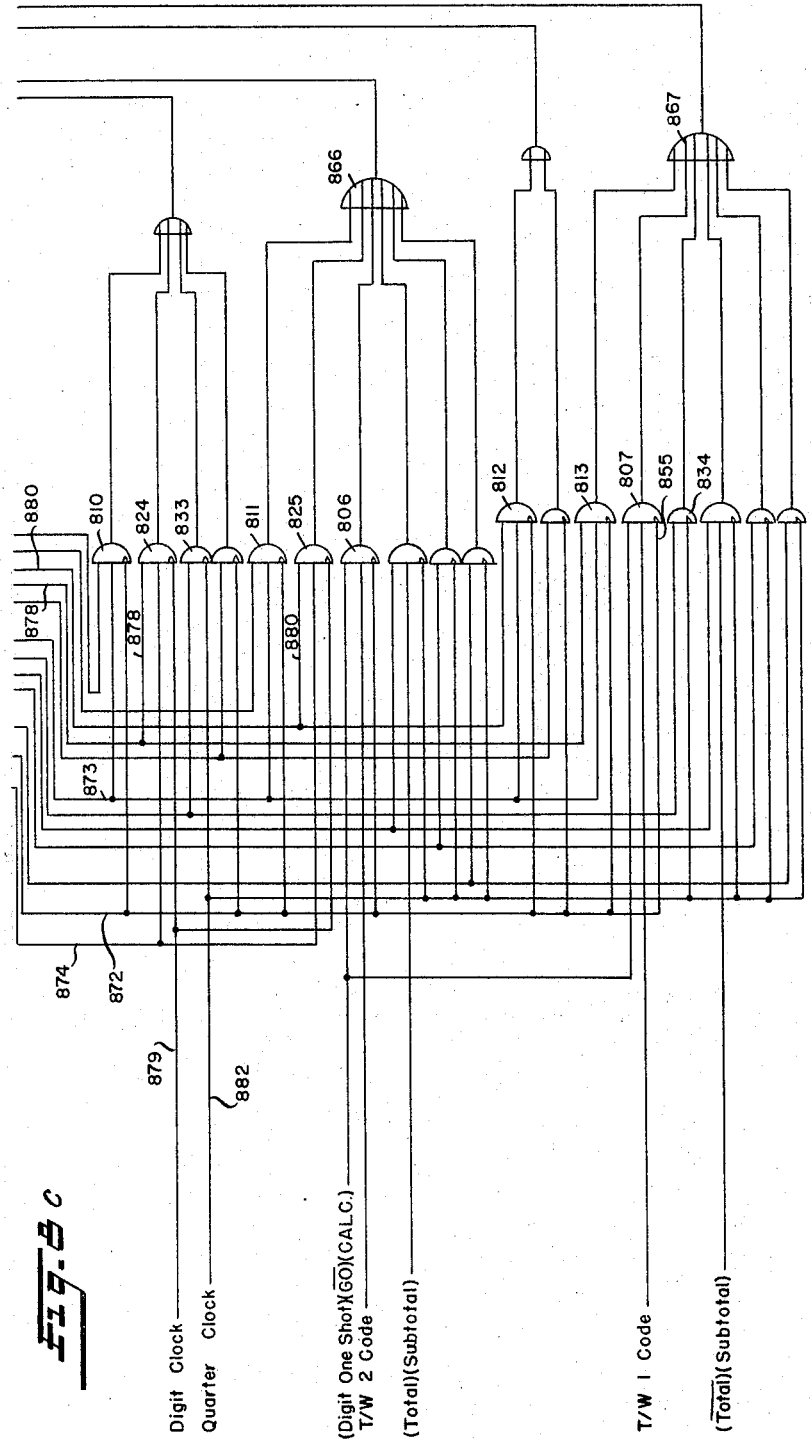

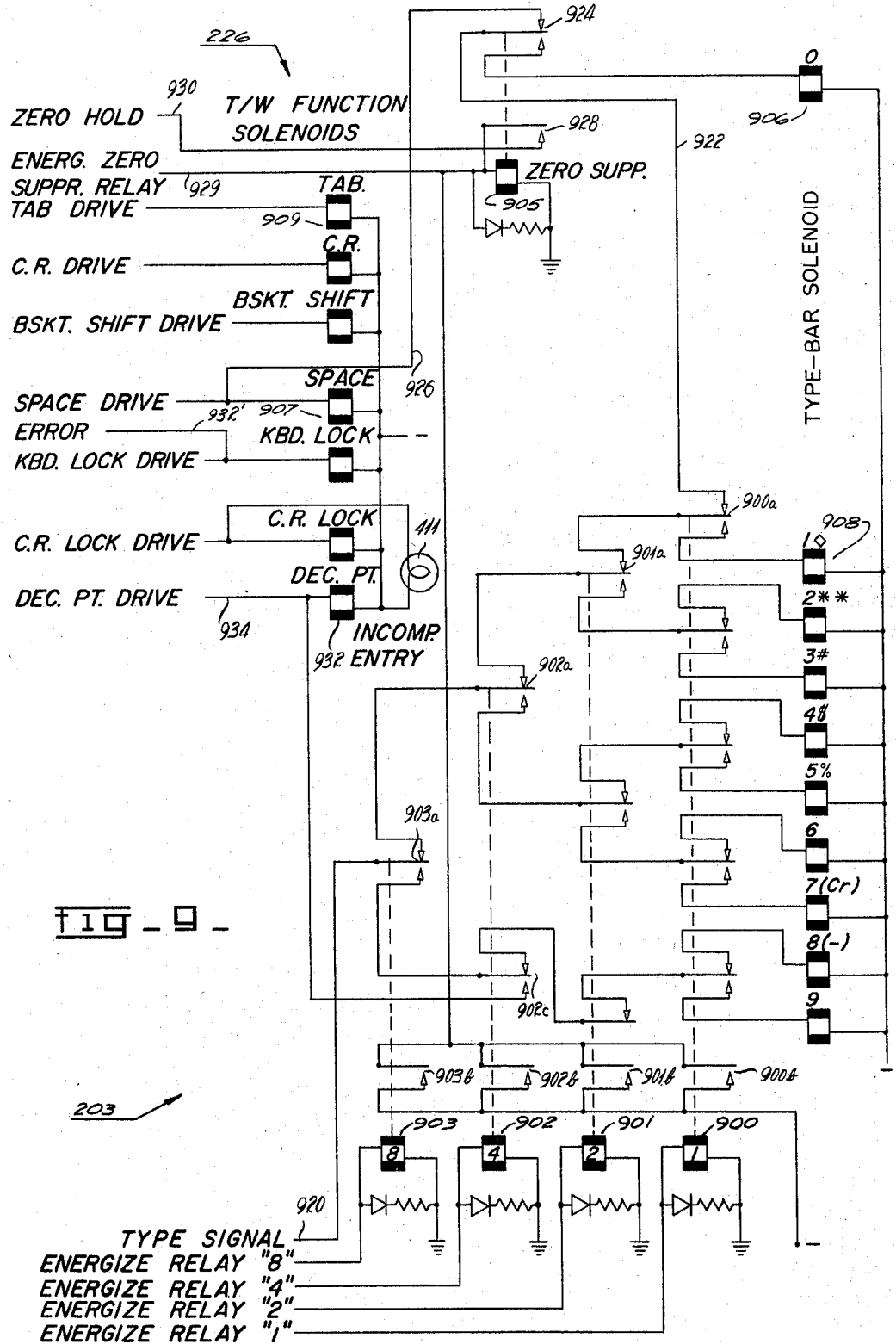

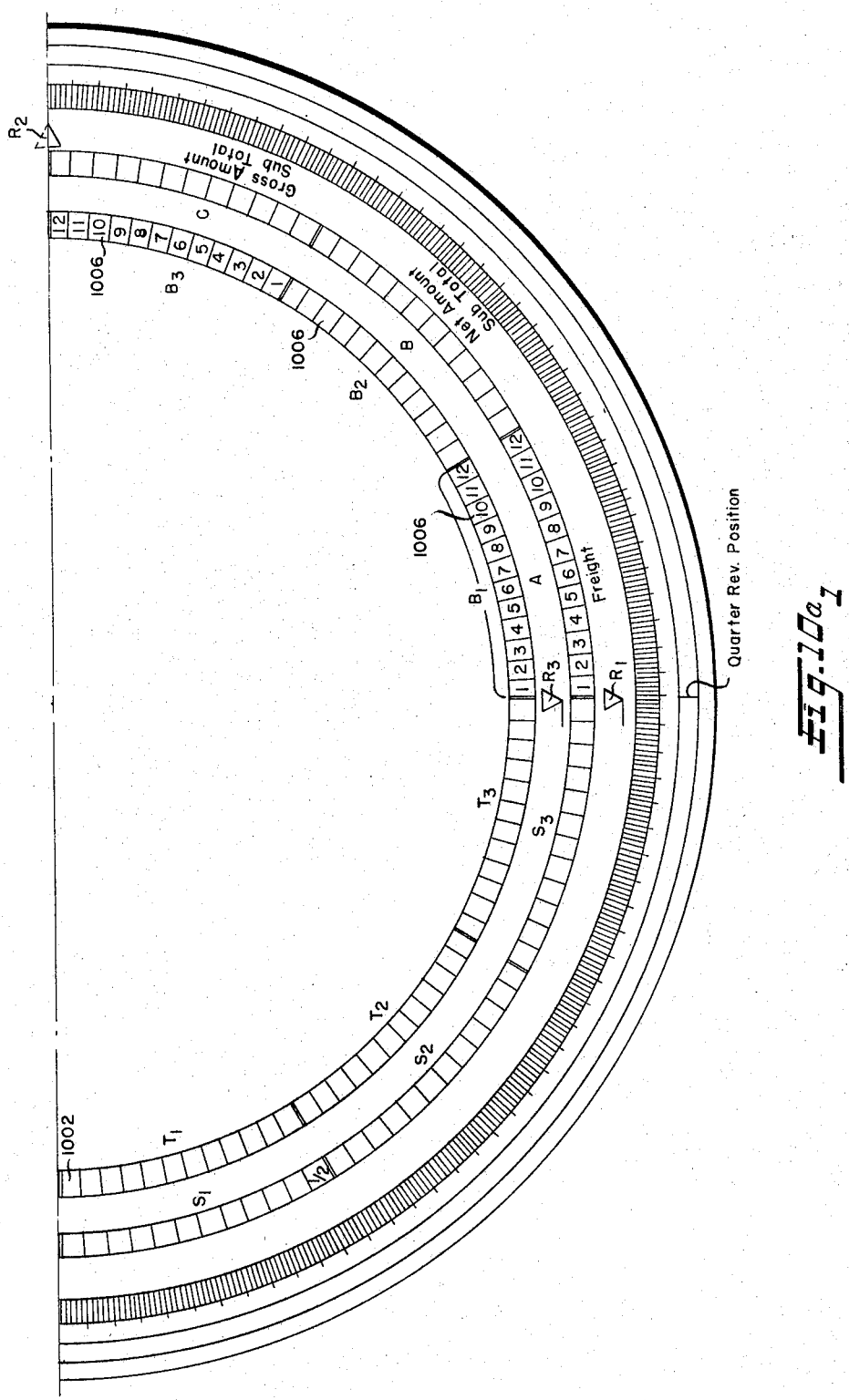

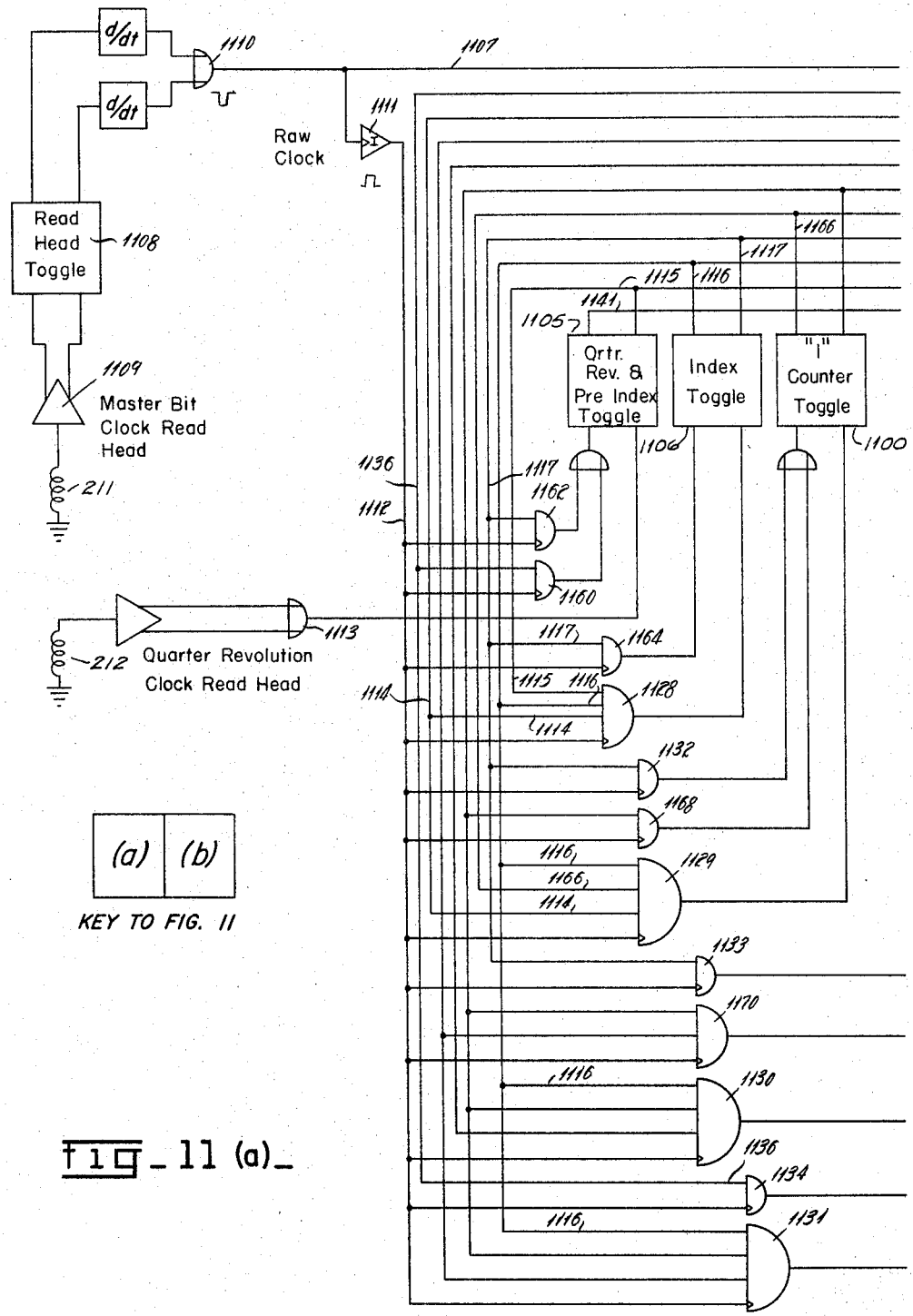
Fig_11 (a)

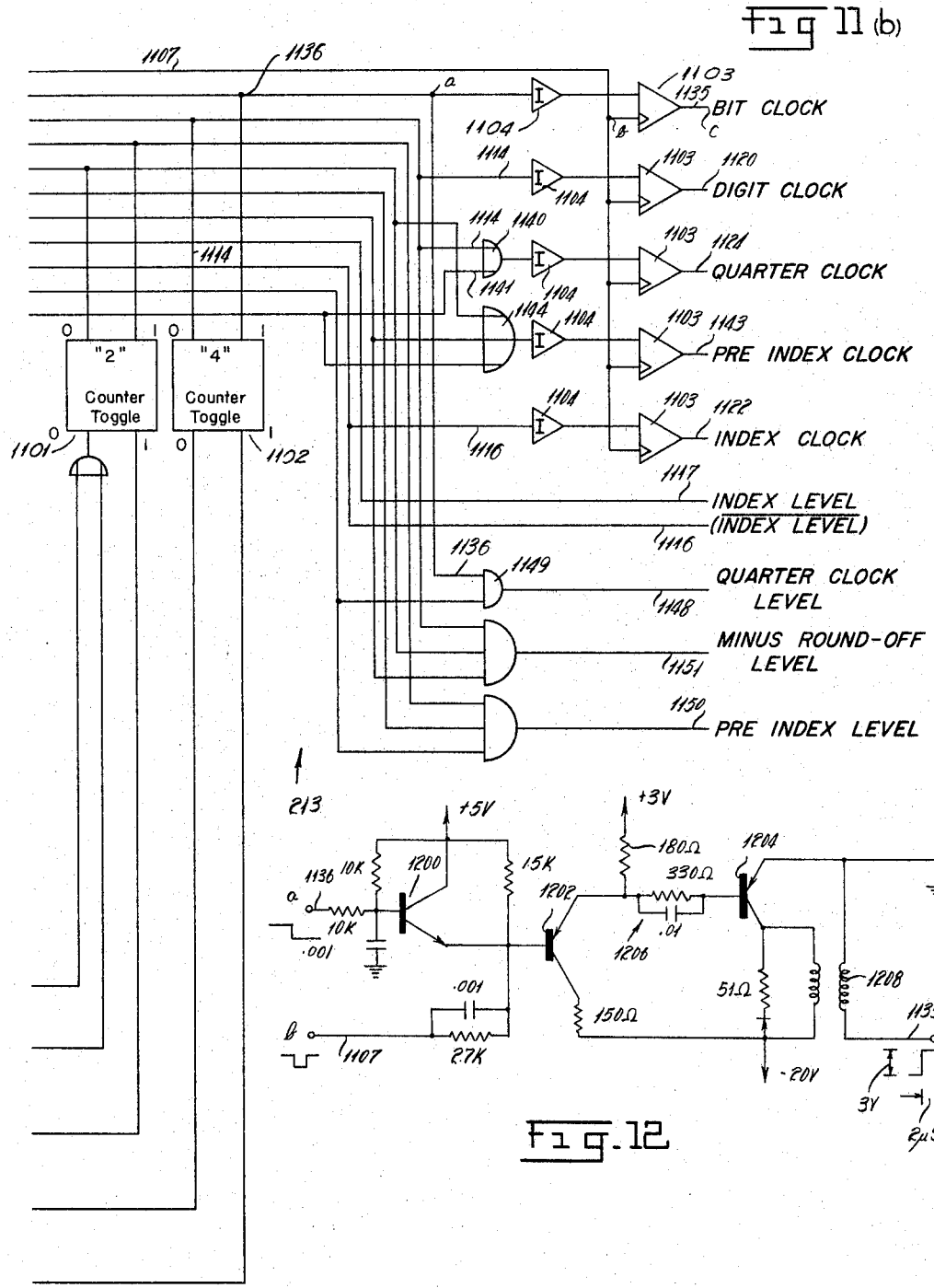

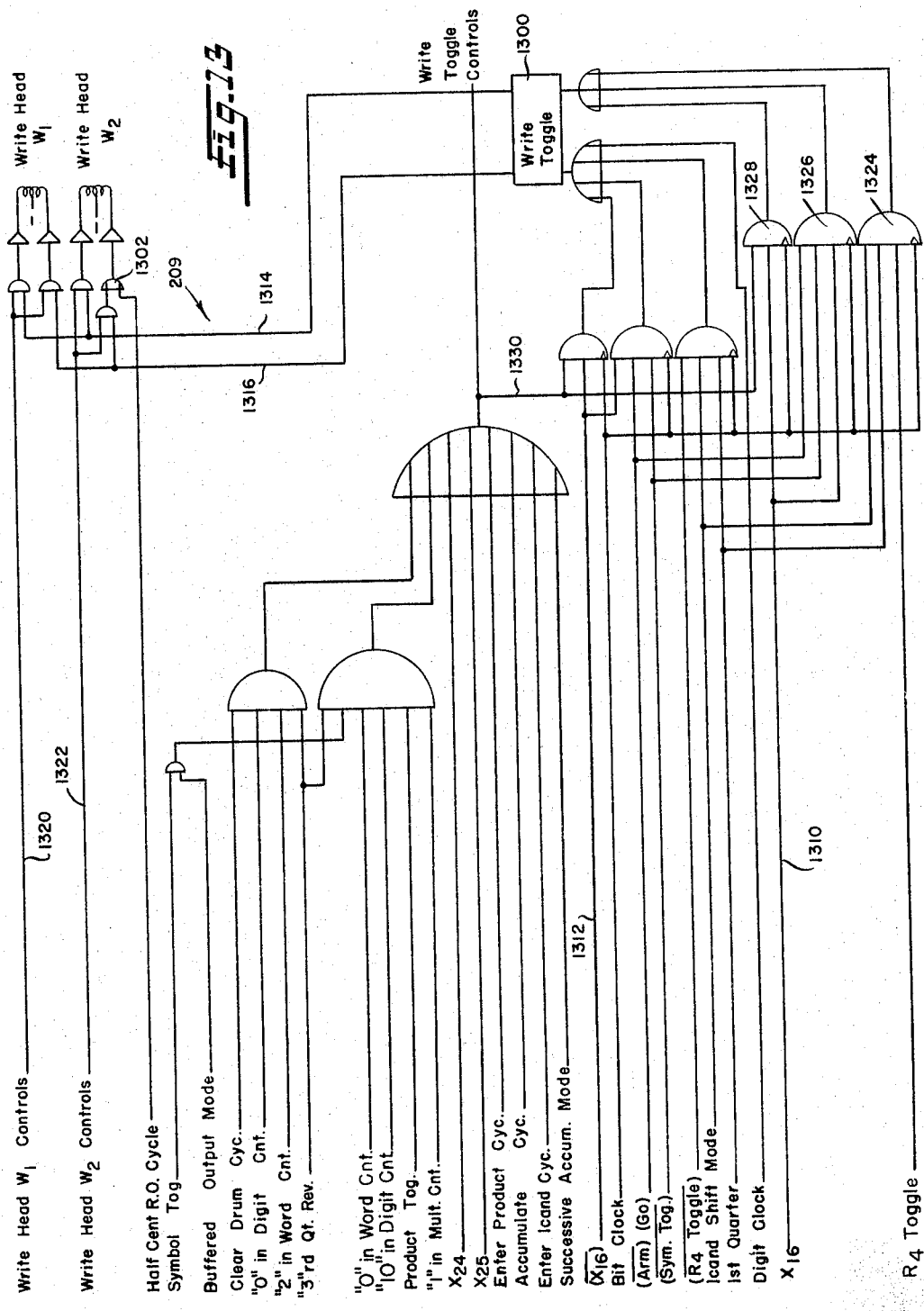

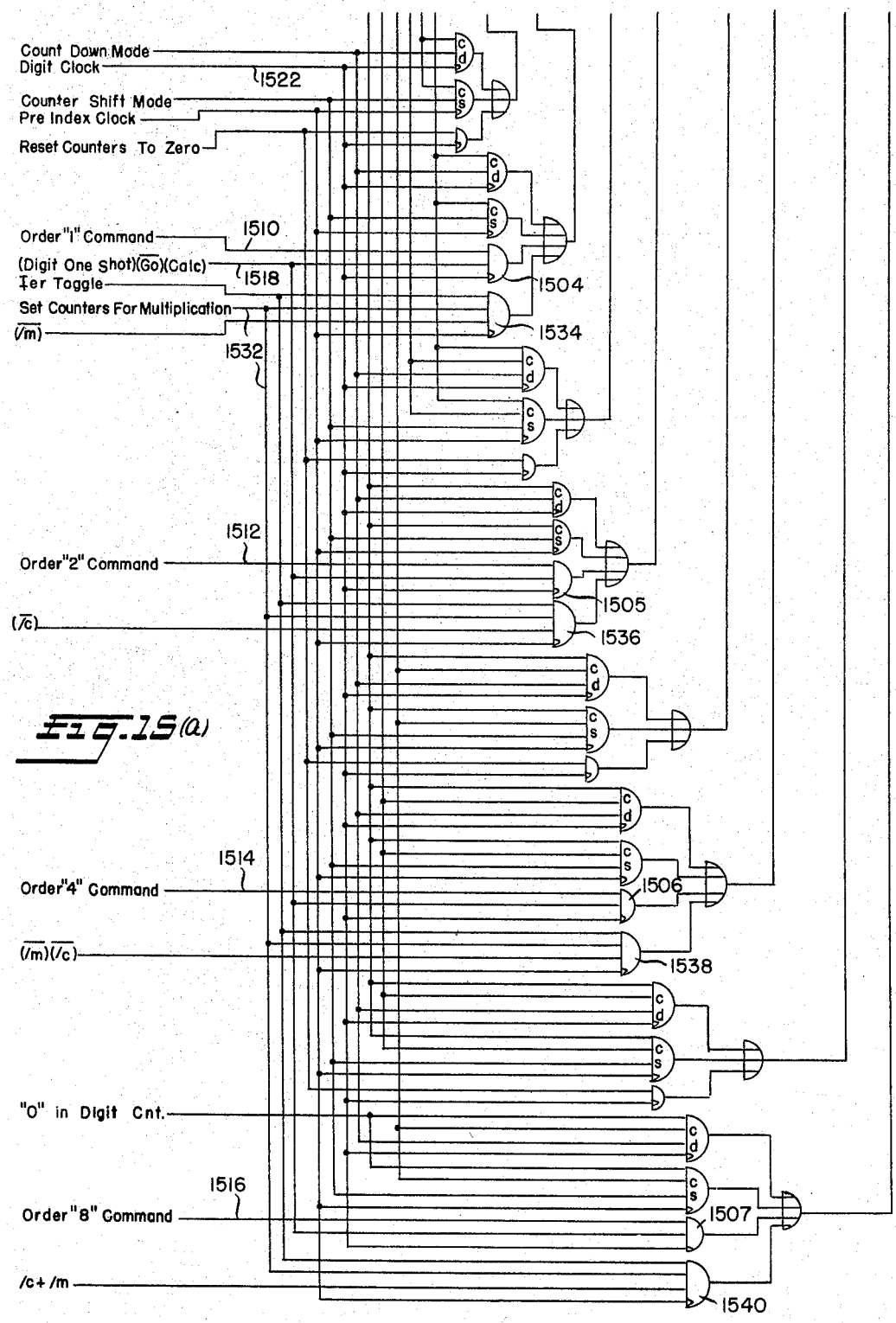

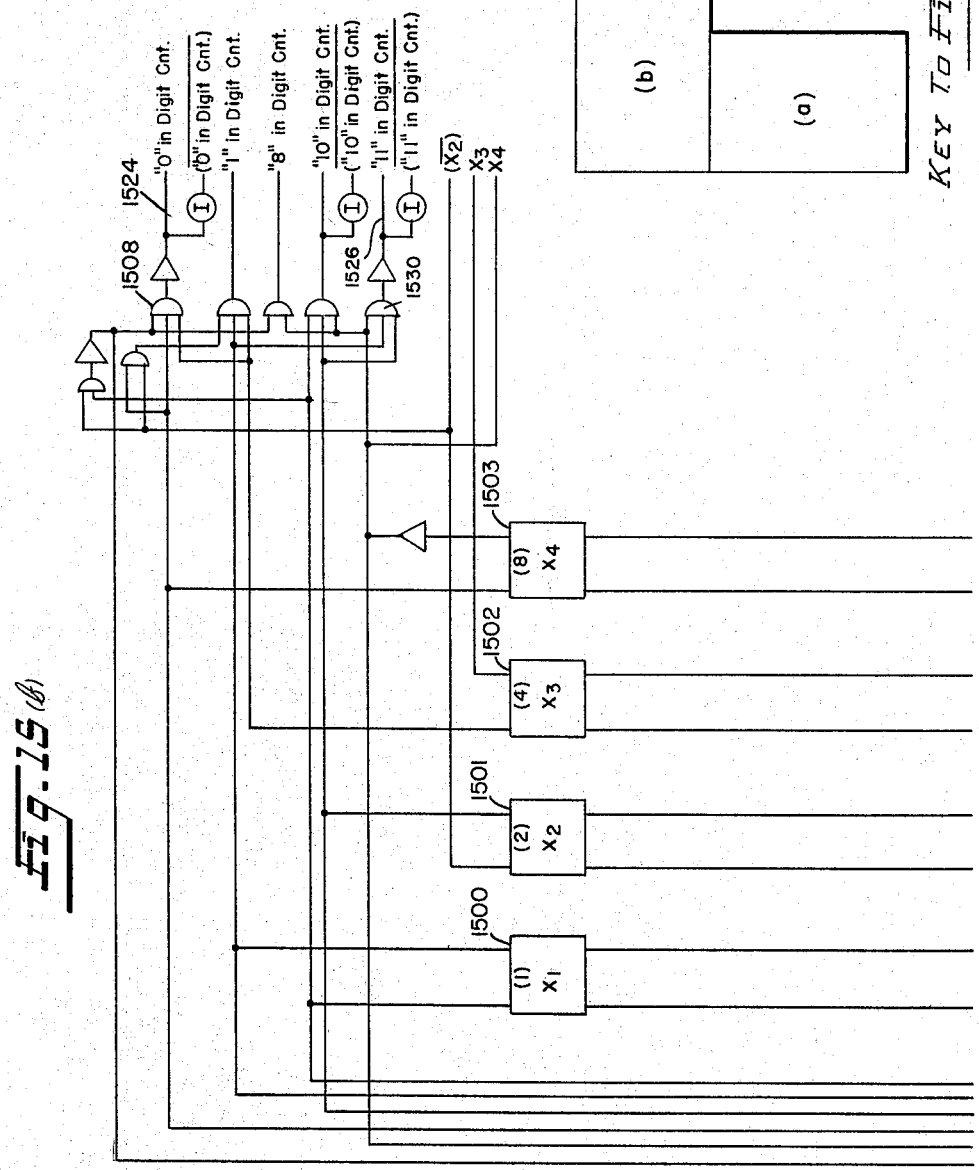

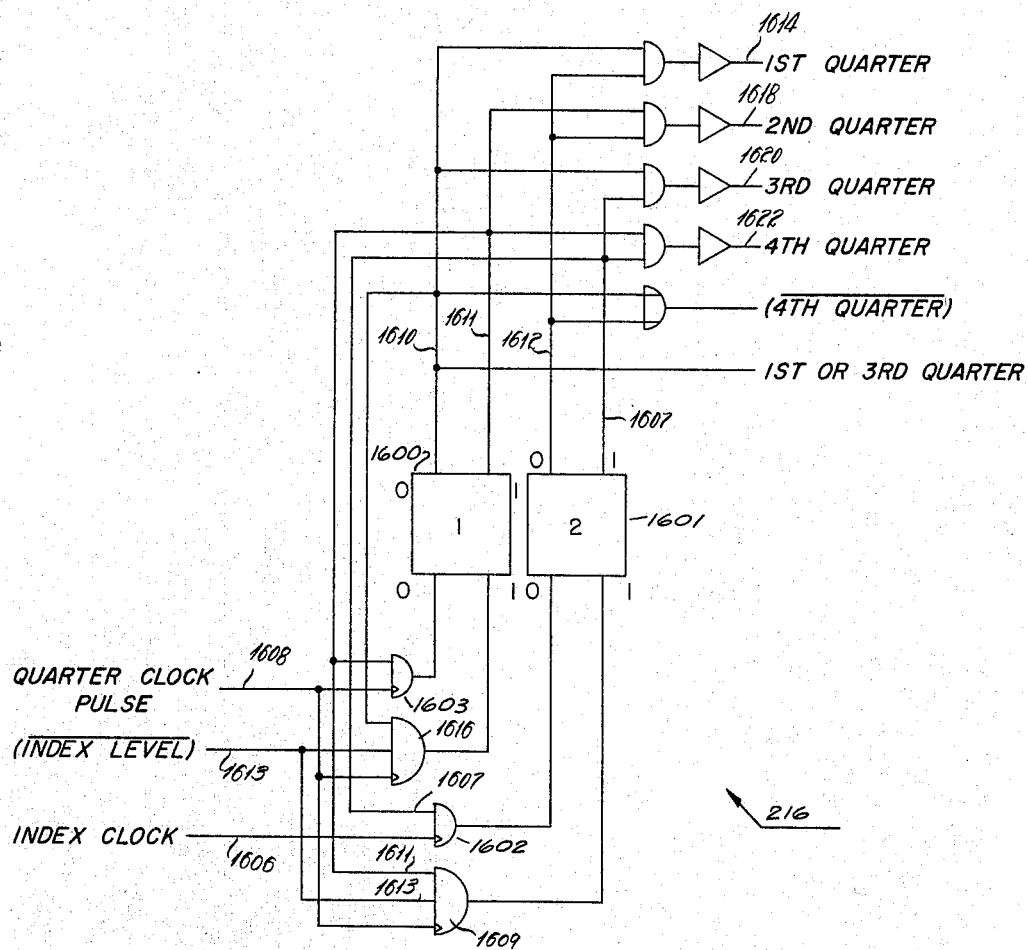
fig_16_

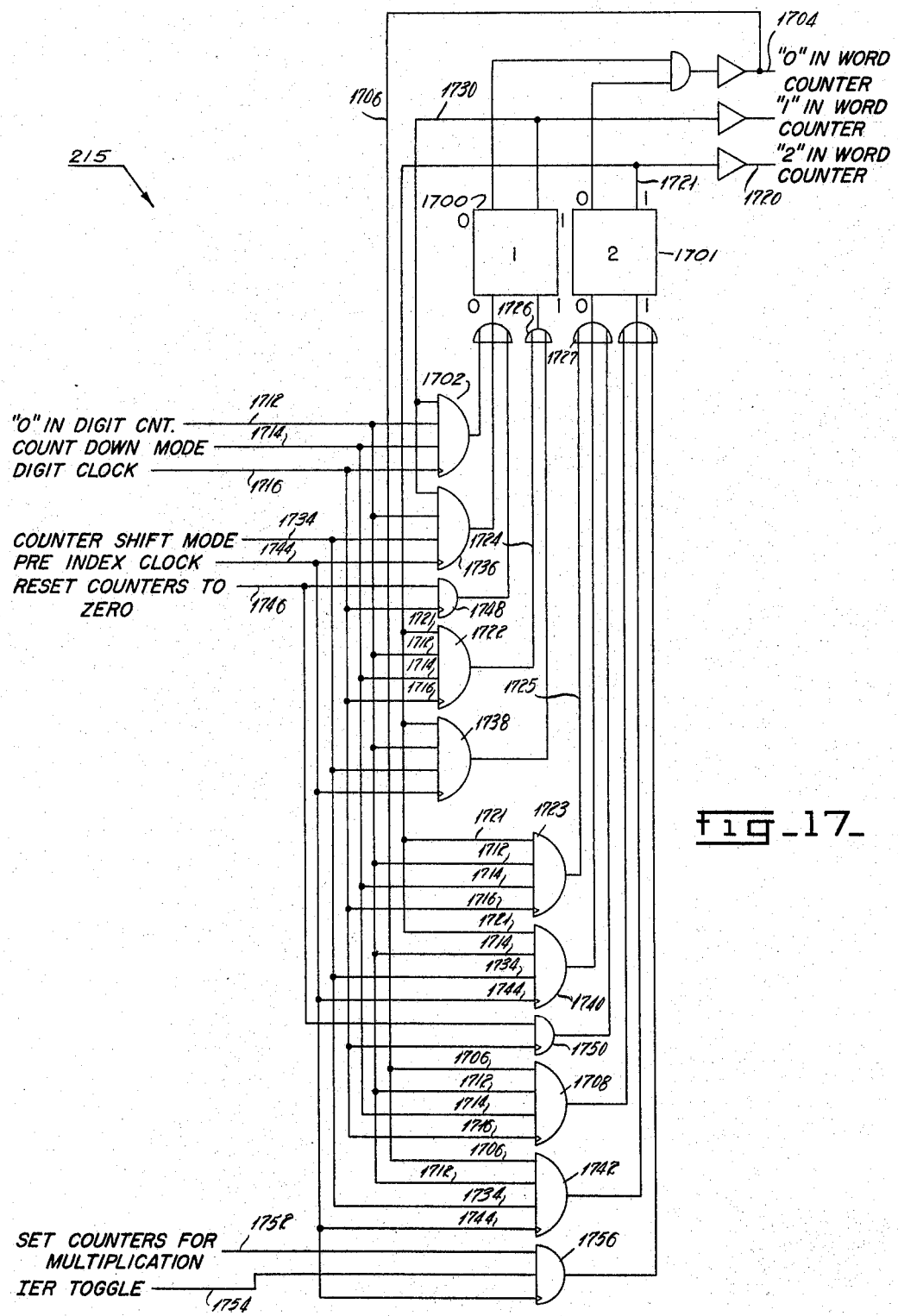
fig_17_

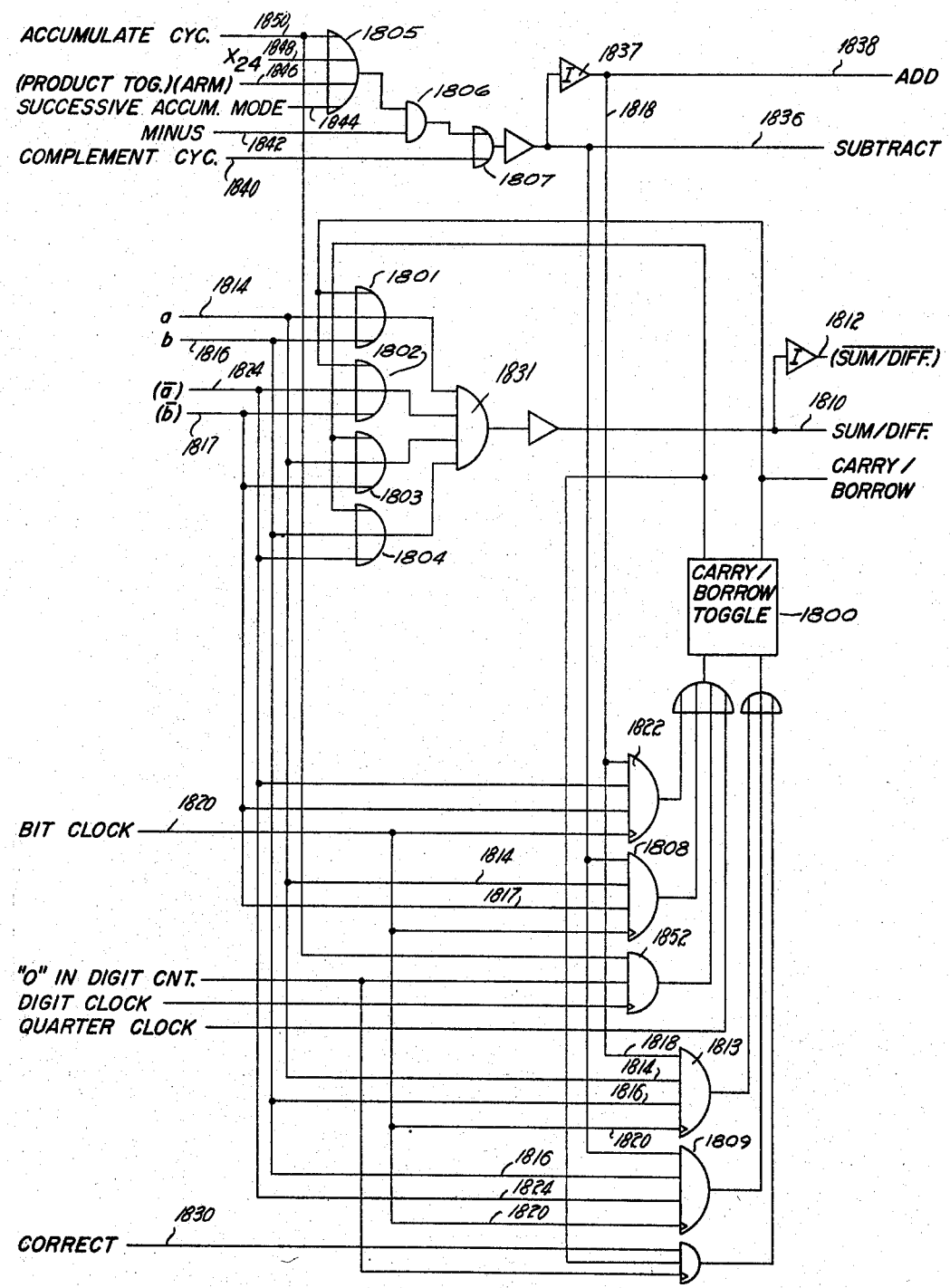
fig_18

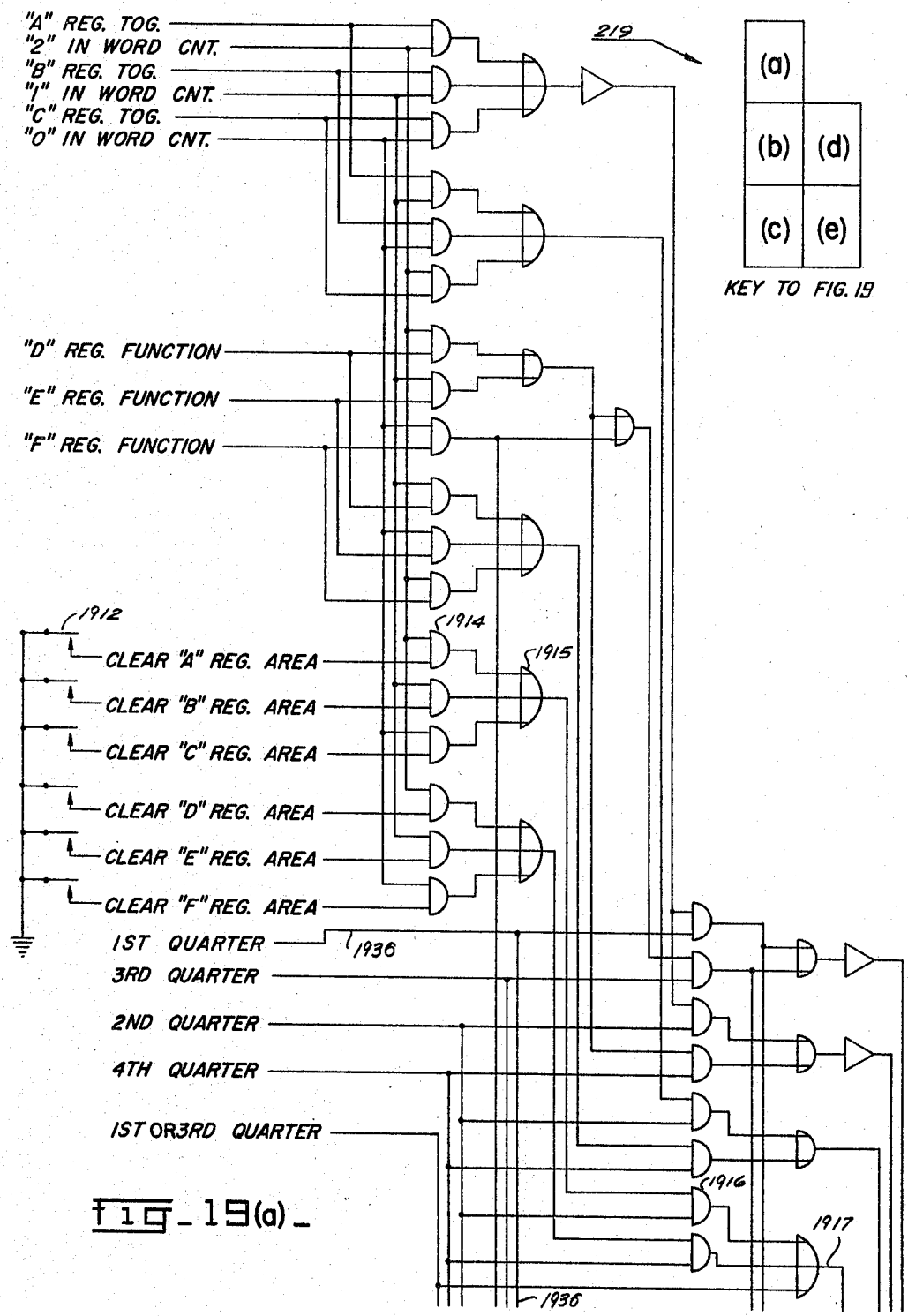
Fig_19(a)

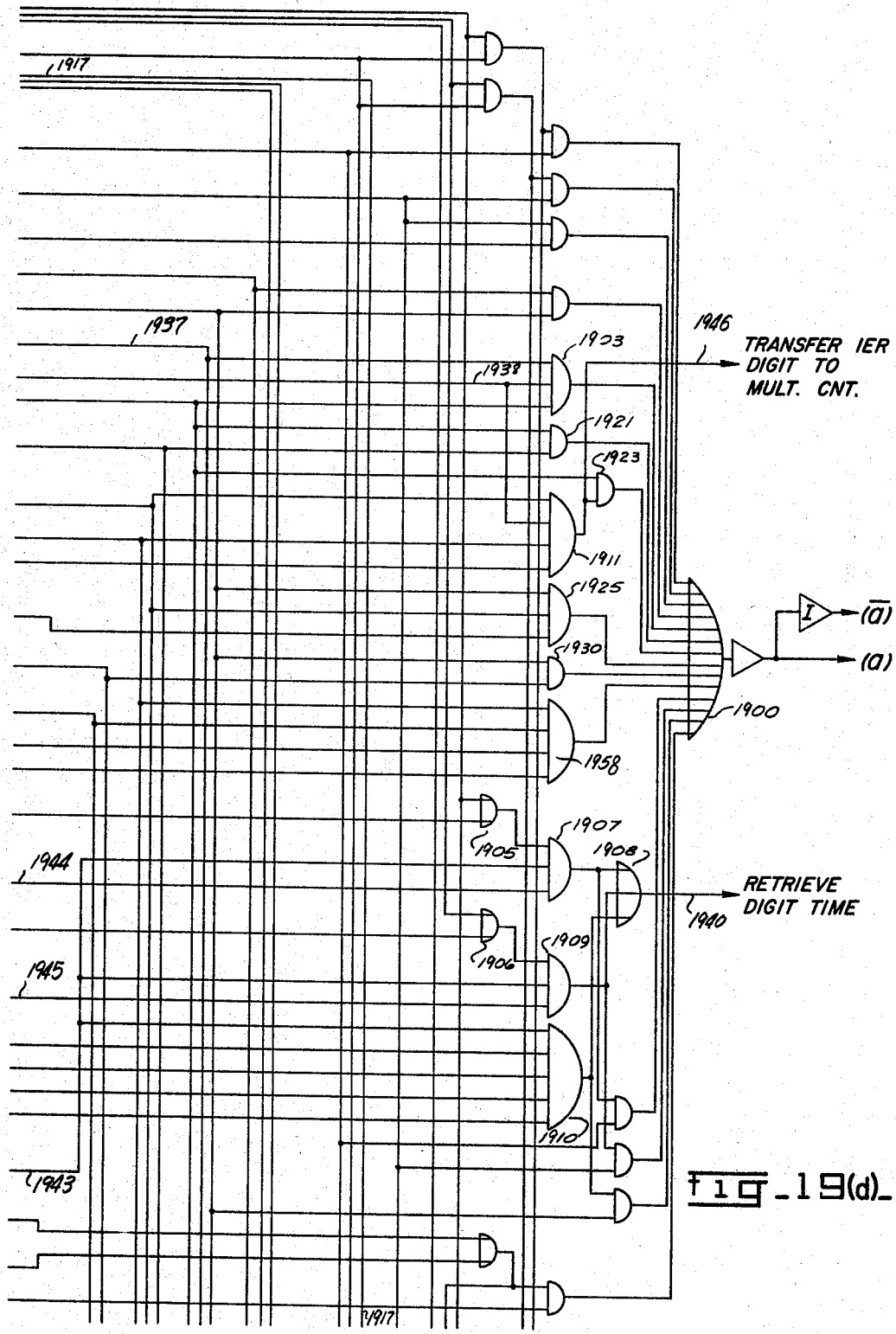

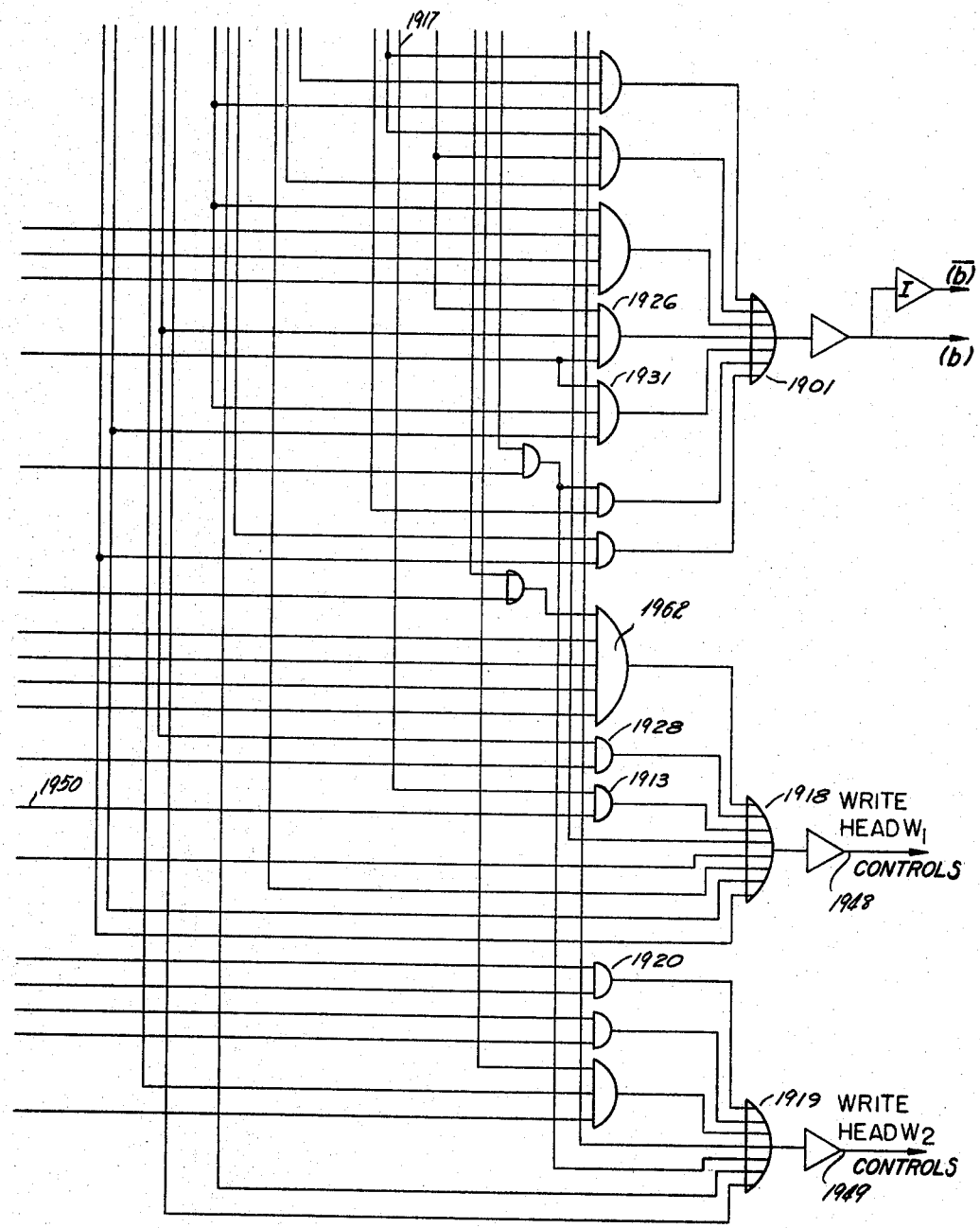
fig_19(e)

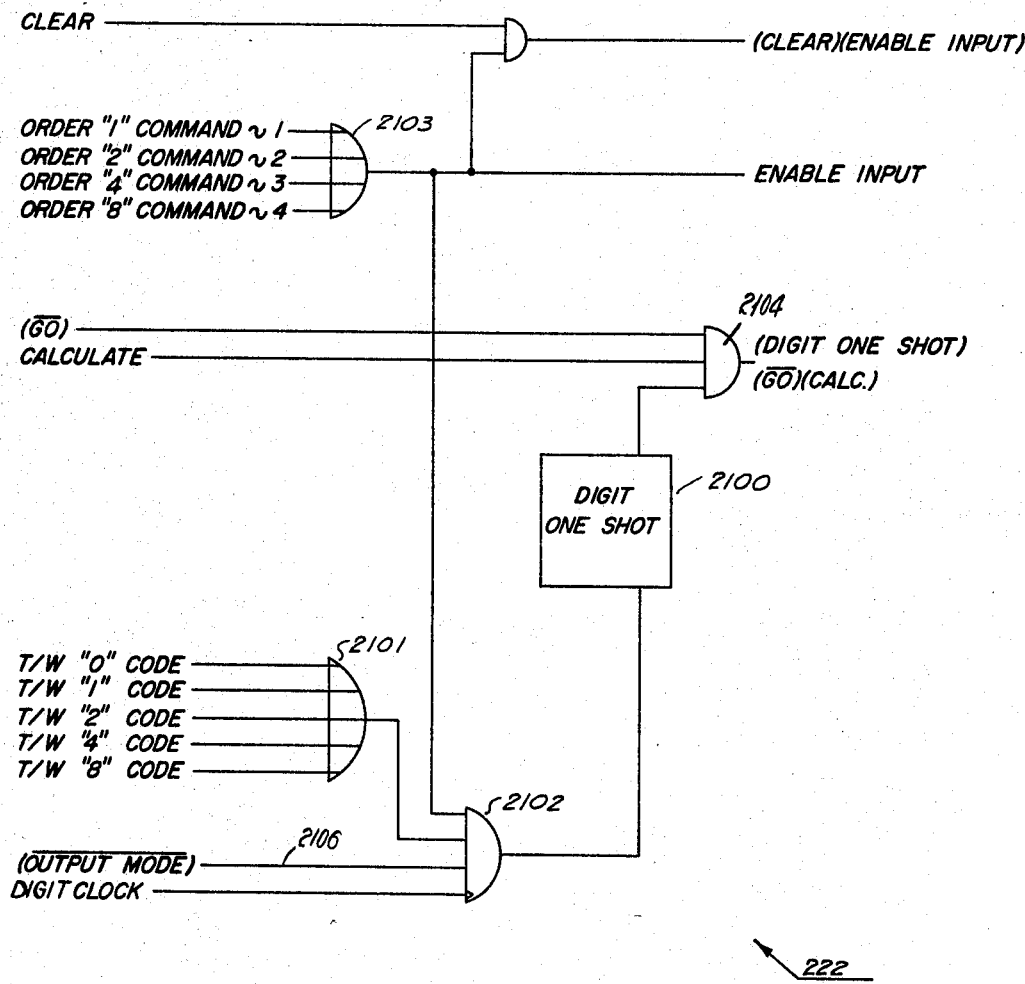
fig_21_ fig_22

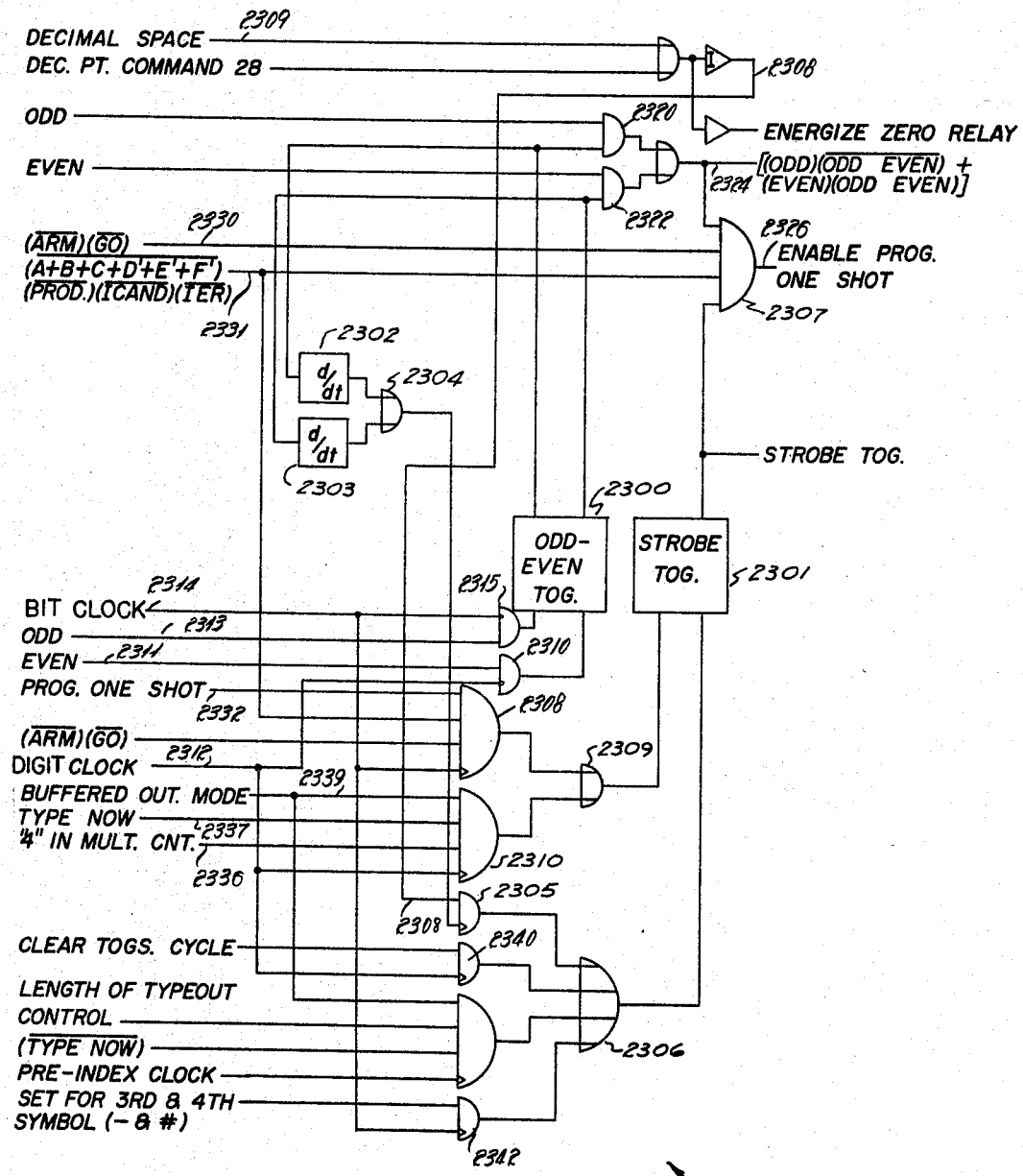
fig_23_

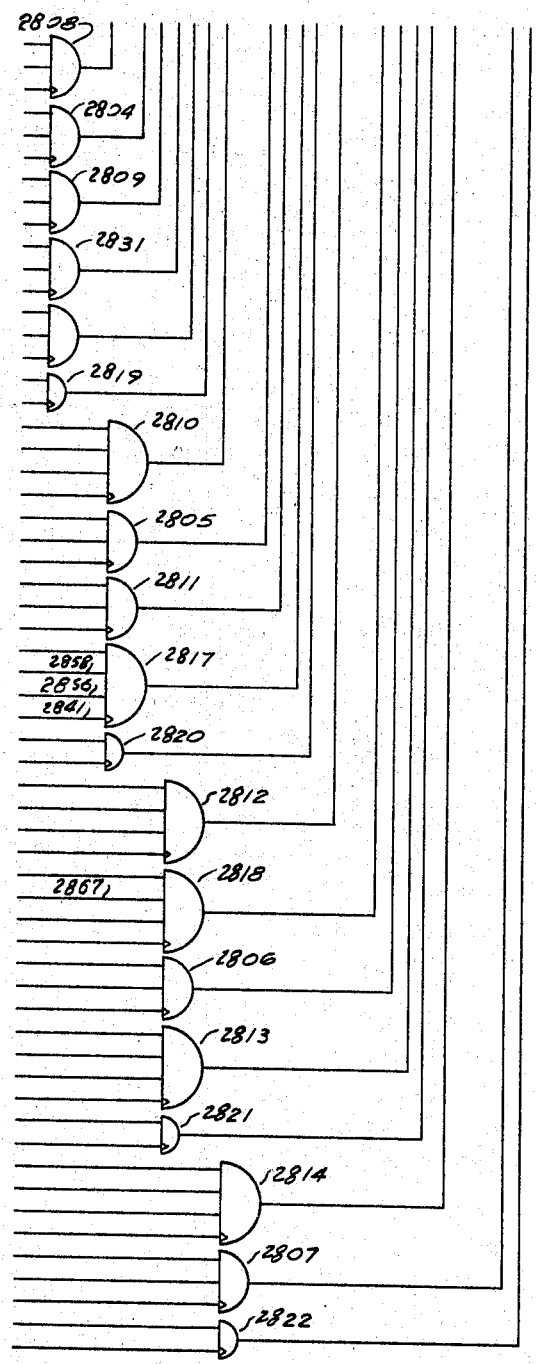
fig_28(d)

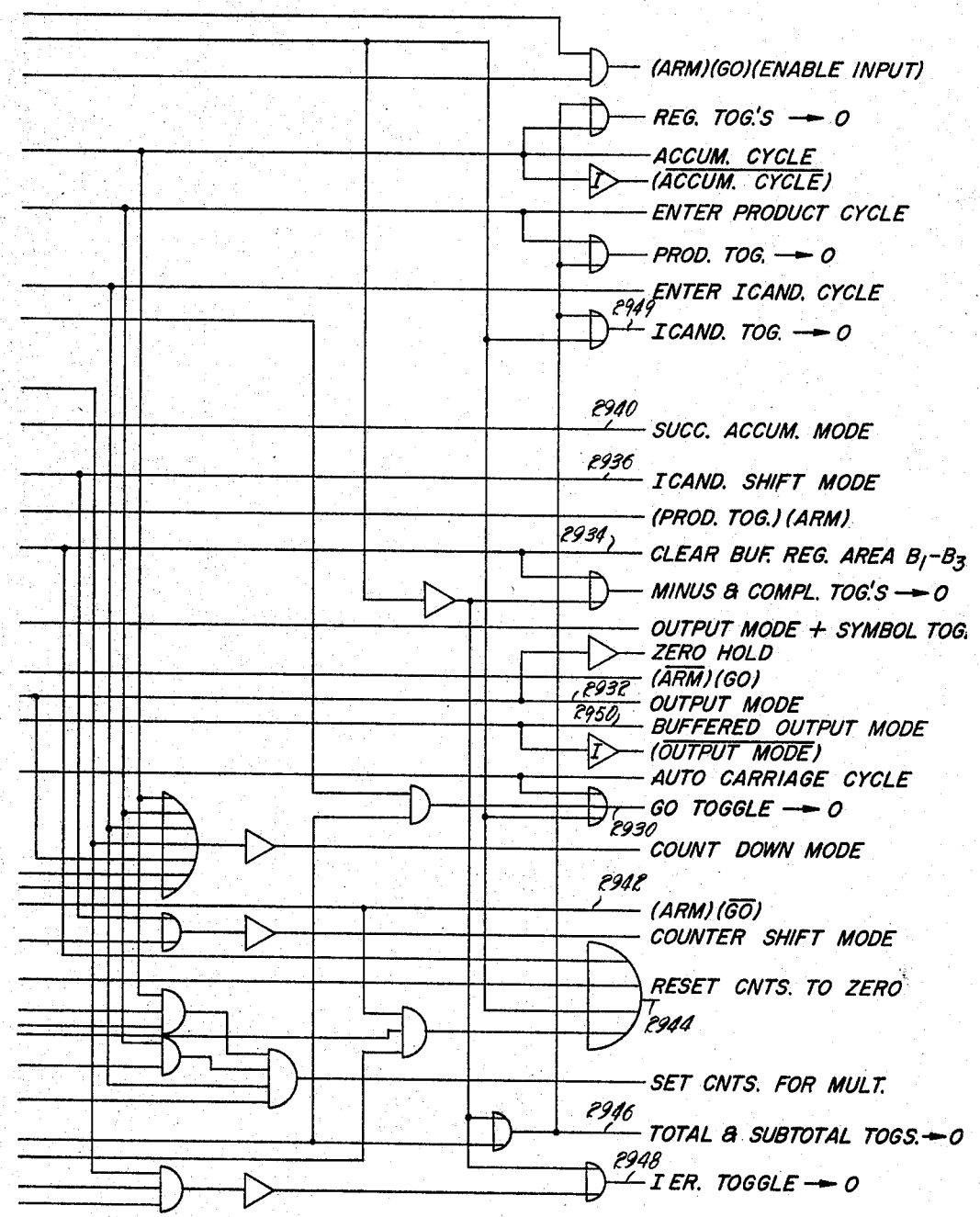
fig_29(b)

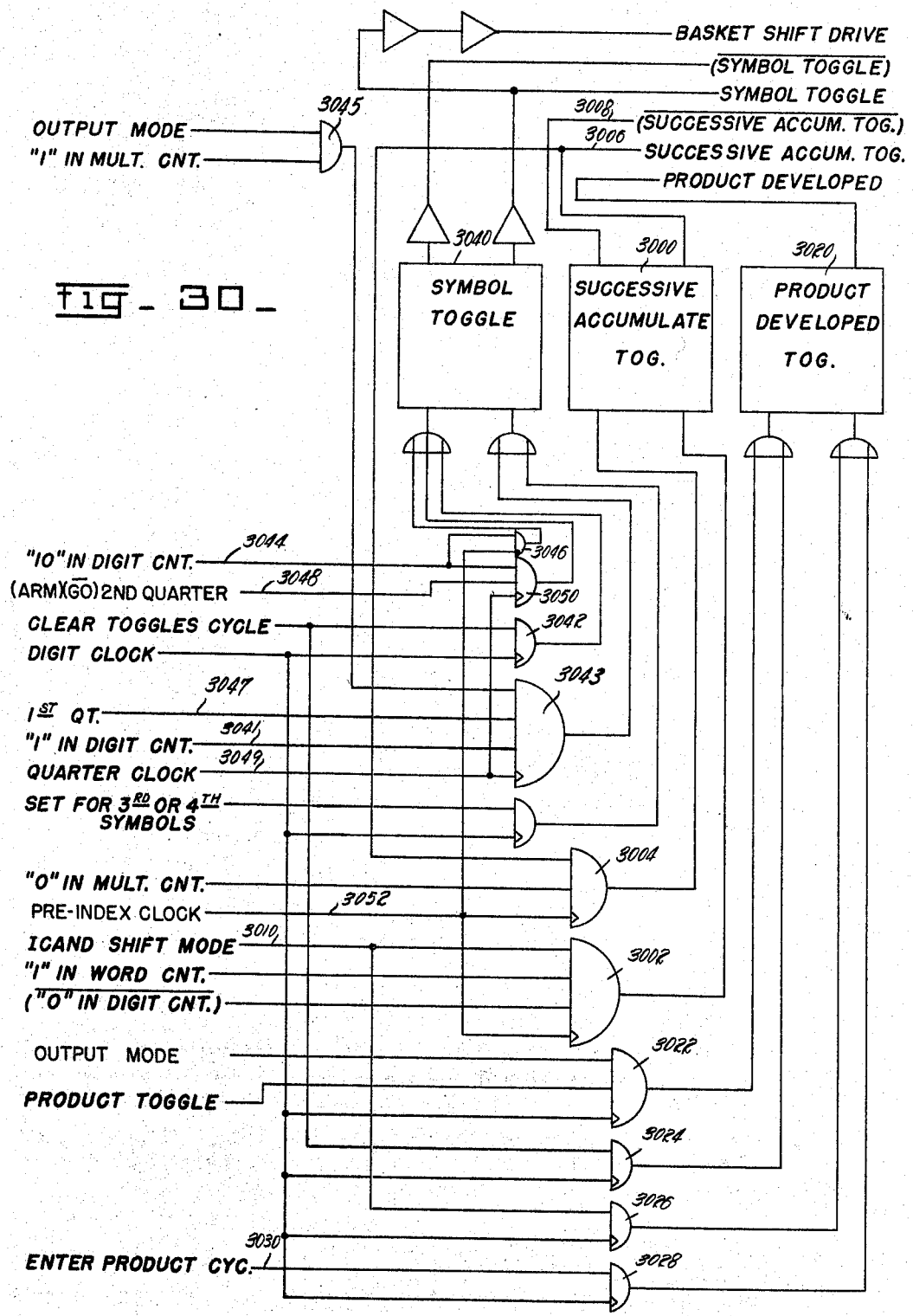

fig_35_

United States Patent Office 3,265,874
Patented August 9, 1966

3,265,874
DATA PROCESSING DEVICES AND SYSTEMS
Winsor Soule, Jr., Berkeley, and Eugene P. Binnall, El Cerrito, Calif., assignors to SCM Corporation, New York, N.Y., a corporation of New York
Filed Dec. 27, 1961, Ser. No. 162,526
53 Claims. (Cl. 235—159)

The invention relates to data processing systems which are especially adapted for use in invoicing operations, and more particularly is concerned with digital electronic data processing systems having a typewriter coupled to an electronic computer whereby all input data is entered at the typewriter and all result data is automatically printed out at the typewriter.

In present practice, many procedures which involve typing of numeric results of computation on a form requiring typing of additional data is accomplished manually at a typewriter after the results to be typed are calculated separately, usually manually on a calculator. One such office procedure requiring a typewriter and a calculator is invoicing.

An invoicing procedure may, for example, require an operator to type on an invoice sheet the description of an article, the quantity, the unit price, the gross amount, a percent discount, and the net amount. The gross amount is usually figured separately on a calculator which normally requires separately entering quantity figures and unit price figures on the calculator keyboard; after the gross amount is calculated, it must then be transferred to the printed invoice. Similarly, the net amount is figured separately by the calculator and then typed by the operator. The foregoing procedure normally occurs in a single line in the body of the invoice.

At the foot of the invoice, the total net amount is typed along with shipping charges and taxes, each of which amounts is figured separately on the calculator, must be then typed on the sheet. A grand total may be typed on summary sheets where desired. In addition, it is frequently necessary to keep daily totals of certain items such as freight, tax, etc. To accomplish this, an additional manual operation is required, such as listing the freight charges shown on each invoice on a separate sheet and then totaling the list at the end of the day.

Since in invoicing it has been necessary to use both a typewriter and a calculator and sometimes intermediate written notation, the operator of these machines must be skilled in arithmetic as well as the use of the machines, such skill being usually acquired only over a long period of training. In such a procedure, a large degree of human performance is involved, accompanied with the usual human propensity to err not only in the manual computation but in the transfer of the result from the calculator to the invoice sheet. In addition, the manual operations in a procedure increase the time required to carry out the procedure, which increase is due not only to the extra time needed at each step for checking for mistakes but due also to the inherent slowness in the operation being manual and the necessity for operating more than one machine.

In the development of a successful electronic computer, the cost of the computer and its operation for performing a particular function must compare favorably with the cost of performing the same function in the conventional manner. While large computers of a general purpose type can be used in many ways to perform arithmetic functions, such computers frequently require card or tape input and/or output units in order that the high speed of operation for which they are designed may be obtained. Also, the correlation and transfer of the output data must be converted into a customary form.

For an invoicing operation, the calculations involve no more than addition, subtraction and multiplication, and one important consideration is that the information on a customary invoicing form must be provided. Hence, a typewriter which is an input-output unit offers significant advantages over other types of input-output units in that the printed sheet produced by the typewriter may be used directly as the invoice form to be mailed to the customer.

Because of the inherently slow speed of a tpyewriter relative to the speed of operation of electronic circuits in an electronic computer, considerable saving in the cost of the electronics may be achieved in a computer especially designed for an invoicing operation. Many circuits may be provided which serve entirely different purposes when different program commands are present.

Adequate flexibility may be offered by a programming system which is correlated with the position of the typewriter carriage. This permits information typed in tabular columns on an invoice sheet to be uniformly processed by the electronics of the system, and the use of replaceable perforated program cards makes it possible to adapt the computer operation with a great variety of invoice formats.

According to the invention, an automatic typing calculator is arranged to utilize a typewriter, a program unit attached to the typewriter carriage, a memory unit, and electronic timing, control and arithmetic circuitry for automatically calculating, storing and printing the results of the calculations, in accordance with a predetermined program. The program may be varied by changing program cards. To perform an arithmetic calculation, operands are entered at the typewriter keyboard, and transferred by means of a coding matrix and a buffer storage into appropriate register areas of the memory unit which may be a magnetic disk or drum. Register areas in the memory unit are arranged so that the portions cyclically recur at a reference point, and are used not only to store arithmetic values entered at the typewriter, but also to store accumulated sums, differences, and products resulting from calculations. Other register areas are used to store operands, sums, and differences during transfer from register to register and still others to store multiplicand operands and partial products during a multiplication.

To perform an addition or subtraction, the operands are simultaneously reproduced in serial form from two register areas in the memory unit and applied to the arithmetic circuitry for addition or subtraction according to the program. The result of the calculation is then recorded directly into a transfer register area of the memory unit. From the transfer register area, the result may be transferred to one or more of six accumulator register areas, which may, if desired, include the register area from which one of the original operands was reproduced.

Operands subsequently entered at the keyboard may also be added to or subtracted from values in select ones of the accumulator register areas. A result may be reproduced from an accumulate register area for printing at the typewriter at the end of each calculation or at the end of any number of accumulations, which reproducing may be accomplished automatically by a predetermined program, or in response to actuation of a control key. Further, because of the order of sequencing program commands and the flexibility afforded by the programming according to carriage position, it is possible to provide automatic branching, that is automatically performing one program or another according to conditions sensed internally rather than as a result of the operator's choice at the control keyboard. For example, a different program can be chosen without intervention by the operator, if the system detects that contents of a register are negative when they are being typed out. Normally, in the carriage position after the last digit in an output field an automatic carriage motion is programmed to carry the invoice to the next field. When an output is negative, however, type-out of a Credit Symbol will take precedence over the above-mentioned automatic carriage motion, moving the carriage into the next adjacent position where an alternate instruction is programmed, thus effecting "branching through credit symbol." Such programming can be used, for instance, to permit all "returned-for-credit" amounts entered in individual invoices throughout a day to be accumulated in a special register for reading out the total at the end of the day.

Multiplication is carried out in the computer of this invention by successive additions and appropriate shifting of the multiplicand, all temporary storage being in the memory unit and shifting occurring during transfer of partial products between multiplication register areas. At the end of a multiplication, and as determined by the program card, the product may be automatically reproduced from the appropriate multiplication register area and printed at the typewriter, or it may be added to a value in an accumulator register area as an internal transfer, or both may occur, and at the same time the product may be programmed for return to the multiplication register area for further processing. In connection with the transfer of a product or an accumulated value from its corresponding register area for purposes of type out or performance of further accumulation always results in clearance of that register as an automatic part of the cycle and that the only way to retain the quantity is to program its return to the register in question. Accordingly, the only difference between sub-total operation and total operation is that the former enables the programmed return to the source register after this register has been cleared of the value typed out, whereas the latter does not.

Because the same typewriter is used both as the input and output device and the system is programmed in large part by the position of the typewriter carriage, it has been found important that all typewriter keys be locked during the time that the typewriter serves as an output unit and also locked at other times such as when the carriage has moved into an entry field, but the system is not ready for entry because previous internal operations have not been completed. Also it has been found important that the carriage return key be locked during the time that the input operation is in process. These locking devices prevent operator interference with the system function. For the same reasons, the Special Total Key, the Sub-Total Key, and the Total Key on the control keyboard are electronically interlocked as described hereinafter so that they have no effect while the unit is cycling internally. If one of these keys is depressed and released while such condition prevails, the desired operation will not be initiated and it will be necessary to depress that key once again.

Another advantage of the present invention is that the electronic system receives information entered by the typewriter at the maximum rate that the typewriter can perform with correct copy. Therefore, the electronic typewriter does not require interlocking against a high speed entry and the free keyboard touch highly desired by operators is retained.

The principal object of the present invention is to provide a novel electronic calculator or computer combined with the typewriter to simplify the performance of the procedures involving arithmetic calculations. This reduces the likelihood of mistakes by eliminating the need to transfer numbers between the keyboards of a typewriter and a separate calculator, and significantly increases the amount of work which an operator is capable of performing.

Another object of the invention is to provide an electronic computer of minimum size and cost, and with components of economic design to perform the normal invoicing operation of a business organization.

Other objects of the present invention which are ancillary to provide a computer having the foregoing characteristics are to provide:

A novel programming arrangement utilizing a perforated card and sliding brush assembly which is adapted to program and control operations of the electronic portions of the computer in accordance with the position of the carriage on the typewriter whereby the invoice sheet printed by the typewriter and the program card may be correlated to provide maximum flexibility for the format of the invoice sheet, including provision for automatic branching, i.e., choice of alternate programs, under control of the electronic portions when certain conditions are sensed; these being conditions associated with negative contents in an accumulating register in this illustrative example.

A novel buffer storage input-output toggle register which serves to convert the parallel transmission of the decimal digit in binary form into a sequential signal for use in the memory unit and electronic portions of the calculator and for again converting the sequential signals into parallel signals for type-out operations.

A novel information modification system which includes an add/subtract circuit positioned between the reproducing heads and the recording heads of the memory unit in combination with the input-output toggle register which serves as a one digit delay device. The binary decimal digit code used throughout the system is composed of only four bits, and a fifth bit time is used to correct in the buffer toggle register any digit indication greater than nine to a corrected digit indication less than ten to thereby record in the memory unit only single order decimal values.

A unique system for programming the decimal point and locking the keyboard if a digit it typed in a decimal position or if a decimal point is typed in a digit entry position coupled with a non-return-to-zero magnetic recording technique whereby erroneous entries can be corrected by mere over-typing where the correction is made prior to escapement of the typewriter carriage beyond the input field.

Program commands that designate both address and sign of entry.

Operator control of entry directly into a selected register while entry to other registers are programmed.

Internal transfer of information from one register of the memory to another either with or without type-out, and variable length and truncated type-outs though with internal transfer of the entire ten digit number and sign.

A novel program card having unique program and timing or strobe perforations to make certain that all the program commands are set in the computer prior to initiating a cycle of operation when the typewriter carriage moves to a new position.

A novel circuit for synchronization of the typewriter with operation of the electronic calculating unit.

A novel memory track, recording head and reproducing head arrangement on the memory unit to provide addition, subtraction and multiplication operations and input of information into and retrieval of information from the memory unit at speeds adequate for use with the typewriter as the input-output unit.

A novel memory unit having two closed tracks with a single write head with each track and two read heads for each track, all of the heads being located at substantially quarter revolution positions for providing adequate flexibility and speed of operation with reduced cost resulting from a memory unit having simplified construction.

A novel arrangement including a one digit delay shift register and a memory unit wherein the read heads are located at quarter revolutions and the write heads at approximately one digit position beyond a quarter revolution position in the direction of rotation to facilitate shifting of digits in the memory unit one digit area at a time for control of decimal point and for carrying out multiplication operations.

A novel system in connection with a simplified memory unit layout for accumulation into separate accumulate register areas, for shifting of the multiplicand into the central portion of a quarter area of one of the memory tracks for successive additions with the values in diametrically opposite quarter track areas in the other track, and for complementing each plural digit number and then detecting the signs before type-out of any plural digit value by the typewriter.

A novel circuit arrangement for the suppression of all zeros to the left of the first non-zero number during type-out.

A novel power supply circuit for energizing the write head in connection with the magnetic memory unit whereby any decrease of the power supply voltage to the write head results in a complete cut-off of the power to the write head so that signals below a predetermined level will not be recorded in the memory unit; and when the power is again applied, the entire system must be in its proper condition before write head voltage is applied to effect a change in the information stored in the memory unit.

A most transfer system for recording information in the memory unit at one location as it is reproduced from another location, either with or without modification, including a circuit having a one digit delay register where the recording head is normally gated off at index time, and means for extending the time the write head is gated on past index position of the memory unit when recording in register areas where part of the information would otherwise be lost.

An improved operator control panel on the typewriter containing a clear key for destruction of information in only the input buffer storage area of the memory unit and a reset key which alone is incapable of causing destruction of any information in the memory unit, but when depressed together with the clear key will destroy the information in the accumulate registers, with these two keys being separated on the control panel to reduce the likelihood of inadvertent simultaneous closure of both keys.

These and other objects of the invention will become more fully apparent from the claims, and from the description as it proceeds in connection with the drawings wherein:

FIGURE 1 is a diagrammatic illustration of the electronic calculator of the present invention showing in detail the typewriter which serves as the input-output unit, the arrangement of the program card mounted on the back side of the typewriter unit to thereby program the computer in accordance with the position of the carriage on the typewriter, the memory unit, and the encoding and decoding circuitry for transmitting a digit entered on the keyboard of the typewriter to the memory unit and for retrieving a digit from the memory unit to be printed on the invoice sheet by the typewriter;

FIGURE 2 shows an invoice sheet which may be typed by the typewriter unit in the calculator of the present invention;

FIGURE 3a shows the program unit conductors containing thirty-two command functions which may be programmed at each position of the carriage either singly or in any combination, and the odd/even program bus bars used to provide a strobe pulse which is effective to cause operation of the electronic portion of the calculator only once for each stable condition of the typewriter carriage, no matter how long the typewriter carriage remains in a particular carriage position;

FIGURES 3b1 and 3b2 together show the entire program card with each of the program command functions labeled at positions corresponding to those shown in FIGURE 3a, with the perforations necessary to program the calculator unit of the present invention to produce the invoice sheet shown in FIGURE 2;

Figure 1:
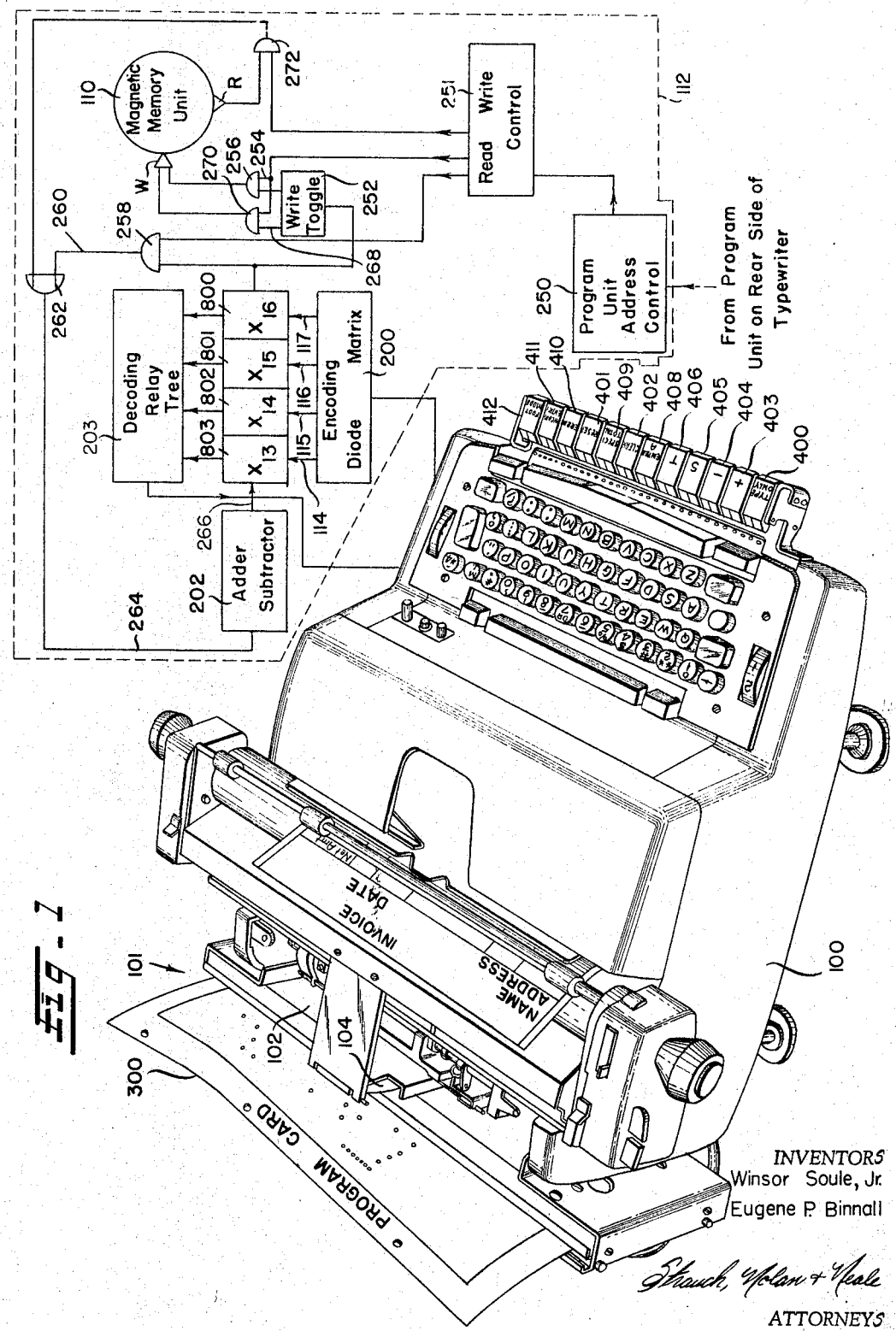
Figure 6B:
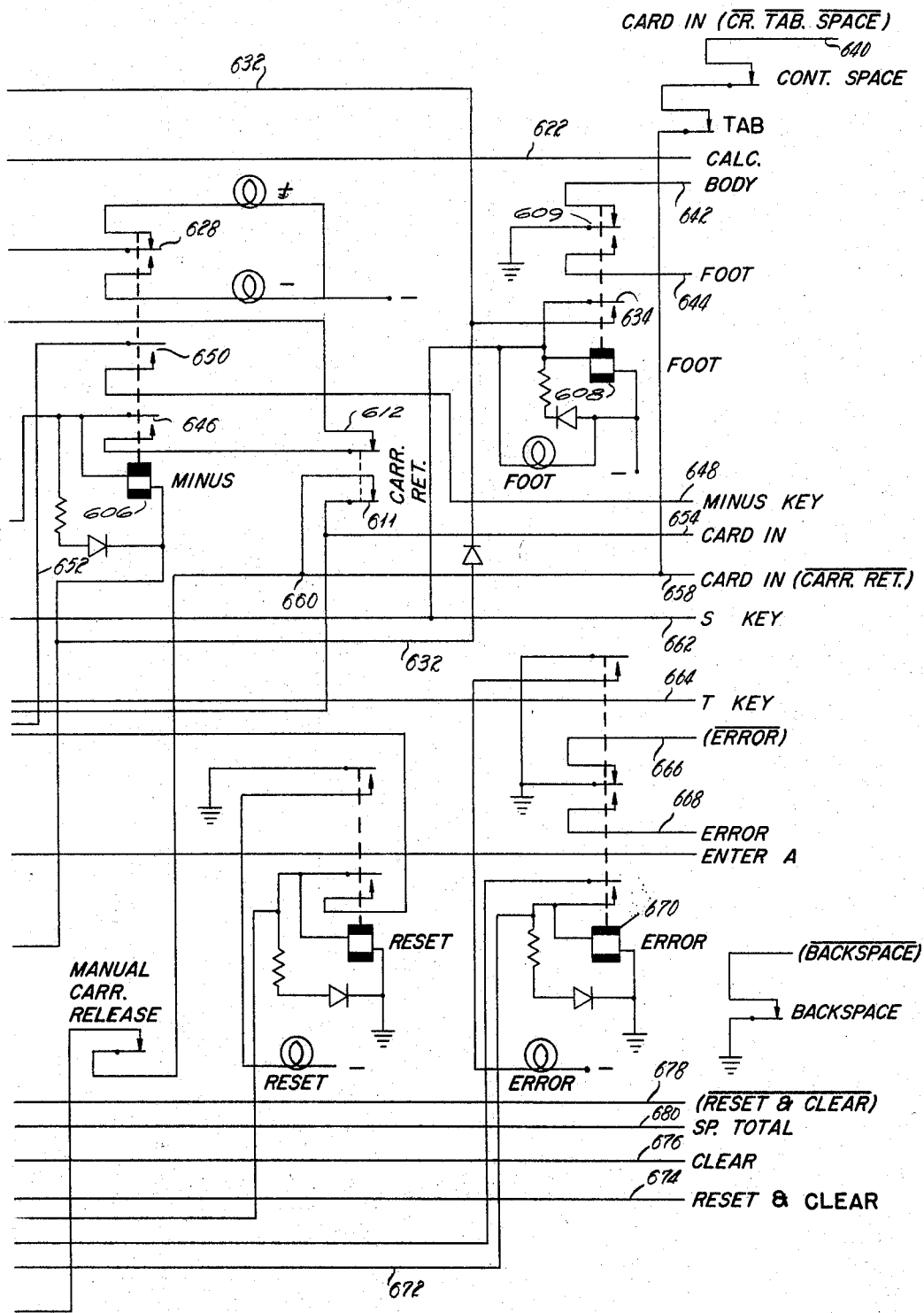
Figure 10B:
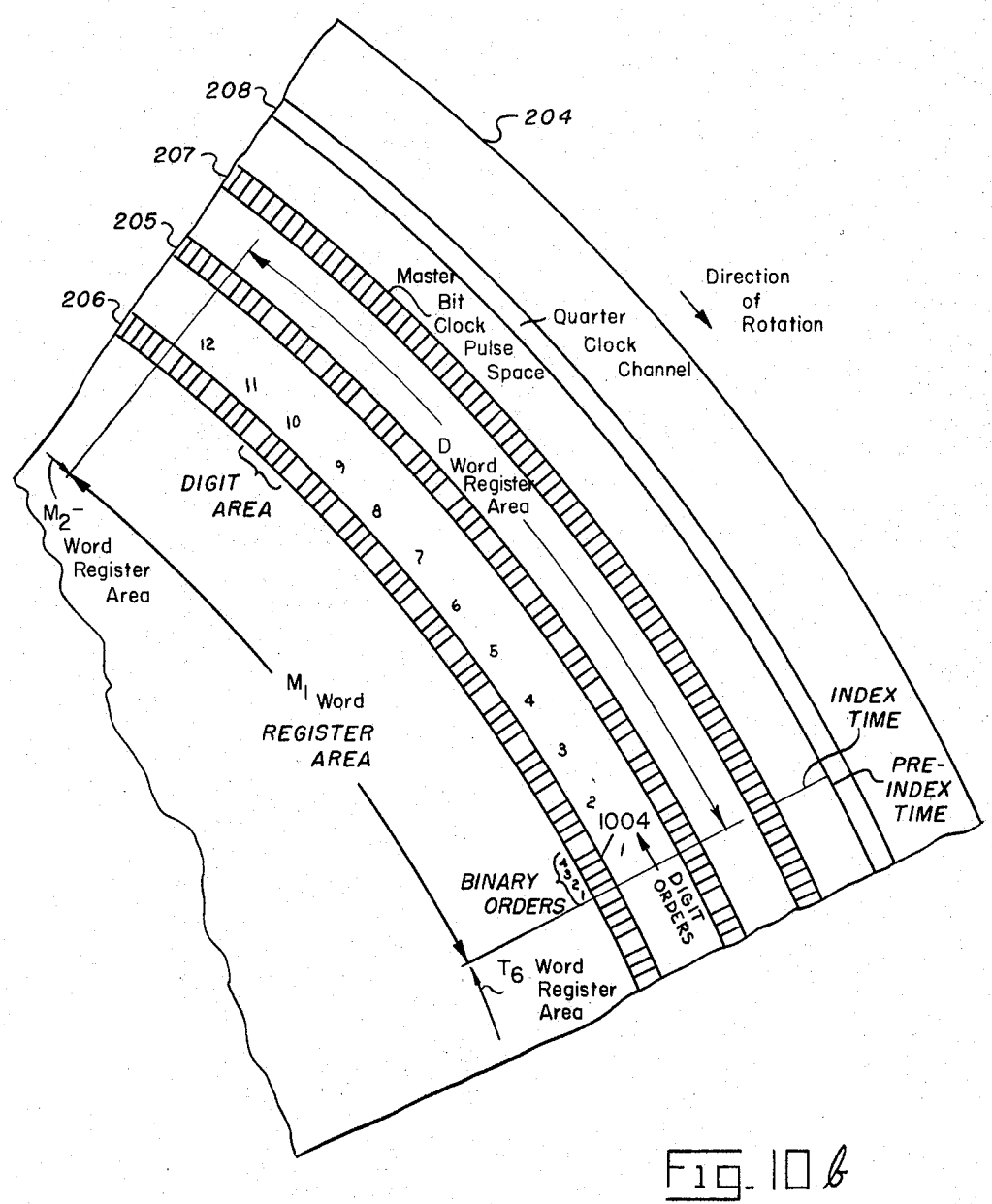
Figure 10D:
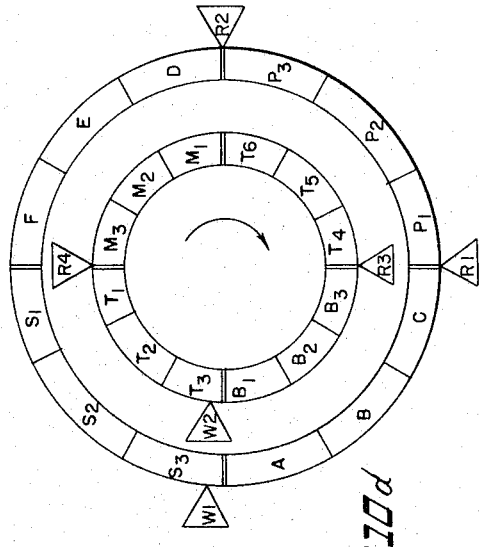
Figure 10F:
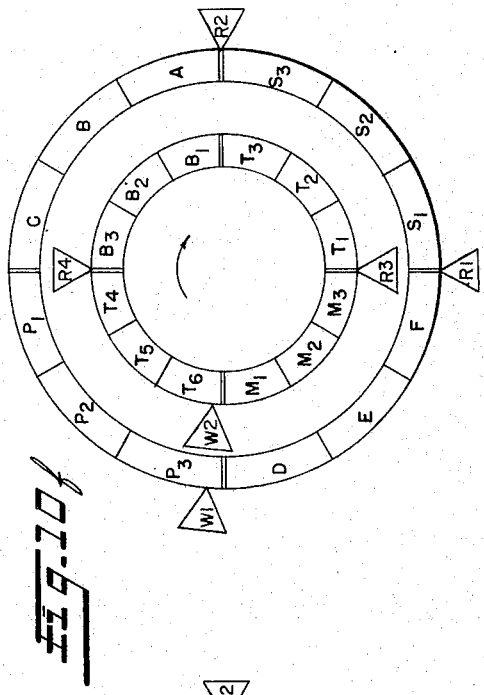
Figure 10E:
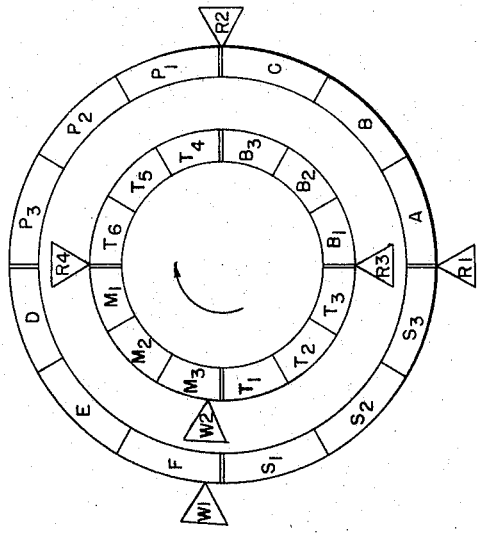
Figure 10G:
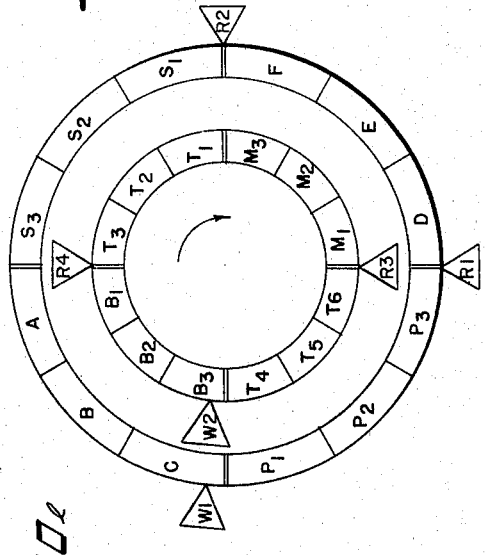
Figures 2, 10A:
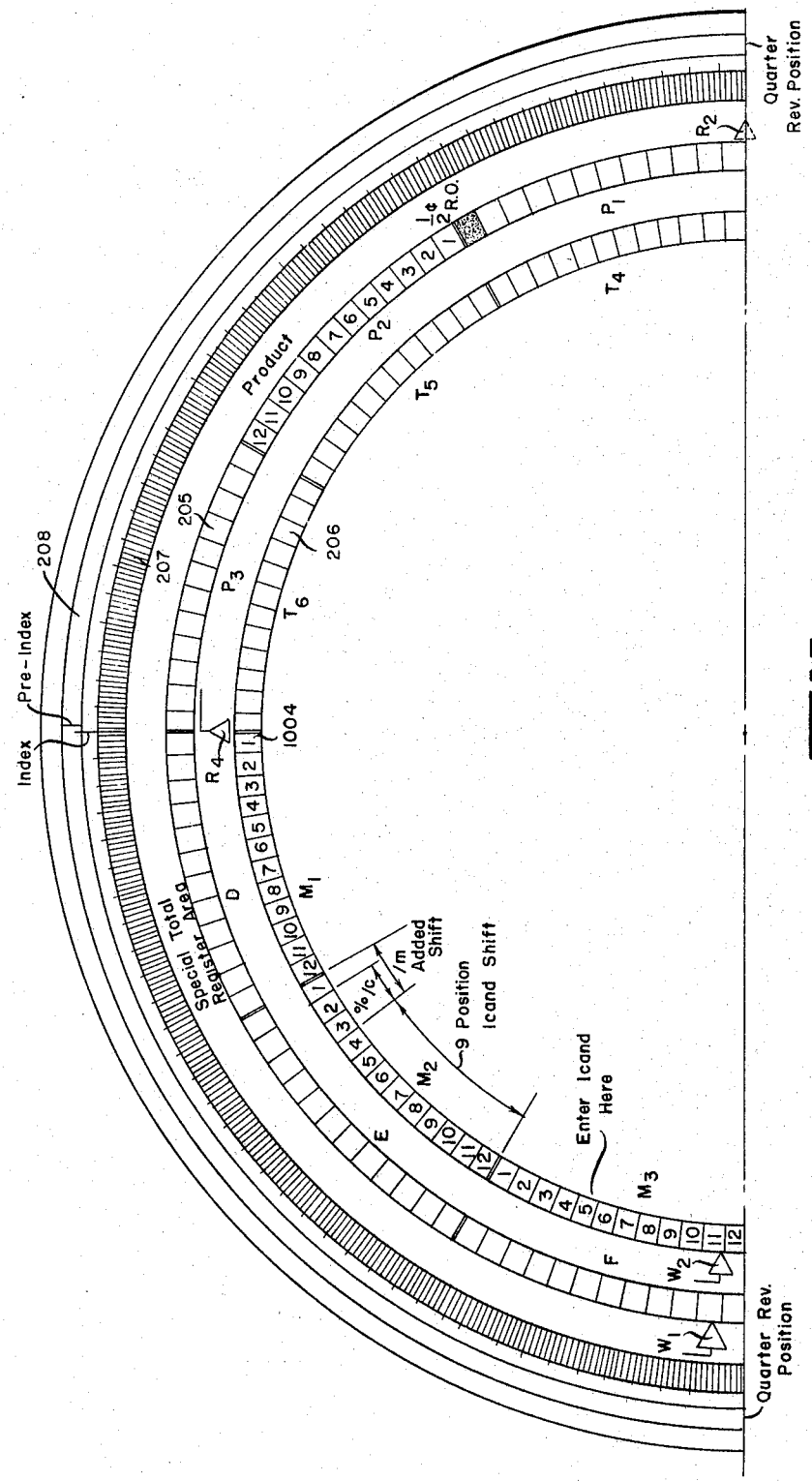

FIGURES 5a and 5b together are a functional block diagram of the automatic typing calculator;

FIGURES 6a and 6b together are a schematic diagram of the control key switch contacts and control relays which are used to provide the various output potentials illustrated along the right hand margin of FIGURE 6b;

FIGURE 7 is a schematic diagram of the typewriter key switch contacts for encoding data into the system;

FIGURES 8a, 8b and 8c aligned as shown in the key illustrated on the sheet containing FIGURE 8b together comprise the input gating for toggles 800–803 which comprise a four bit or one digit delay shift register that is used as the input and output buffer storage register in the calculator unit as is apparent from the diagram FIGURE 1;

FIGURE 9 is a circuit diagram of the various solenoids and relays used in the decoder for actuating the number keys on the typewriter and also for actuating other functions of the typewriter necessary for actuation of the typewriter by the electronic circuitry of the calculator;

FIGURES 10a1 and 10a2 together show the two information tracks on the memory unit along with the record or write heads W1 and W2 and reproduce or read heads R1 through R4, and the two clock tracks;

FIGURE 10b is a view of a portion of the memory unit which is enlarged to show the relative location of the various bit digit, and word register areas and the clock timing areas;

FIGURES 10c, 10d, 10e and 10f illustrate the information track on the memory disk in their respective positions at the beginning of the first quarter revolution, the second quarter revolution, the third quarter revolution and the fourth quarter revolution, respectively;

FIGURES 11a and 11b together comprise the logic diagram of the clock pulse distributor in which clock pulses are developed for synchronizing the operation of the system;

FIGURE 12 is a circuit diagram of a combination *or* gate and invertor circuit as used for producing the *quarter*

Figure 14:
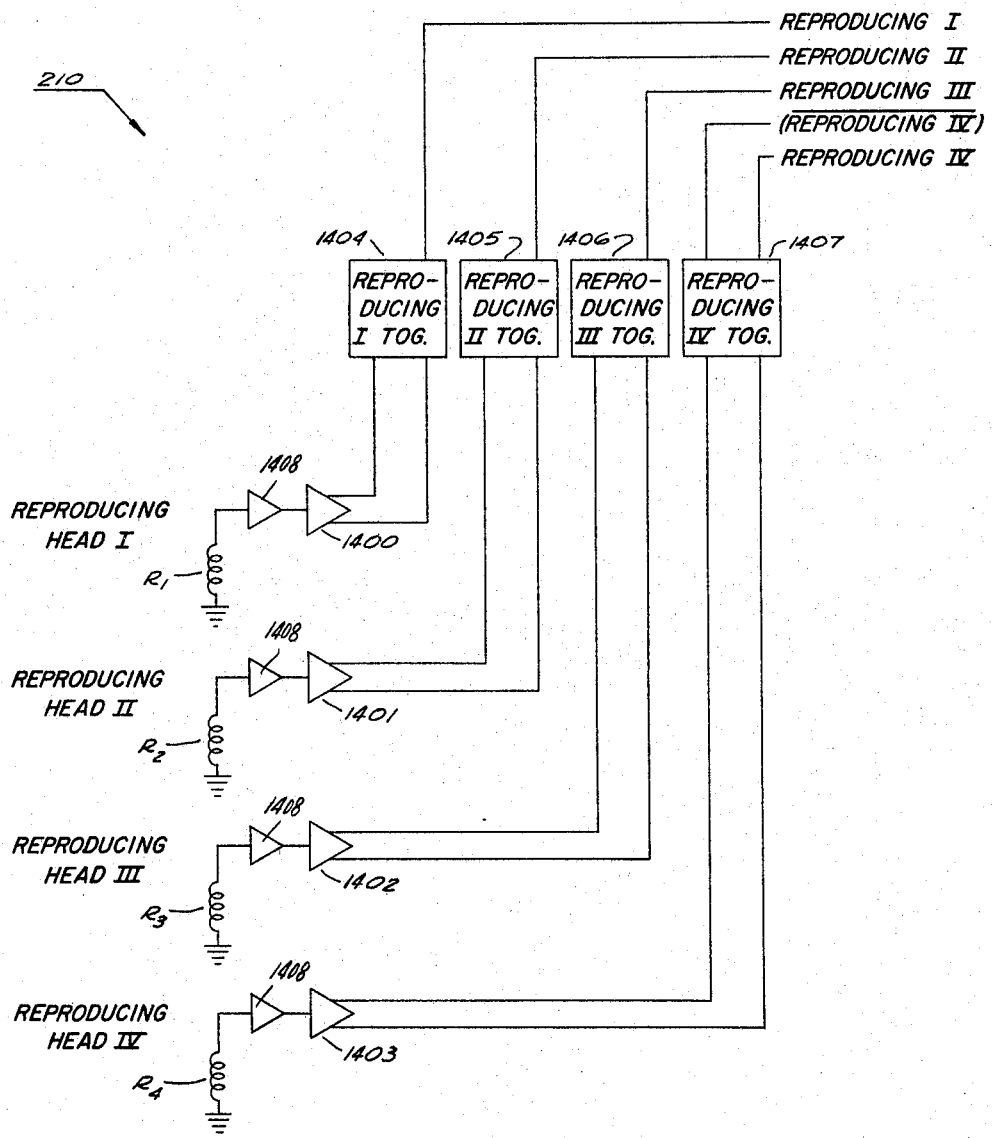
Figure 19B:
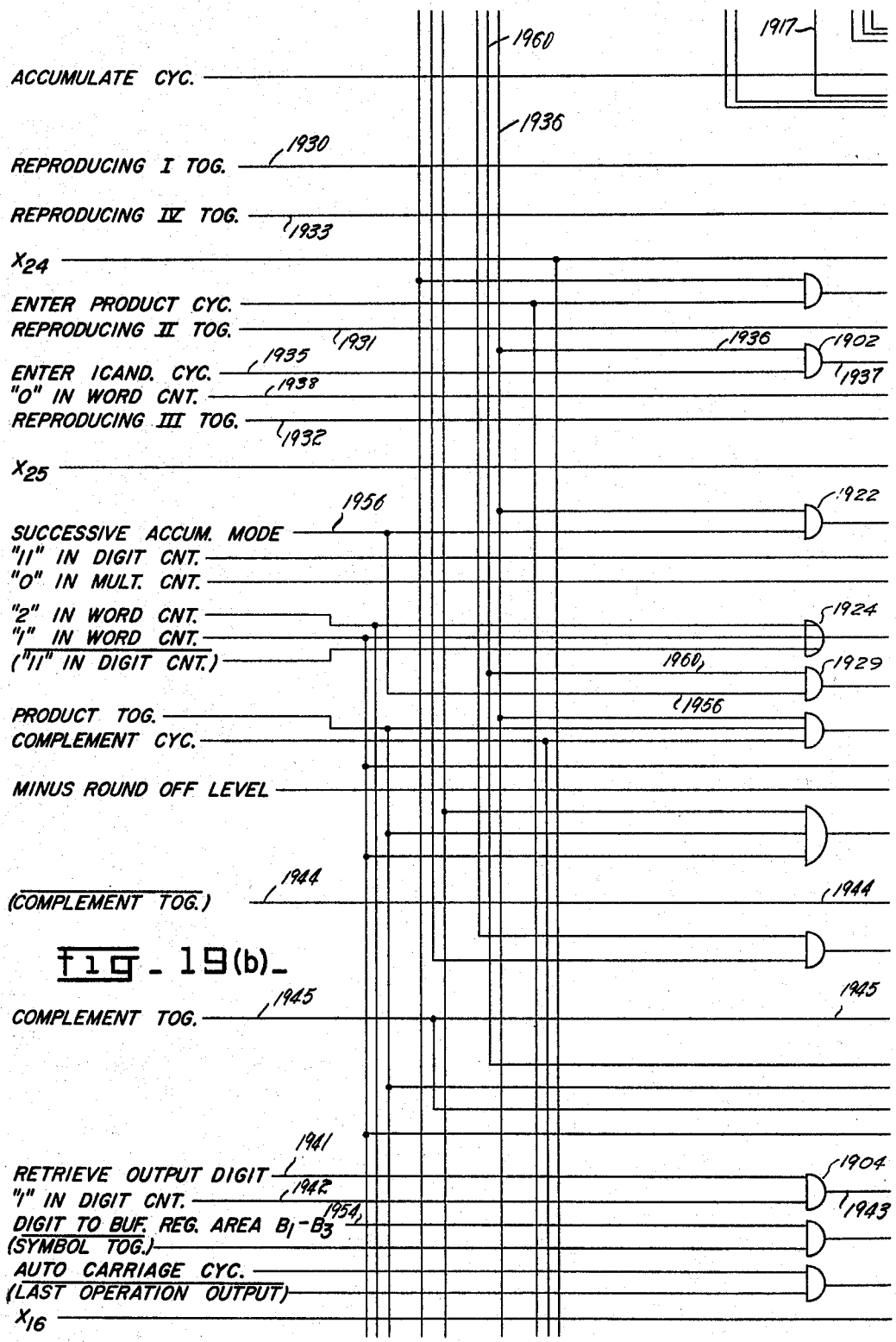
Figure 19C:
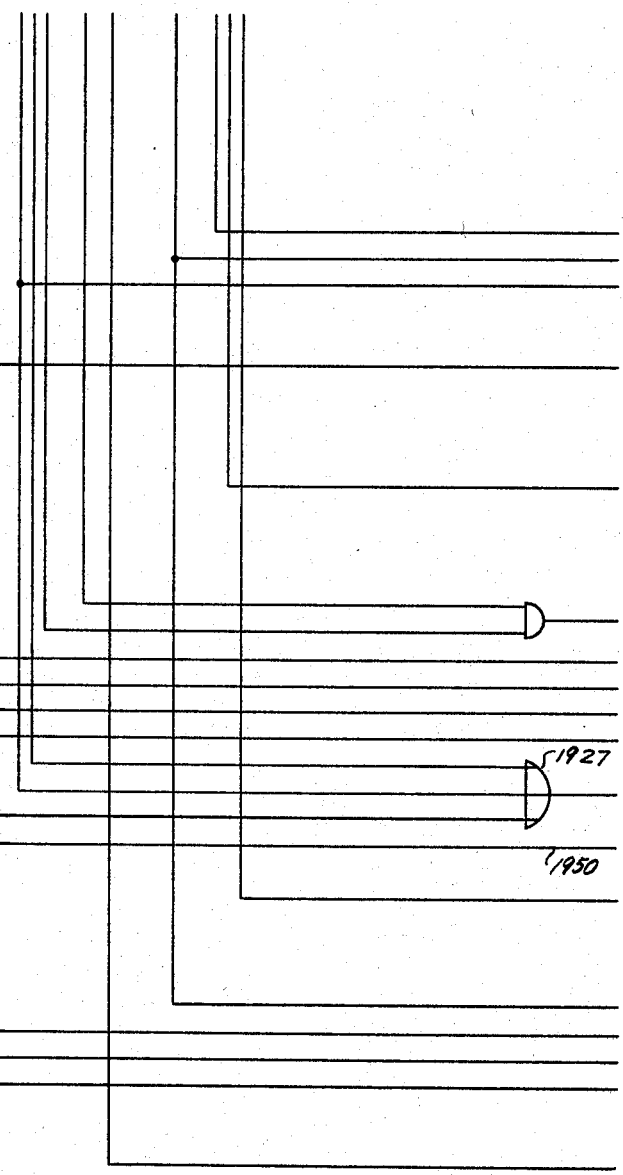
Figure 20:
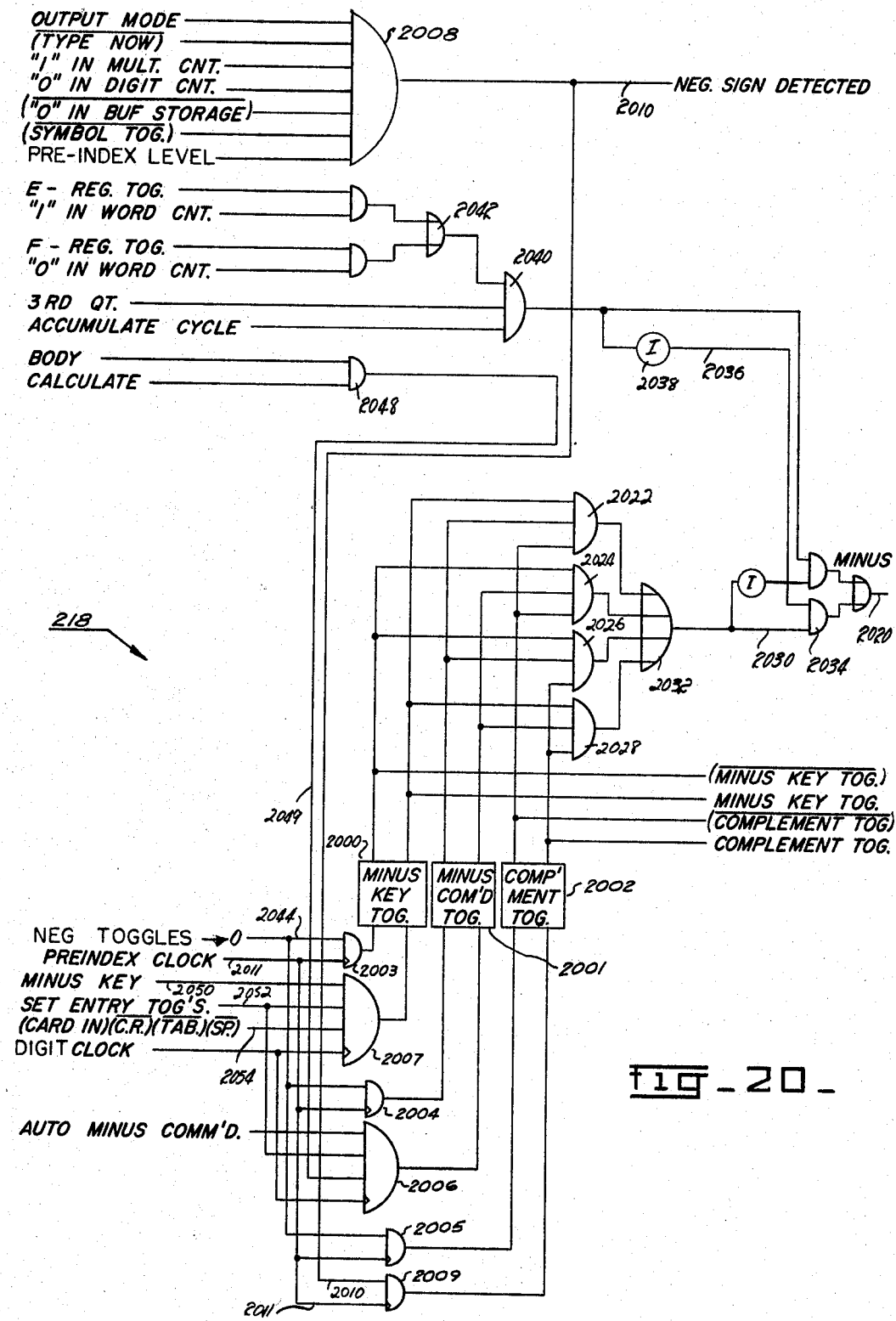
Figure 24:
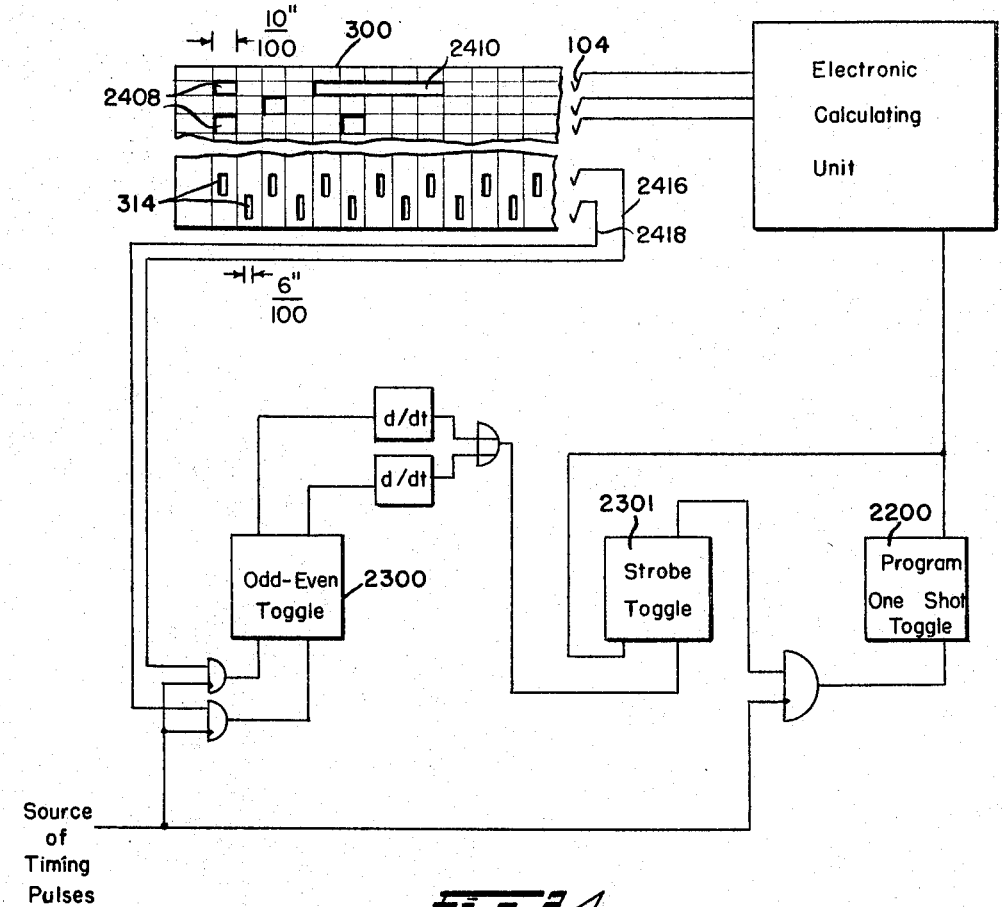
Figure 25:
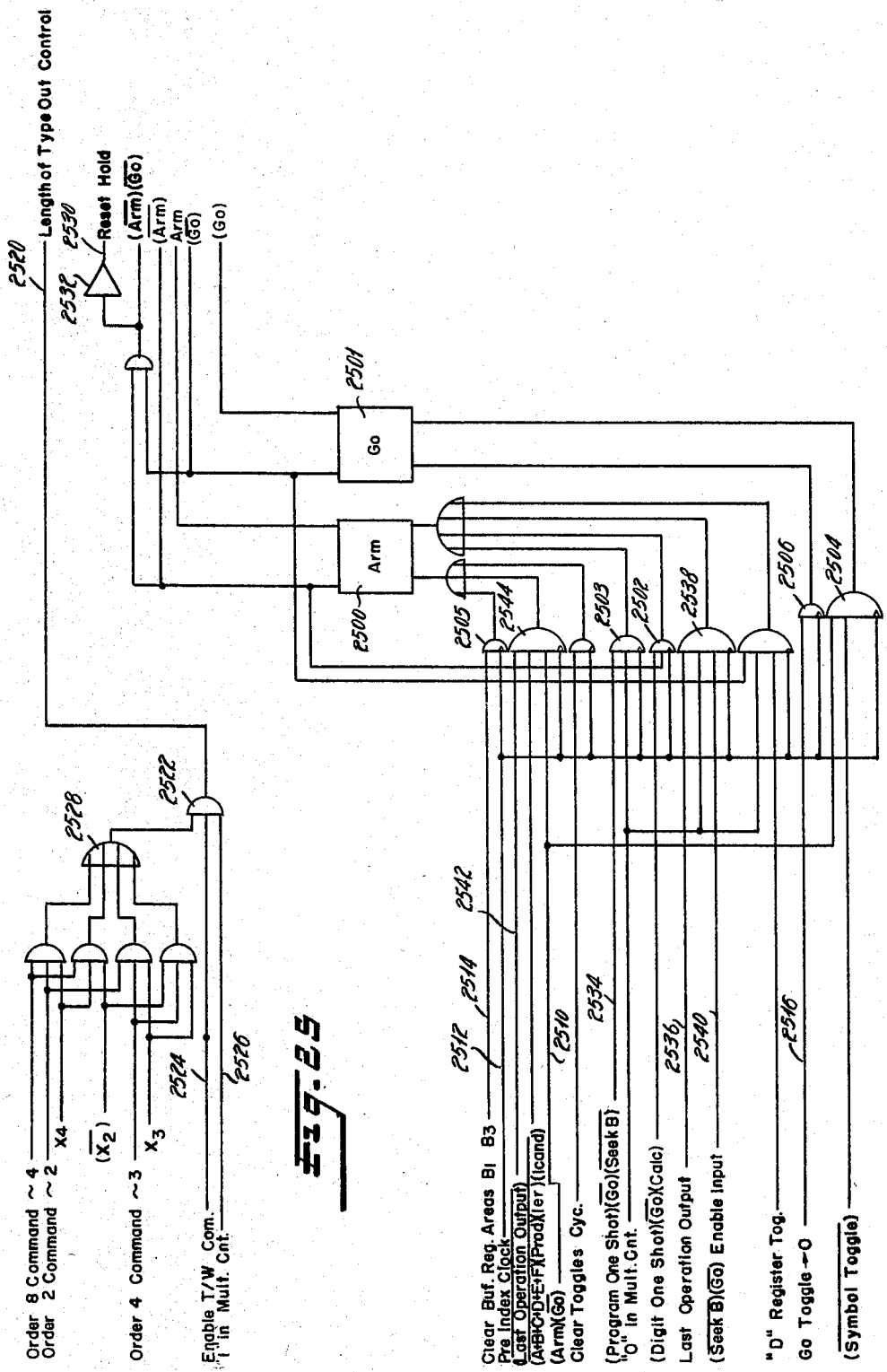
Figure 26:
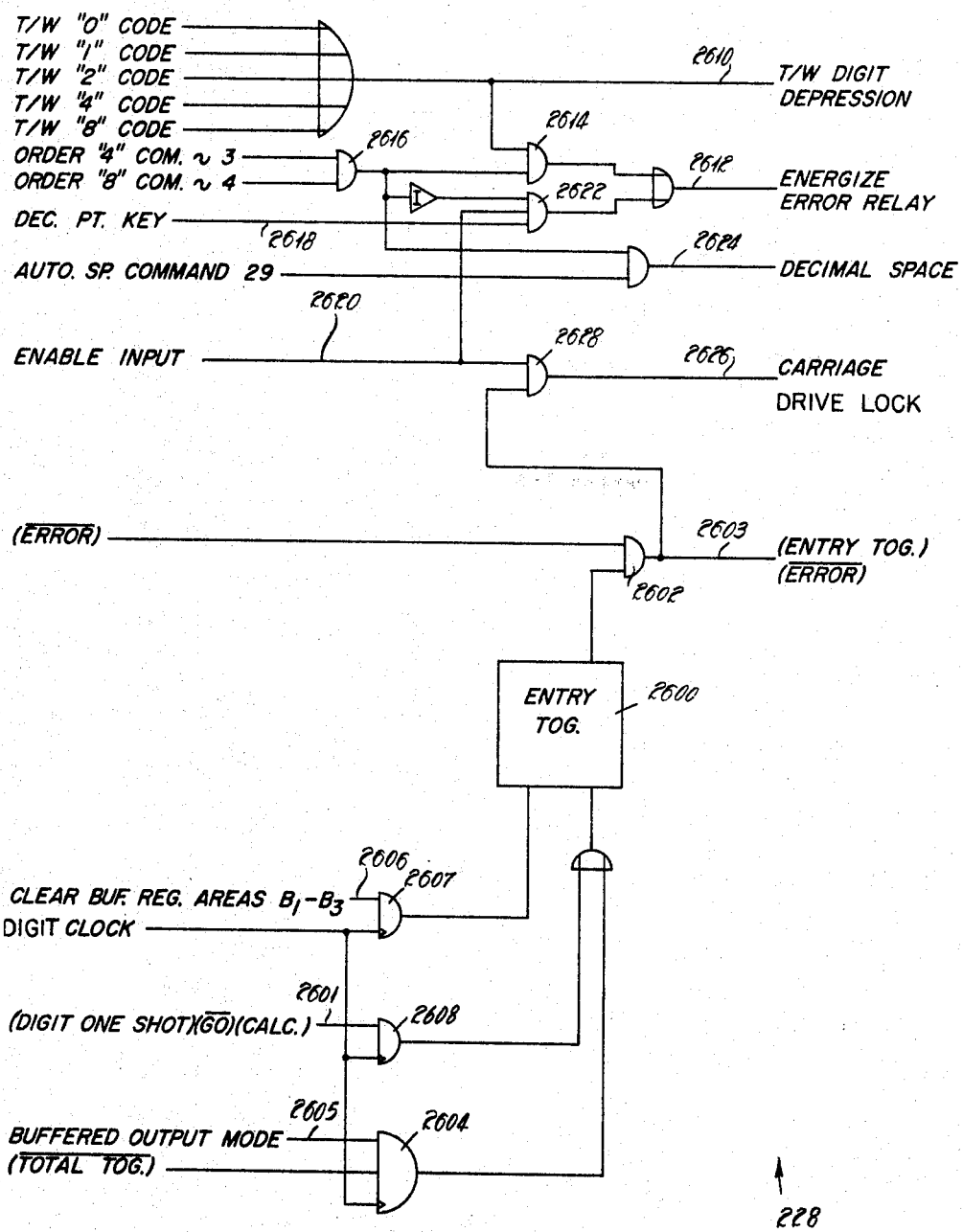
Figure 27A:
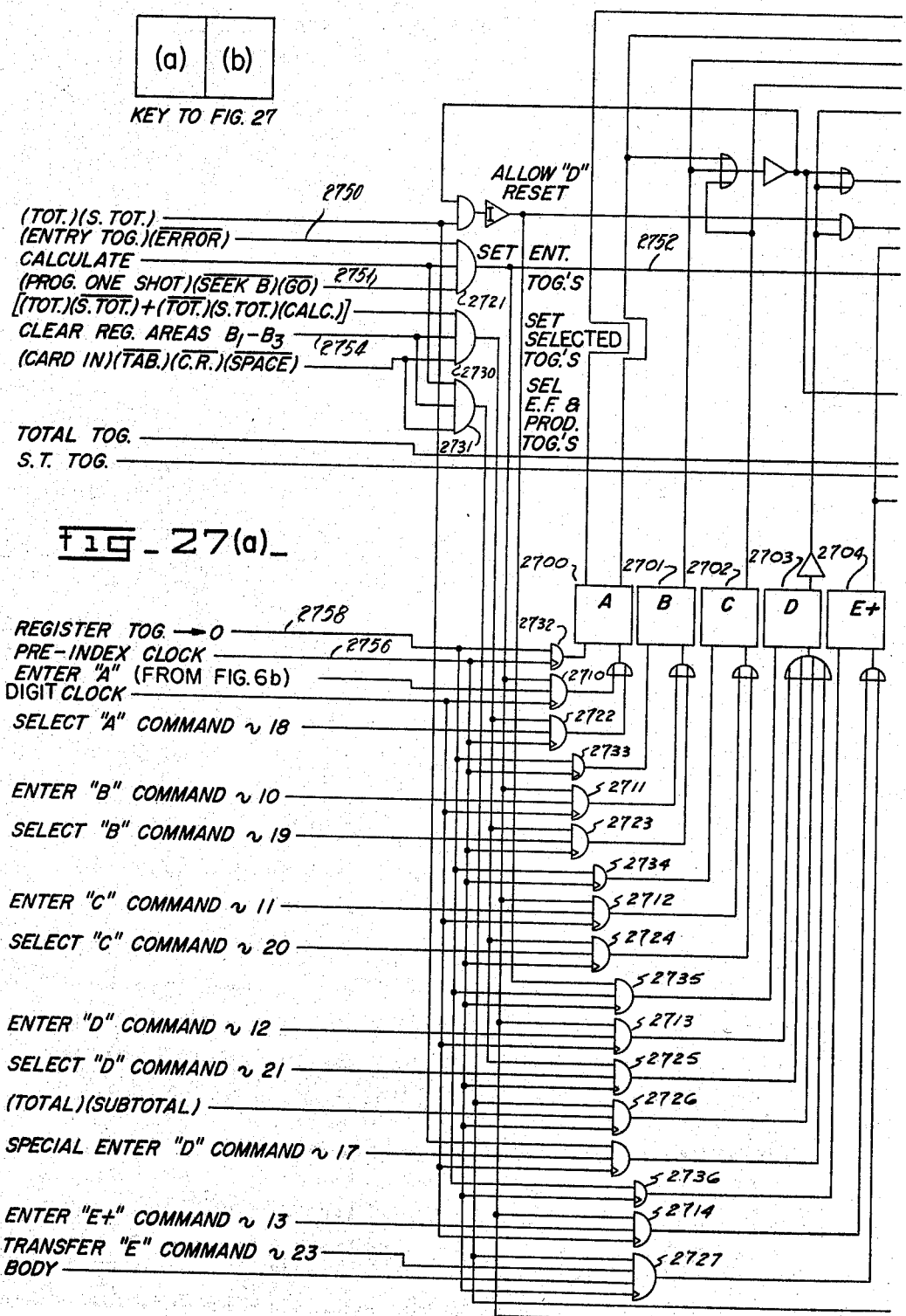
Figure 28A:
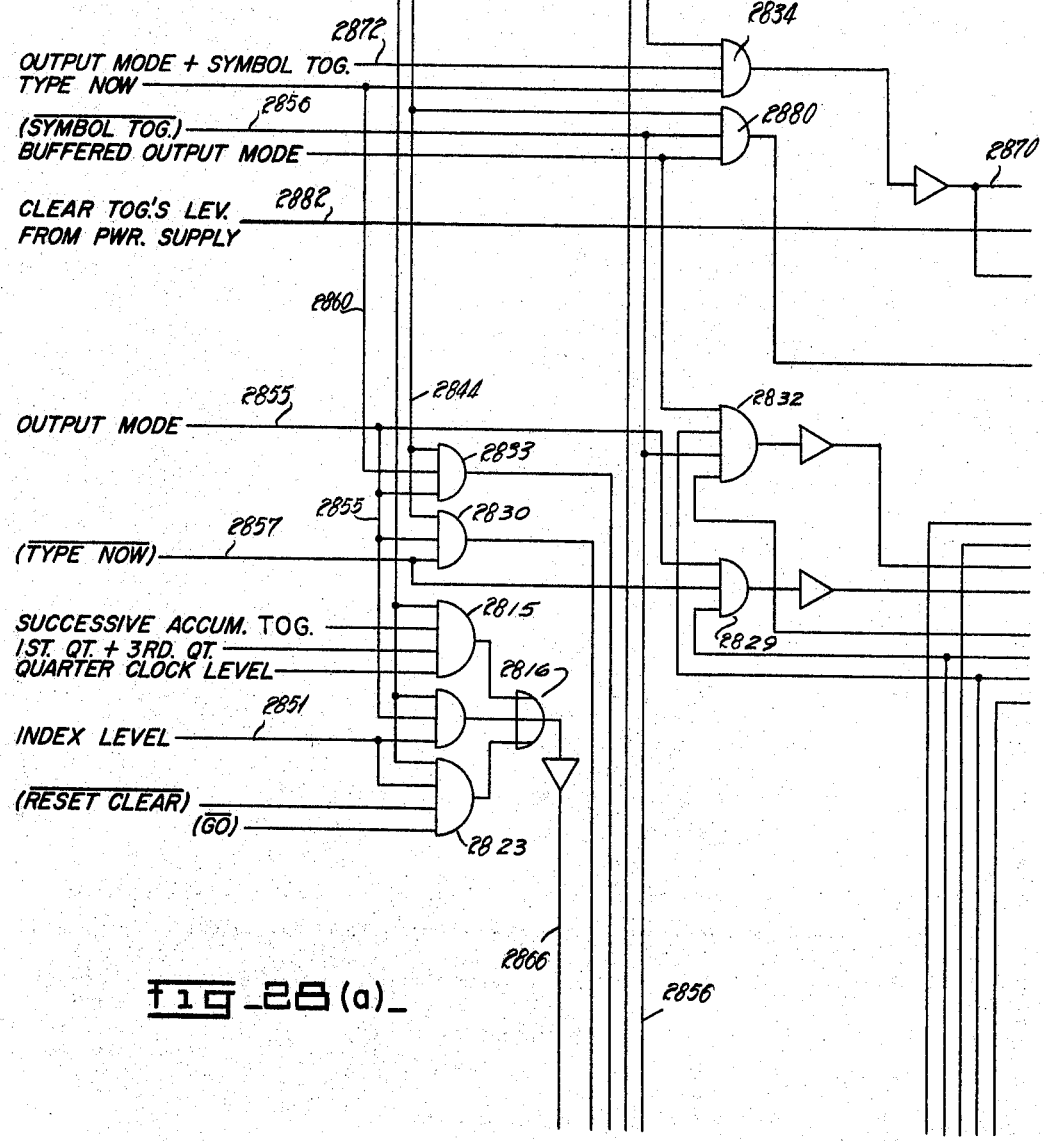
Figure 28B:
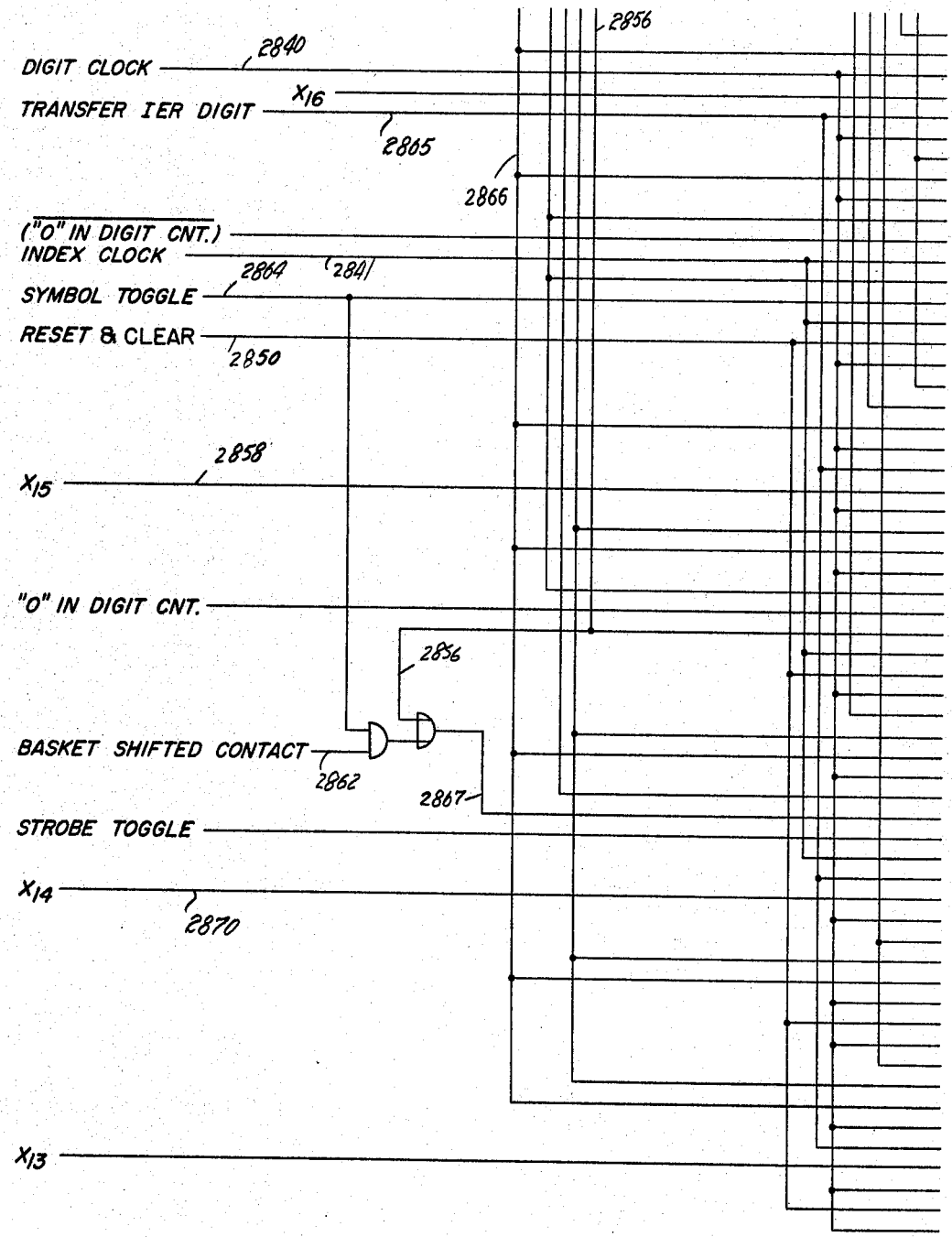
Figure 28C:
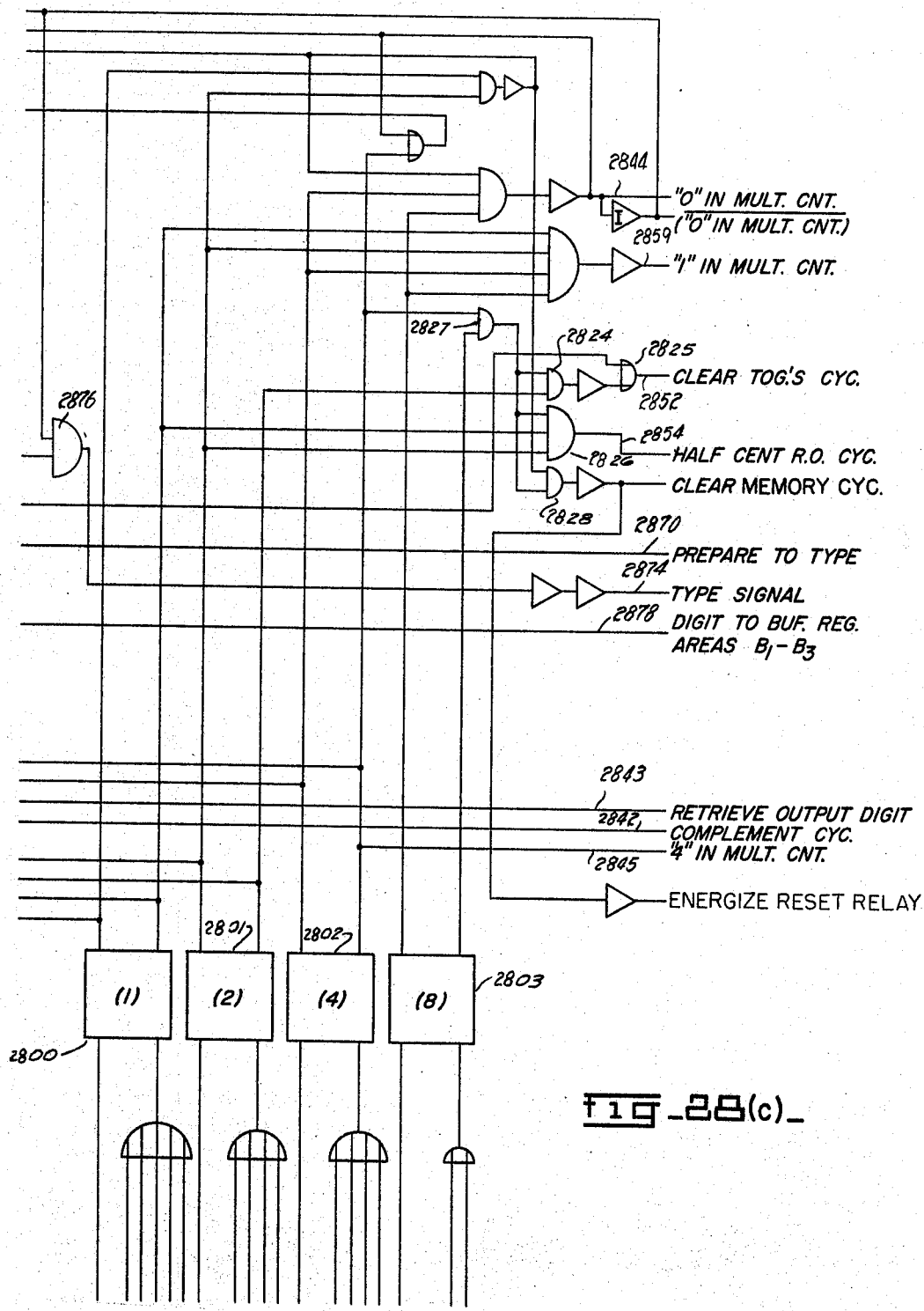
Figure 29A:
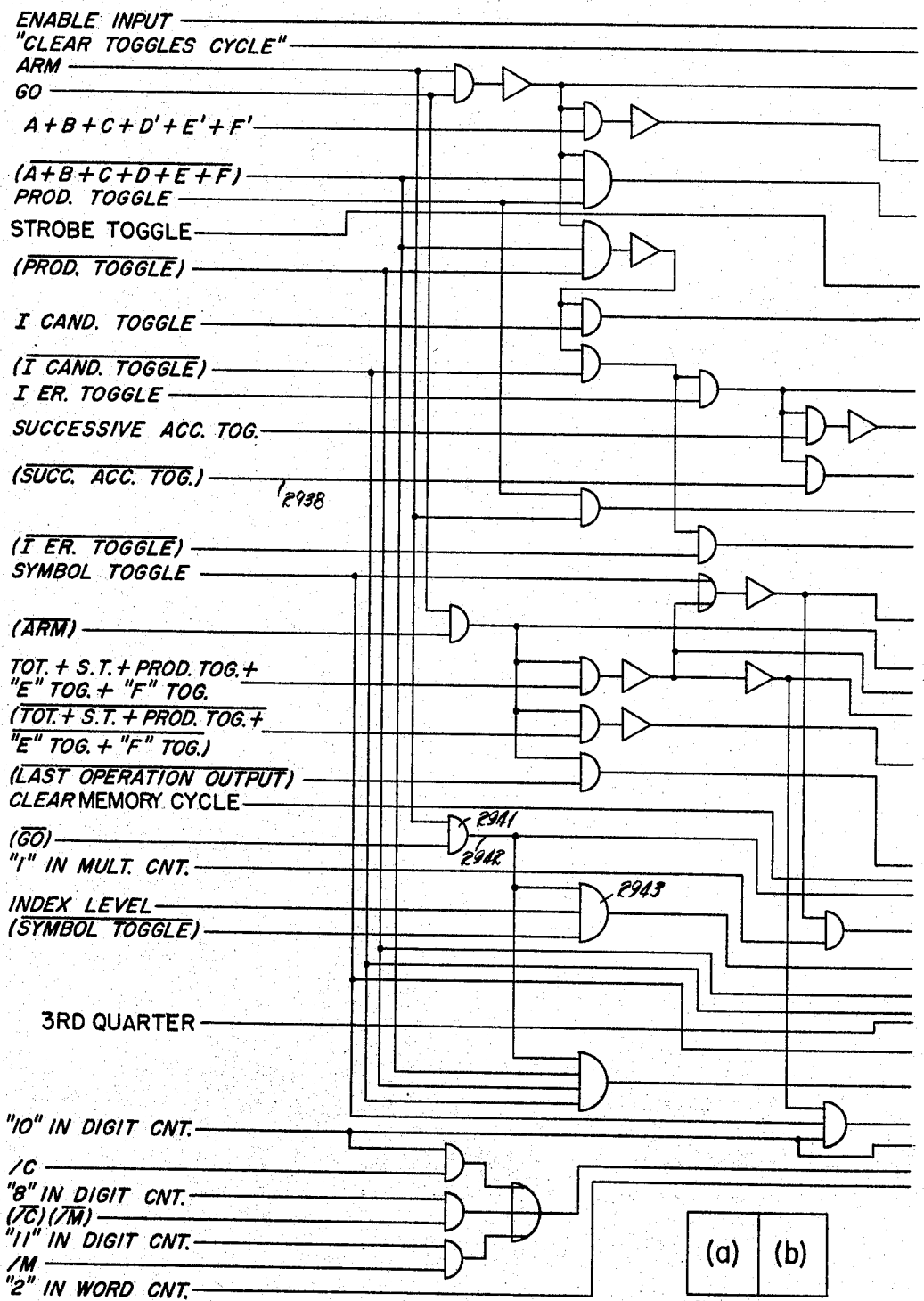
Figure 31:
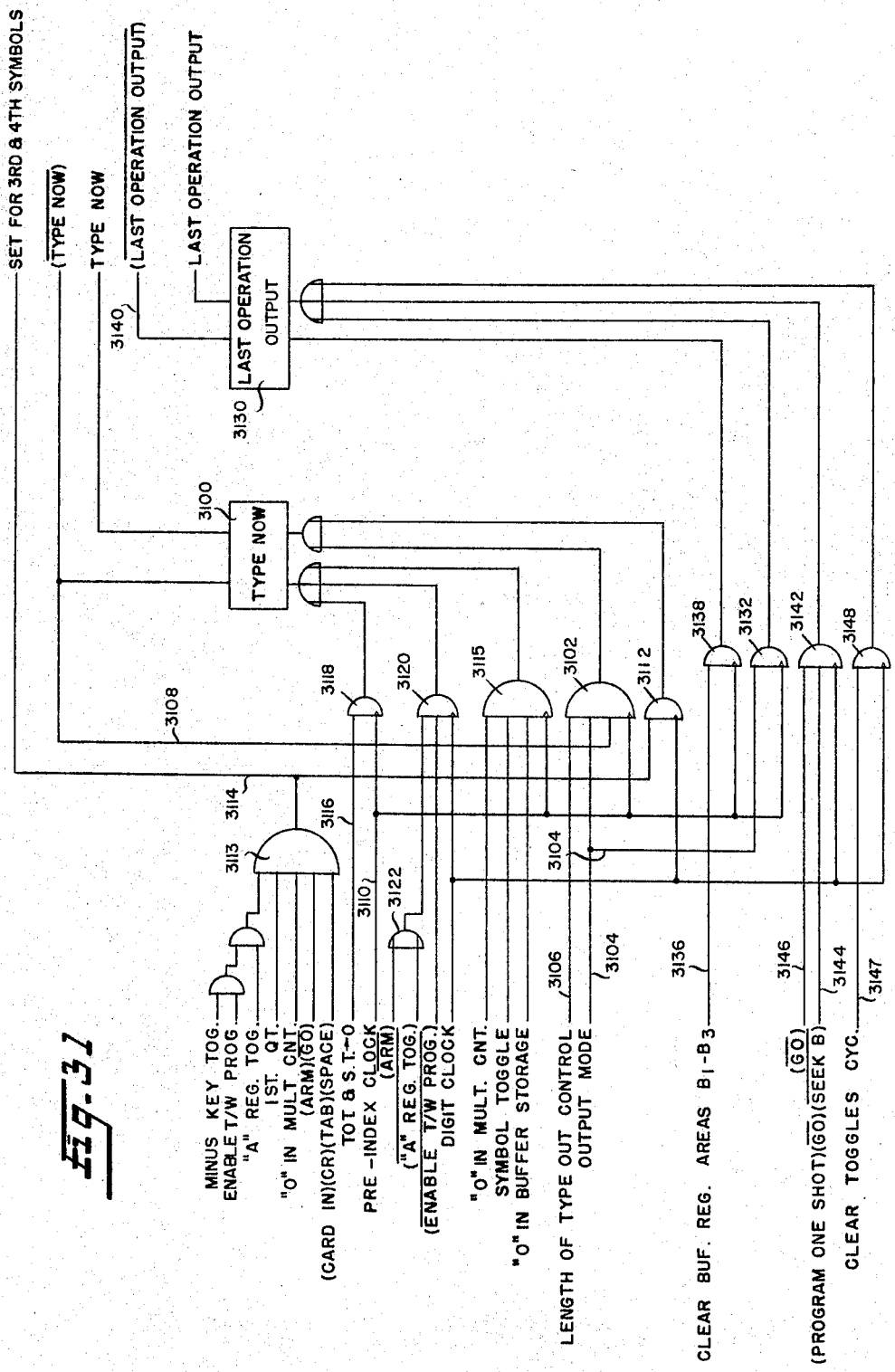
Figure 32:
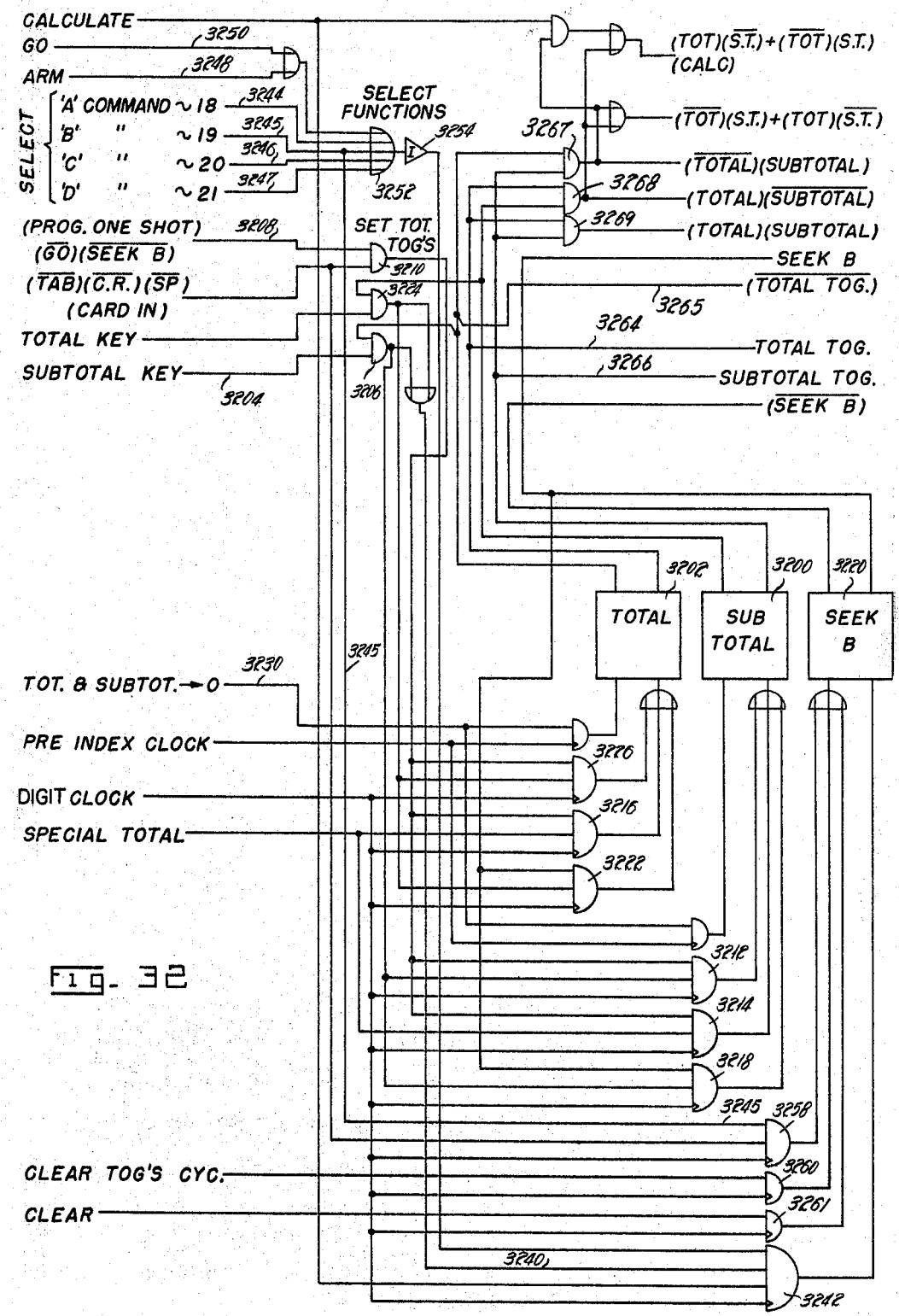
Figure 33:
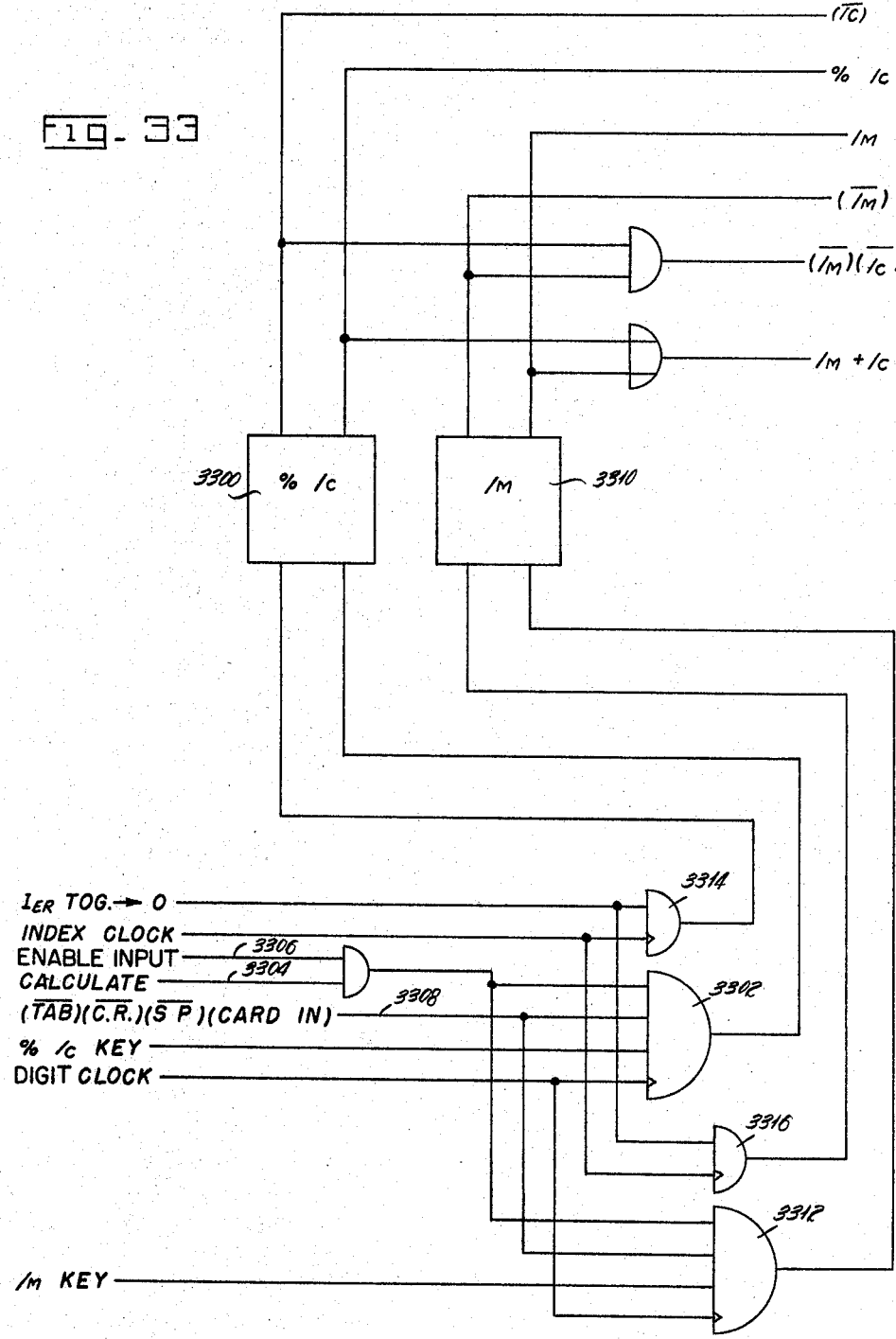
Figure 34:
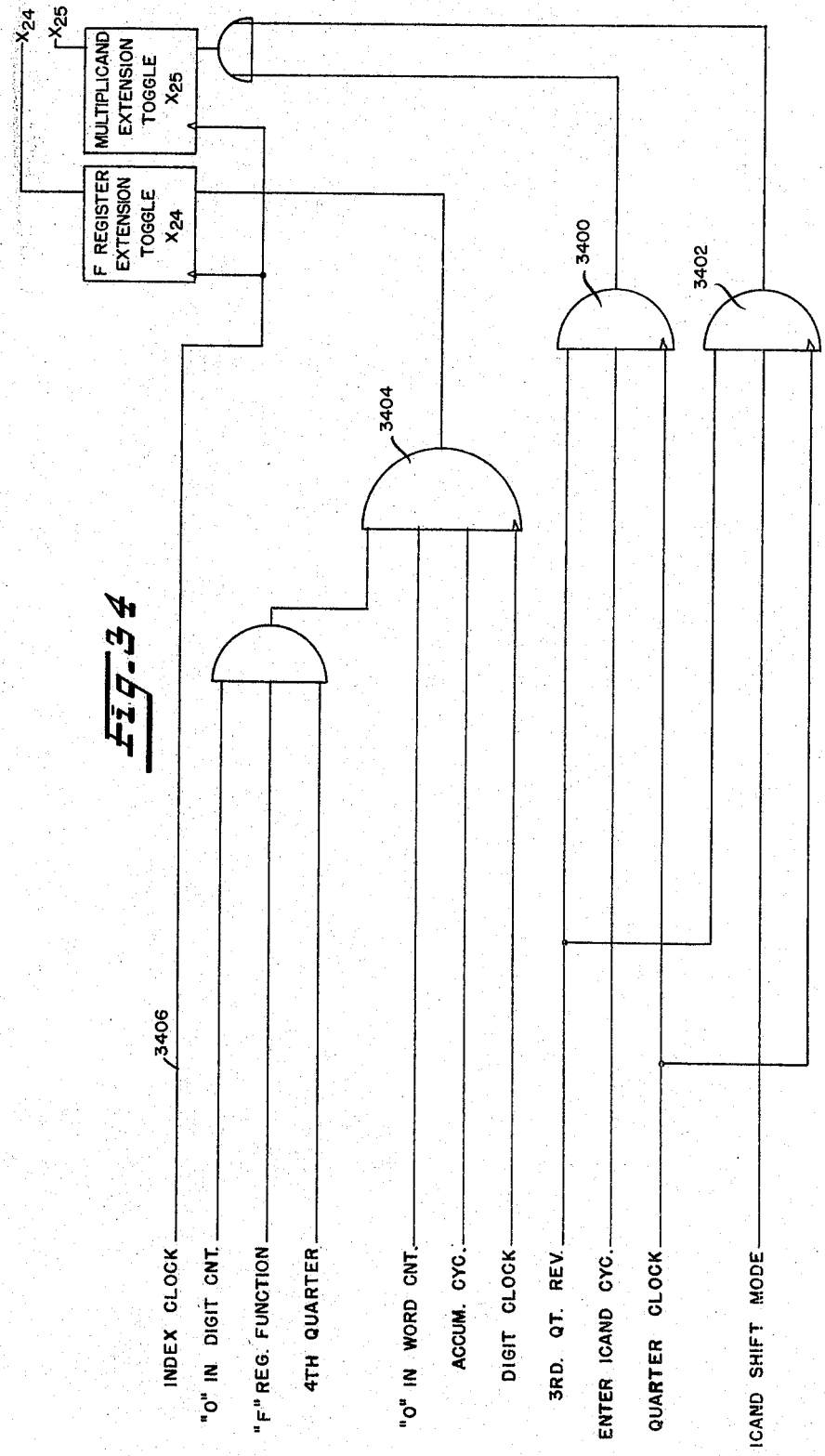
Figure 35:
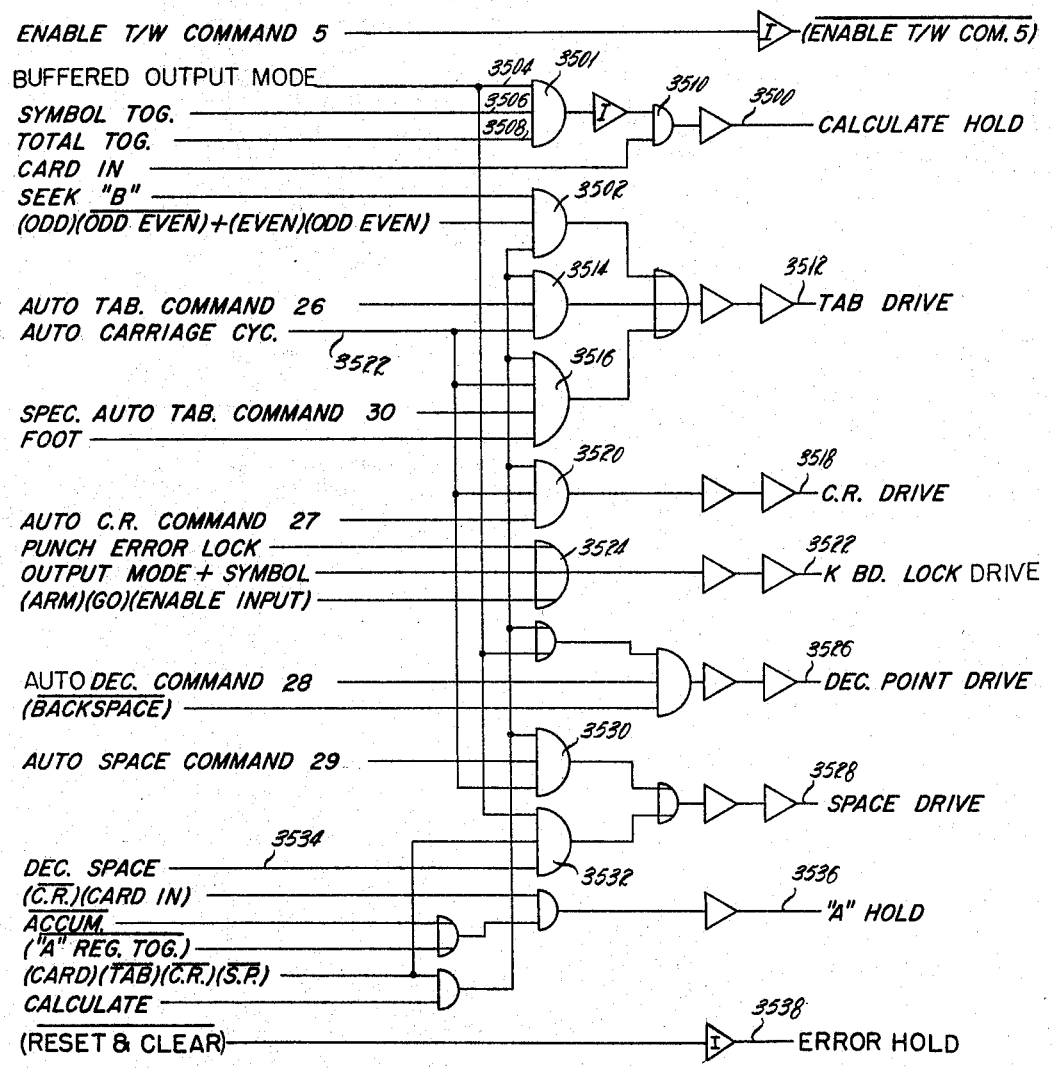

*clock,* and *pre-index clock* pulses in the circuit of FIGURE 11;

FIGURE 13 is a logic diagram of the gating circuits for the recording heads;

FIGURE 14 is a logic diagram for the reproducing heads;

FIGURES 15a and 15b positioned as shown in the key on the sheet containing 15b comprise the logic diagram for the 12 place digit counter, it being apparent from memory unit diagram in FIGURE 10 that 12 digits are provided for each word;

FIGURE 16 is a logic diagram of the 4 place quarter revolution counter;

FIGURE 17 is a logic diagram of the 3 place word counter, it being apparent from the memory unit diagram of FIGURE 10 that there are 3 words in each quarter revolution;

FIGURE 18 is a logic diagram of the add/subtract circuit;

FIGURES 19a through 19e assembled as shown in the key to FIGURE 19 on the sheet containing FIGURE 19a comprise a logic diagram of the write head gating circuits;

FIGURE 20 is a logic diagram of the minus and complement circuit;

FIGURE 21 is a logic diagram of the digit one-shot circuit which is part of the initiating circuitry;

FIGURE 22 is a logic diagram of the program one-shot circuit which is also part of the initiating circuitry;

FIGURE 23 is a logic diagram of the odd/even and strobe circuits which are part of the initiating circuitry;

FIGURE 24 is a diagram of the initiating circuitry shown in FIGURES 22 and 23 along with part of the program card of FIGURE 3b showing the use of the narrow odd/even perforations 2412 in the program card to illustrate the manner by which the program commands are all set in the electronic calculating unit prior to the time when the initiating circuitry permits the electronic calculating unit to perform the programmed functions;

FIGURE 25 is a logic diagram of the part of the sequencing control circuits of the electronic calculator containing the arm and go toggles;

FIGURE 26 is a logic diagram for certain of the control functions and including the entry toggle;

FIGURES 27a and b together comprise the logic diagram for the register toggle circuits which correspond to the several registers in the memory unit of FIGURE 10 to thus control the portion of the memory unit into which information is entered, or from which it is retrieved;

FIGURES 28a through d placed together as shown in the key to FIGURE 28 on the sheet containing FIGURE 28a comprise the multiplier counter circuit and its related gating arrangements;

FIGURES 29a and b place in accordance with the key to FIGURE 29 shown in the sheet containing FIGURE 29a comprise a logic diagram for producing potentials on the labeled outputs at the right hand margin of the sheet containing FIGURE 29b for controlling the sequence that various operations take place in the electronic calculator unit;

FIGURE 30 is a logic diagram of the successive accumlate and product developed toggles used in the multiplication process and of the symbol toggle used in printing symbols identifying the nature of a digit printed by the typewriter from the electronic circuitry;

FIGURE 31 is a logic diagram for the type now and last operation output toggles;

FIGURE 32 is a logic diagram for the total, sub-total and seek B toggles;

FIGURE 33 is a logic diagram for the %/c and /m toggles;

FIGURE 34 is the logic circuit for the extension toggles;

FIGURE 35 is a logic diagram for the typewriter schematic supplement; and

Figure 36:
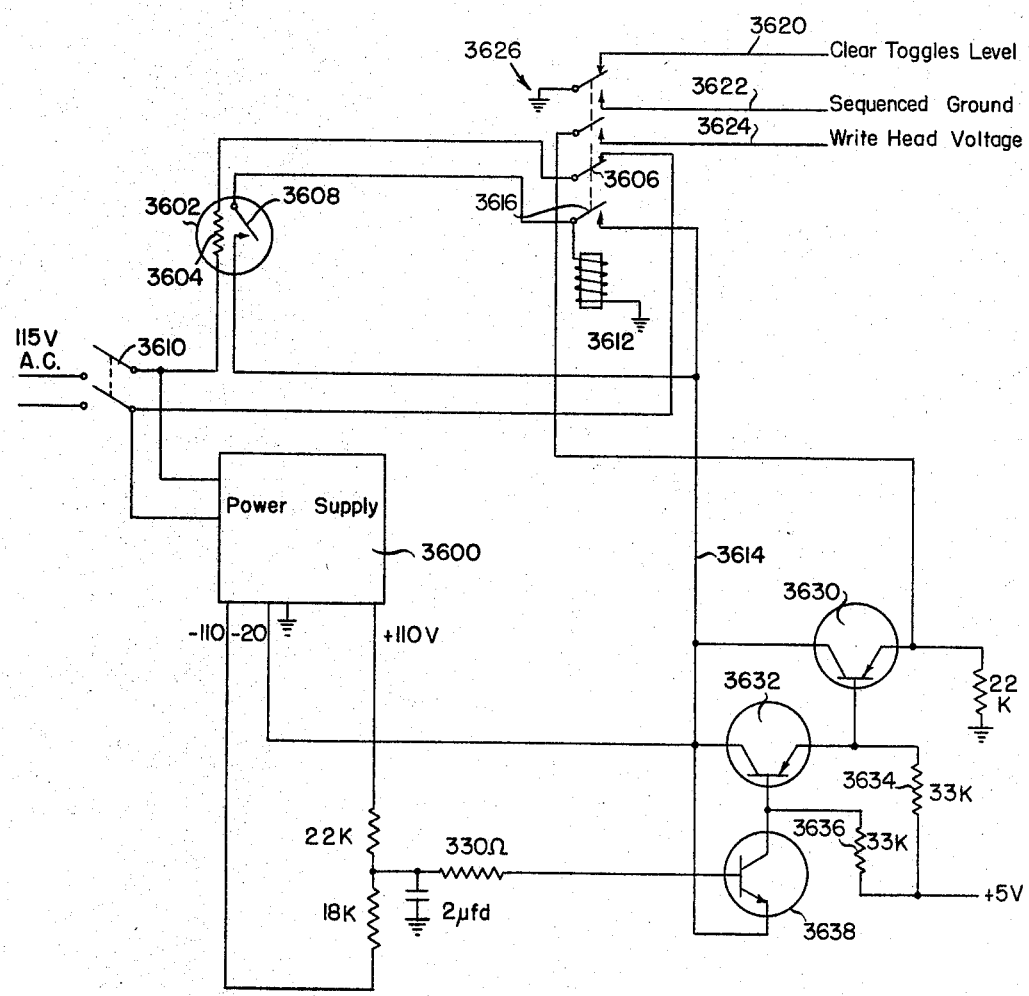

FIGURE 36 is a schematic diagram of the part of the power supply and control circuit for supply of the operating voltage to the write head windings.

Before beginning the detailed description, an index is provided to facilitate reference to particular functions of the computer of the present invention.

INDEX

|  | Column | Figure No. |
| --- | --- | --- |
| General Description | 00 | 1-4 |
| Detailed Description: |  |  |
| Typewriter | 00 | 6 |
| Encoder | 00 | 7 |
| Buffer Storage | 00 | 8 |
| Decoder | 00 | 9 |
| Memory Unit | 00 | 10 |
| Entry | 00 |  |
| Accumulate | 00 |  |
| Multiplication | 00 |  |
| Negative Numbers | 00 |  |
| Readout | 00 |  |
| Timing Signals | 00 |  |
| Clock Pulse Distributor Circuit | 00 | 11-12 |
| Write Circuit Controls Circuit | 00 | 13 |
| Reading Head Circuit | 00 | 14 |
| Digit Counter Circuit | 00 | 15 |
| Quarter Revolution Counter | 00 | 16 |
| Word Counter Circuit | 00 | 17 |
| Adder-Subtractor Circuit | 00 | 18 |
| Head Gating Circuit | 00 | 19 |
| Minus and Complement Circuit | 00 | 20 |
| Digit One Shot Circuit | 00 | 21 |
| Program One Shot Circuit | 00 | 22 |
| Odd-Even and Strobe Circuit | 00 | 23 |
| Synchronization of Typewriter and Electronic Calculating Unit | 00 | 24 |
| Arm-Go Circuit | 00 | 25 |
| Entry Circuit | 00 | 26 |
| Register Toggle Circuit | 00 | 27 |
| Multiplier Counter-General | 00 | 28 |
| Reset Operation | 00 |  |
| Internal Transfer and Type Out Operations | 00 | 28 |
| Multiplication Operation | 00 |  |
| Successive Accumulate Circuit | 00 | 30 |
| Product Developed Circuit | 00 | 30 |
| Symbol Circuit | 00 | 30 |
| Sub Total and Total Circuit | 00 | 32 |
| Seek B Circuit | 00 | 32 |
| Type Now Circuit | 00 | 31 |
| Last Operation Output Circuit | 00 | 31 |
| %/c and /m Circuit | 00 | 33 |
| Extension Circuit | 00 | 34 |
| Typewriter Control Circuit Supplement | 00 | 35 |
| Power Supply Circuit | 00 | 36 |
| Summary | 00 |  |

GENERAL DESCRIPTION

Referring now to the drawings, the system of the present invention as illustrated in FIGURE 1 comprises basically a typewriter 100 which may serve as an input-output unit, and a storage or memory unit 110 interconnected by an electronic control unit 112. The system is adapted to produce an invoice sheet such as that illustrated in FIGURE 2 and which contains certain items of information such as name, address, date and description that are typed in the usual manner, and other items of information such as quantity, price and discount % which are typed in the usual manner and also entered in electronic control unit for automatically calculating products, such as gross amount and net amount, with the assistance of memory unit 110.

The calculated products are typed out automatically and without operator intervention when the typewriter carriage reaches predetermined positions. The calculated products are also stored in memory unit 110 for supplying sub-totals used in calculating tax and discounts, and for supplying totals for one or a group of particular invoices and for other accounting purposes.

The typewriter may be a conventional business typewriter preferably electric, with the keyboard modified as shown in FIGURE 1 by the addition of manually operable control keys 400–406, 408 and 409 having momentary contacts. Positions 410–412 contain only indicator lamps. Indicator lamps are also provided under certain of control keys 400–406, 408 and 409.

When the *type only* control key 400 is depressed, the typewriter remains isolated in most respects from the electronic control unit until another one of the special keys 401–406, 408, 409 is depressed. This is necessary to permit the typing of digits in addresses and dates on the invoice sheet of FIGURE 2 without interference from the electronic system.

To transfer from the *type only* mode, the *plus* (+) key 403 or *minus* (−) key 404 may be depressed which then sets up the system for automatic calculation. At the beginning of a line, or at predetermined positions of the typewriter carriage within a line, other ones of the control keys 401–406, 408, 409 may be depressed to cause the several special functions to take place during the remainder of the travel of the typewriter carriage in that line. Actuation of the carriage return following a *minus* entry automatically re-establishes the *plus* (+) key 403 mode of operation unless there is further manual intervention by the operator.

After actuation of a control key, all internal functions of the system are controlled automatically and in large part by a program control unit 101 mounted to the rear side of the typewriter as shown in FIGURE 1. The program control unit 101 comprises a printed circuit board 102 composed of a stationary rectangular block of insulating material having on a vertical surface 36 strips of conducting material that run horizontally and parallel to the movement of the typewriter carriage. Of these strips, thirty-two are identified by their functional legends and numbers 1–32 in FIGURE 3a. At the bottom of printed circuit board, two additional strips labeled *odd* and *even* are provided. Two remaining strips, not shown in FIGURE 3a, are ground connections for the two groups, i.e., 1–32 and *odd, even,* of the program strips.

A contact block 104 is mounted on the typewriter carriage to move with the typewriter carriage. The contact block contains 36 wire feelers each adapted to individually engage one of the several horizontal strips of conducting material on the stationary program block and thus generate the various commands for determining the operation of electronic control unit 14 of FIGURE 1. The detailed construction of the program control unit is fully disclosed and claimed in co-pending application Serial No. 64,405 filed October 24, 1960, by Gim P. Chan and assigned to the assignee of the present invention.

Figure 3A:
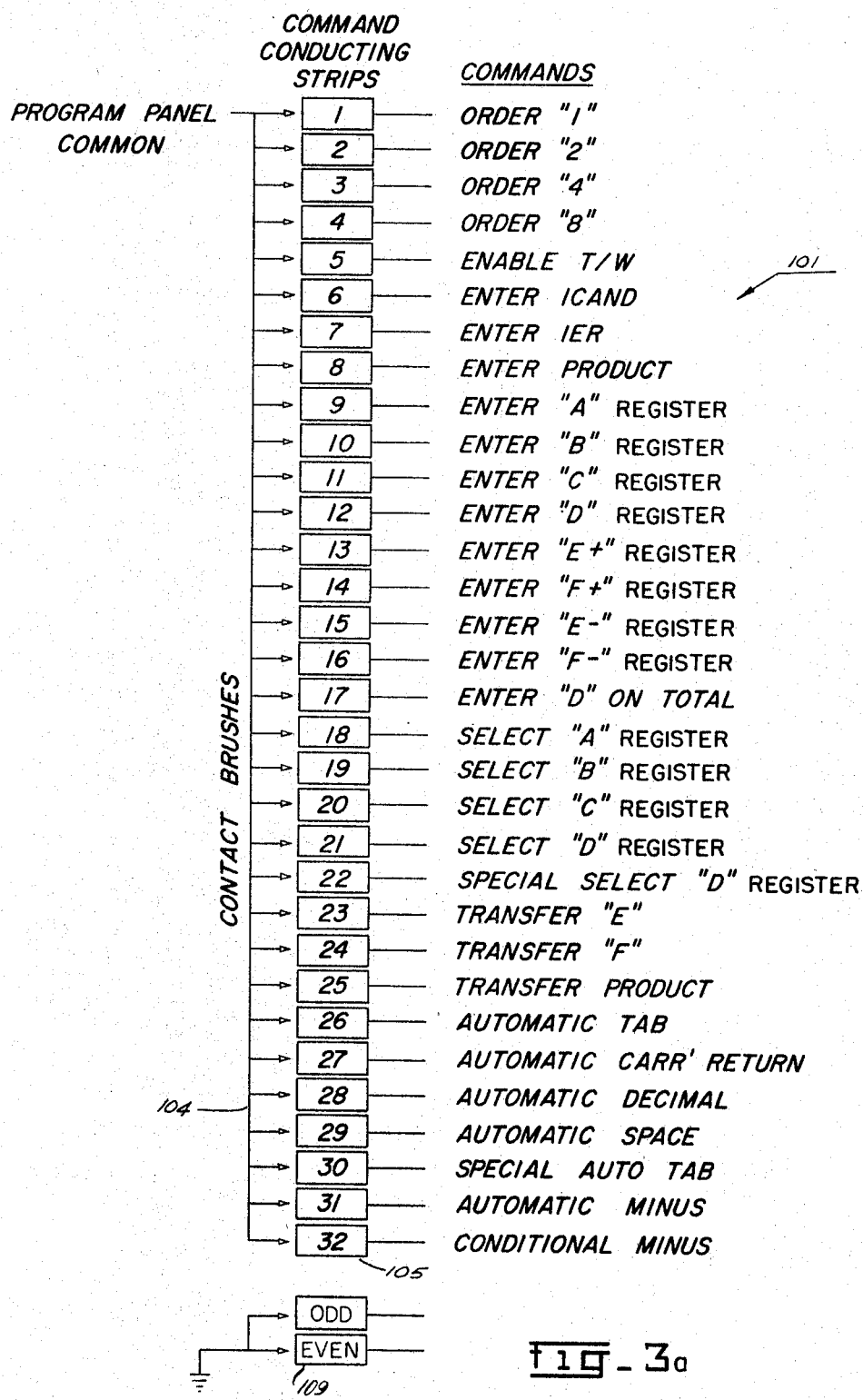

To selectively determine when the various program commands are to be effected, a replaceable punched program card 300, shown also in FIGURE 3b, is mounted over the strips of conducting material and rigidly secured to the stationary program block to thus normally insulate from the command strips the feelers on the contact block moving with the typewriter carriage. In FIGURE 1, program card 300 is shown only partially inserted over the strips of conductive material. Program card 300 may be made of a wear-resistant insulation material such as a paper board or Mylar, and contains punched holes aligned vertically with the horizontal command conducting strips 1–32 of FIGURE 3a and at horizontal positions which correspond to a stable typewriter carriage position. The presence of a hole over any particular strip 1–32 at any particular position of the typewriter carriage is determined by the desire for a particular command function to be effective at a specific position of the typewriter carriage.

Thus, with reference to FIGURE 2 and FIGURE 3b, under the price column of the invoice of FIGURE 2, the decimal point appears at a fixed carriage position in each line of an item entry in the body of the invoice. This decimal point occurs automatically in the price entry field as the result of hole 302 over *automatic decimal* conducting strip 28, see FIGURE 3a, in the number 60 position of the typewriter carriage. In FIGURE 2, the carriage positions are numbered just above the body of the invoice for easy comparison with the program card of FIGURE 3b which also has the carriage positions numbered along the upper portion of the card. An automatic decimal is also printed by the typewriter in the gross amount column at position 73, in the discount % column at position 83, and in the net amount column at position 96 of the carriage. Holes 304, 306 and 308 on the card of FIGURE 3b are at these respective positions.

While the other command functions will be discussed below in greater detail, it may be used to observe at this point that the positions where the typewriter functions automatically to type out calculated products or accumulations are limited to those where holes are provided over #5 command contact strip of FIGURE 3a labeled *enable t/w*, such as holes 310–312 in carriage positions 65 through 76 and 88 through 99.

*Automatic carriage return* is provided by holes 320 in the program card over the #27 command contact strip of FIGURE 3a at carriage positions 99 or 100 depending upon the presence of other functions to be typed out automatically. The other functions, if present and operative for the particular entry, have the effect of over-riding the automatic carriage return function.

This format for the program unit provides an opportunity to program multiple functions at one column or position of the typewriter. Thus, for example, in carriage position 65, which is at the beginning of the output in the gross amount column, the type-out (#5 command) may be begun with a digit stored in the tenth order (#2 and #4 commands) of the "C" register (see FIGURE 10a) by the Select "C" (#20 command), of the "D" register by the Special Select "D" register (#22 command), or of the product register (#25 command); or, the Special Automatic Tab function may be effective to tab the typewriter carriage past this output field (see for example those operations at the foot of the invoice sheet of FIGURE 2 where no printing is provided in the gross amount column).

The command structure may be easily modified by simple wiring changes. For example, registers B and C may always be entered simultaneously by tying together their respective lines at the program panel in such a fashion that a single contact causes entry to both. Another example: automatic transfers from A, B, C, and D may be provided by interwiring an unused program line on the panel with a sub-total key line (with suitable isolating means). A hole in the card in this program line position, together with a Select "A," "B," "C," or "D," will provide automtatic transfer from the selected register. This flexibility of operation is one of the important features of the present invention.

At the bottom of the program unit board of FIGURE 3b, a pair of strips labeled *even* and *odd* are provided. Holes 314 in the program card are provided at each carriage position over alternate ones of these strips. Holes 314 in the program card are narrower than the holes in the positions over command strips 1–32 as clearly illustrated in FIGURE 3b. This has been found to be extremely helpful in providing synchronism of the beginning of all command signals made effective at a particular position of the typewriter carriage, and is useful to prevent repetitive operation of the electronic circuit when the typewriter carriage is permitted to stay at a particular carriage position for a length of time. The circuit arrangement including the odd-even toggle for making use of the program card 300 possible from a practical standpoint will be discussed below in connection with FIGURE 24.

Another unique feature of the present invention resides in the use of an inexpensive storage unit of moderately small capacity which may comprise a magnetic disk having four storage tracks mounted on one surface. The particular manner of construction of the magnetic disk storage unit forms no part of the present invention, as it is fully described and claimed in co-pending application Serial No. 44,808, filed July 22, 1960 by Gordon J. Whyte, now Patent No. 3,135,949, and assigned to the assignee of the present invention. A drum or other type storage unit may be equally well used in the system of the present invention instead of the magnetic disk storage unit to be described, but the system of the present invention requires a memory having only modest capacity and access time, and hence, a low cost memory unit may be used thereby permitting the total cost of the invoicer system of the present invention to be modestly low.

With reference to the sample invoice sheet of FIGURE 2, the operation of the illustrated program involving the entries of the quantity ordered (55) and the quantity shipped (50) in the E register as plus and minus values respectively (see the program card of FIGURE 3B1) by command hole 3XE at carriage position 13 and hole 3XA at carriage position 15 is described in greater detail under the section entitled Register Toggle Circuits. As is evident, the "quantity ordered" is entered in the E register as a plus value and the "quantity shipped" is entered in the same register as a minus value, and the balance in the E register is then typed-out automatically as the result of the *enable typewriter for typeout* at carriage positions 23–27 and the Transfer "E" command hole 3XG at carriage position 23.

After the "quantity shipped" is typed in the input field, the value 50, in addition to being transferred to the E register, is also programmed by hole 33 at carriage position 21 to be entered in the Icand register for use in determining the gross amount. After the article description is typed, then the unit price 43.50 is entered on the keyboard and also placed digit by digit in the storage disk 110. At this point of time, control unit 112 (specifically hole 316 in program card 300 of FIGURE 3b in carriage position No. 64 over the #7 strip labelled enter *2nd factor (Ier)* causes the product of the two plural digit numbers just entered into the memory unit to be multiplied together without further intervention by the operator on the typewriter. The operator then tabs the carriage to the gross amount column on the invoice sheet at position 65 of the carriage. The product is quickly developed and circuits are established by means, including hole 310 in the program card (FIGURE 3b) over the No. 5 strip *enable T/W* (FIGURE 3a), which cause the product to be typed out on the invoice sheet under the gross amount column. Hole 310 is in effect a slot corresponding to typewriter carriage positions 65 through 76 inclusive to enable the typewriter for automatic type out throughout the gross amount field on the invoice of FIGURE 2.

This product when typed out is also retained in the memory unit and is available for use in determining the 15% discount value entered in the net amount column. The net amount is then automatically calculated and typed out. Type out occurs automatically when the final value is calculated and the carriage is advanced to position 88.

By virtue of the programming here illustrated, when number 15.0 is entered in the discount % column, a net amount is produced directly through a subtraction and decimal shifting process described below in detail, and typed automatically after the carriage is tabbed to the net amount column. In carriage positions 99, carriage return is automatically effected by hole 320 at that position unless the value typed will cause an audit trail symbol to be printed. In such event, the carriage return is effected in carriage position 100.

All audit trail symbols following automatic type-outs are generated internally of the system as explained below in connection with the Symbol Circuit. Four symbols are possible and come in the order ◇CR-#. Such a complex audit trail symbol would indicate a subtotal taken, the sign of which was negative, was entered negatively, the net result plus, to register A. All symbols following automatic type-out are left justified, i.e., ◇# would appear together not ◇, space, space, #.

Running accumulations of the various amounts such as gross amount and net amount are also retained in the memory unit to be available as sub-totals and as totals upon request by the operator. To distinguish between the entry of original items in the *body* of the invoice sheet and the printing of sub-totals, tax, freight and final totals at the *foot* of the invoice sheet, the system has what is referred to as a *body mode* of operation and a *foot mode* of operation. An indicator lamp under key 412 (see FIGURE 4) labeled *foot mode* is energized once the sub-total key 406 is depressed and remains energized until the system goes into the "type only" mode. Transfer into "type only" mode is automatic following the printing out of the total at the bottom of an invoice to condition the system for typing in the heading on the next invoice.

When *sub-total* key 405 (see FIGURES 1 and 4) is pressed, a *foot* relay 608 (FIGURE 6b) is energized to thus effect a switch arrangement whereby certain commands entered on program card 300 are no longer effective and others which were previously not effective are now in effect. As examples, *special automatic tab* command #30 (FIGURE 3a) is energized so that holes 301 in the program card of FIGURE 3b are effective, when the system is in the foot mode of operation, to automatically tab past the quantity columns (carriage positions 8–27), the price entry field and gross amount columns (carriage positions 56 through 76); and *automatic minus* command #31 (FIGURE 3a) is de-energized so that hole 305 at carriage position 85 is ineffective to cause the figure entered in this column to be automatically subtracted. This last feature is used for the sales tax entries in the invoice of FIGURE 2, which amounts are added, rather, than subtracted, to the net amount accumulation.

*Entry of data from typewriter to memory unit*

Referring again to FIGURE 1, the electronic control circuit 112 illustrates in a simplified form the manner by which numeral values as typed by typewriter 100 are entered in storage unit 110 and retrieved from storage unit 110 and typed out by typewriter 100. A digit selected by the depression of a key on the keyboard of typewriter 100 sets up a 4 element binary code in encoding diode matrix 200. The ends of the four wires 114, 115, 116 and 117 may be ground or minus to indicate the "one" or "zero" condition, respectively, of the 4 code elements to thus set buffer storage toggles $X_{16}$, $X_{15}$, $X_{14}$ and $X_{13}$ in accordance with the digit entered on the typewriter. If the entered digit was a zero, each of toggles $X_{16}$, $X_{15}$, $X_{14}$, and $X_{13}$ would be a zero. If the entered digit is a 1, toggle $X_{16}$ is set at its unit condition and the other toggles are set at zero; and if the entered digit is a 3, toggles $X_{16}$ and $X_{15}$ are set at their unit or one condition and the other toggles are set at zero thus using the binary counting system in its usual unmodified form.

Referring now also to FIGURE 2, and in particular to the freight entry of 346.93#, the first digit typed would be a 3. Thus buffer toggles $X_{16}$ and $X_{15}$ are set at one and toggles $X_{14}$ and $X_{13}$ are set at zero. By virtue of the position of the typewriter carriage, a circuit is established in the program unit address control 250 which selects the portion of memory unit 110 into which the digit 3 stored in buffer toggles $X_{16}$, $X_{15}$, $X_{14}$ and $X_{13}$ is to be recorded.

The unit condition in toggle $X_{16}$ is applied to set write toggle 252 to a unit condition. The voltage level on lead 254 is thus applied to *and* gate 256 at a predetermined time when the memory unit 110 with respect to write head W is at a preselected position and a level of magnetization or direction of polarization is applied to a bit area on the surface of memory unit 110. Simultaneously, the voltage level from toggle $X_{16}$ is applied through *and* gate 258, lead 260, *or* gate 262 and lead 264 to adder/subtractor 202. As there is no other input to adder/subtractor 202 at this instant, the unit voltage level is applied unchanged through lead 266 as another input to toggle $X_{13}$ which causes this toggle to assume the unit condition from lead 266 and to transfer its zero condition to toggle $X_{14}$. Toggle $X_{14}$ takes on the new zero condition and transfers its previous zero condition to toggle $X_{15}$. Toggle $X_{15}$ assumes now the zero condition previously stored by toggle $X_{14}$ and transfers its unit condition to toggle $X_{16}$. All of the foregoing changes occur simultaneously and the unit condition of the second order bit is now applied to write toggle 252 and to *and* gate 258.

The second order bit is recorded adjacent the first order bit on the surface of memory unit 110, and simultaneously recirculated through adder/subtractor 202 and applied to set toggle $X_{13}$. The setting of each of toggles $X_{13}$, $X_{14}$ and $X_{15}$ is then again shifted one position to the right whereby the third order bit (zero) is now applied to set toggle $X_{16}$.

When the third order bit is applied to write toggle 252, the output level is shifted to lead 268 to be applied through *and* gate 270 to write head W to thus provide a polarity of magnetization on the surface of memory unit 12 opposite of that provided when a unit or one condition was recorded. With this method of recording (known as "non-return to zero" recording), there is no need for erasure of previous signals prior to recording.

Simultaneously with recording, the third order bit is recirculated through adder/subtractor 202 and applied to toggle $X_{13}$. This then effects a further shift of the four binary orders of the digit so that the fourth order bit is placed in toggle $X_{16}$, recorded and recirculated so that the four binary bits of the digit "3" are thus returned to their original position in the buffer toggles $X_{13}$, $X_{14}$, $X_{15}$ and $X_{16}$.

Once the typewriter carriage begins to move, the contacts on the program unit addressing control 250 open and remain effectively open until after the carriage has stopped at its next stable position and the contact associated with the narrow *odd* or *even* (see FIGURES 3a and 3b) strip is closed. This then establishes a new address in the memory unit for the next digit, and upon typing the next digit sets toggles $X_{13}$, $X_{14}$, $X_{15}$ and $X_{16}$ with the binary code indicating that digit.

Referring to the invoice sheet of FIGURE 2, under the freight entry, the second digit is 4. Thus toggle $X_{14}$ in FIGURE 1 is set to its unit condition and the other toggles are set at zero. The four bits defining the digit are then recorded through the same procedure as described in the preceding paragraphs.

By the time the typist can select the third digit 6, the second digit 4 will have been recorded. When the third digit 6 has been typed and recorded in the memory, the instant the carriage advances, *automatic decimal* contact 28 (see FIGURES 3a and 3b) is made by virtue of hole 308 on program card 300 and the decimal is printed without intervention by the operator and the carriage advanced to its next position. The 9 and 3 are then typed to complete the manual entry of the freight amount. The symbol # indicating a freight entry on the illustrated invoice is then typed automatically by circuitry which will be described below and the carriage advances to carriage position 100 at which time it is returned automatically due to hole 320 in the program card over command #27 *automatic carriage return.*

The typing of a digit in a position programmed for automatic decimal point entry or, vice versa, the typing of a decimal in a position programmed for digit entry will cause a level to appear on the *Energize Error Relay* line 672 (see FIGURES 6a and 6b), causing the Error Relay to operate, which will close the circuit to *Error* line 668 (FIGURE 6b) and line 932 (FIGURE 9) thus causing, in turn, the *keyboard lock* solenoid 433 (FIGURE 4b) to operate, locking the typewriter keyboard until the error condition is cleared. The means for providing the necessary level on *Energize Error Relay* line 672 are described under "Entry Circuit" below.

*Read-out of data from memory unit to typewriter*

Explanation of the internal transfer functions of information store in memory unit 110 will be given below, and it will now be assumed that it is desired to type out a digit from memory unit 110. The typewriter carriage must first be in a position where the program control card (FIGURE 3b) has a hole punched at strip No. 5 corresponding to *enable T/W*. This instruction, and others from program unit 250 of FIGURE 1 discussed below, are applied to read/write controls 251 to thus select the particular position on memory unit 110 from which the digit to be typed out is retrieved. Assuming now a command to type out the daily freight total 346.93# which had been recorded, see the third from bottom line on the invoice of FIGURE 2, the typewriter carriage is tabbed to the gross amount column at carriage position 65 and then tabbed again to carriage position 67 where hole 313 in the program card appears over strip 18 labeled *select "A."* Read head R of FIGURE 1 is gated on by *and* gate 272 as soon as the memory unit advances to its proper position. Until the first significant digit 3 is reached, the typewriter carriage is spaced, printing of the zeros preceding the first significant digit being suppressed.

When read head R picks up the first order binary bit of the digit 3, it is transmitted through *and* gate 272 and *or* gate 262 to adder-subtractor 202 and applied to toggle $X_{13}$ in the buffer storage. When the memory unit 110 advances to the second order binary bit, this signal is applied to toggle $X_{13}$ and the first order binary bit is pushed to toggle $X_{14}$. When the memory unit 110 advances to the third and fourth order binary bits, these bits are successively applied to toggle $X_{13}$ to thus set up the four toggles $X_{13}$, $X_{14}$, $X_{15}$ and $X_{16}$ to 0, 0, 1, 1 conditions respectively to represent a digit 3.

During this time *and* gate 258 is not gated on by read/write controls 251 and thus there is no recirculation in the sense that recirculation occurred during the operation where the digit was entered. Decoding relay tree 203 is now set and after a time sufficient to permit the relays to reach a stable condition, a *type now* signal is produced whereby the typewriter prints a 3 by virtue of the energization of a solenoid associated with the 3 key on the typewriter.

The time required for the typewriter to type out a 3 and advance to the next carriage position may take on the order of 100 milliseconds whereas one 360° rotation of memory unit 110 requires on the order of 17 milliseconds. The logic used, as described below in setting up the read/write controls 251, utilizes 5 rotations of the memory unit for a type out operation, and thus the limiting speed factor is the mechanical movement of the typewriter carriage.

After each digit is read out from memory unit 110 into buffer storage toggles $X_{13}$, $X_{14}$, $X_{15}$ and $X_{16}$, the digit is re-recorded at another position in memory unit 110 as it rotates past write head W and is recirculated through adder/subtractor 202 back to buffer toggles $X_{13}$, $X_{14}$, $X_{15}$ and $X_{16}$. Because the action of the relays in the decoding relay tree 203 is so slow, the few hundredths of a millisecond that toggles $X_{13}$, $X_{14}$, $X_{15}$ and $X_{16}$ are juggled in sequentially advancing the binary bit orders is insufficient to disturb the relay settings.

After the first digit is typed, the typewriter carriage advances to its next carriage position to thus cause the read and write controls 251 to gate out the second digit 4 in the freight total example being described. After this digit is printed, the typewriter carriage again advances to cause the next digit 6 to be printed by the same type-out procedure. After the decimal point is typed automatically, the final two digits are typed out following the same procedure. Read out of a register's contents always results in clearing the register, as will be described in detail below under "Head Gating Circuit." If it is desired to retain the value in the register, the program card must be coded to cause entry into the desired register.

From the foregoing, it will be apparent that during input and output operations, the entire system is synchronized by the movement of the typewriter carriage. If the typewriter carriage is blocked for any reason or at any position, there is no pile up of data at the buffer storage toggles or at the typewriter, and the possibility of loss of information from memory unit 110 is thus precluded.

During the time interval when a digit is being typed out from the memory or storage unit 110, a danger exists that the operator may actuate a key to cause a number or letter to be improperly typed on the printed page or to cause a carriage return (or other function) to occur. To prevent such action from being possible, means for locking the keyboard (both character keys and function keys) against actuation by the operator are provided. These means are controlled by the programming means for the system and by the internal circuitry.

Figure 4A:
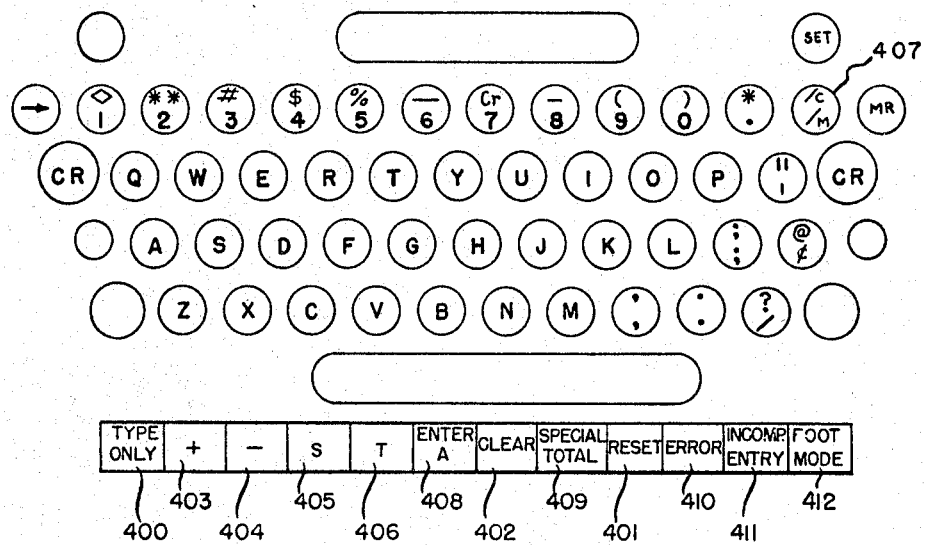
FIGURE 4a is a diagrammatic showing of the typewriter keyboard modified to include auxiliary control keys at the lower portion of the keyboard of the typewriter shown in FIGURE 1.
Figure 4B:
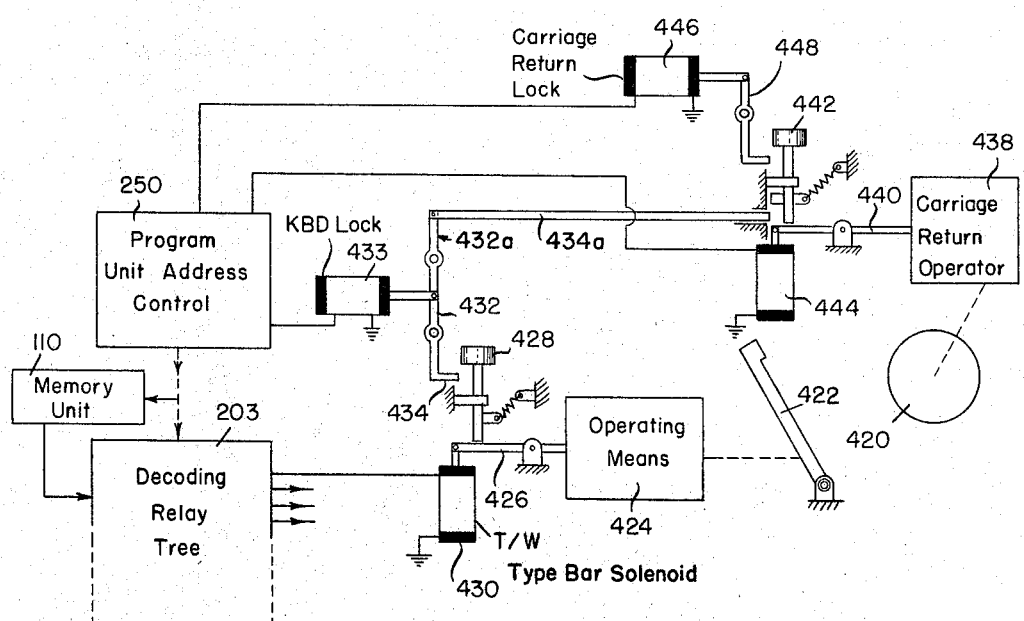
FIGURE 4b is a diagrammatic illustration of a novel keyboard interlock arrangement which prevents the operator from inadvertent actuation of the typewriter keys during critical periods of the operation of the electronic system.

Referring to FIGURE 4b the locking means are diagrammatically illustrated in combination with the typewriter which conventionally comprises platen 420, typewriter bars 422, operating means 424 for bars 422, and the usual link 426 for acting through operating means 424 to drive a selected type bar 422 against platen 420. Link 426 may be actuated either by pressing a character key 428 downwardly or by energization of the associated typewriter typebar solenoid 430.

A similar arrangement is provided for effecting return of the carriage which includes platen 420. The carriage platen function is accomplished through carriage return operator 438 which may be actuated by lever 440 in the usual manner. Lever 440 may be actuated by pressing key 442 downwardly or by energization of solenoid 444.

Electric typewriters are conventionally equipped with a key locking means operable by the on-off switch and which locking means is illustrated by members 432a and 424a. Alternatively, these members may be actuated by a solenoid 433. When keyboard lock solenoid 433 is energized, 432 pivots so that end 434 physically engages key 428 to prevent actuation of link 426, and thus prevent the operator from being able to cause any of the type-bars 422 to print against platen 420. At the same time, through lever 432a, locking bar 424a is moved under an ear on each control key, such as that illustrated on carriage return key 442.

The system is so arranged that when the typewriter carriage moves to a position where typing will occur in the gross amount or net amount columns, the keyboard lock solenoid 433 is energized through appropriate signals generated in program unit address control block 250. At such time during the operation of the system, information stored in memory unit 110 is supplied to decoding relay tree 203 and to the various type bar solenoids 430 to cause the typewriter to operate as an output unit by typing out information from memory unit 110 as described above. During this output operation, the operator cannot actuate the type keys nor effect a carriage return, or a tabulation, etc. Otherwise, any intervention by the operator during these positions of the carriage would seriously interfere with and destroy the accuracy of the electronic computing functions and transfer of information from one portion to another in memory unit 110. As can be seen from FIGURE 35, the keyboard lock solenoid may also be operated under control of internal circuitry at times, for instance, when the carriage moves into an entry field before internal operations have been completed.

Also, in the entry fields such as columns where the quantity or price items are entered, inadvertent carriage return from that entry field to a prior one when an entry has been partially completed would result in failure to enter the intended field's register and make possible an incorrect entry in the prior field's register. Accordingly, a separate carriage return lock solenoid 446 may be provided for pivoting lever 448 to thereby lock carriage return key 442 when solenoid 446 is energized. The purpose of the separate carriage return lock mechanism is thus to provide means for separately locking the carriage return key 442 during an input operation where the type keys 428, and other control keys, such as tab, must be free to be manipulated by the operator. Note that the keyboard lock mechanism may be modified, if desired, to lock all keys except carriage return and the locking of the entire keyboard then may be achieved by energizing both solenoid 433 and solenoid 446.

Before proceeding with the detailed description, a brief reference to the block diagram of FIGURES 5a and 5b will be helpful. The system shown in FIGURE 5 is identical to the system shown in FIGURE 1, excepting that the control circuits are shown in greater detail while the typewriter encorder 200, buffer storage 201 and decoder 203 are simplified. Most of the blocks labeled in FIGURE 5 in reality are composed of one or more binary trigger circuits, referred to through the remainder of the specification as toggles, plus the necessary gating. To the extent possible, the reference numerals used in FIGURE 5 are found on the logical circuit diagrams in the remaining figures of the drawings. Continued reference to FIGURE 5 will therefore be helpful in following the detailed description as it proceeds in connection with the drawings.

DETAILED DESCRIPTION

Typewriter

The typewriter has been described in some detail above under the general description. An example of a typical keyboard layout including control keys is shown in FIGURE 4a. At the top of the invoice sheet (of FIGURE 2) it is usually necessary to type a heading comprising at least the name and address of the recipient of the invoice and the date. As the numbers contained in the address and date are not entered into arithmetic portions of the system, a *type only* key 400 (FIGURES 1 and 4a) is provided. Actuation of *type only* key 400 opens momentarily a pair of normally closed contacts 600 (FIGURE 6a) to open a holding circuit for a calculate relay 601 (FIGURE 6a) which must be energized, in a manner discussed hereinafter, before an arithmetic operation may be carried out. The typewriter may be used as a typewriter, therefore, without interacting with other portions of the system, when calculate relay 601 is de-energized, and the *type only* lamp 620 under key 400 (FIGURE 4a) is energized.

It is sometimes necessary before typing the first item of an invoice to reset the registers of the system to zero. For example, in the case of the first invoice of a series of invoices, it is necessary to reset the registers to zero in order to remove values remaining in the registers from previous procedures. Simultaneous depression of *reset* key 401 and *clear* key 402 (FIGURE 4a) actuates momentary reset contacts 602 and clear contacts 603 (FIGURE 6a) for coupling a potential to other portions of the system to initiate such a resetting of the registers. Actuation of *reset* key 401 alone has purposely been made incapable of resetting the accumulator registers to zero so that inadvertent loss of data does not occur by accidental closing of *reset* key 401. Also *reset* key 401 and *clear* key 402 have been separated by key 409 to further assure that values stored in the memory unit are not accidentally destroyed.

*Plus* key 403 (FIGURE 4a) is actuated to place the system in condition whereby the numerical digits typed in proper columns on the typewriter will be entered into memory unit 110. Actuation of *plus* key 403 transfers momentary contacts 604 from the position illustrated in FIGURE 6a whereby a potential is then connected to the *calculate* relay 601. Each of the switch contacts of *calculate* relay 601 are thus transferred to their alternate position to produce a *calculate* potential on lead 622 for use in other portions of the system to carry out the system operations. Contacts 624 close to provide a circuit for holding calculate relay coil 601 energized. Contact 626 transfers to de-energize the *type only* lamp and to apply ground to the plus (+) lamp on FIGURE 6b through normally closed contact 628 of *minus* relay 606. Contact 630 of calculate relay 601 is closed to provide ground on lead 632 which provides a holding circuit for *foot* relay 608 (FIGURE 6b) through contacts 634 when closed and a circuit to ground for *minus* relay 606 (FIGURE 6b) and for *enter A* relay 636 (FIGURE 6a). Thus, unless *calculate* relay 601 is previously energized, *enter A* relay cannot be energized even though its respective key contact 638 is closed. By depressing *minus* key 605, *calculate* relay 601 is energized which closes contact 630 putting ground on lead 632 thus allowing simultaneous energization of minus relay 606 and calculate relay 601.

With continued reference to FIGURES 6a and 6b together, the output signals or control voltages used as input signals to other parts of the system are all arranged along the right hand side of the figure while the input signals used in this particular part of the system are arranged along the left hand side of the figure. Thus, referring to the right hand side of FIGURE 6, which in this instance is on the sheet containing FIGURE 6b, output lead 640 at the top of the figure will contain a control potential when the program card of FIGURE 3b is in place (indicated by CARD IN PLACE, FIGURE 6a) and when the carriage return contacts (CARR. RET., FIGURE 6b) the tab switch contacts (TAB, FIGURE 6b) and the continuous spacing contacts (CONT. SPACE) are *not* open. The line over the function identified on the drawing indicates a *not* condition in accordance with the usual Boolean algebra symbols.

Lead 642 labeled *body* is grounded only when the *foot* relay 608 is not energized, as is apparent from switch contacts 609. Lead 644 labeled *foot* will be grounded only when *foot* relay 608 is energized. It will be recalled that operations entering items on the invoice utilize the *body* mode of operation, and when the sub-total is taken, all subsequent operations as appear at the foot of the invoice, are regarded to utilize the *foot* mode of operation.

*Foot* relay 608 is thus energized by closing sub-total key contacts 607 and will remain energized until *calculate* relay 601 is de-energized. This occurs either when *type only* contacts 600 are opened to type the heading on the next invoice or when the *calculate hold* level (an input signal at the top of FIGURE 6a) is dropped by depression of *total* key (as shown in the gating of FIGURE 33).

When *minus* relay 606 is energized by closing momentary contacts 605 through actuation of key 404, a hold circuit is established through contacts 612 of the carriage return limit switch (FIGURE 6b) to thus automatically de-energize the minus relay upon the first typewriter carriage return after its energization. When energized, a control voltage is present on *minus key* output lead 648 through closed contacts 650 and lead 652 to the conditional minus command on strip 32 of the program panel of FIGURE 3a.

On *card in* lead 654, a ground potential is provided when the contacts 656 of the *card in place* switch (FIGURE 6a) are closed indicating the program card 300 of FIGURE 3b is in place at the rear of the typewirter, see FIGURE 1. Ground potential through contacts 656 when closed is also applied through carriage return contacts 611 to junction 660 to thus supply ground potential to the *program panel common* lead at the lower left hand side of FIGURE 6a when carriage return and manual carriage release switches are closed, and to supply ground potential to lead 658 at the center of the right hand side of FIGURE 6b indicating that the card is in position and the carriage is *not* in the motion of returning.

On *S key* lead 662, ground potential is applied when *sub-total* key contacts 607 are closed. On *T key* lead 644, ground potential is applied when *total* key contacts 613 are closed momentarily. Leads 666 and 668 are alternately grounded to indicate "not error" and "error" respectively, depending upon the energization condition of *error* relay 670. *Error* relay 670 is energized by an input signal on *energize error relay* lead 672 located at the lower left hand side of FIGURE 6a.

On *reset and clear* lead 674, a signal is present when reset contacts 602 and clear contacts 603 are simultaneously transferred. On *clear* lead 676, a signal is present when clear contacts 603 are transferred. On (reset and clear) lead 678, a voltage level (ground) is present thereby indicating only that *clear* contacts 603 have not been closed. Transfer of *reset* contacts 602 without simultaneous transfer of clear contacts makes no change in the internal operation of the system; this prevents inadvertent cancellation of data stored in certain portions of the memory by accidental transfer of reset contacts 602 alone.

On *special total* lead 680 (FIGURE 6b), a voltage level (ground)) appears when *special total* key contacts 682 are closed and when ground is applied to *special select "D" command* on lead 684 which is terminal strip 22 of the program panel shown in FIGURE 3a. The contacts on strip 22 are closed, in the embodiment illustrated, at carriage position 65 by the presence of hole 322 in the program card of FIGURE 3b. As will be explained below, memory unit 110 has a storage register identified as "D" (see FIGURE 10a) and the effect of selecting these command instructions is to cause the running total carried in the "D" register of the memory unit (see FIGURE 5a) to be typed out.

*Encoder*

A conventional typewriter is modified, as by adding contacts to the digit keys of the typewriter and a diode matrix as illustrated in FIGURE 7, to provide means for converting the decimal digits selected on the typewriter into a four order binary coded signal. Encoder 200 (FIGURES 1, 5a and 7) is provided for developing such signals and is shown in its functional relationship to other portions of the system in FIGURES 1 and 5. To electrically represent the numeral of an actuated numeral key, separate switch contacts 700 (FIGURE 7) are coupled to each key. The output signals from the encoder including leads 701, 702, 703, 704 and 705 are coded 0, 1, 2, 4 and 8, respectively. An arrangement of diodes 706 is connected between the numeral key switch contacts 700 and the encoder output leads so that upon actuation of a numeral key, a potential is coupled through the closed numeral key contacts 700 to selected ones of coded output leads 701–705 in a manner obvious from FIGURE 7 and well known to those skilled in this art. The sum of lead designations 1, 2, 4 and 8 having ground potential applied thereto, is the digit value of the numeral key selected. Whenever a numeral key is actuated, therefore, signals corresponding to the binary coded decimal value of the key are developed and appear in parallel from the encoder.

Additional control voltage levels are produced by the portion of the typewriter shown in FIGURE 7. Ground potential is normally present on *basket unshifted* lead 710, but is transferred to *basket shifted* lead 712 when *basket shift* switch contacts 714 transfer. Ground potential is also normally applied on /m key lead 716 when key contacts 718 are closed unless the *basket shift* contacts 720 are transferred in which case the ground potential is applied to /c% key lead 722. When basket shift contact 724 is transferred and the 5 digit key is selected by the operator, ground is also applied to /c% key lead 722. There being two decimal points on the keyboard shown in FIGURES 1 and 4a, a circuit connection is provided to supply ground to *decimal point key* lead 726 when either key is selected.

Buffer storage

The buffer storage unit (see FIGURE 5a) serves (1) to receive the input from the typewriter through encoder 200 just discussed; (2) to provide an output from the arithmetic portions of the system to the typewriter through decoder 203 to be discussed in the following section in connection with FIGURE 9; (3) as a shift register that provides a time delay corresponding to four bit clock pulses; (4) as a corrector; and (5) to generate non-numerical cymbols. As the buffer storage toggles are used for a number of different purposes, depending upon the function taking place in the system at a particular moment, only part of the circuit will be described at this point in the specification and subsequent references back to FIGURE 8 will be made at appropriate points in the specification.

The internal arithmetic portions of the system of the present invention operate in a serial or sequential pulse mode. Consequently, each group of parallel signals coming from the typewriter and produced at the output of the encoder 200 of FIGURE 7 are converted to an equivalent serial or sequential representation. Buffer storage 201 (FIGURES 5 and 8a, b and c) provides function (1) enumerated above by accomplishing this parallel to sequential conversion. For typewriter print out, function (2) enumerated above, buffer storage serves to convert the internal sequential mode of operation into groups of four bit units available in parallel to thus select the digit keys of the typewriter one at a time.

Turning first to FIGURE 8a, buffer storage comprises four toggles 800, 801, 802, and 803 which in FIGURE 1 were identified as $X_{16}$, $X_{15}$, $X_{14}$ and $X_{13}$ respectively. Each toggle 800–803 is a bistable device commonly referred to also as a flip-flop. The toggles or flip-flops of buffer storage, as well as the toggles or flip-flops of other portions of the system discussed hereinafter, may be of any common type as, for example, that type shown in FIGURE 11–2 of Design of Transistorized Circuits for Digital Computers, by Abraham I. Pressman, John F. Rider Publisher, Inc., 1959. In the case of one of the toggles, more fully discussed hereinafter, the circuit of FIGURE 11–2 may be modified according to FIGURE 11–7 of the same publication to include a symmetrical input. Obviously, any of the commonly used flip-flops or toggles may be used in the system, as the choice is merely one of design, and for that reason a detailed description is not deemed necessary here.

Throughout the circuit diagrams, the input signals to a toggle such as 800 are applied as by leads 850 and 851 always connected to the bottom of the block representing the toggle. The output signals are present on leads 852 and 853 always extending from the top of the block representing the toggle. A toggle is triggered when a potential is applied to the right hand input lead 850 to be in its unit or one indicating condition, which means that a ground potential is applied on output lead 852 and output lead 853 has a negative potential. When an input signal is applied to the left hand input lead 851, the toggle is then in its naught or zero indicating condition with a ground potential present on output lead 853 and output lead 852 has a negative potential. Successive input signals on the same lead cause no change in the condition of the toggle.

The units input, i.e., the right hand lead to the bottom side of each of the toggles 800–803 is coupled to respective output leads 702, 703, 704, 705 of the encoder of FIGURE 7 through input leads "T/W 8 Code" and "T/W 4 Code" on FIGURE 8b and leads "T/W 2 code" and "T/W code" on FIG. 8c, through and gates 804, 805, 806, and 807 respectively; and through or gates 864, 865, 866 and 867. The toggles, therefore, are coded to correspond respectively to the 1, 2, 4, 8 code of the encoder outputs. Toggles 800–803 are initially reset to their zero or naught state in a manner discussed hereinafter.

In response to the actuation of a numeral key on the typewriter, signals appearing on the encoder output leads are transmitted to corresponding buffer storage toggles 800–803 through respective and gates 807, 806, 805, 804 which, to be opened, must be further controlled in manner discussed hereinafter for setting the toggles to the unit state of operation. The toggles which are coupled to encoder output leads 702–705 (FIGURE 7) on which no signals appear remain in the naught state of operation.

The and and or gates of buffer storage, as well as of other portions of the system discussed hereinafter may be of any common type as, for example, the and gate shown in FIGURE 5.6 and the or gate shown in FIGURE 5.10 of the publication referred to above. The input lead to an and gate terminating in an arrow inside the and gate, see for example lead 855 for and gate 807 on FIGURE 8c, indicates the signal on that lead is a short pulse, whereas the signals on the other input leads are levels extending for a period of time at least as long and usually much longer than the bit clock period. An and gate having one pulse input signal will obviously produce a pulse output signal since it is open only during the duration of the short pulse input, and of course, when all of the other input signals are present.

The state of operation of toggles 800–803 of FIGURE 8a therefore may be set by the pulse output from and gates 807, 806, 805, 804 to correspond to the actuated numeral key on the typewriter. The state of operation of the lowest order toggle 800 is determined either by detecting an $X_{16}$ ground potential on units output lead 852 or by detecting the negative potential $\overline{X_{16}}$ on naught output lead 853.

During an operation where a digit has been entered on the typewriter and toggles 800–803 are conditioned in accordance with the value of the digit entered, this digit may be transmitted for storage in memory unit 110, bit by bit, in a sequential manner in response to four successive bit clock pulses on lead 872. Each bit, naught or unit, when read out of toggle 800 is recirculated through the adder/subtracter of FIGURE 18 and applied on sum/diff lead 868 to and gate 816 (FIGURE 8b) and on $\overline{\text{sum}}$/$\overline{\text{diff}}$ lead 870 to and gate 815 to be, in effect, applied to toggle 803. This is accomplished by simply applying a triggering input signal to toggle 803 through and gate 816 if toggle 800 had been in its unit condition and through and gate 816 if toggle 800 had been in its naught condition upon receipt of the next bit clock pulse on lead 872 at a time when an output level is present on lead 873 from shift buffer or gate 814 in FIGURE 8a. Toggle 803 thus either retains its condition if it had been the same as that of toggle 800 or transfers to assume the condition toggle 800 had if it had been different.

When toggle 803 assumes the condition of toggle 800, toggle 802 assumes the previous condition of toggle 803 by circuits including leads $X_{13}$ and $\overline{X_{13}}$ (see FIGURE 8b) connected to and gates 809 and 808 respectively which are connected to the input terminals of toggle 802. The condition of toggle 802 is transferred to toggle 801 by similar circuits including leads $X_{14}$ and $\overline{X_{14}}$ (FIGURE 8b) connected to and gates 811 and 810 (FIGURE 8c) respectively which are connected to the input leads of toggle 801. And the condition of toggle 801 is transferred to toggle 800 by circuits including leads $X_{15}$ and $\overline{X_{15}}$ (FIGURE 8b) connected to and gates 813 and 812 (FIGURE 8c) respectively which are connected to the input leads of toggle 800.

The numeral of the actuated key is therefore represented by a series of potentials at lead $X_{16}$, the opposite potentials being present at lead $\overline{X_{16}}$, at the output of the toggle 800 (see FIGURE 8c) which is used for controlling an entry of corresponding binary representations into a digit register area of memory unit 110 as explained above under the general description.

Buffer storage is also arranged for receiving serial pulses representing a sum or a difference of two decimal digits from an adder-subtractor circuit 202 (FIGS. 1, 5a and 18) at *and* gates 815 and 816 (FIGURE 8b) applied to the input to $X_{13}$ toggle 803 over *sum/diff* and $\overline{sum/diff}$ leads 868 and 870 (FIGURE 8b).

As the system is arranged to operate in the binary coded decimal system, each four bits in buffer storage may not represent a number greater than nine. Consequently, if any number should be transferred to buffer storage which exceeds nine, it is converted to the correct decimal number plus a tens carry or borrow, as will be explained in detail in connection with the adder-subtractor circuit 202 of FIGURE 18. Briefly, after entry of a digit from adder-subtractor circuit 202, conversion is accomplished by feeding back toggle potentials to a gating arrangement comprising *and* gates 817, 818, 819, 820, 821, 822, 823 (FIGURE 8b) 824, 825 (FIGURE 8c) and developing a *correct* potential in gates 826, 827, 828, 829 (FIGURE 8a) for application to the gating arrangement in response to detection of a sum or difference greater than nine. The states of the toggles 800, 801, 802 and 803 therefore are changed to correspond to the correct decimal number and a carry or borrow potential is coupled over a *correct* output lead 856 (FIGURE 8a) for storage in the adder-subtractor circuit (FIGURE 18) to be used in the next higher order addition or subtraction.

If a sum is transferred to buffer storage, conversion is accomplished through the feedback gating arrangement by adding a binary coded decimal six (0110) to the value represented by the toggles; thus if the toggles represented 11, an absolute numerical value of adding 6 will produce 17 thereby causing the toggles 800–803 to indicate 1 and the carry of 10 will be supplied as a 1 to the next higher order digit which will be next to come into the buffer storage. In the case that a difference is transferred to buffer storage where the digit is greater than nine, conversion is accomplished by subtracting a binary coded decimal six and by storing a borrow; thus if the toggles represented 11, subtracting 6 will produce 5 will be indicated by toggles 800–803 and the borrow of 10 will be supplied as a 1 to the next higher order digit. After conversion and in response to four bit clock pulses, serial representations of the converted number appear at the $X_{16}$ and $\overline{X_{16}}$ outputs of the lowest order toggle 800 for entry into a register of memory unit 110.

Buffer storage is also used in the normal transfer of numbers from register to register, i.e., transfer of a number from ordinal positions of a first register in memory unit 110 through the adder-subtractor circuit 202 (FIGURE 5a) and buffer storage 201 to corresponding ordinal positions in a second register in memory unit 110. No addition or subtraction occurs since only one value is applied to the adder-subtractor circuit 202 during such a transfer so that the value is added to zero.

In this system during the multiplication process, an entire word number is shifted one digit position relative to a fixed position on the storage unit during an internal transfer in which case buffer storage is bypassed thereby eliminating the time required to apply the four bit clock pulses for shifting decimal digit representations into the buffer storage toggles 800–803. Since the shifting time normally requires an amount of time equal to that required for recording the four bits of a decimal digit, elimination of this time by bypassing buffer storage toggles 800–803 during internal transfers results in the shift of the relative position in which the digits are recorded in a particular register area by one digit area position in a manner discussed hereinafter. As this system uses a fixed decimal point, the effect of the foregoing transfer is to shift the decimal point.

Another function of buffer storage is to convert serial representation of digits received from a register on memory unit 110 through the added-subtractor circuit 202 to buffer storage to parallel representations for actuating a corresponding typewriter typebar during the typeout operation. Four output leads designated 860, 861, 862, 863 (FIGURE 8a) designated *energize relay 1, 2, 4, 8* are coded 1, 2, 4, 8 respectively and are connected to respective unit outputs of the buffer storage toggles 860–803. After a serial representation of a decimal digit has been applied to the toggles, the parallel potentials on the toggle output leads represent the digit. These coded potentials are used for actuating a corresponding typewriter typebar.

Decoder

A decoder 203 (FIGURES 1, 5a and 9) is provided wherein the parallel potentials available at the output of leads 860–863 of buffer storage (FIGURE 8a) are used to actuate a corresponding typewriter key. The decoder comprises a group of relays 900, 901, 902, 903 (FIGURE 9) which are coded 1, 2, 4, 8, respectively. These relays are selectively energized in response to the selective presence of potentials on leads *energize relay "8", "4", "2" and "1"* corresponding to the states of the toggles $X_{13}$, $X_{14}$, $X_{15}$, $X_{16}$ respectively of blocks 800–803 of FIGURE 8a. Relays 900–903 are arranged upon energization to set up contacts through a well-known tree arrangement to select which of the typebar solenoids 908 will be actuated. The selected solenoid 908 is energized by an input *type signal* on lead 920 generated at an appropriate time in the type cycle as more fully discussed hereinafter.

If the *type signal* appears on lead 920 and none of relays 900–903 is energized, the *type signal* proceeds through the upper switch contacts 903a, 902a, 901a, 900a to lead 922. If zero suppression relay 905 is not energized, the signal on lead 922 goes through contacts 924 and lead 926 to energize *space* solenoid 907 to thereby space the carriage. If *zero suppression* relay 905 is energized, the *type signal* on lead 922 goes through transferred contacts 924 to energize the *zero* solenoid 906 to cause the typewriter to print a zero.

*Zero suppression* relay 905 is energized when any of contacts 903b, 902b, 901b or 900b are closed, or when a signal appears on *energ. zero supp. relay* lead 929. Once energized, *zero suppression* relay 905 remains energized through a holding circuit including contacts 928 and *zero hold* lead 930 which is energized throughout the type out cycle.

Advantages of the novel zero suppression circuit just described are that it is entirely a circuit arrangement requiring no additional mechanical parts other than the extra set of contacts on each relay 900–903 and, of course, the zero suppression relay 905. Thus, this important function is achieved with a minimum of effort and cost.

Decimal point solenoid 932 is provided to automatically type out a decimal. This may be accomplished by an input signal on *dec. pt. drive* lead 934 or by the *type signal* on lead 920 when the "8" and "4" relays 903 and 902 are energized through a circuit including transferred contacts 903a and 902c.

The remaining solenoids: *carriage return* (C.R.); *basket shift; keyboard lock;* and *carriage return lock* are all directly energized by signals on their respective input leads as will be discussed below.

The typewriter has a manually actuatable carriage return key identified as C.R. in FIGURE 4. The solenoid for performing the same function is identified as C.R. in FIGURE 9. The carriage return key C.R. of FIGURE 4 may be locked so that the operator is incapable of effecting a manual carriage return function when the *C.R. Lock* solenoid shown in FIGURE 9 is energized.

The *C.R. Lock drive* potential is derived from the gating circuit shown in FIGURE 26 and requires the *entry* toggle 2600 to be set and an *enable input* potential which is generated by the circuit shown in FIGURE 21 any time the typewriter carriage is positioned where holes are provided for *order 1, order 2, order 4* or *order 8* in the program card of FIGURE 3. The operator may not cause malfunction of the system by accidentally hitting the carriage return key during an entry of digital information. Also, the incomplete entry lamp 411 (see also FIGURES 1 and 4) is connected across the carriage return lock solenoid to thus visually indicate when the *C.R. Lock* solenoid is energized.

The *keyboard lock* solenoid of FIGURE 9 is provided to lock the keyboard and prevent manipulation of any of the keys at such times as when the operator could interfere with operation of the electronic system. The *C.R. Lock drive* potential is derived from a gating circuit discussed in connection with and shown in FIGURE 35. It may be noted here that when the typewriter carriage is in a position where the typewriter keys are to be actuated by the electronic circuitry, the keyboard is locked to prevent interference by the operator.

*Memory unit*

Memory unit 110 of FIGURE 1 may be of any satisfactory type. In the particular system here described, a rotating disk having a magnetizable coating on one surface as described and claimed in the above-mentioned application of Gordon J. Whyte, has been used.

The rotating storage disk 204 shown in detail in FIGURES 5a and 10 contains two information tracks 205 and 206 and two clock tracks 207 and 208. Each of the two information tracks is divided into four quarters or quadrants and each of the quarters is further sub-divided into thirds. Each of these thirds is designated as a word register area on which a binary coded plural digit decimal number may be stored.

Each of the word register areas is sub-divided (see FIGURE 10a) into twelve digit areas into which a number having up to ten decimal digits and the sign of the number may be stored. The twelfth digit area is generally unused excepting for special features which will be discussed in detail below.

Each digit area is sub-divided into four binary bit areas as best shown in FIGURE 10b and on which may be stored the binary bits of a binary coded decimal digit. The digit areas are separated from each other by one clock bit, also referred to as a master clock pulse space (see track 207). This space is useful for several purposes, including as a means to provide a time during which to gate on a reading head without danger of missing the first bit signal and means to provide the time required during an addition or subtraction process to determine whether buffer storage toggles $X_{13}$, $X_{14}$, $X_{15}$ and $X_{16}$ (FIGURES 1 and 8a) contain a digit which must be corrected, and if so to convert that digit to the correct decimal digit by the addition or subtraction of 6 prior to continuation of the addition or subtraction process with entry of the next digit as mentioned above and as will be discussed in greater detail below.

Memory unit 110 (FIGURES 5a and 10a) is provided with two write or record heads $W_1$ and $W_2$ associated with information channels 205 and 206 respectively and four read or reproduce heads $R_1$, $R_2$, $R_3$, and $R_4$. Read heads $R_1$ and $R_2$ are associated with recording channel 205 and read heads $R_3$ and $R_4$ are associated with recording channel 206. Two additional read heads (211, 212 on FIGURE 5a) are associated with clock tracks 207 and 208.

The position of the memory unit relative to the fixed read and write heads as shown in FIGURES 5a and 10a is such that the index position of the clock tracks 207 and 208 lies along the radial line through read head $R_4$. This is referred to as the reference position of disk 204 which is illustrated diagrammatically in FIGURE 10c. After a quarter revolution of disk 204 in a clockwise direction, the index position will lie along the radial line through read head $R_2$ as shown in FIGURE 10d. At the end of the second quarter revolution, the index position will lie along the radial line through read heads $R_1$ and $R_3$ as illustrated in FIGURE 10e. At the end of the third quarter revolution, the index position will be slightly greater than one digit area position short of lying on the radial line passing through write heads $W_1$ and $W_2$.

Write heads $W_1$ and $W_2$ are displaced in the direction of disk rotation from a quarter revolution position by an amount slightly greater than one digit area, i.e., 5 bit areas (see FIGURE 10b) to permit a digit read from one position on the memory unit to be applied to the $X_{13}$ toggle 803 and sequentially passed through toggles 802 and 801 to toggle 800 (see FIGURE 1) from which it is then applied to a write head $W_1$ or $W_2$ for recording in another register on the memory unit. For example, if the digit recorded in the number one digit area of the storage register of the buffer storage register $B_1$ is read out by read head $R_3$ it will normally (except during part of the multiplication operation as will be explained below) pass through buffer storage toggles 803 to 800. By the time the first bit of this digit is available at toggle 800 of buffer storage for transmission to writehead $W_2$, for example, disk 204 will have advanced one digit area (plus a small additional displacement to compensate for delay in the circuitry) whereby the number 1 digit area 1002 (FIGURE 10a) is in a recording position under write head $W_2$ because of the displacement of write head $W_2$ from an exact quarter position relative to read head $R_3$.

A plural order number is stored in the register areas, for example $M_1$ of track 206, with the lowest decimal order first, and with the lowest bit order first, in the direction of disk rotation. For example, the lowest order bit area of the lowest order digit area of a register area $M_1$ (FIGURE 10b) is the first bit area 1004 in the counter-clockwise direction from the boundary with the $T_6$ word register area.

In the system here described, the operations involving the memory disk are tabulated below:

(1) *Entry*.—A number introduced into the memory originates from the typewriter keyboard while disk 204 is operating at a continuous speed of approximately 3450 r.p.m. The digit is entered into buffer word registers $B_1$, $B_2$ and $B_3$ in triplicate through suitable gating and timing controls.

(2) *Accumulate*.—Registers A, B, C, D, E and F are accumulate registers. It is possible to add the number entered in buffer word registers $B_1$ to $B_3$ to all or any one of these accumulate registers. During the first quarter (see FIGURE 10c) read heads $R_1$ and $R_3$ may be used simultaneously to add (or subtract) the number entered in buffer registers $B_1$ to $B_3$ to the numbers stored in accumulate register A, B and C and to enter the new accumulation into transfer registers $T_1$, $T_2$ and $T_3$. During the second quarter (see FIGURE 10d) read head $R_4$ is energized and the number transferred from register area $T_1$ to A; $T_2$ to B; $T_3$ to C. If only one of registers A, B or C were desired to be modified, then the gating is arranged so that only one of registers A, B and C is permitted to participate in this process.

During the third quarter (see FIGURE 10e) a number entered in buffer registers $B_1$ to $B_3$ may be added (or subtracted) to a number stored in the D, E or F registers by simultaneously gating on read heads $R_1$ and $R_4$. The new number is then temporarily placed in registers $T_4$, $T_5$ or $T_6$ by write head $W_2$.

During the fourth quarter (see FIGURE 10f), the number stored in registers $T_4$, $T_5$ or $T_6$ is read out by read head $R_4$ and entered without further modification in whichever of the registers D, E or F the original stored number was taken from. Thus, as a result of completing one rotation of disk 204, one complete addition (or subtraction) may be accomplished for all or any one of accumulate registers A, B, C, D, E and F.

(3) *Multiplication*—

(a) Entry of Multiplicand: The process of multiplication takes place by first entering one factor, referred to as the multiplicand, into the appropriate place in the memory (multiplicand register $M_3$) via buffer register $B_3$, then entering the second factor, referred to as the multiplier, into buffer register $B_1$–$B_3$, and then causing shifts and additions of the multiplicand to itself a number of times equal to the value of the multiplier, until finally the product has been formed in the product primary register $P_1$–$P_3$. The process that takes place is thus that of accumulation of partial products until the full product has been formed. This process will be described in detail below.

In entering the multiplicand, the number is first stored in buffer register $B_1$–$B_3$ and by external programming, it is indicated that this is a multiplicand. The external programming may be hole 334 in the program card of FIGURE 3*b* appearing at carriage position #21 in column *Enter 1st Factor (ICAND)*.

During a subsequent 360° rotation action takes place during the first and fourth quarters only. During the first quarter, read head $R_3$ is connected, via the digit shift register provided by buffer storage toggles 800–803, to write head $W_2$ and the contents of buffer register $B_3$ is transferred (without modification) to register $T_3$. During the fourth quarter, read head $R_3$ is again connected, via the digit shift register toggles 800–803, to write head $W_2$ and the contents of register $T_3$ is transferred (without modification) to the multiplicand register $M_3$. As a result of this one revolution of the memory disc, the first factor for multiplication is now stored in the most significant or highest order third of the multiplicand register.

(b) *Entry of Multiplier*: The second factor for multiplication, the multiplier, is introduced into the three buffer registers $B_1$–$B_3$ as usual in the entry process. This number remains in the buffer register $B_1$–$B_3$ during the multiplication process and the digits are retrieved one by one and applied to buffer storage toggles 800–803. The output signals on leads $X_{13}$, $X_{14}$, $X_{15}$ and $X_{16}$ of FIGURE 8*a* are applied on leads having similar designations in FIGURE 28*b* to set the multiplier counter of FIGURES 28*a*, *b*, *c* and *d* as will be explained below.

The process of multiplication or product development is carried out by multiplying the multiplicand by the successive digits of the multiplier starting with the most significant multiplier digit. This is initiated by the presence of hole 316 in the program card of FIGURE 3*b* at typewriter carriage position 64 in column *Enter 2nd Factor (IER)* and is accomplished as follows:

Before multiplication can actually take place, it is necessary to shift the contents of the multiplicand register $M_3$ (which as explained above, contains the first factor or multiplicand entry) in such manner that the product will be properly positioned in the product primary register areas $P_1$–$P_3$ when the multiplication process is completed. This is a function of the location of decimal within the multiplicand and the multiplier. For an invoicing operation as described above in connection with FIGURE 2, the location of the decimal may be readily controlled by the typewriter entries and preparation of the program card of FIGURE 3*b*.

For purposes of illustration of the system herein described, the multiplicand (Icand) is shifted nine digit positions from its original position in the $M_3$ register in the direction of rotation of disk 204, or in the less significant direction, as shown in FIGURE 10$a_2$. This is performed as follows: During the first quarter cycle (see FIGURE 10*c*) read head $R_4$ is connected to write head $W_2$ without going through the digit shift register provided by buffer storage toggles 800–803. As a result, during this first quarter, the contents of the multiplicand registers $M_1$–$M_3$ are recorded in temporary storage registers $T_1$, $T_2$ and $T_3$, however, advanced by one digit position from the relative position in which they existed in the multiplicand register $M_1$–$M_3$. This advance is caused by the one character displacement of read head $W_2$ from an exact 90° position as clearly shown in FIGURE 10$a_2$. No further action takes place until the fourth quarter (see FIGURE 10*f*) at which time read head $R_3$ is connected to write head $W_2$, but this time through the digit shift register provided by buffer storage toggles 800–803. This time the contents of temporary storage registers $T_1$–$T_3$ are recorded back into the multiplicand registers $M_1$–$M_3$. As a result of this one rotation, the information now stored in the multiplicand registers $M_1$–$M_3$ has been advanced, or right shifted, one digit position. This process will be repeated eight more times as indicated in FIGURE 10$a_2$, unless a /c, % or /m is indicated, and as a result the multiplicand will now have been right shifted nine digit positions and the first factor will now exist more nearly in the center of the group of the three sectors representing the multiplicand registers $M_1$–$M_3$.

Note that it would be possible to make two shifts each of one digit position per revolution by bypassing the digit shift register during the transfer of each shifting step, i.e., $M_1$–$M_3$ to $T_1$–$T_3$ and $T_1$–$T_3$ to $M_1$–$M_3$, but for reasons related to simplicity of control circuits, it has been found more economical to allow only one shift per revolution. The time for the shift is short relative to that required for manual entry of data on the typewriter. The process of product development is now ready to start.

Product development starts by taking the most significant digit in the multiplier from buffer register $B_1$ and transferring it to a register called the *multiplier counter*, see FIGURE 28. This takes place during the first quarter cycle position of disk 204 as shown in FIGURE 10*c*. Read head $R_3$ is connected to the buffer storage toggles 800–803 and the most significant digit of the second factor stored in buffer register $B_1$ is transferred into the *multiplier counter*. If the multiplier digit being examined is non-zero, in the same first quarter cycle the number, if any, in the product primary registers $P_1$–$P_3$ is added to the number in the multiplicand registers $M_1$–$M_3$ and the sum is gated into the product secondary registers $S_1$–$S_3$. This is accomplished by connecting read heads $R_2$ and $R_4$ to the *adder/subtractor* of FIGURE 18 which is connected to the digit shift register toggles 800–803 in the loop and recording the resultant sum, which in essence is a partial product, with write head $W_1$ in product secondary registers $S_1$–$S_3$.

In the third quarter (see FIGURE 10*e*) the new partial product in the product secondary registers $S_1$–$S_3$ is applied to the *adder/subtractor* along with the multiplicand from registers $M_1$–$M_3$ and the resultant sum developed in the digit shift register toggles 800–803 is transferred to the product primary registers $P_1$–$P_3$. This is accomplished by connecting read heads $R_2$ and $R_3$ to the *adder/subtractor* and recording the results from the digit shift register toggles 800–803 by write head $W_1$. As a result of the above process, the Icand has been added to itself twice in one revolution of the memory unit.

If the multiplier digit is two or greater, the digit in the multiplier counter of FIGURE 28 is reduced one during each of these transfer processes. As soon as the multiplier counter of FIGURE 28 counts down to zero, the adding process is stopped. If the multiplier counter is set at a "one" when the transfer to product secondary registers $S_1$–$S_3$ occurs, the second transfer back to product primary registers $P_1$–$P_3$ takes place without connecting the multiplicand registers $M_1$–$M_3$ to the *adder/subtractor* and the result is that the partial product developed in the product secondary registers $S_1$–$S_3$ is merely transferred to the product primary registers $P_1$–$P_3$.

Additions take place one by one, but two additions may occur each revolution, each addition in turn reducing the count by one in the multiplier counter of FIGURE 28 until it reaches zero. When the multiplier counter reaches zero and the partial product has been returned to product primary register $P_1$–$P_3$, the process stops.

To multiply by the next most significant digit of the multiplier stored in buffer register $B_1$, the digit stored in the multiplicand registers $M_1$–$M_3$ is shifted one digit position further in the direction of disk rotation to effectively shift the decimal one additional position.

Then in the next revolution the next most significant digit in the multiplier stored in buffer register $B_1$ is selected, and the process described above is continuously repeated. This process repeats until all of the digits in the multiplier stored in buffer register $B_1$ have been processed at which time multiplication is complete and the proper product exists in the product primary registers $P_1$–$P_3$.

In the revolver system the cyclic path is only broken when it is wished to destroy the existing information in the memory and to replace it with new information. In the system described above and used herein the information in the memory is retained. No cyclic path is required and none will take place unless it is wished to utilize the number in external operation and replace it.

In the present invention, under no circumstances is the same piece of information gated through the external loop and back into the register for more than one cycle, and the one cycle operation is only performed when it is desired to extract all or some portion of the information from this associated register. For this reason, the present invention more closely resembles the conventional use of rotating type memories where the storage is permanent and fixed rather than the revolver-type operation where the storage has the characteristics of being volatile, i.e., the information is destroyed and replaced on each cycle.

The system of the present invention also provides a half cent round off following a multiplication operation. The half cent round off function is automatically accomplished by having a five stored in the No. 12 digit area of product primary register $P_1$ before multiplication starts. This area is darkened in FIGURE $10a_2$ and labelled ½ R.O. The actual product read out is from product primary register $P_2$, the lower order digits in register $P_1$, if any, being discarded. Also, the maximum output capacity of the system programmed as described, is 10 digits, all of which are stored in product primary register $P_2$. If the number in $P_2$ exceeds 99,999,999.99, the complement of the least significant 10 digits of the number is typed out followed by a $Cr$ symbol automatically provided by the circuitry involved.

(4) *Negative numbers.*—Negative numbers are stored as complements with the sign digit (9) appearing in the most significant or eleventh order position. All registers have a characteristic of being credit balance registers. They are capable of being read out as true value plus sign and are not restricted to operating in the positive direction only. The *adder/subtractor* of FIGURE 18 is used in the complementation process. This is accomplished by subtracting the appropriate register quantity from zero.

In multiplication, the multiplicand and multiplier are always entered as true values and the sign of the product determined by external circuitry. If the product is to be negative it is developed by subtraction rather than by addition resulting in the formation of the appropriate complement.

(5) *Readout.*—In the readout process the characters are read out one by one starting with the most significant, the zeros preceding the first non-zero digit being suppressed as explained above in connection with FIGURE 9. Before readout takes place, however, it is necessary to ascertain whether the quantity being read out is negative or positive. If it is negative and it is stored as a complement, it is necessary to recreate the absolute value and print out the result with a suitable sign. This is accomplished as follows. When readout is required, during the first revolution, the contents of any particular register A, B, C, D, E or F on track 205 desired are automatically complemented regardless of sign and the complement is stored in the associated temporary storage register $T_1$–$T_6$ on the inner track 206. In the next revolution the sign of the register is detected. If the sign is negative (indicated by the presence of a 9 in the sign position) then the results are taken from the temporary register which, in such a case, would be storing the true value. If the sign is positive the number is taken from the regular register which contains the true value. This process is automatic and occurs on all readout operations, including readout of the product primary register $P_2$, the complemented value of which is stored in the product secondary register $S_2$. In the case that the product has been a complement, an appropriate compensation consisting of adding one to the least significant digit is made to produce the correct rounded true value.

(6) *Timing signals.*—To provide synchronization of the operation of the gating and counting circuits with the instantaneous position of disk 204 at all times, clock tracks 207 and 208 are arranged for records of representation which are reproduced to provide clock pulses. Pulses are reproduced from master clock track 207 by read head 211 (FIGURE 5a) to provide evenly spaced basic timing pulses which are applied to control the electronic control unit. These pulses are designated as master pulses which define and correspond to the least areas on information tracks 205 and 206 (see FIGURE 10b).

Pulses are reproduced from clock tracks 207 and 208, and applied to circuits shown in FIGURES 11a and b, to produce the following distinct clock pulse trains once per revolution:

(1) One Index pulse at the beginning of the first quarter revolution;
(2) One Pre-Index pulse which precedes the Index pulse by one Master Clock period, i.e., at the end of the fourth quarter;
(3) Four quarter pulses, one corresponding to the beginning of each quarter;
(4) One hundred and forty-four Digit pulses, spaced evenly, corresponding to each fifth Master Clock pulse, commencing in synchronism with the Index pulse; and
(5) Five hundred and seventy-six Bit pulses corresponding to the Master Clock pulses not defining Digit pulses (i.e., groups of four pulses with one pulse gap between, these gaps being defined by digit pulses).

The logical relationship of the areas of the disk within the register area following index time is shown in FIGURE 10b. It will be noted that on tracks 205 and 206, one bit area on which no information is stored occurs between each group of four bit areas in which each decimal digit may be stored. As discussed above, these "No Information" areas correspond to digit pulses. Digit pulses are used for functions which are carried out during the time between the four bit groups on the information tracks 205 and 206. One function, for example, is the use of a digit pulse for correcting a digit in buffer storage toggles 800–803 (FIGURE 8) when required as discussed above.

Read heads $R_1$–$R_4$ associated with information tracks are located at quarter positions on the fixed member of the memory. Write heads $W_1$ and $W_2$ are located slightly past a quarter position. The effective displacement of write heads $W_1$ and $W_4$ is one digit area plus the small time displacement required for the electronic circuitry to respond to a signal produced by a write head.

As best shown in FIGURE 1, when a four bit digit is read out of memory unit 110, it is normally applied through *adder/subtractor* 202 and pushed through toggles $X_{13}$, $X_{14}$, $X_{15}$ and $X_{16}$. By the time the entire digit is properly positioned in those toggles, the memory unit will have advanced four bit spaces. By the time the digit is analyzed and corrected where necessary, another bit space will have passed write heads $W_1$ and $W_2$. Therefore, the $X_{13}$, $X_{14}$, $X_{15}$ and $X_{16}$ toggles 800–803 will not be set in time for re-recording through write heads $W_1$ or $W_2$ until after memory unit disk 204 has rotated slightly more than one digit area.

The off-set spacing of write heads $W_1$ and $W_2$ is also used to advantage in the multiplication process in that a digit may be shifted forward relatively to its original position in the word area by directly connecting a write head $W_1$ or $W_2$ to a read head $R_1$–$R_4$ and by-passing the *adder/subtractor* and *buffer storage* toggles as explained above.

Clock pulse distributor

Reading heads 211 and 212 (FIGURES 5*a* and 11) are positioned adjacent clock tracks 207 and 208 for generation of electrical signals for transmission to a clock pulse distributor 213. The clock pulse distributor of FIGURE 11 is arranged for producing the following clock pulse trains once per revolution:

(1) One *index* clock pulse on lead 1122 (FIGURE 11*b*) at the beginning of the first quarter revolution which corresponds with the position of the memory unit as shown in FIGURE 10*c*;

(2) One *pre-index* clock pulse on lead 1143 which precedes in time the index pulse by one master clock period;

(3) Four *quarter* clock pulses on lead 1124, one corresponding to the beginning of each quarter revolution position of the memory unit as shown in FIGURES 10*c, d, e* and *f*;

(4) One hundred forty-four *digit* clock pulses on lead 1120, spaced evenly corresponding to each fifth master clock pulse, commencing in synchronism with the index pulse; and (5) Five hundred seventy-six *bit* clock pulses on lead 1135 corresponding to master clock pulses excepting for those that occur when a *digit* clock pulse is present on lead 1120.

Also provided by the clock pulse distributor of FIGURE 11 are voltage levels, as distinguished from pulses. On lead 1117 a signal is present at index time for the duration of one master clock interval, and at all other times such signal is present on $\overline{\text{(index level)}}$ lead 1116. Other levels are generated by the circuitry of FIGURE 11 for leads 1148, 1150 and 1151 as explained in detail below.

Such levels and pulses may be used for identifying the precise position of memory disk for use during operations of recording and reproducing information on and from assigned positions in the memory unit and for synchronously controlling system operation.

The clock pulse distributor of FIGURE 11 comprises three counting toggles 1100, 1101, 1102 connected as a five-place counter through input gating of FIGURE 11*a* to count master bit pulses and to go through a cycle of operation in response to each sequence of five of such master bit pulses. It will be recalled from FIGURE 10*b* that each digit area is composed of four bit areas plus a bit space between adjacent digit areas. Thus, the leading edges of successive digit areas are five bit areas, corresponding in time to five master bit pulses, apart.

A *digit* clock pulse is produced on lead 1120 once every time the "4" counter toggle 1102 is in a unit condition, and bit clock pulses are produced on lead 1135 at counts of "0" through "3" of clock distributor counter toggles 1100, 1101, 1102.

Master bit clock read head 211 drives read head toggle 1108 through amplifier 1109. The output signals from read head toggle 1108 are differentiated and applied to *or* gate 1110 having output lead 1107 which is coupled to *and* gate and amplifier circuits 1103 on FIGURE 11*b*. The signal on lead 1107, which is referred as the raw clock pulse, is a negative going pulse whereas the output clock pulse from *and* gate amplifiers 1103 (see FIGURE 11*b*) are positive going pulses having a duration of about two microseconds.

The negative going raw clock pulses on lead 1107 are also applied through inverter 1111 to lead 1112 of FIGURE 11*a* to serve as positive going enabling pulses for each of the several *and* gates which control operation of clock distributor counter toggles 1100, 1101, 1102, *quarter revolution and pre-index* toggle 1105 and *index* toggle 1106.

Clock distributor counter toggles 1100, 1101, 1102 operate through successive counts of 0, 1, 2, 3 and 4 in that order and are then reset to zero to thereby provide a five-place counter, one count corresponding to the displacement of the disc memory unit by one master bit area. One complete cycle of the digit counter thus corresponds to an advancement of the disc memory unit by one digit area. This counter is kept synchronized with the beginning of the digit areas on the memory unit by the operation of the *quarter revolution and pre-index* toggle 1105 and *index* toggle 1106 through various circuit connections to the input gates of the counter toggles 1100, 1101, 1102.

The *quarter revolution clock reading* head 212 is coupled directly through *or* gate 1113 without further gating to the unit input of *quarter revolution and pre-index* toggle 1105 to thereby set this toggle to its unit condition each time the pre-index position and positions defining the beginning of the second, third and fourth quarter revolution positions of the memory disk pass reading head 212. The quarter revolution positions correspond to a count of four in the clock distributor counter and the pre-index position corresponds to a count of three in the same counter. The count of four is represented by the "4" counter toggle 1102 being in its unit condition and the "1" and "2" digit counter toggles 1100 and 1101 being in their zero condition. The count of three is represented by the "1" and "2" counter toggles 1100 and 1101 being in their unit condition and the "4" counter toggle 1102 being in its zero condition.

*Quarter revolution and pre-index* toggle 1105 is reset to its zero condition after registering a quarter revolution position through *and* gate 1160 by the input potential on lead 1136 from the units output of "4" digit counter toggle 1102, and is reset to its zero condition after registering a pre-index position through *and* gate 1162 by the input potential on lead 1117 from the units output of *index* toggle 1106. Both of *and* gates 1160 and 1162 are supplied with raw clock pulses from lead 1112 which occur at the time intervals spaced by approximately twenty-four microseconds in the embodiment illustrated.

As pointed out above, pre-index time occurs one master bit time prior to index time. At the pre-index position in clock track 208, the magnetization pattern changes polarity at one master bit position prior to index position and accordingly causes the *quarter revolution and pre-index* toggle 1105 to transfer to its units condition when the clock distributor counter indicates a count of three. This identifies the pre-index position rather than a quarter revolution location, the latter occurring when *quarter revolution and pre-index* toggle 1105 is triggered to its unit condition as the digit counter changes to a count of four.

*Index* toggle 1106 is set to its unit condition by an output signal from *and* gate 1128. This requires an output signal on zero lead 1114 from the "4" toggle 1102, meaning that the digit counter is not indicating a count of "4." The other inputs to gate 1128 require that the toggles be in such condition that a unit output is present on lead 1115 indicating a unit condition of *quarter revolution and pre-index* toggle 1105 and an output on lead 1116 indicating a zero condition of *index* toggle 1106. With the next raw bit clock pulse on lead 1112, *index* toggle 1106 is transferred to its unit condition. This unit condition in normal operation occurs only with a four count in the digit counter.

*Index* toggle 1106 is reset through *and* gate 1164 by a signal on lead 1117 which is from the unit output on *index* toggle 1106 when the next raw clock pulse appears on lead 1112. Thus *index* toggle 1106 stays in its units condition for a period corresponding to the period between two successive master bit clock pulses.

Synchronization of the clock distributor counter toggles with the index position of the memory disk is provided by applying the zero condition of *index* toggle 1106 on lead 1116 as an input to each of *and* gates 1129, 1130 and 1131 to the unit input of each of the counter toggles 1100, 1101, 1102 respectively. Unless *index* toggle 1106 is in its zero condition, none of the digit counter toggles 1100–1102 can advance to a unit condition.

In addition, clock distributor counter toggles 1100 and 1101 are reset to a zero condition by the signal on units output lead 1117 of *index* toggle 1106 upon the receipt of the next raw clock pulse on lead 1112 by *and* gates 1132 and 1133, respectively. This means that anytime *index* toggle 1106 indicates a unit condition, counter toggles 1100 and 1101 will be reset to zero at the time the next raw clock pulse is received on lead 1112. Counter toggle 1102 is also reset to a zero condition at the same time by applying its unit output signal on lead 1136 to *and* gate 1134 along with the next raw clock pulse on lead 1112. Thus, synchronization is automatically effected within the time required for a few revolutions of the memory unit after the system is first turned on and is continuously effected during operation.

The counter toggles 1100, 1101 and 1102 are connected as a conventional five-place counter. Toggle 1100 is set to its units condition by the output from *and* gate 1129 which contains as input signals a zero condition from *index* toggle 1106 on lead 1116, a zero condition from toggle 1100 itself on lead 1166, and the signal on lead 1114 indicating a zero condition of counter toggle 1102. At the time of the next raw clock pulse on lead 1112, toggle 1100 is reset to its zero condition by the output signal from *and* gate 1168 while the next counter toggle 1101 is set to its units condition by the output signal from *and* gate 1130. At the time of occurrence of the next raw clock pulse on lead 1112, counter toggle 1100 is again set to its units condition through *and* gate 1129 while counter toggle 1101 retains its units condition thereby indicating a count of three. When the next raw bit clock pulse appears on lead 1112, counter toggle 1102 is set to its units condition by the output from *and* gate 1131 while counter toggles 1100 and 1101 are reset to their zero condition by *and* gates 1168 and 1170 respectively.

Timing signals provided at the output of the clock distributor in FIGURE 11*b* include an *index* level on lead 1117. When *index* toggle 1106 is in its unit condition, the voltage on index level lead 1117 is approximately ground and when the toggle is in zero condition, the voltage on lead 1117 is approximately minus eighteen volts. The same voltage level, but in reversed time sequence, is present on (index level) lead 1116.

The *quarter clock* level on lead 1148 is provided through *and* gate 1149 when there is coincidence between a four in the clock distributor counter (i.e. toggle 1102 is in its unit condition supplying an output signal on lead 1136) and *quarter revolution and pre-index* toggle 1105 is in its unit condition. The *pre-index* level on lead 1150 is present where there is a three in the clock distributor counter and *quarter revolution and pre-index* toggle 1105 is in its unit condition.

The *minus round-off* level on lead 1151 is provided when there is a zero in all three clock distributor counter toggles 1100, 1101, 1102 of the digit counter. The *minus round-off* level on lead 1151 is used in the head gating circuit of FIGURE 19*b*.

All of the clock pulses produced on the output leads of FIGURE 11*b* are provided from a combination *and* gate and amplifier 1103 which has as one input the raw master clock pulse on lead 1107. The other input to each of the combination *and* gate and amplifiers 1103 is through an inverter 1104 which inverts the high or ground voltage normally used as the control signal voltage to a low voltage and the low voltage to a high or ground voltage by a circuit as shown in FIGURE 12.

Referring now to FIGURE 12, a circuit containing three transistors 1200, 1202 and 1204 is illustrated which is a physical embodiment of one form of circuit which functions as a combination inverter 1104 and *and* gate amplifier 1103. Input terminals *a* and *b* are shown in the bit clock circuit of FIGURE 11*b* with the same designations, and when clock distributor counter toggle 1102 is its unit condition whereby a high level voltage is present on lead 1136, transistor 1200 is conducting. When a raw negative going master clock pulse on lead 1107 is applied to the collector of transistor 1200, the pulse finds a low impedance through the conducting transistor and hence is absorbed and does not cause conduction of transistor 1202.

When the input signal level on lead 1136 is low, indicating that the clock pulse distributor toggle 1102 is in zero state, transistor 1200 is not conducting. A raw master negative going clock pulse on lead 1107 then causes transistor 1202 to conduct during the duration of the pulse. Transistor 1202 is connected as an emitter follower and a negative output pulse is applied through the capacitor and resistance network 1206 to key on normally non-conducting transistor 1204. When transistor 1204 conducts, a positive going pulse having an amplitude of approximately 3 volts and a duration of about two microseconds is produced at the output lead 1135 of transformer 1208. This is the timing pulse which is available at terminal *c* (see also FIGURE 11*b*) and which is applied to the various other circuits throughout the system.

From the foregoing, it is apparent that the *bit* clock pulses provided on lead 1135 of FIGURE 11*b* are present when the signal level on lead 1136 is low during a count of zero through three of the clock distributor counter circuit. When the clock distributor counter indicates a count of four, the signal level on lead 1136 is high thereby blocking the *bit* clock pulse from lead 1135.

An identical circuit is used for providing a *digit* clock pulse on lead 1120. The input to inverter 1104 is on lead 1114 which is from the zero output of counter toggle 1102. Only when toggle 1102 is in its units condition is the output signal on lead 1114 low and thus the digit clock pulse on lead 1120 is provided only at this one count during the operation of the clock distributor counter.

It will be observed, therefore, that when the *digit* clock pulse is provided on lead 1120, the *bit* clock pulse on lead 1135 is omitted.

The *quarter* clock pulse on lead 1124 is provided by a circuit identical to that shown in FIGURE 12, the input to inverter 1104 being supplied from *or* gate 1140. It will be recalled that a quarter clock pulse appears when the clock distributor counter indicates a count of four and when the *quarter revolution* toggle 1105 is in its units condition. Since the output of *or* gate 1140 is inverted, the input signals to *or* gate 1140 are taken from zero output lead 1114 from the "4" counter toggle 1102 and from zero output lead 1141 from *quarter revolution* toggle 1105. The output of *or* gate 1140 is thus high anytime either counter toggle 1102 or quarter revolution toggle 1105 is in its zero condition and thus no output signal appears on *quarter* clock lead 1124. Only when counter toggle 1102 is in its units condition and when *quarter revolution* toggle 1105 is in its units condition is there a low level signal applied to both inputs of *or* gate 1140. Thus, only at that time is the output from *or* gate 1140 at a low level to thereby permit the raw clock pulse on lead 1107 to pass through the combination *and* gate and amplifier 1103 to produce the *quarter* clock pulse on lead 1124.

The *pre-index* clock pulse on lead 1143 is provided by a circuit similar to that just discussed, the *or* gate 1144 having inputs from zero output leads from counter toggles 1100 and 1101 and from the *pre-index* toggle 1105. When anyone of these three toggles is in its zero condition, a high level output is provided from *or* gate 1144 which thereby blocks the raw clock pulse on lead 1107 from appearing at the *pre-index* clock output lead 1143. Only when all three toggles simultaneously register a unit condition is the output from *or* gate 1144 at a low level to thereby permit the raw clock pulse on lead 1107 to be available on *pre-index* clock lead 1143.

An *index* clock pulse is provided on lead 1122 through a circuit similar to that described above. Lead 1116 connected to the input of inverter 1104 is connected to the zero output lead of *index* toggle 1106 and is thus normally a high level potential excepting when the *index* toggle is in its units condition at which time the raw clock pulse on lead 1107 is permitted to pass through the combination *and* gate and amplifier 1103 to provide the *index* clock pulse on lead 1122.

Write circuit controls

A recording or writing circuit 209 (FIGURES 1, 5*a* and 13) is arranged for supplying recording currents to recording transducers or write heads $W_1$ and $W_2$ for magnetizing the tracks 205 and 206, respectively, in a non-return-to-zero fashion in which magnetization in a first direction of polarity represents a binary naught and magnetization in a second direction represents a binary unit. With this type of recording, magnetization of a track is continuous in the same direction of polarity over successive bit areas of a digit area on which bits of the same value are recorded.

Recording circuit 209 includes input gating, a record or wire toggle 1300 (FIGURE 13, and also shown in FIGURE 1 as 252) which in a first state of operation corresponds to a naught and in a second state corresponds to a unit, and output gating. Toggle 1300 controls both write heads $W_1$ and $W_2$, and whether either of write heads $W_1$ or $W_2$ is energized depends upon the presence of an input signal on lead 1320 or 1322 developed in *or* gates 1918 or 1919 respectively in FIGURE 19.

In addition to the gating signals produced by the logic of the system to be discussed here, the energization of write heads $W_1$ and $W_2$ also requires a write head voltage from the power supply (see FIGURE 36) which is of sufficient magnitude to assure that the signals stored in the magnetic disc will be of a usable magnitude. Any deviation of the power supply voltage below a predetermined value will result in complete cut-off of the energizing voltage applied to the center-tap on the windings of write heads $W_1$ and $W_2$.

The input gating is coupled to the input of toggle 1300 and is controlled in a manner as shown in the drawings, as will become more fully apparent from the description of later sections, for transmitting naught and unit signals from other portions of the system to the toggle input for setting write toggle 1300. For example, naught and unit signals representing a decimal digit may be serially transmitted from buffer storage toggle 800 outputs $X_{16}$ and $\overline{X_{16}}$ (FIGURE 8*a*) through corresponding input leads 1310 and 1312 of the input gating (FIGURE 13) to inputs of write toggle 1300. The recording head or write toggle outputs on leads 1314 and 1316 are coupled to one or the other of the write heads $W_1$ or $W_2$ through the output gating, which gating is controlled in a manner more fully discussed hereinafter, to serially transmit the toggle naught and unit output signals on leads 1314 and 1316 to a selected one of the reproducing heads for placing the signals on predetermined bit areas of the disk 204. For example, a decimal digit such as a 5 of the number 50 may be entered at the typewriter and typed on the invoice of FIGURE 2 and the corresponding binary signals recorded in the eighth digit order of the buffer register areas $B_1$, $B_2$ and $B_3$ of the memory of FIGURES 5*a* and 10*a*.

Reading head circuit

Reproducing or reading heads $R_1$, $R_2$, $R_3$, $R_4$ (FIGURES 5*a*, 10 and 14) are located adjacent respective information tracks 205 and 206 for reproducing or reading out information stored thereon to correspond signals. Signals of a first polarity result from a change in magnetization from a first direction of polarization to a second direction of polarization, which first direction of polarization may correspond to a binary naught and which second direction of polarization may correspond to a binary unit. Signals of a second polarity result from a change in magnetization from second direction of polarization to the first direction of polarization. The output signals of reproducing heads $R_1$–$R_4$ are connected to a reproducing circuit 210 (FIGURES 5*a* and 14) which comprises four amplifiers 1408 and four phase inverters 1400, 1401, 1402, 1403 (FIGURE 14) for purposes of retaining proper polarity and four toggles 1404, 1405, 1406, 1407. The phase inverters are of the type in which a signal is produced at a naught output in response to an input signal of a first polarity from a corresponding reproducing head and in which a signal is produced at a unit output in response to an input signal of a second polarity. The naught and unit outputs of the phase inverters are connected to naught and unit inputs of respective toggles 1404–1407 for setting the toggles to correspond with the direction of polarity of the magnetized disk areas passing beneath the associated reproducing heads. Since, in the case of successive bit areas having the same direction of magnetization, the track under a reading head is magnetized continuously in the direction, once a signal is received by a reproducing toggle, the toggle remains in the corresponding condition until an opposite polarization of the magnetization is detected. Thus, throughout the disk rotation the condition of each of the four toggles, and therefore the voltage levels at the outputs of the toggles, corresponds to the polarization of the magnetized areas passing beneath the associated reproducing heads.

Since the output voltage levels represent the information stored on the disk, such voltage levels are transmitted to a gating arrangement controlled for transfer of the information to other portions of the system as more fully discussed hereinafter.

Digit counter

A digit counter 214 (FIGURES 5*b* and 15) is coupled to the clock pulse distributor 213 described above in connection with FIGURE 11 and is arranged for counting digit clock pulses on lead 1120 (FIGURE 11*b*) from index time for controlling other portions of the system in response to a predetermined count. The digit counter includes input gating (FIGURE 15*a*), output gating (FIGURE 15*b*) and four toggles 1500, 1501, 1502, 1503 coded 1, 2, 4, 8, respectively, and arranged for down counting digit clock pulses applied on lead 1522 near top of FIGURE 15*a* from eleven to zero from index time.

During each of four different operations of the system involving use of memory unit 110, the digit counter of FIGURE 15 is arranged to function in a mode peculiar to that operation. The four different operations are [1] entry of a decimal digit at the typewriter to the correct orders of the buffer register areas $B_1$, $B_2$, $B_3$ (FIGURE 5*a*), [2] shifting of a multiplicand during multiplication, [3] transferring a value from a first register area to a second register area (internal transfer) or from a register area to the typewriter for automatic typing of the value (type out) and [4] actuation of a word counter 215 (FIGURES 5*b* and 17), so that the word counter may be used to define a particular register into which accumulation is to take place. [Note: The "word counter"

also operates during the first 3 operations described about.]

The digit counter and the program unit of FIGURE 3 are arranged together so that with the typewriter carriage in predetermined tabular positions corresponding instructions become effective for setting the digit counter for controlling in turn the recording circuit 209 (see FIGURE 13) through other portions of the system for recording, in the correct orders of the buffer register areas, decimal digits entered at the typewriter keyboard. For example, referring to the invoice sheet of FIGURE 2, the carriage position for typing the numeral 1 of the quantity ordered, 1500 of the second entry corresponds to the number 9 carriage position. At the number 9 carriage position the program card of FIGURE 3b contains holes 332 in *order 2* and *order 8* rows. The No. 1, 2, 3, 4 strips of the program board (FIGURE 3a) and of the program card are binary orders 1, 2, 4, 8, respectively, that identify which one of the twelve digit areas (see FIGURE 10b) comprising a word register area in which this particular digit is to be stored. As the "1" in the quantity ordered entry 1500 appears in the number 9 carriage position, and 2 holes 332 are punched in the 2 and 8 orders of the program card of FIGURE 3b, the order indicated is 10, thus meaning that the digit 1 is to be recorded in the No. 10 digit area position 1006 (see FIGURE $10a_1$) in each of buffer storage registers $B_1$, $B_2$ and $B_3$.

The next digit 5 in the quantity ordered 1500 and typed at carriage position 10 will be entered in the No. 9 digit area position because of holes 333 in the 1 and 8 orders of the program card of FIGURE $3b_1$. The last two digits "0" in the quantity will be entered in the No. 8 and 7 digit area positions due to holes 335 and 336 at the number 11 and 12 carriage positions.

The digits 126.00 entered under the price column of the invoice sheet of FIGURE 2 at carriage positions 57, 58, 59, 61 and 62 with the program card illustrated in FIGURE 3b, are stored in digit area positions 6, 5, 4, 3 and 2 digit area positions respectively in the buffer storage registers $B_1$, $B_2$ and $B_3$ of FIGURE $10a_1$. The decimal point and/M printed on the invoice are not recorded in buffer storage registers $B_1$, $B_2$ or $B_3$ because depression of these keys on the typewriter does not energize any of the output leads 701–704 from the encoder of FIGURE 7.

Turning now to FIGURES 15a and b, the means by which the foregoing typewriter entries are properly located on the storage unit will be described. The input gating of the digit counter of FIGURE 15a is coupled to the conducting strips 105 (FIGURE 3a) of the program unit so that coded potentials representing "order" commands may be gated from the program unit to the digit counter input gating for setting the digit counter. The coded potentials from the program unit are applied through brushes that pass through coded command holes to energize the underlying conducting strips 105. Four such conducting strips are coded 1, 2, 4, 8 (which are referred to as *order* commands in FIGURES 3a and 15a) and correspond respectively to the digit counter toggles 1500, 1501, 1502 and 1503. Potentials from the conducting strips are applied over any one or combination of these conducting strips through input leads 1510, 1512, 1514, 1516 respectively to *and* gates 1504, 1505, 1506, 1507 respectively to set the corresponding toggles 1500, 1501, 1502 and 1503 to the unit condition. In the example, if only a command hole corresponding to "4" is coded so that a potential (ground) is applied over the strip coded 4 through lead 1514 to *and* gate 1506 (FIGURE 15a), toggle 1502 (FIGURE 15b) coded 4, is set to its unit condition. To provide an output signal from *and* gate 1506, enabling input signals on leads 1518 and 1522 must be present. The requisite input signal is present on lead 1518 only if the *calculate* relay 601 (FIGURE 6a) and *digit one shot* toggle (FIGURE 22) are in their unit conditions, and the *go* toggle (FIGURE 26) is in its zero condition thereby indicating that the system is in condition to receive an entry from the typewriter. The exact time *and* gate 1506 is opened is determined by the presence of a *digit clock* pulse on lead 1522 from the correspondingly labeled lead 1120 on FIGURE 11b.

Returning now to the entry of the number 1500 on the invoice of FIGURE 2, the digit counter toggles 1500, 1501, 1502, 1503 of FIGURE 15 are thus set to a count of 10 in response to depression of the numeral 1 typewriter key because of the presence of holes 332 punched in the program card (FIGURE 3b) in a vertical column corresponding to the No. 9 carriage position. In response to the digit pulse at index time, the digit counter is counted down to 9 and then, in response to subsequent digit pulses after index time, to 8, 7, 6, 5, 4, 3, 2, 1, 0, 11, 10, 9, etc.

It will be observed that the disc 204 (FIGURES 5a and 10a) is shown in a position corresponding to index time, and that buffer storage area $B_1$, $B_2$, $B_3$ will start under write head $W_2$ after the passage of three word areas or one quarter revolution plus one digit area since $W_2$ is offset by one digit. Thus, the digit counter of FIGURE 15 will count three complete cycles while word register areas $T_1$, $T_2$, $T_3$ on the memory unit pass beneath writing head $W_2$ and then one additional count down from 10 through zero to eleven to thus identify when the No. 10 digit area position (see FIGURE $10a_1$) is operatively positioned relative to write head $W_2$. In view of the fact that each input digit from the typewriter is also recorded in word register areas $B_2$ and $B_3$ (FIGURES 5a and 10a) to be in triplicate, after another twelve count cycle by the digit counter of FIGURE 15, the No. 10 digit area position of word register area $B_2$ will be in operative position relative to write head $W_2$; and one more twelve count cycle will permit the digit to be recorded in the No. 10 digit area position of word area register $B_3$. In each instance, there will be an output on *"11" in digit cnt.* lead 1526 from *and* gate 1530.

The digit counter, when operating in the *count down mode*, changes indication each time a *digit clock* pulse is received on lead 1522 through input *and* gates on FIGURE 15a identified with the letters "cd." It thus counts through a cycle once for each word area as the memory unit rotates.

When the *counter shift mode* potential is present, the digit counter also picks up one additional count each revolution of the memory at pre-index time by the *pre-index clock* pulse applied to the *and* gates on FIGURE 15(a) identified with the letters "cs."

The *count down mode*, the *counter shift mode*, the *set counters for multiplication* and the *reset counters to zero* potentials are all generated through gating circuits having output leads on the lower third of the sheet containing FIGURE 29b.

Quarter revolution counter

A quarter revolution counter 216 (FIGURES 5b and 16) is coupled to the clock pulse distributor 213 described above in connection with FIGURE 11, and is arranged for counting quarter clock pulses from index time produced for each quarter revolution of the memory disc for controlling other portions of the system in response to a predetermined count thereby aiding to identify the exact position of the memory disc. The quarter revolution counter of FIGURE 16 comprises input gating, two toggles 1600 and 1601 arranged as a four-place counter for counting from zero to three, and output gating.

The quarter revolution counter toggles 1600, 1601 are reset to the zero count state at the time of the *index* clock pulse and remain in that state during the first quarter of revolution of the memory disc from index position as shown in FIGURE 10c. Toggle 1601 is reset by an *index clock* pulse on lead 1606 from the corresponding lead 1122 of the clock pulse distributor circuit of FIGURE 11b through *and* gate 1602 to transfer toggle 1601 from a unit indicating condition indicated on lead 1607 that it has during the fourth quarter to a zero condition. Toggle 1600 transfers each time a *quarter* clock pulse on lead 1608 is received unless toggle 1600 is in the zero condition at index clock time, but is normally in the unit condition in the fourth quarter. Therefore, when the *quarter* clock pulse at index time is received, toggle 1600 is also reset to zero. Throughout the first quarter of revolution after index time, the indicating control voltage is on leads 1610 and 1612 to thereby provide the *first quarter* output signal of lead 1614.

In response to the next *quarter* clock pulse on lead 1608, toggle 1600 is set to a one condition by *and* gate 1616 to indicate the disk is in the second quarter of its revolution (see FIGURE 10d). Toggle 1600 is reset and set alternately in response to subsequent *quarter* clock pulses to represent in sequence the third, fourth, first, second, etc., quarter revolution positions. Toggle 1601 is set by the output of *and* gate 1609 by the *quarter* clock pulse occurring at the end of the second quarter of the disk revolution (see FIGURE 10e). At that time a gating potential is present on unit output lead 1611 from toggle 1600 and on ($\overline{\text{index level}}$) lead 1613.

Potentials corresponding to each of the four quarters are continuously available from the respective output leads 1614, 1618, 1620, 1622 during the period that disk 204 (FIGURE 5a) is rotating through a corresponding quarter position.

In FIGURE 5a disk 204 is shown in a position at index time at the beginning of a first quarter of rotation. Output potentials from the quarter revolution counter are thus available for gating information to the recording heads for recording or for gating information to other portions of the system from the reproducing heads during predetermined quarter revolutions according to instructions from the program unit.

Word counter

As discussed hereinbefore a word register area such as $B_1$, $T_1$, A, C, etc., of memory disc 204 (FIGURES 5a and 10) is divided into twelve digit areas. Each quarter of the disk is composed of three separate word register areas. Also, as mentioned previously, each such word register area is partly located by an identifying potential from the quarter revolution counter just discussed in connection with FIGURE 16 for indicating the quarter in which a particular word register area is located. As a cycle of the digit counter (see FIGURE 15) which is a 12 place counter (11 to 0) corresponds to the length of a word register area to precisely locate each digit area in a word register area, it is necessary to determine whether it is the first, second or third word register area from the beginning of a particular quarter revolution count. To count the number of word areas in a quarter revolution of memory disc 204, which obviously involves three cycles of the twelve place digit counter of FIGURE 15, a three place word counter 215 (FIGURES 5b and 17) is coupled to the output of the digit counter 214 of FIGURE 15 so that each time the digit counter 214 is set to zero, the count of the word counter 215 is increased by one.

The word counter is a simple three place counter including two toggles 1700 and 1701 (FIGURE 17) arranged for counting down from 2 to 0, input gating through which the various input control signals are applied to the toggles 1700 and 1701, and output gating including three outputs, each of which corresponds to one of possible three counting condition of toggles 1700, 1701. When there is *"0" in word counter* on lead 1704, this signal is applied by lead 1706 to *and* gate 1708. Assuming an operation providing a signal in *count down mode* on lead 1714, toggle 1701 will transfer to provide an output control signal *"2" in word counter* on lead 1720 when input signals *"0" in digit counter* on lead 1712 and *digit clock* 1716 are received from the digit counter of FIGURE 15 and clock pulse distributor of FIGURE 11 respectively.

The unit output signal on lead 1721 from toggle 1701 is connected as an input to each of *and* gates 1722 and 1723. The remaining three inputs to *and* gates 1722 and 1723 are *"0" in digit counter* on lead 1712, *count down mode* on lead 1714, and *digit clock* on lead 1716 as described above. Thus at the begining of the next word area on the memory disk 204, the count decreases to *"1" in word counter* by virtue of control signals on leads 1724 and 1725 to *or* gates 1726 and 1727, respectively.

Toggle 1700 may be counted down from the unit to zero condition by the output of *and* gate 1702 which has the same three inputs discussed above plus the connection through lead 1730 from the unit output lead of toggle 1700.

During the *count down mode* of operation, which will be described in connection with FIGURE 28 under sequencing circuits, the word counter of FIGURE 17 cycles completely once each quarter of revolution by the memory disk to thus identify the word area in operative association with the reading and writing heads.

The word counter of FIGURE 17 is used also for other operations. When a potential is applied on a *counter shift mode* lead 1734, the word counter is gated through *and* gates 1736, 1738, 1740 and 1742 to be first set to a count of two by *and* gate 1742 when there is *"0" in word counter* on lead 1706, *"0" in digit counter* on lead 1712, the *counter shift mode* potential on lead 1734 and *pre-index* clock on lead 1744. At the time of the next *pre-index* clock signal on lead 1744 in coincidence with *"0" in digit counter* on lead 1712, toggle 1701 is reset from its units to its zero condition by *and* gate 1740 while toggle 1700 is set to its units condition through *and* gates 1738. At the time of the next *pre-index* clock pulse on lead 1744 in coincidence with *"0" in digit counter* on lead 1712, toggle 1700 is reset to its zero condition through *and* gate 1736.

Thus, shifting of the *word counter* only occurs during every twelfth shift of the *digit counter*. Any time a signal is present on *reset counters to zero* lead 1746, both toggles 1700 and 1701 are reset to zero through *and* gates 1748 and 1750 respectively, upon receipt of a *digit clock* pulse on lead 1716.

The word counter of FIGURE 17 may also be set to its "2" condition by an input on *set counters for multiplication* lead 1752 when there is a signal on *Ier toggle* lead 1754 through *and* gate 1756 at the time of occurrence of the next *pre-index* clock on lead 1744.

Adder-subtractor

An adder-subtractor 202 (FIGURES 5a and 18) is arranged for adding or subtracting values reproduced from register areas of the storage disk according to instructions of the program card of FIGURE 3b. The adder-subtractor includes input gating, a carry-borrow toggle 1800 (FIGURE 18), and arithmetic gating comprising gates 1801, 1802, 1803, 1804 and 1831. Naught and unit potentials of a first digit value are serially applied to inputs ($\bar{a}$) and *a* on leads 1824 and 1814, respectively. Naught and unit potentials of a second digit value are serially applied in coincidence with the first value to inputs ($\bar{b}$) and *b* on leads 1817 and 1816 respectively. Naught and unit sums or differences of values applied to the inputs pass through *or* gates 1801–1804 and *and* gate 1831 to appear serially at the outputs ($\overline{\text{sum/diff.}}$) and *sum/diff.* on leads 1812 and 1810 respectively.

During an addition or subtraction operation as determined by a corresponding program unit instruction, entered either by depressing subtract key 404 on the typewriter keyboard (FIGURE 4a) in association with the program instruction *conditional minus* on contact strip 32 or by the *automatic minus* on contact strip 31 of the program board and card of FIGURE 3 or as determined by a previous internal transfer, values are simultaneously read out from first and second word register areas of the storage disk 204 (FIGURE 5a), for example, accumulator register C of track 205 and buffer Register B₃ of track 206, using reading heads R₁ and R₃ respectively during the third word position of the first quarter revolution from index position, and gated through other portions of the system to the adder-subtractor of FIGURE 18. The result of the addition or subtraction is recorded on a transfer word register area T₃ by write head W₂ as can be seen from FIGURES 5a and 10a.

Digit values are reproduced from register areas, lowest order first. Consequently, during an addition or subtraction process, values are simultaneously reproduced from first (C) and second (B₃) word register areas, lowest order first and applied bit-by-bit to the adder-subtractor inputs $a$, $(\bar{a})$, $b$, and $(\bar{b})$ on leads 1814, 1824, 1816 and 1817 respectively. The bit results of the lowest bit order addition or subtraction process is transferred as *sum/diff.* and $(\overline{sum/diff.})$ outputs on leads 1810 and 1812 respectively of the adder-subtractor to leads 868 and 870 at the input of buffer storage (see FIGURE 8b) to the highest order buffer storage toggle X₁₃ shown as block 803 on FIGURE 8a through *and* gates 815 and 816. The other inputs to *and* gates 815 and 816 are *shift buffer* signal on lead 873 and a *bit* clock pulse on lead 872. Thus, with the occurrence of each *bit* clock pulse on lead 872 successive bits in each digit are supplied to buffer storage toggle 803 and pushed through the successive toggles 802, 801 and 800 one bit at a time.

*Carry/borrow* toggle 1800 (FIGURE 18) is set to indicate a unit condition by *and* gate 1813 when the digit values on $a$ and $b$ input leads 1814 and 1816 are each units, a signal is on lead 1818 indicating the digits are to be added, and a *bit* clock pulse is received on lead 1820. Toggle 1800 remains in its units condition so long as either the $a$ or $b$ input has a unit potential and is reset by *and* gate 1822 during addition only when both the $(\bar{a})$ and $(\bar{b})$ inputs are units.

During a subtract operation, the output from *and* gate 1809 sets *carry/borrow* toggle 1800 only when the $b$ signal on lead 1816 is one and the $a$ signal on lead 1814 is zero whereby the $(\bar{a})$ lead 1824 contains the unit signal, and of course a bit clock pulse is received in lead 1820. Toggle 1800 remains in its units condition until the $a$ signal on lead 1814 is one and the $b$ signal is zero which means there is a unit input on $(\bar{b})$ lead 1817.

*Carry/borrow* toggle is also set by the *correct* signal on lead 1830, which is discussed immediately hereafter, and reset by a *quarter* clock signal or by *and* gate 1852 when in the accumulate cycle with "0" in digit counter upon receipt of the digit clock.

When the second order bits are added together, they are combined in *or* gates 1801, 1802, 1803 and 1804 as shown in FIGURE 18 with the output of *carry/borrow* toggle 1800 through *and* gate 1831. Each bit result is transferred as a *sum/diff.* potential to the highest order buffer storage toggle X₁₃ (block 803 on FIGURE 8d) thereby shifting the previous bit result to the next lower order buffer storage toggles X₁₄. This cycle is then repeated two additional times to enter the entire four-bit digit in toggles 800, 801, 802 and 803 of FIGURE 8a.

If at the conclusion of an addition or subtraction of two four-bit digits the value in buffer storage is a digit greater than nine and/or if the carry/borrow toggle is set, the value is converted to the correct decimal value plus a carry upon receipt of the *digit* clock pulse. It will be recalled that the clock pulse distributor produces four *bit* clock pulses and then one *digit* clock pulse. The status of buffer storage toggles 800, 801, 802 and 803 and of the *carry/borrow* toggle 1800 is tested when the digit pulse is received, and if the value is greater than 9 and/or the carry/borrow toggle is set (and a symbol is not being generated), then a correction operation takes place to reduce the value to the correct single order decimal number prior to transferring the number out of the buffer storage toggles 800 to 803.

Referring now to FIGURE 8a, the circuit determining when the value in buffer storage toggles 800–803 is greater than nine includes *and* gate 827 whose output lead carries a *correct* control signal when the digit value exceeds 9 and/or the carry/borrow toggle is set. The *symbol* toggle is discussed in detail below in connection with FIGURE 31, but it is sufficient to here state that normally a $(\overline{symbol\ toggle})$ input control signal appears on lead 893. Thus *and* gate 827 produces a *correct* control signal when a signal appears on any of the inputs to *or* gate 826.

Starting with *carry/borrow* toggle lead 875 in FIGURE 8a, if *carry/borrow* toggle 1800 is in its units condition after the fourth or highest order bit is produced, indicating a value in excess of fifteen for addition, or less than zero for subtraction, then a *correct* signal on lead 874 is necessary and present. A signal will appear on lead 876 when the "8" toggle 803 and "4" toggle 802 are both energized indicating a value in excess of twelve; and a signal will appear on lead 877 when the "8" toggle 803 and the "2" toggle 802 are both energized indicating a value of ten or eleven.

During the addition process, the true numerical value of the four-bit digit stored in toggles 800–803 and carry/borrow toggle 1800 may be zero or any number up to and including 18. Therefore, all digits greater than 9 are corrected in this system before leaving the buffer storage toggles. A digit value greater than 9 may be corrected to a single decimal degit 0–9 in the case of addition by adding a binary 6 to the binary representation of the value of any digit greater than 9 to thereby modify the binary representation in toggles 800–803 to a number, the decimal value of which is less than 10. This, of course, requires that a carry be supplied to the next digit and *carry/borrow* toggle 1800 of FIGURE 18 is accordingly set to its units condition (if not already set when the highest order bit is determined) by the *correct* potential on lead 874 at the upper right hand corner of FIGURE 8a and on lead 1830 at the bottom of FIGURE 18. The following table shows the mechanics of making this correction.

| Digit Value | Four Order Binary Indication | Carry/ Borrow Toggle | Correction | Binary-Decimal Indication plus 1 to the next higher order digit |
|---|---|---|---|---|
| 10 | 1010 | 0 | +0110 | 0000 |
| 11 | 1011 | 0 | +0110 | 0001 |
| 12 | 1100 | 0 | +0110 | 0010 |
| 13 | 1101 | 0 | +0110 | 0011 |
| 14 | 1110 | 0 | +0110 | 0100 |
| 15 | 1111 | 0 | +0110 | 0101 |
| 16 | 0000 | 1 | +0110 | 0110 |
| 17 | 0001 | 1 | +0110 | 0111 |
| 18 | 0010 | 1 | +0110 | 1000 |

For digit values of 16, 17 or 18, *carry/borrow* toggle 1800 has already been set to its units condition to thereby assure that the correct potential will be generated from the *and* gate 827. Thus, there is no ambiguity between those digit values and digit values of 0, 1 or 2.

If the value of the digit as stored in buffer toggles 800–803 is such that a correction operation is required, a *correct* signal from *and* gate 827 is provided on lead 874 of FIGURE 8a and connected to *and* gates 824 and 825 on FIGURE 8c which are connected to the zero and unit inputs respectively of the "2" toggle 801 on FIGURE 8a. If the "2" toggle 801 represents a zero, the output signal $(\overline{X_{15}})$ on lead 880 of FIGURE 8b is applied to *and* gate 825 in FIGURE 8c which, along with *digit* clock pulse on lead 879, sets the "2" toggle 801 to its units condition. If the "2" toggle 801 represents a unit, the output signal $X_{15}$ on lead 878 (see FIGURE 8b) is applied to *and* gate 824 in FIGURE 8c which, along with *digit* clock pulse on lead 879, resets the "2" toggle 801 to its zero condition.

To change the "4" toggle 802, the gating must provide for four possible situations: (1) during addition whether there is (a) no carry from the "2" toggle 801, (b) a carry from the "2" toggle, and (2) during subtraction whether there is (a) no borrow by "2" toggle or (b) a borrow by the "2" toggle. Therefore, it is necessary to have distinct *add* and *subtract* potentials which are generated in gating circuits as shown at the top of FIGURE 18 which will now be described.

Ordinarily, the output from *or* gate 1807 is low to provide a no signal condition on *subtract* lead 1836. An *Add* potential is then available through inverter 1837 on lead 1838.

To provide an output signal on *subtract* lead 1836, there must be an input signal on *complement cycle* lead 1840, or there must be input signals on *minus* lead 1842 and any one of the four leads 1844 for *successive accumulate mode*, on lead 1846 indicating both the product toggle (FIGURE 31) and arm toggle (FIGURE 26) are in their units condition, on lead 1848 from the $X_{24}$ toggle, or on lead 1850 indicating that the system is operating in the accumulate cycle.

The *add* and *subtract* signals on leads 1838 and 1836 respectively of FIGURE 18 are applied as input signals in FIGURE 8a on leads 883 and 884 to *and* gates 828 and 829 to thereby provide a (correct) (add) output signal on lead 885 and a (correct) (subtract) signal on lead 886. The (correct) (add) signal on lead 885 is applied to *and* gates 817, 819, 820 and 822 of FIGURE 8b while the (correct) (subtract) signal on lead 886 is applied to *and* gates 818, 821 and 823 of FIGURE 8b.

*And* gate 822 is used when adding to set the "4" toggle $X_{14}$ to its units condition during the correction operation if it initially is in its zero condition thereby providing a signal on the ($\overline{X_{14}}$) lead and the "2" toggle $X_{15}$ initially is also in its zero condition thereby providing a signal on the ($\overline{X_{15}}$) lead 880. Under these conditions there is no carry from the "2" toggle to the "4" toggle.

*And* gate 820 (FIGURE 8b) is used when adding and when there is no carry from the "2" toggle to the "4" toggle during the correction operation to reset the "4" toggle $X_{14}$ to its zero condition when the input signals ($\overline{X_{15}}$) on lead 880 and $X_{14}$ on lead 887 are present.

If during addition there is a carry from the "2" toggle, i.e., when a potential is on the $X_{15}$ lead 878, then the "4" toggle is permitted to remain unchanged during the correction operation.

From the above table, it is apparent that the "8" toggle $X_{13}$ should normally be reset to zero, which is accomplished through *and* gate 817 except when the digit value 18 is present. Under that circumstance, the "8" toggle $X_{13}$ is set through *and* gate 819 which contains as an input signal the $X_{15}$ potential on lead 878 and the ($\overline{X_{13}}$) potential on lead 888.

During the subtraction process, the correction operation, when necessary, involves subtracting a binary 6 from the binary indication of the digit value when the digit is less than zero to provide the correct binary-decimal value. The table below indicates all of the possible digit values which must be corrected during a subtraction process and the manner by which the step of subtracting the binary 6 results in the correct binary decimal value.

Since the digit value of both input digits must be numbers less than 10, no correction will be necessary for a difference so long as the digit applied to the *a* input lead 1814 (FIGURE 18) is larger than the digit applied to the *b* lead 1816. If the *a* digit is smaller than the *b* digit or if the *a* digit is equal to the *b* digit and there was a borrow left from the previous digit subtraction, then when the fourth order bit is determined, the *carry/borrow* toggle 1800 will have transferred to its units condition. A unit output from the *carry/borrow* toggle always indicates that a correction signal is necessary since, in effect, the subtraction has been made from 16 rather than from 10. Thus, the further subtraction of 6 from the difference will produce the correct binary indication of the decimal value.

When the (correct) (subtract) signal is present on lead 886, it is applied to *and* gates 818, 821 and 823 of FIGURE 8b. Correction of the "2" toggle $X_{15}$ for a subtraction operation is the same as it is for an add operation and thus is made by *and* gates 824 and 825 and the *correct* signal on lead 874 as explained above. The "4" toggle $X_{14}$ is reset through *and* gate 821 when both the "2" toggle $X_{15}$ and the "4" toggle $X_{14}$ are in their units condition which eliminates the need for either of the toggles to borrow from the next higher order toggle during the correction process. If the "4" toggle $X_{14}$ was in its zero condition and the "2" toggle $X_{15}$ was initially in its units condition, the "4" toggle $X_{14}$ is set through *and* gate 823.

If the "2" toggle $X_{15}$ is initially in its zero condition, there is no change made in the condition of the "4" toggle $X_{14}$ during the correction operation. This results from the fact that when subtracting 0110 during the correction operation, the "2" toggle $X_{15}$ requires a borrow from the "4" toggle $X_{14}$ and the concomitant subtraction of "1" from the "4" toggle $X_{14}$ results in a corrected binary-decimal indication which has the same third order digit as in the original four order binary indication.

With respect to the "8" toggle $X_{13}$, it is apparent from the above table that it is never necessary to set this toggle during a correction operation. It is, however, necessary to reset for each of the digit values 8 through 13 inclusive. This is achieved by taking the output from *or* gate 890 at the upper right hand corner of FIGURE 8a and applying it as an input to *and* gate 818. The inputs to *or* gate 890 are from the zero outputs of the "Z" toggle $X_{15}$ and the "4" toggle $X_{14}$. An output signal is provided by *or* gate 890 at all times except when the "2" toggle $X_{15}$ and the "4" toggle are both in a unit condition. This corresponds to the four order binary digits of 14, 15 and 7 when a correction is taking place, and in each case no reset of the "8" toggle $X_{13}$ is required.

The availability of the final corrected result of an addition or subtraction operation is therefore delayed in buffer storage during the time that it takes to develop the four-bit result, and in addition, a further delay of one bit time occurring when the digit clock pulse is received during which time the correction, if necessary, takes place. To record the result in a position in word register area $T_3$ at digit positions corresponding to those which the original values had prior to read-out from the first and second word register areas C and $B_3$, the recording heads $W_1$ and $W_2$ are angularly displaced from the adjacent quarter position through the angle subtended by a digit area plus a very small angle to account for a small time delay in the electronic circuitry. Normal internal transfer of a value from one word register to another, even though no addition or subtraction occurs, is through the adder-subtracter 202, buffer storage 201, and the recording circuit 209 just described. During such a transfer the value being transferred is added with zero in the adder-subtracter following the procedures just described.

Head gating circuit

A head gating circuit 219 (FIGURES 5a and 19) comprises *and* gates and *or* gates arranged for developing po-

| Four-order Binary Digit Value | Binary | Carry/ Borrow Toggle | Correction | Decimal Value | Binary-Decimal Value |
|---|---|---|---|---|---|
| 15 | 1111 | 1 | −0110 | 9 | 1001 |
| 14 | 1110 | 1 | −0110 | 8 | 1000 |
| 13 | 1101 | 1 | −0110 | 7 | 0111 |
| 12 | 1100 | 1 | −0110 | 6 | 0110 |
| 11 | 1011 | 1 | −0110 | 5 | 0101 |
| 10 | 1010 | 1 | −0110 | 4 | 0100 |
| 9 | 1001 | 1 | −0110 | 3 | 0011 |
| 8 | 1000 | 1 | −0110 | 2 | 0010 |
| 7 | 0111 | 1 | −0110 | 1 | 0001 | tentials synchronized with clock pulses developed during defined periods of rotation of the disk 204 for controlling other portions of the system during the periods.

Output potentials provided from the head gating circuit include potentials developed at $a$ ($\bar{a}$) (FIGURE 19d) and $b$, ($\bar{b}$) (FIGURE 19e) at the outputs of a pair of gates 1900 and 1901 respectively which are coupled to corresponding inputs of the adder-subtracter circuit 202 (FIGURES 5a and 18) discussed above. The outputs of the *reproducing* toggles I–IV 1404, 1405, 1406, 1407 (FIGURE 14) are respectively coupled on leads 1930–1933 (FIGURE 19b) to gating arrangements which include gates 1900 and 1901 which gates are further controlled by timing potentials and other potentials indicated in the legends for developing an output potential corresponding ot the condition of one of the *reproducing* toggles 1404–1407. For example, after entry on the typewriter of the first plural digit number under quantity on the invoice sheet of FIGURE 2, an *enter Icand* cycle (more fully discussed hereinafter) is carried out during which time potentials on lead 1935 (FIGURE 19b) corresponding to the *enter Icand* cycle, on lead 1936 indicating a *first quarter revolution*, are connected to *and* gate 1902 (FIGURE 19b). The output from *and* gate 1902 on lead 1937 is applied as an input to *and* gate 1903 (FIGURE 19d) along with a signal "0" *in word cnt.* on lead 1938 (FIGURES 19b and d) and the output of the *reproducing III toggle* on lead 1932. The output from *and* gate 1903 is one of the inputs to *or* gate 1900 which provides output signals $a$ and ($\bar{a}$). In this mode of operation, the digit entered by the typewriter in buffer storage registers $B_1$, $B_2$ and $B_3$ is readout by read head $R_3$ (see FIGURE 5a) during the first quarter revolution and reproducing III toggle 1406 is coupled to the $a$ and ($\bar{a}$) output of the gate 1900. With the reproducing III toggle 1406 in the unit condition, a unit output is developed at $a$, and with toggle 1406 in the naught condition, a unit output is developed at ($\bar{a}$). As illustrated in FIGURE 1, this signal passes through the adder-subtracter into buffer storage toggles 800–803 of FIGURE 8 and then is recorded by write head $W_2$ in the temporary register area $T_3$ of the memory unit (see FIGURE 10$a_1$). During the fourth quarter of the same revolution, the information in temporary register area $T_3$ is transferred in a similar manner to the Icand register area $M_3$.

Referring now to FIGURE 19, a *retrieve digit time* potential is developed in a gating arrangement of the head gating circuit which presents it on lead 1940 (FIGURE 19d). This gating arrangement includes a group of gates 1904, 1905, 1906, 1907, 1908, 1909, and 1910 and is coupled on lead 891 of buffer storage (FIGURE 8a) for developing a shifting potential in *or* gate 814. Input potentials on FIGRUE 19 in response to which the *retrieve digit time* potential is generated on lead 1940 include a *retrieve output digit* potential on lead 1941 (FIGURE 19b) generated in a gate 2832 (FIGURE 28a) from lead 2843 of the multiplier counter during a *type out* sequence or *internal transfer* sequence upon counting down the multiplier counter to one as discussed in detail in connection with the multiplier counter of FIGURE 28. With a "1" *in digit counter* potential on lead 1942, an output signal from *and* gate 1904 on lead 1943 is applied as an input to each of *and* gates 1907, 1909 and 1910. Other input potentials required for generation of the *retrieve digit time* potential include a potential from *and* gate 1907 when there is a signal on ($\overline{\text{complement toggle}}$) lead 1944 or from *and* gate 1909 when there is a signal on *complement tog.* lead 1945 and a potential corresponding to one of the word register areas A–F, or $P_2$ of memory disk 204 which is generated in the program board in response to an instruction comprising a *select* or *transfer* command (see FIGURE 3) for *internal transfer* or *type out* of a value and timing potential corresponding to the selected area.

Another output potential generated in the head gating of FIGURE 19d is the *transfer Ier digit to mult. cntr.* on lead 1946 from *and* gate 1911. This potential is for controlling the transfer of a multiplier digit (as for example one of the digits 43.50 of the first entry on the invoice of FIGURE 2) from the buffer register area $B_1$ of the memory unit (FIGURE 5a) to the multiplier counter of FIGURE 28 during a multiplication operation. The development of this potential is discussed in detail hereinafter.

Another potential generated in the head gating circuit of FIGURE 19 is a *write head $W_1$ controls* potential developed on lead 1948 at the output of *or* gate 1918 and coupled to *write head $W_1$ controls* lead 1320 for gating signals from the *write* toggle 1300 to the write head $W_1$ for controlling the recording or writing of values on the storage unit by the recording head $W_1$. The inputs in response to which the *write head $W_1$ controls* potential is generated in *or* gate 1918 include potentials from other portions of the system, indicated in the legends, and potentials from the counter circuits for accurately controlling the period during which the recording of values is carried out.

A *write head $W_2$ controls* potential is developed in a similar manner at the output of *or* gate 1919 and is coupled to *write head $W_2$ controls* for controlling a write head $W_2$ gating arrangement (see FIGURE 13) for controlling the recording of values on the storage unit by write head $W_2$.

Another function partially carried out in the gating circuit is the clearing of the register areas A–F during a *clear cycle* portion of a resetting sequence described below in connection with the multiplier counter of FIGURE 28 initiated in response to actuation of the *reset* and *clear* key contacts 602 and 603 (FIGURE 6) by typewriter control keys 401 and 402 of FIGURE 4a.

A bank of six independent, manually operable two position switches 1912 (see FIGURE 19a) is provided with one switch for each accumulator register area A, B, C, D, E and F so that only those register areas are cleared that have the associated toggle switch closed. For example, with the switch contacts associated with the accumulator register area A closed, an output potential is present from *and* gate 1914 in response to potentials corresponding to *clear A register and "2" in word counter*. This output from *or* gate 1915 is applied to *and* gate 1916 along with a *2nd quarter revolution* potential. This output on lead 1917 is applied as one input to *and* gate 1913 on FIGURE 19e. The timing potentials correspond to the period that the register area A is rotating past write head $W_1$ so that with a potential corresponding to a *clear drum cycle* on lead 1950 (FIGURE 19c) also applied to *and* gate 1913, a *write head $W_1$ controls* potential is generated on lead 1948 for gating on write head $W_1$ of FIGURE 13. At this moment, *write* toggle 1300 is reset to zero to record zeros in all orders of the register area A. With such an arrangement, by leaving an associated switch contact 1912 open, values accumulated in a selected register area A through F are not destroyed during the *clear* and *reset* operations during which the other register areas with associated switches 1912 closed are cleared. This provides means for supervisory control to thereby keep a running total from day to day of certain items, such for example as tax, which may be cleared periodically when tax collections are tabulated.

Another function similar to the above and also partially carried out in the gating circuit is automatic clearing of the source register during an internal transfer or typeout. The register clearance occurs as a result of potentials developed on *write head $W_1$ controls* output lead 1948 (FIGURE 19e) coupled to lead 1320 (FIGURE 13), as described previously, for gating signals from the *write* toggle 1300, which is in the zero condition during the *output mode* period. The particular input which causes generation of the desired potential in *or* gate 1918, the input to *write head* $W_1$ *controls*, is obtained from *and* gate 1962 (FIGURE 19e). The latter gate has an output when the following potentials are present: a potential corresponding to one of the word registers A-F and a timing potential corresponding to that register's location on the memory disk, or *Product Toggle* and a similar timing potential; potentials on leads from *"1" in the Multiplier Counter, Symbol Toggle, Output Mode*, and ($\overline{"11"}$ in Digit Counter). All these potentials being present in output mode, *write head* $W_1$ is gated to pass signals from the *write* toggle 1300. The latter, however, having been reset by the digit clock (see FIGURE 13), remains in this condition because all three *and* gates 1324, 1326 and 1328 coupled to the set side of this toggle, do not have the necessary potential on at least one of their inputs during the output mode period; e.g., $\overline{Icand\ shift\ mode}$ input on gate 1324, ($\overline{Sym.\ Tog}$) input on gate 1326, and *Write Toggle Controls* input on gate 1328. Thus *write head* $W_1$ will write zeros in the source register while it is passing under the head during this period.

*Minus and complement circuit*

A minus and complement circuit 218 (FIGURES 5a and 20) is arranged for control of operations involving negative values and comprises an input gating arrangement, an output gating arrangement, and three toggles (FIGURE 20) designated minus key toggle 2000, minus command toggle 2001, and complement toggle 2002.

Outputs of the toggles are coupled to the output gating arrangement so that a *minus* potential is generated at a *minus* output terminal 2020 in response to each of four combinations of conditions of the three toggles. The *minus* output is coupled to a subtract gating arrangement of the adder-subtractor on lead 1842 at the top of FIGURE 18 for conditioning the adder-subtractor to subtract values that are reproduced from register areas when any one of the inputs to *or* gate 1805 are present. Three of the combinations of conditions of the toggles 2000, 2001, 2002 (FIGURE 20) for producing an output signal on *minus* lead 2020 include cases where two of the toggles are in the naught condition and one toggle is in the unit condition. These are detected by *and* gates 2022, 2024 and 2026. The four combination is with all three toggles in the unit condition, and is detected by *and* gate 2028.

It is apparent therefore that the unit condition of each of the toggles corresponds to an arithmetic minus and the zero condition to an arithmetic plus, and further that the combinations of conditions correspond to algebraic multiplication of signs in which an odd number of minus signs produces a minus sign and an even number of minus signs produces a plus sign. Thus, in order that a *minus* potential is generated, only one of the toggles is in the unit condition or all three are in the unit condition.

When there is an output signal on lead 2030 from *or* gate 2032 this signal normally passes through *and* gate 2034 because a unit potential is normally present on lead 2036 from invertor 2038. This results from *and* gate 2040 being normally closed since to open it requires an input signal from *or* gate 2042 which requires either the $-E$ or $-F$ register toggles to be set. These are set by punching holes (such as holes 3XA and 3XB) in rows 15 or 16 of the program card of FIGURE 3b at the carriage position 13 or 77, where such an entry is to be made to accumulator areas E and F of the storage unit (see FIGURES 5a and 10). (As a result of the $-E$ or $-F$ register toggles being set, the *minus* level will reverse its state during each $\frac{1}{12}$ revolution of accumulate cycle that corresponds to accumulation into the E or F register).

The system is arranged so that the toggles 2000, 2001, 2002 are reset to the naught or zero condition in response to actuation of the *reset and clear* keys (FIGURE 4). As discussed in detail below, actuation of these keys sets the multiplier counter 217 (FIGURES 5a and 28) to a predetermined count to provide an output signal on *clear toggles cycle* lead 2852 which initiates a sequence during which various toggles of the system, including all three minus and complement toggles of FIGURE 20 are reset to the zero condition. A resetting potential is developed during *clear toggles cycle* of operation in other portions of the system and is applied on *neg. toggles→0* lead 2044 through *and* gates 2003, 2004, 2005 with a pre-index clock pulse on lead 2011 to the respective zero inputs of toggles 2000, 2001, 2002 for resetting the toggles.

The *neg. toggles→0* potential on lead 2044 applied to gates 2003, 2004, 2005 is also developed in response to the first instruction of a new field or column in which a value is typed either automatically or manually, or after use of buffer registers $B_1$, $B_2$, $B_3$ for an accumulation, multiplicand entry or multiplication. For example, the *minus command* toggle 2001 is set to the unit condition in response to a potential coupled to *and* gate 2006 from a command hole 305 in the program card of FIGURE 3$b_2$, carriage position 85, to an *automatic minus* command horizontal conducting strip #31 (FIGURE 3a) to *and* gate 2006 (FIGURE 20). This condition must be accompanied by the *calculate* relay 601 (FIGURE 6a) being energized and the *foot* relay 608 being de-energized to thereby provide potentials on *calculate* lead 622 and *body* lead 642 of FIGURE 6b. It will be recalled that entries on the invoice are made with the system operating in the *body* mode, and energization of the *foot* relay occurs with closure of key contacts 607 associated with the sub-total key 405. In FIGURE 20, the *body* and *calculate* potentials are applied to *and* gate 2048, the signal on its output lead 2049 being applied as another input to *and* gate 2006. The other input signal, *set entry toggles* on lead 2052, to *and* gate 2006 is present during the entry of items in the body of the invoice, and the circuitry for generating this potential will be discussed below.

After execution of the accumulation, multiplicand entry, or multiplication modified by the *minus command* toggle 2001, it is reset to the zero condition in response to a potential applied to *and* gate 2004 that is generated in response to *negative toggles→0* level.

A specific example of the operation of the *minus command* toggles 2001 occurs during the entry of the first item in the sample invoice sheet shown in FIGURE 2 at carriage position 85 following the lowest order digit in the % discount field. This command is effective for initiating an operation during which a net amount is produced, for example, the net amount (1848.75) of the first item on the invoice sheet of FIGURE 2. According to the instruction the gross amount (2175.00) which is the product of 50 and 43.50 produced in the product primary register area $P_2$ is entered also into the multiplicand register area $M_3$. After entry of the multiplier, i.e., the % discount (15), the *enter Ier* instruction (i.e., hole 340) appearing in the No. 85 carriage position following the lowest order digit of the % discount column calls for a multiplication operation. During this multiplication operation, successive subtractions from, rather than additions to, the gross amount in the area $P_2$ are carried out because of hole 305 in the program card of FIGURE 3$b_2$ causing the *automatic minus command* to be present to set *minus* command toggle 2001. Consequently, the value in accumulator register $P_2$ at the end of the operation is the net amount (1848.75) which is typed at the typewriter in the manner discussed below.

To carry out successive subtractions, the instruction which initiated the multiplication operation includes an automatic minus command. In response to this command, the *minus command* toggle 2001 is set to the unit condition and in response to this condition, a potential is applied from the *minus* output lead 2020 to the adder-subtractor of FIGURE 18 for conditioning the adder-subtractor to subtract rather than to add during the multiplication operation. At the completion of the multiplication when $B_1$, $B_2$, and $B_3$ are cleared, a *neg. toggles 0* potential is generated in other portions of the system as will be described below and is coupled through the gate 2004 to reset *minus command* toggle 2001 to the zero condition.

The *minus key* toggle 2000 (FIGURE 20) is coupled to the typewriter keyboard (FIGURE 4) and the program unit 101 so that in response to depression of the minus key 404 (FIGURE 4) and the occurrence of a *conditional minus* command on strip 32 of FIGURE 3a, toggle 2000 is set to the unit condition. Depression of the minus key 404 on the typewriter keyboard closes a pair of contacts 605 (FIGURE 6a) through which *minus relay* 606 (FIGURE 6b) is energized and associated contacts closed. *Minus* relay 606 remains energized and the associated contacts closed until the relay holding circuit is broken in response to opening carriage return contacts 612 during a carriage return.

While *minus* relay 606 is energized, a *conditional minus* command potential (see FIGURE 3a) may be generated by a hole 342 or 343 (FIGURE $3b_2$) and applied on lead 652 of FIGURE 6a and through the closed contacts 650 of the *minus* relay 606 to and gate 2007 (FIGURE 20) for setting *minus key* toggle 2000 to the unit condition. Then, whenever a *conditional minus* command is encountered with the *minus* relay energized and a potential is present on lead 2054 from *card in* ($\overline{CR.}$) ($\overline{TAB}$) ($\overline{SPACE}$) lead 640 at the top of FIGURE 6b, *minus* key toggle 2000 is set to the unit condition. *Minus* key toggle 2000 is reset to the naught condition in the manner discussed as a result of the completion of an accumulation, multiplicand entry, or multiplication. After return of the carriage and de-energization of the *minus* relay 606, *minus* key toggle 2000 is not set to the unit condition until the *minus* key 404 is again actuated and a *conditional minus* command encountered on the punched program card of FIGURE 3b.

During the period that the *minus* key toggle 2000 is maintained in the unit condition, every *add* instruction in the program is in effect a *minus* instruction and every *minus* instruction in effect is an add instruction. For example, before making an entry of the fourth item on the sample invoice of FIGURE 2, which is a "returned for credit" entry, the *minus* key 404 is depressed and the *minus* key toggle 2000 is set accordingly each time a *conditional minus* command is encountered, which command is in the form of punched holes 3XC, 3XD, 342, and 343, in the program card of FIGURE 3b following the lowest order digit in the quantity ordered, quantity shipped, price and discount columns at carriage positions 13, 21, 63 and 85 respectively. Consequently, with minus key toggle 2000 set, lead 2020 gives a *minus* output and the gross amount 160.00 is developed in complementary from, the value being decomplemented and recorded in the buffer register area for subsequent type-out, followed by negative accumulation in the gross amount total (register C, according to the command at carriage position 77). The accumulation is performed negatively because the *negative sign detected* output on line 2010 and pre-index clock on line 2011 set the complement toggle 2002 through *and* gate 2009, thus putting a potential on *minus* output lead 2020, since the absence of a conditional minus command at position 77 prevents the setting of the *minus* key toggle 2000. In developing the net amount, the complemented value 999,999,840.00 of the gross amount 160.00 is accordingly recorded in the area $P_2$ and the absolute value of the gross amount 160.00 recorded in the multiplicand register area $M_1-M_3$ since only absolute values may be recorded on this latter register area.

If a discount % were entered, the multiplication operation would be initiated by the "Enter 2nd Factor" instruction at the right of the percent discount column in carriage position 85. The presence of both the *automatic minus* command and the *conditional minus* command would prevent an output from minus lead 2020 and the gross amount would be *added* (repetitively under control of the quantity in the Ier counter) to the complemented value of the gross amount in the area $P_2$, thereby producing a complemented net amount 99,999,856.00, assuming a 10% discount. Consequently, also, the complemented net amount is added to, rather than subtracted from, the running subtotal as occurs during the typing of other items since no *conditional minus* command is included in the instructions of this field, on the program card of FIGURE 3b.

Buffer storage toggles (FIGURE 8) and the multiplier counter toggles (FIGURE 28) are coupled through gates 2008 and 2009 to the *complement* toggle 2002 so that in response to coincident potentials applied through the gates 2008 and 2009 from buffer storage, the multiplier counter and other portions of the system, the complement toggle may be set to the unit condition. The potentials applied to the gate 2008 are generated during the preliminary sequence carried out prior to a *type out* or *internal transfer* sequence of the multiplier counter of FIGURE 28, which sequences are discussed below.

The sign digit transferred from the No. 11 digit position of a register in the storage unit (see FIGURE 10a) to buffer storage (FIGURE 8) during a preliminary sequence sets buffer storage toggles 800–803 to a zero if the sign digit is positive, and to nine if it is negative. Consequently, a potential ("0" in buffer storage) applied to *and* gate 2008 sets complement toggle 2002 to the unit condition at a time in the sequence of operation that the other inputs to *and* gate 2008 are present, and in the absence of the potential ("0" in buffer storage), *and* gate 2008 is not energized so that *complement* toggle 2002 remains in the naught condition. The condition of *complement* toggle 2002 therefore may be used to identify the word register area on which the absolute value is recorded, i.e., either the register area on which the value selected for transfer is recorded or the corresponding transfer register area $T_1-T_6$ or $S_2$ (FIGURE 5a) on which the complement of the corresponding register is recorded.

Output leads corresponding to the naught and unit condition of the complement toggle are coupled to other portions of the system for controlling the system so that only an absolute value is *internally transferred* or *typed out*. Thus, a potential from the *complement* toggle 2002 is available throughout an *internal transfer* or *type out* cycle to reproduce the absolute value and indicate the sign of the value and control the system accordingly. If the absolute value reproduced is negative, the *complement* toggle 2002 is in the unit condition and a *minus* potential on lead 2020 is generated. Therefore, if the instruction calls for an addition, the value is subtracted since it is negative. This is in accordance with one of the four combinations of conditions discussed above, in which, with the *minus command* toggle 2001 and the *minus* key toggle 2000 in the naught conditions, and the *complement* toggle 2002 in the unit condition and the E— and F— register toggles are in the naught condition, a potential is generated at the *minus* output terminal and transmitted to the adder-subtractor circuit for conditioning the circuit to subtract.

If the instruction calls for a subtraction as when *minus command* toggle 2001 is set to its units condition and *complement* toggle 2002 is also set to its units condition by detecting a negative sign no potential is developed at the minus output leads 2020 and the adder-subtractor is conditioned to add.

In the third situation when *minus* key toggle 2000 is set as when a correction entry is being made and *minus command* toggle 2001 is set by the *conditional minus* instruction (see hole 305 in the program card of FIGURE $3b_2$) and *complement* toggle 2002 is also set to its units condition by detecting a negative sign, the *minus* output potential on lead 2020 is present through a circuit including *and* gate 2028 to thereby condition the adder-subtractor of FIGURE 18 to subtract.

Digit one shot circuit

A digit one shot circuit 222 (FIGURES 5*b* and 21) comprises input gating, a *digit one shot* toggle 2100 (FIGURE 21) and output gating. The toggle is normally in the naught condition and is set to the unit condition for a predetermined period in response to potentials applied in coincidence through the input *and* gate 2102. At the end of the predetermined period the toggle automatically returns to the naught condition since the circuit is in the nature of a single shot multivibrator rather than a bistable device such as the toggles previously described. Thus, no reset input is provided. The predetermined period that the *digit one shot* toggle 2100 is set is longer than the period for one revolution of the disk to provide thus sufficient time for indexing subsequent system operations regardless of which part of a storage disk revolution *digit one shot* toggle 2100 is set to the unit condition. The toggle may be of a type, for example, as that shown in Figure 11-15 of Design of Transistorized Circuits for Digital Computers, by Abraham I. Pressman, John F. Rider Publisher, Inc., 1959.

A potential generated in response to depression of a typewriter numeral key (FIGURE 7) is coupled through *or* gate 2101 to *and* gate 2102 along with (1) a system potential (output mode) on lead 2106, (2) a potential corresponding to an *order* command from rows 1–4 of the program unit of FIGURE 3 through *or* gate 2103, and (3) a *digit clock* pulse for setting the *digit one shot* toggle 2100 to the unit condition for the predetermined period.

It is to be recognized that potentials applied through suddenly closed contacts are initially fluctuating due to the contact bounce. The *digit one shot* toggle 2100 therefore provides a smooth output potential at the output of *and* gate 2104 for control of the system over a fixed time period, that is in effect isolated from the irregular potentials obtainable through the encoder contacts (FIGURE 7) associated with the typewriter keys.

The output potential corresponding to the unit condition of *digit one shot* toggle 2100 is coupled to other portions of the system for initiating a sequence, discussed hereinafter, during which time the digit value entered into the encoder in response to depression of the typewriter key is transferred through buffer storage (FIGURES 1, 5*a* and 8) and recorded in the buffer register areas $B_1$–$B_3$ on disk 204 through the recording head $W_2$. Recording of a value in each of the register areas $B_1$, $B_2$, $B_3$, is accomplished by recirculating the value, simultaneous with recording in the area $B_1$ as explained in connection with FIGURE 1, through the head gating circuit 219 and the adder-subtractor 202 back to buffer storage 201 for recording in the area $B_2$ and another recirculation for recording in the area $B_3$.

As will become apparent from the following, the *digit one shot* toggle is used (1) to indicate that a digit has been entered on the keyboard and typed on the invoice sheet, (2) to start the sequencing described below in conection with FIGURE 29, (3) to permit the typed digit to be placed in the buffer storage toggles of FIGURE 8*a* by opening *and* gates 804 and 805 on FIGURE 8*b* and *and* gates 806 and 807 on FIGURE 8*c* with a potential on the (*digit one shot*) $\overline{(GO)}(CALC)$ input leads, and (4) to set up the entry address in the digit counter of FIGURE 15 by the potential on the (*digit one shot*) $\overline{(GO)}(CALC)$ lead 1518 connected to each of the unit input *and* gates 1504, 1505, 1506 and 1507. As explained above, the digit counter is set to count down from the digit value programmed by the holes in the first four rows of the program unit of FIGURE 3 to identify the digit area in buffer registers $B_1$–$B_3$ on the memory unit where the typed digit is to be entered. If the operator makes a mistake by typing the wrong digit, this can be corrected if the entry is still in buffer storage registers $B_1$–$B_3$ by merely backspacing the carriage and retyping the correct digit. This simple type of correction is made possible by use of the non-return-to-zero method of magnetization on the memory unit, and by the method of programming via carriage position and entry addressing as just described.

Program one shot circuit

A *program one shot* circuit 223 (FIGURES 5*b* and 22) comprises input gating, a *program one shot* toggle 2200 (FIGURE 22) and output gating. Toggle 2200 is normally in the naught condition and is arranged so that in response to a potential applied through the input gating, the toggle is set to the unit condition for a predetermined period and at the end of the period, automatically returned to the naught condition. The length of the predetermined period during which the toggle is in the unit condition is longer than the period for one revolution of the disk but less than the period for two revolutions of the disk in order to allow sufficient time for indexing a sequence of system operations discussed hereinafter.

*Program one shot* toggle 2200 is set to the unit condition in response to any one of four groups of potentials developed in other portions of the system and applied through gates 2201, 2202, 2203, 2204, 2209 to the unit input. The output potential of the toggle 2200 is used for control of the system for carrying out one of the four operations corresponding respectively to one of the four groups of potentials in response to which the toggle is set to the unit condition.

The first operation is the transfer of a value from one of the buffer register areas $B_1$–$B_3$ (FIGURE 5*a*) to another register area. This operation is initiated whenever the typewriter carriage is in a position corresponding to an instruction calling for such a transfer as, for example, *enter Icand* command through contact strip 6 of the program unit of FIGURE 3*a* which follows a typewriter entry in the positions in which a *quantity shipped* is entered on the sample invoice (FIGURE 2) at carriage position 21. A hole 334 is accordingly punched in the program card of FIGURE 3*b* at carriage position 21.

In response to a potential corresponding to an instruction comprising an entry command such as *enter Icand* applied through *or* gate 2205 (FIGURE 22) to the gate 2201, the *program one shot* toggle 2200 is set to the unit condition assuming the other requisite inputs to *and* gate 2201 are present. With the *program one shot* toggle in its unit condition, an output potential corresponding to this condition is transmitted to other portions of the system for initiating a sequence for controlling the system to transfer a value recorded in the buffer register areas $B_1$–$B_3$ of memory disk 204 to the register area called for by the instruction. In the sample invoices of FIGURE 2, after entry of the quantity digit 50, a sequence is initiated in response to the unit condition of *program one shot* toggle 2200, during which sequence the system is controlled to transfer the value recorded in buffer register area $B_3$ to the multiplicand register area $M_3$.

A second operation of the *program one shot* circuit of FIGURE 22 is in effecting the transfer of a digit value from the product primary register area $P_2$ (FIGURE 5*a*) or from one of the accumulator register areas A-F of memory disk 204 during an *internal transfer* or *type out*. This operation is initiated in response to movement of the typewriter carriage to a position in which an instruction calling for an *internal transfer* or *type out* is programmed such as at carriage position 65. The *program one shot* toggle 2200 (FIGURE 22) is set to the unit condition in response to a potential corresponding to any instruction applied through *or* gate 2206 with a *calculate* potential on lead 2210, or by the *total key* potential on lead 2212 along with the other inputs to *and* gate 2202 which are normally present. With *program one shot* toggle 2200 in the unit condition, a corresponding output potential is transmitted to other portions of the system for initiating and controlling the sequences of the multiplier counter (FIGURE 28), during which sequences *type out* and *internal transfer* operations are carried out, which sequences and examples of operations are discussed below.

A third operation involving the *program one shot* circuit of FIGURE 22 is during the manual clearing of the buffer register areas $B_1$–$B_3$ in response to closing the *clear* key contacts 603 (FIGURE 6) by *clear* key 402 (FIGURE 4) provided the carriage is in a position in which an *order* command is programmed, i.e., a position in which a value may be typed into the electronics. In response to potentials corresponding to such conditions applied through the gate 2204 (FIGURE 22), the *program one shot* toggle is set to the unit condition thereby generating a potential for transmission to other portions of the system for initiating a sequence during which the buffer register areas $B_1$–$B_3$ are cleared.

The fourth operation associated with the *program one shot* circuit is automatic tabbing of the typewriter carriage to a position corresponding to an instruction which calls for *type out* of a value stored at a predetermined register area on the memory disk 204, for example, such as the running subtotal of the gross amount from the accumulator register area B, in response to actuation of contacts 607 or 613 (FIGURE 6) by depression of the total or subtotal keys 406 or 405 on the typewriter control panel of FIGURE 4. In response to actuation of either one of these keys, a *seek B* toggle (separately discussed in connection with FIGURE 32) is set to the unit condition. With the *seek B* toggle in unit condition, a tabbing solenoid 909 (FIGURE 9) is successively actuated to automatically tab the carriage to a position in which a *select B* command is programmed. In response to this command, the *seek B* toggle is reset to the naught condition so that a corresponding potential ($\overline{seek\ B}$) is applied to the gate 2203 (FIGURE 22) to set toggle 2200 to the unit condition to provide an output for initiating a sequence to carry out the total or subtotal instruction programmed in the same carriage position.

*Odd-even and strobe circuit*

An odd-even and strobe circuit 224 (FIGURES 5a and 23) comprises input gating, an *odd-even* toggle 2300 (FIGURE 23), a *strobe* toggle 2301, and output gating. The *odd-even* toggle 2300 is set successively to the unit and reset to its zero condition in response to potentials applied through conducting strips 109 (FIGURE 3a) by holes 314 at the bottom of the program card of FIGURE 3b. The unit input is through *and* gate 2310 which is connected to *even* lead 2311 and *digit* clock lead 2312 while the zero input is through *and* gate 2315 which is connected to *odd* lead 2313 and *bit* clock lead 2314. Thus, a single uniformly shaped pulse isolated from an irregular pulse obtained through electrical contact between a conducting strip 109 and a respective brush 104 (FIGURE 3a) is available at the output of *odd-even* toggle 2300 for each carriage position to distinguish between successive carriage positions and to initiate operations corresponding to the instruction associated with each respective position.

The output of *odd-even* toggle 2300 is coupled to the unit side of the strobe toggle 2301 through differentiating circuits 2302 and 2303, *or* gate 2304, *and* gate 2305, and *or* gate 2306, so that each time the carriage is moved to a new carriage position, a pulse is transmitted to *strobe* toggle 2301 for setting it to the unit condition. *And* gate 2305 is normally open to set *strobe* toggle 2301 each time *odd-even* toggle 2300 transfers since a potential is normally present on lead 2308. However, if there is an *automatic decimal point* command punched as by holes 302, 304, 306 and 308 in the program card of FIGURE 3b, *and* gate 2305 is closed. Similarly, if there is an input on *decimal space* lead 2309, *and* gate 2305 is closed.

The output signals from *odd-even* toggle 2300 are also applied to *and* gates 2320 and 2322 to provide an output signal on lead 2324 of either (odd) ($\overline{odd\ even}$) or (even) (odd even). This signal is one input to *and* gate 2307 which produces on lead 2326 the *enable program one shot* signal applied to input *and* gates 2201 and 2202 for the *program one shot* toggle on FIGURE 22.

An output potential corresponding to the unit condition of *strobe* toggle 2301 is applied as another input to *and* gate 2307 for generating the *enable program one shot* signal on lead 2326 provided that the machine is not processing a previous command as designated by the input signals on lead 2330 and 2331. A *program one shot* potential (FIGURE 22) resulting from the setting of the *program one shot* toggle 2200 to the unit condition, is applied on lead 2332 through gates 2308 and 2309 (FIGURE 23) to the naught input of the *strobe* toggle 2301 so that it is reset to the naught condition as soon as the *program one shot* toggle of FIGURE 22 is set. Thus, the commands of an instruction which are initiated in response to the unit condition of the *program one shot* toggle 2200 are not carried out until contact is made through the narrow holes 314 at the bottom of the program card of FIGURE 3b with the conducting strips 105 of FIGURE 3a, and all other spring contacts in the program panel of FIGURE 3a are settled in the respective command holes. And after carrying out the instruction, the *program one shot* may not be set again until the carriage has moved to a new position and the strobe toggle has been set again.

Another operation in which *strobe* toggle 2301 is involved is *type out* of a value from a word register area of memory disk 204. In a *type out* field, for example, the gross amount field of the invoice sheet of FIGURE 2, each carriage position corresponds to an instruction which comprises an *enable typewriter* command (see the elongated hole 310 in the program card of FIGURE 3b) which calls for a type out sequence of the multiplier counter 217 (FIGURES 5a and 28) during which a digit from one of the digit areas, as determined by the position of the typewriter carriage is typed out, which sequence is discussed below. The output of *strobe* toggle 2301 is coupled to the multiplier counter through the gate 2818 (FIGURE 28d) so that in response to setting *strobe* toggle 2301 to the unit condition, the multiplier counter is set to "four" and the *type out* sequence is initiated. An output potential on lead 2845 from the units output of toggle 2802 of the multiplier counter is coupled through lead 2336 to *and* gate 2310 (FIGURE 23) to the naught side of *strobe* toggle 2301 so that in response to the setting of the multiplier counter to four, *strobe* toggle 2301 is reset to the naught condition. *Strobe* toggle 2301 therefore remains in the naught condition until the digit is typed and the carriage has escaped to the next carriage position, at which time a new signal from the *odd-even* toggle 2300 sets *strobe* toggle 2301 to the unit condition, thereby initiating a type out sequence for the next digit.

Consequently, information is transferred from the memory to the typewriter only as fast as the typewriter mechanism can operate so that in the event of stoppage of the typewriter operation for any reason, such as jamming or obstruction of the displacement of the carriage, information is withheld from the typewriter, thereby preventing loss of information or typing digits one over another.

*Strobe* toggle 2301 is also set during the *clear toggle* cycle by *and* gate 2340 when the *reset* and *clear* keys 401 and 402 are simultaneously depressed, and for automatic typing of the symbols "-" & "#" by *and* gate 2342.

Synchronization of typewriter and electronic calculating unit

Referring now to FIGURE 24, there is illustrated in diagrammatic form the essential components used in connection with the coordination and synchronization of operation of the typewriter and the electronic calculating unit which include the *odd-even* toggle 2300, the *strobe* toggle 2301 and the *program one shot* toggle 2200 just described. The program card of FIGURE 3*b* is diagrammatically illustrated at reference numeral 300.

The program card is punched with a series of holes 2408 selectively positioned, as explained in connection with FIGURE 3*b*, to accommodate invoice sheets of varying sizes and formats. In the case of several holes occurring at adjacent positions of the typewriter carriage, an elongated slot 2410 may be provided.

At the bottom of the program card, odd-even slots 314 are positioned at successive positions of the carriage. The width of odd-even slots 314 is about one-half to three-quarters of the width of the individual command holes 2408 punched in the same vertical column. The center-lines of the odd-even slots 314 and holes 2408 are aligned so that contacts associated with holes 2408 make an electrical circuit connection with the contact strips on the printed circuit panel board of FIGURE 3*a* before the odd-even contact is made. Also, the narrow width of odd-even slots 314 may serve to indicate any misalignment between contact brushes 104 which move with the typewriter carriage and the stationary parts of the program unit.

With a typewriter designed to type ten characters per inch, the space between the adjacent stable positions of the carriage is one-tenth of an inch. Contact brushes 104 which move with the carriage are vertically aligned so that each makes contacts through all holes provided in any one vertical column of the program card. A suitable mechanical construction for providing such an arrangement is disclosed in the co-pending application of Gim Chan, identified above.

One of the purposes of the toggles shown in FIGURE 24 is to provide a means to assure that all of the command functions which may be punched in a particular vertical column of the program card are received in the electronic calculator unit so that the unit does not embark upon an erroneous operation. Some of the commands from the program unit require the typewriter to tab or automatically print a decimal point whereas others instruct the system to set a counter to a particular count to thus establish an address for an for an entry or to carry out some arithmetical operation. A delayed reception of an instruction command may result in the erroneous setting of a counter, or cause arithmetic operations to start before all preliminary operations, such as the setting of a minus toggle, to have taken place. With the program card providing over 30 separate program functions, many combinations of which may be selected in a particular vertical column in the program card, there is an inherent variation in time when all of the command signals are received by the electronic calculating unit. This is particularly true in the case where a command is programmed through a series of adjacent carriage positions thereby resulting in a slot such as 2410 in the program card.

Synchronization of the operation of the electronic calculating unit along with the movement of the typewriter carriage is provided through the use of the narrow, odd-even slots 314 at the bottom of each vertical column in the program card 300. The potential from the associated brush contacts on leads 2416 and 2418 sets or resets *odd-even* toggle 2300 with each successive displacement of the typewriter carriage. The output from the *odd-even* toggle 2300 is differentiated and combined so that *strobe* toggle 2301 is set each time the carriage advances, and is reset by *program one shot* toggle 2200.

While *odd-even* toggle 2300 could be dispensed with and *strobe* toggle 2301 triggered by the signals on leads 2416 and 2418 (or just one lead from a single row of narrow slots) it has been discovered that voltage fluctuations on leads 2416 and 2418 were sufficient to cause *strobe* toggle 2301 to occasionally set again even though the typewriter carriage had not advanced. This is possible because *strobe* toggle 2301 is reset by the *program one shot* toggle 2200 with the first *digit* clock pulse (see FIGURE 22) which occurs after a time duration of only a fraction of a millisecond. With such a short time period involved for resetting *strobe* toggle 2301, contact bounce occasionally caused the *strobe* toggle to be set again and this, of course, resulted in a duplicate operation of the electronic calculating unit and caused other erroneous operations.

The *odd-even* toggle 2300 thus provides a mechanical decoupling between *strobe* toggle 2301 and the movement of the typewriter carriage. This decoupling greatly increases reliability of operation and prevents the possibility of performing the same operation twice at the same typewriter carriage position by requiring a distinct movement of the carriage from one position to an adjacent position before the strobe toggle can be set again to thereby allow triggering of the *program one shot* toggle 2200 which sets into operation a plurality of functions in the electronic calculating unit to be described below.

Arm-go-circuit

An *arm-go* circuit 225 (FIGURES 5*b* and 25) comprises input gating, an *arm* toggle 2500 (FIGURE 25), a *go* toggle 2501, and output gating. The *arm* and *go* toggles in combination proceed through a sequence of naught and unit conditions in response to setting the *digit one shot* toggle 2100 (FIGURE 21) or the *program one shot* toggle 2200 (FIGURE 22) to the unit condition. The outputs of the *arm* and *go* toggles 2500 and 2501 (FIGURE 25) are coupled to other portions of the system for controlling the system in correspondence with the sequence.

For clarity and convenience of presentation, the Boolean algebra system of notation is applied to the sequence of conditions of *arm* and *go* toggles 2500 and 2501 in which ($\overline{\text{arm}}$), arm, ($\overline{\text{go}}$), go correspond respectively to the naught and unit conditions of the *arm* and *go* toggles. The sequence of the four possible conditions is tabulated below.

| | | |
|---|---|---|
| 1. | ($\overline{\text{Arm}}$) | ($\overline{\text{Go}}$) |
| 2. | Arm | ($\overline{\text{Go}}$) |
| 3. | Arm | Go |
| 4. | ($\overline{\text{Arm}}$) | Go |

Potentials are developed in the sequencing circuit 220 (FIGURES 5*b* and 29) in response to potentials corresponding to the various conditions of the *arm-go* circuit of FIGURE 25 and other potentials indicated in the sequencing circuit of FIGURE 29.

The condition ($\overline{\text{arm}}$) ($\overline{\text{go}}$) is the normal condition of *arm* and *go* toggles 2500, 2501 so that in response to setting *digit one shot* toggle 2100 (FIGURE 21) or the *program one shot* toggle 2200 (FIGURE 22) to the unit condition and the application of corresponding potentials to gates 2502 (FIGURE 25) or 2503 respectively, the *arm* and *go* toggles 2500 and 2501 are set to the second condition tabulated, *arm* ($\overline{\text{go}}$).

In response to a potential corresponding to *arm* ($\overline{\text{go}}$) applied on lead 2510 to a gate 2504 and the next *pre-index* clock pulse on lead 2512, *go* toggle 2501 is set to the unit condition so that the *arm* and *go* toggles are in the third condition tabulated above, viz., *arm go*. The system is thus in the *arm* ($\overline{\text{go}}$) condition for no more than one revolution of the memory unit as *go* toggle 2501 is set by the first *pre-index clock* pulse that follows generation of the *arm* (go) potential. This delay is intentionally provided to assure that other toggles such as the register toggles of FIGURE 27 are properly set before advancing to the *arm go* condition initiates certain operations.

During the period that the toggles remain in the *arm go* condition, output potentials are applied to gating arrangements of other portions of the system including the sequencing circuit (FIGURE 29) so that various operations may be carried out in a predetermined sequence in accordance with commands of the instruction corresponding to the carriage position. Operations that may be carried out in response to corresponding potentials generated in the sequencing circuit during the period that *arm go* toggles 2500, 2501 are in the condition *arm go* includes an *accumulate cycle* during which time a value in the buffer storage register areas $B_1$–$B_3$ is added to or subtracted from a value in one of the accumulator register areas A-F to provide a new value in the accumulator register area, an *enter product cycle* during which time a value in the buffer register area $B_2$ is added to or subtracted from the product primary register area $P_2$ such as at the end of the type out of the gross amount in preparation for calculation of a net amount after entry of the discount %, an inter Icand cycle during which time a value in the buffer register area $B_3$ is transferred to the transfer register area $T_3$ and then to the multiplicand register area $M_3$, an *Icand shift mode* or *successive accumulate mode* during which times a multiplication is carried out in the manner discussed below and a *clear buffer register areas* $B_1$–$B_3$ operation during which time zeros are recorded in all orders of the register areas $B_1$–$B_3$.

At the conclusion of the operation carried out, a *clear buffer register areas* $B_1$–$B_3$ potential is applied on lead 2514 to a gate 2505 for resetting the *arm* toggle to the naught condition so that the toggles are set to the fourth condition tabulated, i.e., (arm) *go*. The output potentials corresponding to this condition are coupled to the sequencing circuit of FIGURE 29b so that an *output mode* potential on lead 2932 is developed and a corresponding operation carried out during which operation *type out* and *internal transfer* may be accomplished.

Other sequencing circuit output potentials generated during the (arm) *go* condition are coupled to other portions of the system for initiating and controlling the transfer of a value entered into buffer storage from the typewriter to the buffer register area $B_1$–$B_3$. The (arm) *go* output potentials are also used for initiating an automatic carriage function if such a command is present in the program card of FIGURE 3b, as for example *automatic carriage return* and *automatic tab*.

At the conclusion of the operations carried out during the period that the toggles are in the condition (arm) *go*, *and* gate 2506 is conditioned by a *go toggle→0* potential on lead 2516 developed in the sequencing circuit on lead 2930 on FIGURE 29b, so that *go toggle* 2501 is reset to its zero condition in response to the next pre-index pulse. The *arm* and *go* toggles 2500, 2501 are thereby returned to the normal condition, (arm) (go).

The *arm go* sequence which is carried out in response to setting the *digit one shot* toggle 2100 to the unit condition normally includes only the conditions (arm) (go), arm (go), and (arm) *go*. At the beginning of an entry field, such as quantity or price in the invoice of FIGURE 2, however, the sequence carried out in response to *last operation output* (seek B) (go) (enable input), ("0" in *multiplier cnt.*) pre-index clock includes the condition *arm go* during which the buffer register areas $B_1$–$B_3$ are cleared.

The *arm go* sequence carried out in response to setting the *program one shot* toggle 2200 to the unit state includes all the tabulated conditions of the *arm go* circuit.

At the top of FIGURE 25, gating is provided to produce *length of type out control* signal on lead 2520 which is produced by *and* gate 2522 in response to an *enable T/W command* on lead 2524 and an output from *or* gate 2528.

A *reset hold* potential is also provided on lead 2530 through amplifier 2532.

*Entry circuit*

An entry circuit 228 (FIGURES 5b and 26) comprises input gating, output gating, and an *entry* toggle 2600 (FIGURE 26) arranged in the system so that *entry* toggle 2600 is set to the unit condition whenever any digit is recorded on the buffer register areas $B_1$–$B_3$ in response to entry of any digit at the typewriter or during an internal transfer. The only time it is possible to enter a value into buffer register areas $B_1$–$B_3$ without setting entry toggle is during the type out of a *total*, or *special total* both discussed below.

In response to actuation of a typewriter numeral key and with the carriage positioned in an entry field, i.e. quantity or price in the invoice sheet of FIGURE 2, the *digit one shot* toggle 2100 (FIGURE 21) is set to the unit condition thereby initiating the *arm go* sequence just discussed, during which sequence the value corresponding to the selected numeral key is recorded on the buffer register areas $B_1$–$B_3$. The potential corresponding to the unit condition of *digit one shot* toggle 2100 is coupled to the *entry* circuit input gating on lead 2601 through *and* gate 2608 (FIGURE 26) so that *entry* toggle 2600 is set to the unit condition in response thereto.

An (entry toggle) (error) potential corresponding to the unit condition of *entry* toggle 2600 is coupled from *and* gate 2602 on lead 2603 to the input gating on lead 2214 of the *program one shot* circuit of FIGURE 22 so that upon encountering the instruction at the end of the entry field such as carriage positions 13, 21, 64, 85 and 99, with the program card of FIGURE 3b, which calls for transfer of the value from the buffer register areas $B_1$–$B_3$, the *program one shot* toggle 2200 is set to the unit condition. Such an arrangement prevents setting of the *program one shot* toggle 2200 to the unit condition and initiating the *arm go* sequence when an entry program is encountered unless an entry has been made as indicated by the *entry* toggle.

*Entry* toggle 2600 may also be set to the unit condition during an *internal transfer* or *type out* in response to a *buffered output mode* potential applied on lead 2605 through gate 2604. The potential from *entry* toggle 2600 is applied through gate 2602 to *program one shot* toggle 2200 as before described so that a transfer of the value recorded in the buffer register areas $B_1$–$B_3$ during the internal transfer may be accumulated on another register area during the *arm go* sequence initiated by setting *program one shot* toggle 2200 to the unit condition.

*Entry* toggle 2600 is reset to the naught condition in response to a clear *buffer register areas* $B_1$–$B_3$ potential on lead 2606 applied through *and* gate 2607, which potential is developed in and available from the sequencing circuit (FIGURE 29) on lead 2934, in the case of an entry command, *internal transfer* or *type out*, during the *arm go* sequence initiated in response to the setting of the *program one shot* toggle 2200 to the unit condition.

Other output signals produced by gating circuits shown in FIGURE 26 include *T/W digit depression* on lead 2610 when a potential is present on any T/W code lead from FIGURE 7; an *energize error relay* potential on lead 2612 when a typewriter entry is programmed as a 12th order and a *T/W digit key depression* is detected through *and* gates 2614 and 2616 or when a *decimal point key* potential on lead 2618 is present, along with an *enable input* potential 2620 and the program card is not punched in both the 4 order and 8 order positions through *and* gate 2622; a *decimal space* potential on lead 2624, but which is not programmed in the illustrated system; and a *carriage return lock* potential on lead 2626 from *and* gate 2628 when there is no error, the *entry* toggle is in its unit condition, and the *enable input* potential is present on lead 2620.

*Register toggles circuit*

A register toggles circuit 227 (FIGURES 5b and 27) comprises input and output gating and toggles 2700, 2701, 2702, 2703, 2704, 2705, 2706, 2707, 2708 which are designated A, B, C, D, E+, E—, F— and Prod ($P_2$) and correspond respectively to the word register areas on the disk 204 (FIGURES 5a and 10a) having the same letter designation. During the period that a plural digit value is recorded on a word register area or reproduced from a word register area a corresponding one of the toggles is set to the unit condition. Otherwise, these toggles are in their zero condition.

A potential applied through an *entry* command hole in the program card of FIGURE 3b overlying a conducting strip 105 (FIGURE 3a) is coupled to input gating composed of *and* gates 2710, 2711, 2712, 2713, 2714, 2715, 2716, 2717, and 2718 for setting the corresponding toggle to the unit condition. All values that are recorded on the accumulator register areas A-F, and $P_2$ have been previously reproduced and transferred from the buffer storage register areas $B_1$-$B_3$ in response to an instruction calling for a transfer. To avoid going through such a transfer sequence in response to a corresponding instruction each time the carriage enters the position containing the instruction, *entry* toggle 2600 (more fully discussed and just described in the preceding section) is normally set to the unit condition after a usable value is recorded on the buffer storage register areas $B_1$-$B_3$. A potential corresponding to the unit condition of the *entry* toggle is coupled by lead 2750 (top of FIGURE 27a) to *and* gate 2721 so that with the *calculate* relay of FIGURE 6, energized and a potential on (program one shot) $\overline{(seek\ B)}$ $\overline{(go)}$ lead 2751, a *set entry toggles* potential is generated on lead 2752. Lead 2752 is also connected to each of *and* gates 2710-2718 to the unit inputs of the register toggles A-F and Prod. One or more register toggles, as selected by *entry* command holes in the program card of FIGURE 3b, are set to the unit condition. Consequently, unless a value has been recorded on the buffer storage register areas $B_1$-$B_3$, which recording is indicated by the unit condition of the *entry* toggle 2600, the accumulator register toggles cannot be set.

The accumulator register toggles A-F and Prod. may also be set to the unit condition whenever an instruction calls for an *internal transfer* or *type out*. A potential applied over any one of six conducting strips 105 (FIGURE 3a) corresponding to *select* A through D or *transfer* E, F, or Prod. commands is applied through input gating for setting the selected toggle to the unit condition so that a value may be reproduced from the selected register area. These potentials are applied through *select* and *transfer* command holes adjacent strips 18-21 or 23-25 of the program card of FIGURE 3b by leads having corresponding labels in FIGURES 27a and 27b to *select and* gates 2722, 2723, 2724, 2725 (FIGURE 27) associated with toggles A-D and *transfer and* gates 2727, 2728, and 2729 associated with toggles E+, F+, Prod. and to special select D register through *and* gate 27276 on special total for partially enabling the gating arrangement so that in response to setting the *program one shot* toggle of FIGURE 22 to the unit condition for initiating the *arm go* sequence, a potential corresponding to the portion of the *arm go* sequence designated *clear buffer register areas $B_1$-$B_3$* is applied on lead 2754 through *and* gates 2730 or 2731 to enable a *select* or *transfer* gate.

In response to the next pre-index clock pulse on lead 2756, the register toggle corresponding to the command is set to the unit condition. Potentials are available at the several output terminals on FIGURES 27b corresponding to the unit condition of the register toggles is coupled to the sequencing circuit (FIGURE 29) and to the multiplier counter 217 (FIGURES 5 and 18) for initiating an *internal transfer* operation. In response to predetermined conditions of the digit counter and the word counter at the end of the *internal transfer* or *type out* operation, a potential *register tog.→0* on lead 2758 is applied to *and* gates 2732-2739 to reset any A-F register toggle. The product toggle is also reset to naught in a similar manner with the level *prod. tog.→0*.

The input gating to the D register toggle 2703 is arranged so that a program may be written during which toggle 2703 is set to the unit condition for reproduction of a value from the D register in response to actuation of the *special total* key 409 (FIGURE 4a) and actuation of associated contacts 682 (FIGURE 6a) when the typewriter is in a carriage position in which a *special select* D command on strip 22 of FIGURE 3 is programmed, such as by hole 322 in the program card of FIGURE 3b.

Figure 27B:
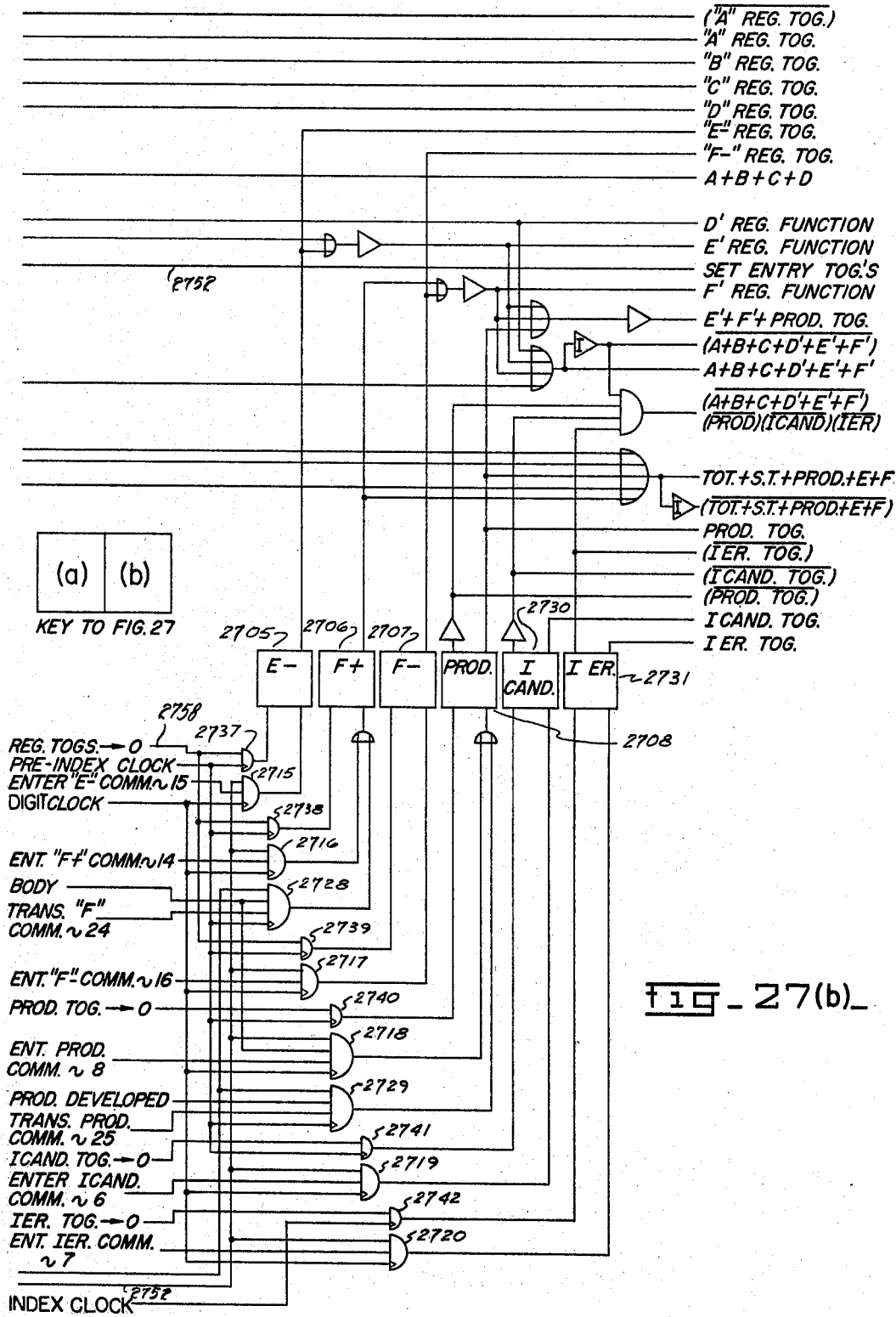

The "E—" and "F—" toggles 2705 and 2707 on FIGURE 27b are used for recording values negatively on the register areas E and F. These toggles are useful when an instruction calls for adding or subtracting a value from a first register area and then oppositely subtracting or adding a value to a second register area. For example, an instruction may be programmed which calls for addition of a value in the buffer register areas $B_1$-$B_3$ to the value recorded in the accumulator register area B as well as subtraction of the value in the buffer register areas $B_1$-$B_3$ from a value in register area E. In such a case, both operations are completed during a single revolution of the memory during the accumulate portion of the arm go sequence. In any case, whenever the system otherwise calls for an addition during one part of an instruction, a subtraction occurs with an E— or F— command programmed during another part of the instruction, or if the system otherwise calls for a subtraction then an addition occurs. The utility of these registers is shown in the invoice of FIGURE 2 where the quantity back-ordered is obtained automatically through use of the E register. For example, in the first item the quantity ordered (55) is typed in columns 11 and 12 of the referenced invoice and then when the typewriter escapes into column 13, the value is entered into the E register positively by means of the hole 3XE over strip 13. Following this, the typewriter tabulates automatically to column 19 where the quantity shipped (50) is typed. As the typewriter escapes from column 20 after the second digit is typed, the program contacts encounter at column 21 a hole over strip 15, the Enter "E—" command. Since the quantity shipped is accumulated in the E register negatively, the difference (55–50) is re-entered in the E register. From column 21 the typewriter tabulates automatically (by virtue of the hole 3XF over strip 26) to column 23 where the command "Transfer E," in the form of the hole 3XG over conducting strip 23, is encountered. The contents of the E register are then typed out (note corresponding elongated hole over strip 5) resulting in the difference (5) being printed on the first line in column 27. The fourth item in this invoice being a return-for-credit item, the *minus* key 404 is depressed and the quantity ordered (200) is entered negatively into the E register and the same value is typed in the quantity shipped field. The entry of the latter into the E register will be effected positively, however, because of algebraic multiplication of the two negative commands, "*Minus*" and "*Enter E—*." The difference in the quantities is 0, of course, and therefore the carriage is automatically spaced through the quantity back-ordered field for this line item. For purposes of providing an audit trail, minus signs are typed automatically by means of holes 3XH over conducting strip 5 in columns 13 and 21.

A *multiplicand* register toggle 2730 and a *multiplier* toggle 2731 are included in the register toggles circuit on FIGURE 27b. *Multiplicand* register toggle 2730 is operated in the same manner as are toggles A-F and Prod. for recording values on the *multiplicand* register area $M_1$–$M_3$. The output *Ier* toggle 2731 is applied as a control potential in the sequencing circuit of FIGURE 29, and is used to indicate that a multiplication operation is to take place.

*Icand* and *Ier* toggles 2730 and 2731 are reset by *Icand tog.→0* potential generated on lead 2949 and by *Ier tog.→0* potential generated on lead 2948 of the gating circuit of FIGURE 29.

Multiplier counter general

A multiplier counter 217 (FIGURES 5a and 28) comprises input gating, four toggles 2800, 2801, 2802, 2803 (FIGURE 28c) coded 1, 2, 4, 8, respectively, and output gating. The multiplying functions of this system are used only at certain positions of the typewriter carriage and hence this counting circuit is available and in this system is used for certain other functions which will first be described.

The first of these functions to be described is the reset operation when the reset and clear keys 401 and 402 (FIGURE 4) respectively are actuated to thereby clear the memory unit. Its second distinct function occurs during a typewriter output sequence or an internal transfer sequence. The third distinct function is used during the multiplication operation at which time it is set to a digital value equal to the digits of the multiplier and counted down as the multiplicand is added into the product registers a number of times equal to the digital value in the multiplier. Each of these functions is discussed in separate sections below.

(a) *Multiplier counter—reset operation.*—The multiplier counter of FIGURE 28 is arranged for resetting various toggles and clearing of all desired register areas on the memory unit of FIGURE 10 such as would be done at the beginning of an invoicing operation. This operation is initiated in response to simultaneous actuation of the reset key 401 and the clear key 402 (FIGURE 4a) and the sequence of the operation is controlled according to successive condition of the multiplier counter.

In response to depression of the reset and clear keys, a *reset & clear* potential is coupled on lead 2850 (FIGURE 28b) to the toggles 2800, 2801, 2802, 2803 (FIGURE 28c) through respective *and* gates 2819, 2820, 2821, 2822 (FIGURE 28d) so that the multiplier counter is set to fifteen (1111) when a *digit* clock pulse on lead 2840 is received.

Upon release of the *reset & clear* keys, a count down potential is generated on lead 2866 (FIGURE 28a) at the output of *or* gate 2816 from *and* gate 2823 to the *count down and* gates 2808-2814 which are connected to respective toggles 2800-2803 so that the multiplier counter is counted down to fourteen in response to the next index level on lead 2851 and *digit* clock on lead 2840 (FIGURE 28b). The *index level* is in the form of a pulse, as explained above, in connection with the clock pulse distributor of FIGURE 11, occurring once each revolution of the memory unit at index time for the time duration that *index* toggle 1106 is in its unit condition.

During the time that the *reset & clear keys* 401 and 402 are depressed, the multiplier counter is held at a count of fifteen, and upon release of keys 401 and 402, the count is reduced to fourteen at index time. During the time the multiplier counter indicates 15 or 14, unit potentials from the (4) and (8) toggles 2802, 2803 (FIGURE 28c) are coupled through *and* gate 2827 and together with the potential from the units lead of (2) toggle 2801 through *and* gate 2824, for generation of a *clear toggles* cycle potential on lead 2852. This gating potential is applied to other portions of the system for resetting to the desired condition, all toggles that are not self correcting which toggles are more fully discussed hereinafter.

At the beginning of the next revolution of the resetting sequence, the multiplier counter toggles 2800 to 2803 are counted down to thirteen in response to the corresponding *index* level on lead 2851 of FIGURE 28a. With the multiplier counter in this condition, a *half cent round off cycle* potential is generated on lead 2854 at the output terminal of *and* gate 2826. The *half cent round off cycle* potential on lead 2853 is transmitted to the recording circuit for energizing *or* gate 1302 (FIGURE 13) for controlling recording head $W_2$ to record a zero in each digit position of each register area of the information track 206 (FIGURES 5a and 10a). The *half cent round off cycle* potential on lead 2854 is also coupled to lead 881 of buffer storage (FIGURE 8a) and through *or* gate 830 to *and* gates 831, 832, 833, 834 (FIGURES 8b and c). With the next *quarter* clock pulse on lead 882, *buffer storage* toggles 800-803 are set to indicate the digit "5."

In response to the next *index* level on lead 2851 (FIGURE 28a) at the beginning of the third revolution, the multiplier counter is counted down to twelve. During the third revolution, corresponding to a count of twelve, a *clear memory* cycle is generated at output terminal of *and* gate 2828 (FIGURE 28c) for gating write head $W_1$ (FIGURE 13) to record zeros in all orders of each register area of the information track 205 (FIGURE 5), except that the digit "5" previously recorded in the *buffer storage* toggles 800-803 is now transferred to the recording circuit of FIGURE 13 and gated to be recorded on the twelfth order digit area of word register area $P_1$ by write head $W_1$, see FIGURE $10a_2$. (This is the only instance in the system as programmed where a new digit value is entered fresh from the *buffer storage* toggles 800-803 to the memory disk in any position other than buffer storage areas $B_1$, $B_2$ and $B_3$.)

The reason for recording 5 in the twelfth order digit area of register area $P_1$ is that as final products are recorded in the register area $P_2$, the products are rounded off to the nearest half cent. For example, in the third item of the sample invoice of FIGURE 2, the system may be programmed so that the gross amount 1248.48 is multiplied by the discount 10% to produce 000000124.848. However, with a 5 recorded in the twelfth order of the register area $P_2$ during the resetting operation, the 8 in the third order to the right of the decimal point and the 5 added together to generate a carry to the cents order, so that when the value 0000000124.85 is subtracted from the gross amount of 1248.48, the correct net amount 1123.63, rounded off to the nearest cent, is provided.

The step of recording a 5 in the 12th digit area of product register $P_1$ is also effected after each multiplication operation when the product is removed from the product register area $P_2$ by another circuit described below.

In response to the next 12 *index* levels received on lead 2851, the multiplier counter of FIGURE 28 is counted down to zero during which time after the multiplier counter is counted down to zero, it remains in this condition until an internal transfer or type out operation, discussed next, or a multiplication operation or another resetting operation is programmed to be carried out.

(b) *Multiplier counter—internal transfer and type-out operations.*—The multiplier counter 217 (FIGURES 2a and 28) is also arranged, as summarized above, for sequencing certain operations in response to corresponding program unit instructions, which operations include automatic *type out* of values reproduced from a register area, such as automatic typing of a gross amount reproduced from the product primary register area $P_2$, or *internal transfer* of a value from a first register area to a second register area, which may occur either independently of or concurrently with type out, such as a transfer of a gross amount value from the product primary register area $P_2$ to the buffer register area $B_1$, $B_2$ and $B_3$ and then, for example to register area "B."

In either event, the first operation that takes place is to set the multiplier counter to a count of 2 meaning toggle 2801 is set to its unit condition through *and* gate 2817. This can only occur when *and* gate 2830 (FIGURE 28*a*) produces an output potential which occurs at a time when a *"0" in mult. count.* potential is present on lead 2844. Thus, the other toggles 2800, 2802, 2803 of the multiplier counter need not be disturbed. The enabling potential from *and* gate 2830 requires also a potential on *output mode* lead 2855, and also a (type now) potential on lead 2857. There are the additional inputs to *and* gate 2817 of *"0" in digit cnt.* potential on lead 2858, a (symbol tog.) potential on lead 2856 and an *index clock* pulse on lead 2841.

At this point, the *complement* cycle potential on lead 2842 (FIGURE 28*a*) is provided by *and* gate 2829 (FIGURE 28*a*) which has as inputs *output mode* on lead 2855, (type now) on lead 2857 and the unit output from the "2" toggle 2801, and is applied as an input potential to buffer storage (FIGURE 8*a*) on lead 892 to cause the value in the selected word register (such as registers A, B, C, $P_2$ or D of track 206 of the memory disk, FIGURES 5*a* and 10*a*) to be read out and subtracted from zero in the adder-subtractor of FIGURE 18 to thus provide the complement. The complement is recorded in the associated transfer word register area $T_1$, $T_2$, $T_3$, $S_2$ or $T_4$, respectively, so that both the original value and complemented value are available.

At the time of the next *index level* potential on lead 2851 and concomitant *digit* clock pulse on lead 2840, the multiplier counter is counted down to 1 by the respective output signals from *and* gates 2810 and 2809 to toggles 2801 and 2800. The *retrieve output digit* potential on lead 2843 (FIGURE 28*c*) is applied to lead 1941 of the head gating circuit (FIGURE 19*b*) to retrieve the digit in the 11th digit area of the original, uncomplemented value, and to supply it to buffer storage toggles 800–803.

If the digit is zero, the complemented value is discarded; if the digit is not zero, then the ("0" in buff. storage) on lead 882 of FIGURE 8*a* is applied to *and* gate 2008 in FIGURE 20 to provide a *neg. sign detected* signal on lead 2010 which is applied to *and* gate 2009 and along with *pre-index clock* pulse on lead 2011 to thereby cause *complement* toggle 2002 to be set. *Neg. sign detected* is also applied to the clear buffer *or* gate of FIGURE 8*a* to thus clear the *buffer storage* toggles 800–805 to zero immediately after detecting a complemented quantity.

Returning now to the multiplier counter of FIGURE 28, on the next index pulse from lead 2841, the counter counts down to zero, at which time a *digit to buffer register areas* $B_1$–$B_3$ potential on lead 2878 (FIGURE 28*c*) is provided from *and* gate 2880 (FIGURE 28*a*). This potential is applied to lead 1954 (near bottom of FIGURE 19*b*) to cause the number in *buffer storage* toggles 800–803 (in this case a zero) to be transferred to buffer register areas $B_1$–$B_3$. If the *complement* toggle 2002 is set, then the complemented value is typed out or transferred as the real value; otherwise the original value is used. The real value is then stored in buffer registers $B_1$, $B_2$ and $B_3$, whether or not it is typed out.

Thus summarizing, in response to three successive index level potentials on lead 2851 corresponding to three revolutions of the disk, the toggles are counted down from two to zero, i.e., 2, 1, 0. Each of the conditions (2, 1, 0) of the multiplier counter corresponds to an operation of the preliminary sequence used in both *internal transfer* and *type out* operations. During the count of "2," the value in the register is complemented and stored in a transfer register; during the count of "1," the digit in the 11th digit area is checked to determine the sign of the value and whether the original or complemented value is to be further used; and during the count of "0," a zero value is transferred to the 11th digit area of buffer registers $B_1$ to $B_3$."

For example, type out of the gross amount (157.50) of the second item of the sample invoice of FIGURE 2 is initiated in response to a *transfer product* instruction in program card of FIGURE 3*b* in the form of hole 346 corresponding to carriage position 65 to the left of the gross amount field on the invoice sheet of FIGURE 2. In response to this instruction and an *index clock* potential on lead 2841 (FIGURE 28*b*) the multiplier counter is set to two and a *complement cycle* potential is generated by *and* gate 2829 (FIGURE 28*a*) to be available on lead 2842 of FIGURE 28*c*. As explained in the following section, at the end of each multiplication of price by quantity, the product or gross amount is recorded in the register area $P_2$ of the disk (FIGURES 5*c* and 10*a*). During the first revolution of the disk 204 after the multiplier counter is set to two, and in response to this condition of the multiplier counter, the value 000000157.50 is reproduced from the register area $P_2$ in the head $R_2$ during the first quarter position of the memory unit, complemented (i.e., subtracted from zero) in the adder-subtractor, and recorded by head $W_1$ in word register area $S_2$.

In response to the *index* level potential on lead 2851 at the beginning of the second revolution, the multiplier counter is set to one and a *retrieve output digit* potential is generated by *and* gate 2832 (FIGURE 28*a*) to be available on lead 2843 of FIGURE 28*c*. In response to the condition of the multiplier counter during the second revolution, the highest order digit (eleventh order digit area) is reproduced from the register area $P_2$ and transferred to buffer storage toggles 800–803. Since the value 157.50 of the example has a zero in the eleventh order, a signal *"0" in buff. stor.* (see FIGURE 8*a*) is transmitted to other portions of the system for controlling the subsequent reproduction of the value (157.50) contained in the register area $P_2$ during type out.

In response to the next index level potential on lead 2851 at the beginning of the third revolution, the multiplier counter is set to zero so that a *"0" in multiplier counter* potential is generated on lead 2844 of FIGURE 28*c*, in response to which the 11th order digit value 0 is recorded in the buffer register areas $B_1$–$B_3$.

To complete an internal transfer sequence following transfer of a "0" to the 11th digit area of the buffer register $B_1$–$B_3$, the remaining digits are taken from the register where the real value is stored (which depends on the setting of the complement toggle 2002, as mentioned previously) and these digits are also transferred to buffer storage register $B_1$–$B_3$, one digit at a time in decreasing significant order, as the multiplier counter is set successively to a "1" after each counted down to "0."

To produce the foregoing sequence, potentials corresponding to an *internal transfer* instruction are applied through other portions of the system to gates 2830 (FIGURE 28*a*) and 2831 (FIGURE 28*d*) for setting the toggle 2800 to the unit condition. The multiplier counter 2800–2803 is counted down to zero as each of the various digits is transferred from the selected register area to buffer register areas $B_1$–$B_3$.

For a *type out* sequence, the first step as explained above, involves setting the multiplier counter of FIGURE 28 to "2" for complementing the value to be typed out, then counting down to "1" for determining whether the original value or complement is the real value, and then counting down to "0" in the multiplier counter which transfers a zero digit value to the eleventh digit area of buffer register area $B_1$–$B_3$ and causes the multiplier counter to be set to "4" by an input to *and* gate 2818 (FIGURE 28*d*) from gate 2833 (FIGURE 28*a*). The input to *and* gate 2833 for setting the multiplier counter to "4" requires *"0" in mult. cnt.* on lead 2844, a *type now* potential on lead 2860 (FIGURE 28*a*) and an *output mode* potential on lead 2855. *And* gate 2818 requires either the combination of *basket shifted contact* potential on lead 2862 (FIGURE 28b) and *symbol* toggle on lead 2864 or (symbol tog) potential on lead 2856 as an input on lead 2866; the *strobe toggle* potential from lead 2870 (FIGURE 28b); and an *index clock* pulse on lead 2841.

The *type out* sequence is initiated in response to a "4" *in multiplier counter* potential generated on lead 2845 of FIGURE 28c. When the multiplier counter is in its "4" count, usually the typewriter solenoid is actuated to type out the digit already set in buffer storage toggles 800–803, however, the sign digit is not typed and a typewriter solenoid is not energized therefore until the digit from the tenth and lower order digit areas are processed through buffer storage toggle 800–803.

The *strobe* toggle (FIGURE 23) is reset to zero by "4" *in the multiplier counter* potential on lead 2336, *type now* potential on lead 2337 from *type now* toggle 3100 (see FIGURE 31) and *buffered output mode* potential on lead 2339 from lead 2950 of FIGURE 29 to thereby prevent the multiplier counter from being set again to "4" to initiate a type out sequence until the typewriter carriage has advanced.

A *prepare to type* potential is provided on lead 2870 (FIGURE 28c) from *and* gate 2834 (FIGURE 28a) when the *type now* potential on lead 2860, an *output mode* or *symbol toggle* potential is present on lead 2872 and the multiplier counter has a count of either "4" or "0." The *type signal* potential on lead 2874 is produced by *and* gate 2876 only when there is ("0" in mult. cntr.) and the *prepare to type* potential on lead 2870 is present. Therefore, the *type signal* potential on lead 2874 is provided only when the multiplier counter is set to a count of "4."

(c) *Multiplication operation.*—As an example of a multiplication operation, the quantity shipped 50 of the first item of the sample invoice of FIGURE 2 is multiplied by the price 43.50 to produce the gross amount 2175.00. To start the operation, the multiplicand (the quantity 50) is typed, and automatically entered into the No. 8 and 7 digit areas of buffer register areas $B_1$–$B_3$ in the manner discussed hereinbefore. This, in effect, places the decimal point to the right of the No. 7 digit area leaving six digit areas to the right of the decimal point.

The system is arranged so that in carriage position 21 following entry of the lowest order digit, an instruction comprising an *enter multiplicand* command hole 334 (FIGURE 3b) is effective for initiating transfer of the multiplicand from the buffer register area $B_3$ to the multiplicand register area $M_3$. Such a transfer is accomplished during the first quarter position of the memory disk when register area $B_3$ is passing reproducing head $R_3$, during which period the value entered in register area $B_3$ is transmitted through the adder-subtractor 202 (see FIGURE 5a) where it is added to zero, through buffer storage 201 which serves as a digit delay unit, and on to the recording circuit 209 recording head $W_2$ for recording in the transfer register area $T_3$. During the next rotation of the register area $T_3$ past the head $R_3$ (i.e., during the fourth quarter position as shown in FIGURE 10f), the multiplicand is transferred from the register area $T_3$ to the multiplicand register area $M_3$ through the same circuits discussed above. Before entry of the next value in the typewriter, register areas $B_1$–$B_3$ are cleared by recording zero in all orders.

After entry of the lowest order digit of the multiplicand (zero), the typewriter carriage is automatically tabbed by hole 3XF in the program card of FIGURE 3b to a tab stop position such as at carriage position 23 where other operations not pertinent to multiplication occur.

The next step of the multiplication operation includes typing the multiplier (the price, 43.50) in the price column and thereby recording it in the No. 5, 4, 3 and 2 digit areas on each of the register area $B_1$–$B_3$. The automatic decimal point program carriage position 60 causes the typing of a decimal point in the column to the right of the No. 4 digit area leaving three digit areas to the right of the decimal point.

After entry of the lowest order digit of the multiplier at carriage position 62, the typewriter carriage is spaced through carriage position 63 to carriage position 64 in which position an instruction comprising an *enter Ier* command (hole 316 of the program card of FIGURE 3) is effective for initiating multiplication unless the "/c" or "/m" keys are to be depressed to indicate the unit price is per hundred or per thousand respectively, in which case the appropriate symbol is entered in carriage position 63.

In response to the *enter Ier* instruction, other portions of the system are sequenced for shifting the multiplicand nine bit areas within the multiplicand register areas $M_1$–$M_3$ in the direction of rotation of the disk, which shifting is discussed in detail below. As each register area $B_1$–$B_3$ is comprised of eleven digit areas for storing a value and as the value 43.50 is recorded in the No. 5, 4, 3 and 2 digit areas, zeros are recorded on the six higher order digit areas as well as the twelfth order as a result of the prior clearing. After the initial nine shifts of the multiplicand into the $M_2$ register, the digit of the multiplier digit stored in the No. 11 area is reproduced from the register area $B_1$ of memory disk 204 (FIGURE 5a) and is first transferred through the adder-subtractor to the buffer storage toggles 800, 801, 802, 803 (FIGURE 8d) so that corresponding potentials appear at respective outputs $X_{16}$, $X_{15}$, $X_{14}$, $X_{13}$, which outputs are applied to $X_{16}$, $X_{15}$, $X_{14}$, $X_{13}$ inputs of FIGURE 28b and coupled through gates 2804, 2805, 2806, 2807 (FIGURE 28d) at predetermined times under control of a potential on *transfer Ier digit* lead 2865 (FIGURE 28b) and *digit clock* pulse on lead 2840 (FIGURE 28b) to the toggles 2800, 2801, 2802, 2803 (FIGURE 28c) for counting down or reducing by one the digit represented by the toggles. Such a count down occurs with an output potential on lead 2866 from *or* gate 2816 of FIGURE 28a through *and* gates 2808, 2809, 2810, 2811, 2812, 2813, and 2814 on FIGURE 28d. The count down potential is provided by *and* gates 2815 (FIGURE 28a when the *successive accumulate toggle* (FIGURE 30) is set at the beginning of the third and first quarter revolution positions of the memory unit (see FIGURES 10e and 10c).

The value of the multiplier digit represented by the multiplier counter is reduced by one by the output from *and* gate 2815 each time the multiplicand is added to the value in either of product registers $P_1$–$P_3$ or $S_1$–$S_3$. When the multiplier counter is counted down to zero, or when the value entered into the multiplier counter is initially zero (such as the highest order multiplier digit of the example), potentials from the multiplier counter toggles 2800, 2801, 2802, 2803 (FIGURE 28) representing this condition of the toggles are applied to the output gating arrangement for generation of a corresponding potential "0" *in multiplier counter* at output lead 2844. In response to this potential, the system is sequenced so that the multiplicand is shifted one further digit area position in the direction of rotation of the disk to be mathematically shifted one order to the right, and the next lower order decimal digit of the multiplier is transferred from the buffer register $B_1$ through buffer storage toggles 800–803 to the multiplier counter.

In the example, after entry of the higher order zeros and corresponding shifting, the most significant digit of the multiplicand will have shifted once for each zero in the 11, 10, 9, 8, 7 and 6 digit areas of the multiplier when the first non-zero multiplier digit (4 of the example) is entered to set the multiplier counter to 4. In response thereto, the system is controlled for successively adding the multiplicand value of 00050.000000 to the value in the product primary register $P_1$–$P_3$ (zero except for the half cent round off) four times.

To accomplish the successive additions, the system is arranged so that partial sums are stored in the product primary register areas $P_1$–$P_3$ (FIGURES 5a and 10a) and the product secondary register areas $S_1$–$S_3$. In carrying out the first successive addition, all orders of the multiplicand register areas $M_1$–$M_3$, which are zeros as a result of the prior clearing except for the multiplicand (50), are reproduced by read head $R_4$ and transmitted through the reproducing circuit 210 to the adder-subtractor 202. At the same time, the values in all orders of the product primary register areas $P_1$–$P_3$, all zero at the beginning of multiplication (except for the half cent round off) are reproduced by read head $R_2$ and transmitted through the reproducing circuit to the adder-subtractor. The values from the multiplicand $M_1$–$M_3$ and the product primary $P_1$–$P_3$ register areas are therefore serially added bit-by-bit in the manner previously described. Each resulting decimal digit is held in buffer storage of FIGURE 8 for correction, where necessary as previously described, and then transferred to the recording circuit for recording by write head $W_1$ in the order of the product secondary register areas $S_1$–$S_3$ corresponding to the digit area orders in the multiplicand and product primary register areas from which the original digits were reproduced.

To continue the multiplication process, a second addition process occurs during the third quarter position (see FIGURE 10e) as the product secondary register areas $S_1$–$S_3$ are rotated past read head $R_2$ and multiplicand register areas $M_1$–$M_3$ are rotated past read head $R_3$, during which period the respective values in the register areas are reproduced, added as before in the adder-subtractor and stored in the buffer storage toggles of FIGURE 8 and then recorded, this time in the product primary register $P_1$–$P_3$ by write head $W_1$.

The foregoing cycles of addition continue until the multiplier digit (four of the example) in the multiplier buffer of FIGURE 28d is counted down to zero, at which time the sum of the additions, i.e., the first partial product, is recorded in the product primary register areas $P_1$–$P_3$.

Before the next lower order successive additions are carried out, the multiplicand (50) is again shifted one decimal order further to the right within the register areas $M_1$–$M_3$ so that the next additions are made in the proper orders. During shifting of the multiplicand, the multiplicand is temporarily stored in the transfer register areas $T_1$–$T_3$. To carry out the shift, the multiplicand is reproduced by the head $R_4$, transferred through the reproducing circuit 210 directly to the recording circuit 209, bypassing the adder-subtractor and buffer storage, for recording by the head $W_2$ into the transfer register areas $T_1$–$T_3$. Since the head $W_2$ is angularly displaced from the quarter position one decimal digit area in the direction of rotation of the disk, each digit reproduced from the multiplicand register areas is recorded in the next digit area in the direction of rotation, i.e, the next lower order of the transfer register areas $T_1$–$T_3$. The multiplicand is thus mathematically shifted one decimal order to the right. The shifted multiplicand is reproduced from the transfer register areas $T_1$–$T_3$ by the head $R_3$, transmitted to the adder-subtractor for addition with zeros, through buffer storage of FIGURE 8 (where it is normally delayed, as mentioned previously) then transferred through the recording circuit 209 to write head $W_2$ for recording in the corresponding orders of the multiplicand register areas $M_1$–$M_3$. The multiplicand therefore has been shifted to the next lower order of the multiplicand register and is ready for successive additions to the first partial product.

The next lower order multiplier digit of the example 43.50 is a 3 and is transferred to the multiplier counter of FIGURE 28c for counting down in the manner described. Since the highest order multiplier digit which was a 4 is an even number, the first partial product was finally recorded at the end of the first set of successive additions in the product primary register areas $P_1$–$P_3$. However, in the case of an odd multiplier digit, such as the digit 3, the corresponding partial product is recorded in the product secondary register areas $S_1$–$S_3$ at the end of the additions.

To start each set of successive additions in the same manner, the system is arranged so that each partial product is always transferred to the product primary register areas $P_1$–$P_3$ before the next lower order set of successive additions occur. This is accomplished, in the case of an odd multiplier digit, by blocking the reproduction of the multiplicand during the last half revolution of the disk 204 in response to sensing that the multiplier counter is counted down to zero. Thus, during the last half revolution of the disk before the next successive additions occur and before the next lower order multiplier digit is transferred to the multiplier counter, the value in the product secondary register areas is transferred through the adder-subtractor, added to zeros (since reproduction of the multiplicand is blocked), and recorded in the product primary register areas $P_1$–$P_3$.

The partial products, therefore, are always in the register areas $P_1$–$P_3$ at the end of each set of successive additions ready for the next lower order additions.

After the multiplier counter of FIGURE 28c is counted down to zero, the multiplicand in word register areas $M_1$–$M_3$ is shifted, as before, one order to the right, the next lower order multiplier digit (five of the example) is reproduced and transferred to the multiplier counter of FIGURE 28, and addition of the shifted multiplicand to the value in product register $P_1$–$P_3$ is initiated for five successive additions in the manner described. These additions and shifts continue for each multiplier digit until all of the multiplier digits have been transferred to the multiplier counter and counted down to zero, and the product is recorded in the product primary register areas $P_1$–$P_3$.

The product (the gross amount, 2175.00) may be transferred to an accumulator register area C and added with the value, if any, already stored therein to be available as a total, and as discussed hereinafter, automatically typed as shown in the sample invoice of FIGURE 2.

The system may also be programmed so that successive final products are accumulated in the register areas $P_1$–$P_3$, i.e., partial products of successive additions are added to the final preceding products, which accumulated final products may be reproduced from the register areas $P_1$–$P_3$ and printed at the typewriter.

Further, the system may be programmed so that the same multiplicand can be used in a succession of multiplications. In "foot" mode, for example, a sub-total can be multiplied by more than one factor. It is also possible to retain a constant multiplicand in a line entry such as, for example, where the quantity is to be multiplied by both a list price and a net (or cost) price. An example of the former is shown in the sample invoice in FIGURE 2. Here it is noted under the heading "Sales Tax" that both a state tax of 4% and a city tax of ½% have been applied to the sub-total 2,509.04. After automatic type-out of the sub-total symbol (described in detail subsequently) in carriage position 99, entry of the sub-total into the Icand and B registers occurs upon sensing of the appropriate commands through holes 3XJ and 3XK, respectively, in column 100. It will be recalled from the previous description that after an entry to one or more registers the quantity in the register areas $B_1$–$B_2$ is cleared by a recording of "0" in all orders of the inner track. This clearance also applies to the temporary storage registers, therefore, but as seen from FIGURE 19e does not apply to the Icand register because the gating circuit to the write head 2 controls includes an and gate with two inputs: "Clear buffer register areas $B_1$–$B_3$" and "$\overline{\text{Fourth Quarter}}$." The absence of the latter input prevents gating of write head $W_2$ controls during the fourth quarter, the period corresponding to passage of the Icand register under write-head $W_2$.

After completion of the clearance cycle, the *automatic carriage return* function (hole 320 in column 100, FIG- URE $3b_2$) is permitted to occur. The system now being in "foot" mode, special automatic tabulation holes 301 in columns 11, 19 and 23 are now effective and the carriage moves automatically to position 30 in the description field, where the operator types the entries "Sales Tax" and "State," and depresses the tabulation key. By means of additional special automatic tabulation holes 301 in columns 58 and 65, the carriage moves past the price and gross amount fields to position 81 at the start of the discount percent field. When the state tax 4.0 is typed in this field, escapement of the typewriter carriage into position 85 closes the circuit to strip #7, the "Enter Ier" command, through hole 340. This effects a multiplication, using the sub-total as multiplicand and resulting in the product 100.38 being typed out in the net amount column. After the last digit of the product is typed out, the typewriter carriage escapes into position 99. This time, since a product was developed instead of a sub-total taken, there is no printing of a symbol with the result that entry of this product into the B register (by virtue of the hole 3XK over conducting strip 10) and the carriage return (through hole 320) are both effected in column 99. The carriage return from position 99 prevents the previous product 100.38 from being entered into the Icand (since hole 3XJ is in column 100, as stated above) and thereby displacing the value 2,509.54. Again, special automatic tabulation holes 301 causes tabbing of the carriage from the margin to position 30 in the description field, where the "City" entry is typed by the operator as she applied the second sales tax. This latter is also entered in the discount percent field after the carriage is carried to position 81 in that field by the additional special automatic tabulation holes 301 previously mentioned. After the 5 in the ½% tax rate has been typed, the carriage escapes to position 85 where the "Enter Ier" command hole 340 again initiates a multiplaction which develops the product 12.55 using the same multiplicand as previously, namely the sub-total 2,509.54, without requiring special action on the part of the operator.

*Successive accumulate circuit*

A successive accumulate circuit (FIGURE 30) comprises a *successive accumulate* toggle 3000 and input *and* gates 3002 and 3004. The output on leads 3006 and 3008 is used for controlling other portions of the system to carry out a multiplication operation by successive additions, or subtractions, of the multiplicand to the value in the product primary or secondary registers $P_1$–$P_3$ and $S_1$–$S_3$ respectively of the memory unit.

To set *successive accumulate* toggle 3000, the *Icand shift mode* potential on lead 3010 must be provided along with "*1*" *in the word counter* and ($\overline{"0"}$ $\overline{in}$ $\overline{the}$ $\overline{digit}$ $\overline{counter}$) and a *pre-index* clock. The *Icand shift mode* potential is provided from lead 2936 (see FIGURE 29b) when the *Ier* toggle of FIGURE 27 is set and the other potentials apparent from FIGURE 29a are present. *Ier* toggle 2731 is set by *enter Ier* command on the No. 7 strip of the program panel and the other potentials required are *arm* and *go* plus potentials indicating that none of the register toggles, product toggle or Icand toggle is set. Coincidence between "*1*" *in the word* counter of FIGURE 17 and *pre-index* time when there is ($\overline{"0"}$ $\overline{in}$ $\overline{digit}$ $\overline{counter}$) is delayed by a time corresponding to that required for the initial Icand shift of 9 positions, or of 11 or 12 position shift if the %/c or /m toggles respectively of FIGURE 33 are set. Thus the setting of *successive accumulate* toggle 3000 is delayed until the initial Icand shift operation is completed.

The output potential *successive accum. tog.* on lead 3006 is applied as an input to the sequencing circuit of FIGURE 29 on lead 2938 to produce the *successive accum. mode* potential on lead 2950 of FIGURE 29b. This later potential is used in the head gating circuit (see lead 1956 at the middle of sheet 19b) with the *1st*  *quarter* potential on lead 1936 as the input to *and* gate 1922, the output of which is applied to *and* gates 1911 and 1925 on FIGURE 19d and to *and* gates 1926 and 1928 on FIGURE 19e. The potential *successive accumulate mode* on lead 1956 is also applied along with *3rd quarter* potential on lead 1960 to *and* gate 1929, the output of which is applied to *and* gates 1930 (FIGURE 19d) and 1931 (FIGURE 19e) and to *or* gate 1918 for *write head* $W_1$. This provides the enabling gating for successive accumulate portion of the multiplication operation which occurs, as explained above, during the first and third quarter revolution positions.

*Successive accumulate* toggle 3000 is reset with a pre-index clock through *and* gate 3004 each time the multiplier counter is counted down to zero. Thus, after a multiplier digit is transferred from buffer register $B_1$ through buffer storage toggles 800–803 to the multiplier counter of FIGURE 28, the multiplier counter is either set at or counted down to zero. Each time the count is zero, successive accumulate toggle 3000 is reset so that the *Icand* shift mode is again initiated whereby the multiplicand value is shifted one order position in the multiplicand registers $M_1$–$M_3$.

*Product developed circuit*

A product developed circuit (FIGURE 30) comprises input gating including *and* gates 3022, 3024, 3026 and 3028 and a *product developed* toggle 3020 arranged for controlling the system so that *type* out or internal transfer of a value from the product primary register area $P_2$ is carried out only if a product is recorded thereon. On horizontal strip 25 of the program card, a *transfer product* command is provided which is not to be operable unless there is a quantity in product primary register $P_2$.

The *product developed* toggle 3020 may be set to the unit condition in response to a *multiplicand shift mode* potential on lead 3010 which is developed on lead 2936 (FIGURE 29b) whenever a multiplication operation is carried out for indicating that a product is recorded in the product primary register area $P_2$ at the end of the multiplication operation.

The *product developed* toggle 3020 may be also set to the unit condition in response to an *enter product cycle* potential on lead 3030 which is developed during entry of a value to the product primary register area $P_2$ other than during a multiplication operation through *and* gate 3028. This may occur for example when the gross amount has been typed out and it is desired to place the gross amount back into product primary register $P_2$ so that the net amount may be calculated by a substraction process determined in the discount % entry. Thus, whenever a value is recorded in the product primary register area $P_2$ the product developed toggle is set to the unit condition.

A potential corresponding to the unit condition of the *product developed* toggle is coupled to the input *and* gate 2216 (see FIGURE 22) of the program one shot toggle 2200 for setting the *program one shot* toggle to the unit condition upon coincident application to the input gating of a potential corresponding to a *transfer product* command from strip 25 of the program unit thereby initiating an *arm-go* sequence during which the product is internally transferred or typed out.

The output potential corresponding to the unit condition of the *product developed* toggle 3020 is also coupled to input *and* gate 2729 of the *product register* toggle 2708 (FIGURE 27b) for setting the *product register* toggle to the unit condition upon application of the further potential corresponding to the *transfer product* command 25 and a *clear buffer register area* $B_1$–$B_3$ potential from *and* gate 2731 (FIGURE 27a) during the *arm-go* sequence discussed hereinbefore. A potential corresponding to the unit condition of the *product toggle* and an *output mode* potential developed in the sequencing circuit during the *arm-go* sequence, is applied to the input *and* gate 3022 of the product developed circuit for resetting the *product developed* toggle to the naught condition.

The product developed circuit arrangement is useful for carrying out operations such as indicated in the sample invoice (FIGURE 2) where net amount values as well as total and subtotal values are typed out in the net amount column. The instruction in response to which type out is initiated in that column comprises commands in response to which either operation can be carried out. Upon tabbing the typewriter carriage to the position corresponding to the instruction, a net amount is typed out provided that product developed toggle 3020 is set to the unit condition thereby indicating that a net amount has been previously developed and recorded in the product primary register area. In order to type out a total or subtotal, the *total* or *subtotal* toggles (see FIGURE 32) are set to the unit condition in response to depression of a total or subtotal key 406 or 405 respectively in the manner discussed hereinbefore. A potential corresponding to the unit condition of the total or subtotal toggle is coupled to the input gating of the B register toggle of FIGURE 27 for setting that toggle to the unit condition so that a total or subtotal may be typed out from the B register area. However, as the total or subtotal keys 406 or 405 are not actuated before typing out a net amount and as the product developed toggle 3020 is set to the unit condition, the net amount value from the $P_2$ register is the sole value typed out.

In the case where a total or subtotal value is typed out, the total or subtotal key 406 or 405 is depressed and type out carried out in the manner discussed. As a multiplication operation is not carried out just prior to type out of a total or subtotal value, *product developed* toggle 3020 is in the naught condition so that that portion of the instruction calling for type out of the net amount cannot be carried out and the total or subtotal value is the only value typed out.

Symbol circuit

A symbol circuit (FIGURES 5 and 30) comprises input gating, *symbol* toggle 3040, and output gating. The symbol circuit is used to control automatic typing of symbols which are typed in the column or columns following a value that is automatically typed to indicate the nature of the value. The symbols include ◊ (Subtotal), * (Total), ** (Grand Total), Cr. (Credit), — (Minus), and # (value transferred to register area A), all of which are on digit keys to be typed with basket shifted as is apparent from the typewriter keyboard of FIGURE 4. Usually only one symbol is typed after an entry as shown on the invoice of FIGURE 2, though more than one symbol may be typed for a single entry if the program card is so arranged. Where more than one symbol is typed, the first symbol to be typed is always typed in the column immediately following the value even though the symbol would be typed later if other symbols were typed.

The symbol circuit is arranged in the system so that with *symbol* toggle 3040 in the naught condition no symbol may be typed. Even though symbol toggle 3040 is set to its units condition, no symbol is typed unless other conditions are present which determine the symbol to be typed.

*Symbol* toggle 3040 is set to the unit condition through *and* gate 3043 in response to a *"1" in the digit counter* on lead 3041, *"1" in the multiplier counter* and *output mode* from *and* gate 3045 and a *first quarter* level on lead 3047 and a *quarter* clock pulse on lead 3049. These conditions inherently occur during the *type out* sequence while typing the lowest order digit of a value. However, even though *symbol* toggle 3040 is set to its units condition, type out of a symbol occurs only if other portions of the system are in predetermined conditions; otherwise, the symbol toggle is reset in response to a *"10" in the digit counter* through *and* gates 3046 or 3050.

In resetting *symbol* toggle 3040 to its naught condition in response to a *"10" in the digit counter* on lead 3044, a preindex clock pulse on lead 3052 through *and* gate 3046 may be used, or the (arm) (g̅o̅) (2nd quarter) potential on lead 3048 and *quarter* clock pulse through *and* gate 3050 may be used. Also, *symbol* toggle 3040 may be reset through *and* gate 3042 in response to a clear toggles cycle carried out in response to actuation of *reset* and *clear* keys 401 and 402 on the typewriter keyboard of FIGURE 4a.

As an illustration of the ability to provide automatic branching, the branching upon printing of a credit symbol in the program for the invoice of FIGURE 2 will be described. Basically, the system is arranged to provide two alternate courses of program action depending upon whether or not the CR symbol is printed at the end of a type-out.

In column 77 of FIGURE $3b_2$ the hole 3XB, mentioned previously, has been provided over strip 14, which corresponds to the "Enter 'F+' Register" command. In column 76 there are holes over conducting strips 6, 8 and 11 which correspond to enter first factor, enter product, and enter C register. There is also a hole 307 over strip 26 which corresponds to automatic tabulataion. These holes in column 76 are extended into column 77 where hole 3XB is located in line 14 (Enter F+ Register). If the product developed in the gross amount column is negative, then it is in complemented form and the negative condition is detected as previously described (Minus and Complement Circuit), the credit symbol is typed automatically superseding any other instructions programmed in column 76 and the typewriter escapes into column 77, ignoring all commands in column 76. At this point, entry of the gross amount negatively into the Icand, the Product, the C and the F registers is performed in response to the program holes in column 77.

On the other hand, if the quantity typed-out in the gross amount field is a positive quantity, a credit symbol is not typed and therefore the instructions programmed in column 76 are followed. As a result, when the automatic tabulation command is carried out at the end of the cycle, the carriage tabulates past the command 3XB in column 77 to enter the F register, a command to which the system can respond even with the carriage moving. However, since the quantity previously in the buffer register has already been entered into the Icand, Product, and C registers, the *Entry* toggle (FIGURE 26) has been reset at this time and therefore there cannot be an entry to the F register because no output from gate 2721 in FIGURE 27a is provided. Accordingly, only negative gross amounts are stored in the F register.

The quantity in the F register is a complementary value, of course, but when the daily total is being taken from this register corresponding to "Daily Ret'd For Credit" at the bottom of the invoice of FIGURE 2 by depression of the *calculate* key 6 with the carriage in column 90 where a "Transfer F" command 3XL (strip 24) is programmed, the value typed-out is the absolute value, as previously described, and a credit symbol is also typed for audit trail purposes.

Subtotal and total circuit

A subtotal and total circuit (FIGURES 5b and 32) comprises input gating, a *subtotal* toggle 3200, a *total* toggle 3202, and output gating. With the typewriter carriage in the position corresponding to an instruction for controlling type out of the subtotal, *subtotal* toggle 3200 is set to the unit condition in response to momentary actuation of subtotal key 405. Actuation of *subtotal key* 405 closes a pair of associated contacts 607 (FIGURE 6a). This energizes *foot* relay 608 to thereby transfer operation from the *body* mode to the *foot* mode throughout the remainder of the typing of the invoice, or until the *calculate* relay 601 is deenergized.

*S key* potential on lead 662 is coupled to lead 3204 of the input to *and* gate 3206 of the subtotal circuit (FIGURE 32) and to lead 2218 of the input gates 2206, 2207, 2208 and 2202 of the *program one shot* toggle 2200 (FIGURE 22). The *program one shot* potential is coupled to lead 3208 along with ($\overline{go}$) ($\overline{seek\ B}$) to input *and* gates 3210 and 3212 of the subtotal circuit for setting subtotal toggle 3200 to the unit condition. The output potential from *and* gate 3206 is also applied to *and* gate 3212 to thereby set *subtotal* toggle 3200.

*Subtotal* toggle 3200 may also be set by *and* gate 3214 when the *special total* key 407 on the typewriter is actuated and the *set total toggles* output from *and* gate 3210 is present. At the same time *total* toggle 3202 is set by the same input signals applied to *and* gate 3216. Thus, when the *special total* key 407 on the keyboard is actuated, both *subtotal* toggle 3200 and *total* toggle 3202 are set.

*Subtotal* toggle 3200 may also be set by *and* gate 3218 when *seek B* toggle 3220 is set and an output from *and* gate 3206 is provided which requires that *total* toggle 3202 is not set and the *subtotal* key 405 is depressed.

*Total* toggle 3202 may be set by *and* gate 3222 when seek B toggle 3220 is set and an output from *and* gate 3224 is provided which requires that *subtotal* toggle 3200 is not set and the *total* key 406 is depressed.

*Total* toggle 3202 may be set also through *and* gate 3226 by the output from *and* gate 3224 and the *set total toggles* potential from *and* gate 3210.

Both *total* toggle 3202 and *subtotal* toggle 3200 are reset by *total and subtotal→0* potential applied on lead 3230 and a pre-index clock pulse on lead 3232. The total and subtotal→0 potential is developed in the gating circuit of FIGURE 29b on lead 2946.

The output signals as labeled at the righthand side of FIGURE 32 are provided for controlling the various other circuits in manners described elsewhere and as are apparent from the drawings. It will be noted that in addition to output potential *total toggle* on lead 3264; ($\overline{total\ toggle}$) on lead 3265; and *subtotal toggle* on lead 3266; three *and* gates 3267, 3268 and 3269 are provided to produce output signals ($\overline{total}$) (*subtotal*); (*total*) ($\overline{subtotal}$); and (*total*) (*subtotal*) respectively.

I$^f$ operations previously initiated have not been completed when a Subtotal Key 405, Total Key 406, or Special Total Key 409 is depressed, the system is electronically interlocked such that the particular command is ignored until the system is free. Circuitry for this is shown in FIGS. 22 and 32. *Subtotal* and *total* toggles canot be set without an output from "Set Total Toggles" *and* gate 3210, which depends upon the *program one shot* potential derived, in the case of the above-mentioned keys, through input gates 2206, 2207, 2208, and 2202 as explained previously. The *and* gate 2202 requires an output from the *enable program one shot* gate 2307 (see FIG. 23) but this is not available because ($\overline{ARM}$) ($\overline{GO}$) will not be present as long as some other operations are in process. Consequently, there can be no interference, and initiation of the new operation cannot take place until completion of the previous ones.

Seek B circuit

A seek B circuit comprising input gating, a seek B toggle 3220, and output gating (FIGURE 32) is provided for automatic tabbing of the typewriter carriage to the initial type out position beginning at carriage position 88 in the illustrated embodiment for typing out a total or subtotal in response to momentary actuation of the total of subtotal keys 406 and 405, respectively. The running subtotal is accumulated in the B register area (see FIGURE 10). In FIGURE 3B$_2$, command hole 344 in strip #19 at carriage position 88 is provided for illustrating this mode of operation.

In the procedures used in invoicing and billing practices, the computing of discounts and taxes on a percentage basis form an important part of the process. When business machines are designed to perform this function, a subtotal of some accumulation is the first operand while the discount or tax percentage is the second operand. For this reason, the machine should readily and automatically produce such a subtotal which is here accumulated in the B register.

Carriage programmed machines, whose control signals are a function of carriage position have many useful features, but they often require that the operator position the carriage in the proper field before taking the required subtotal. If the form has many columns this may require the operator to depress the tab key excessively to reach the required region to obtain access to the desired total or subtotal.

Some equipment has developed special supplementary programming devices which take over control of the machine when a subtotal is desired and direct it to a predefined position and then direct it to take a subtotal. Such an approach is direct and effective but does not permit much freedom of operation in program selection or in choice of registers.

In this invention, we provide a method of notifying the machine that a total or subtotal is required in response to which the machine tabs itself until its carriage program controller indicates that it is properly positioned for the required total or subtotal. Such an approach is here used to readily select the total in the B register and to use the same subtotal or total key to read out from other registers if the carriage is properly located.

The fundamental requirements of the system are that:

(1) The machine produces the program subtotal or total if it is in a column programmed for a subtotal or total at the time the subtotal or total key is depressed.

(2) When the total or subtotal key is depressed in a column that is not programmed for a total or subtotal, then the machine must tabulate itself to a column programmed for the appropriate total or subtotal. (In the case illustrated, the appropriate total or subtotal is taken from the B register only.)

(3) The machine tabulates itself through columns programmed for inappropriate totals or subtotals as well as any entry fields when it is "seeking."

Actuation of *total* or *subtotal* key 406 or 405 on the typewriter closes a pair of associated contacts 607 or 613 (FIGURE 6a) through which a potential is applied on lead 3240 of the input *and* gate 3242 of *seek B* toggle 3220 for setting the *seek B* toggle to the unit condition, provided that the carriage is not already in the total or subtotal type out position where there is an "A," "B," "C" or "D" select command on leads 3244–3247 or an *arm* or *go* potential on leads 3248 or 3250 which would produce a high level output from *or* gate 3252 which when inverted by inverter 3254 would block *and* gate 3242.

A potential corresponding to the unit condition of the *seek B* toggle is coupled to the input gating of the total and subtotal circuit for setting the *total* or *subtotal* toggles to the unit condition as explained above.

A potential corresponding to the unit condition of the *seek B* toggle is coupled to a tab drive solenoid *and* gate 3502, see FIGURE 35. Another potential is coupled to *and* gate 3502 through a tab contact (FIGURE 6b) which contacts are mechanically connected to the carriage so that the contacts are open whenever the carriage is in motion during tabulation and are closed when the carriage is in a stationary position. Another potential coupled to *and* gate 3502 is from the odd-even contacts and the odd-even toggle so that the potential is applied only where the carriage is in such position as to make contact in an odd or even strobe hole. In response to these potentials, therefore, the gating arrangement is energized to provide power to tab drive solenoid 909 (FIGURE 9) to therefore tab the carriage to the next tab position. The carriage is therefore successively tabbed through its tab positions until the potential corresponding to the unit condition of the *seek B* toggle is removed.

Upon tabbing to a carriage position corresponding to an instruction comprising a select B register command 19 (in which the register area the running subtotal is accumulated), a potential is coupled through command hole 344 in the program card of FIGURE 3b to lead 3245 of the input gating of the *seek B* toggle to be applied through *and* gate 3258 for resetting seek B toggle 3220 to the naught condition. Automatic tabbing of the carriage is thereby concluded.

A ($\overline{\text{seek B}}$) potential is coupled to input *and* gate 2203 of *program one shot* toggle 2200. Also coupled to input gate is a potential corresponding to the unit-naught condition or naught-unit condition of the *total* and *subtotal* toggles, respectively, which *total* and *subtotal* toggles were set upon actuation of the *total* or *subtotal* key. In response to these potentials, *program one shot* toggle 2200 is set to the unit condition thereby initiating an *arm-go* sequence during which the total or subtotal value is typed out in the manner discussed hereinbefore.

*Seek B* toggle 3220 is also reset during the *clear toggles cycle* by *and* gate 3260 or by pressing *clear* key 402 through *and* gate 3261.

Type now circuit

A *type now* circuit 230 (FIGURES 5A and 31) is arranged with other portions of the system for control of the electronic system during type out. *Type now* toggle 3100 must be set for the typewriter to be able to type from the electronic system. The program card (FIG. 3b) contains an instruction *enable T/W* which is perforated at carriage positions where type out is to occur.

Normally *type now* toggle 3100 is set by *and* gate 3102 which requires an *output mode* potential on lead 3104 from lead 2932 and a *length of type out control* potential on lead 3106 which is derived from circuit shown on FIGURE 25 to thus be present only when there is an input potential on lead 2526 corresponding to a "1" in *multiplier counter* in addition to the ($\overline{\text{type now}}$) potential on lead 3108. A pre-index clock on lead 3110 is used to set *type now* toggle 3100.

*Type now* toggle 3100 may also be set by *and* gate 3112 with the *set for third and fourth symbols* potential on lead 3114 which is generated by *and* gate 3113. This circuit is used only when typing the special symbols — and #. An example of each is shown on FIGURE 2.

*Type now* toggle 3100 is reset after type out is completed through *and* gate 3115 if no symbol is printed in the normal symbol position to the right of the digit that is typed out from the electronic system. This gate requires the *symbol* toggle potential and "0" in buffer storage plus "0" in multiplier counter and pre-index clock from lead 3110.

At the end of an output field where a *total and sub-total tog.→0* potential from lead 2946 (see bottom of FIG. 29b) is present on lead 3116, an output from *and* gate 3118 is provided to reset *type now* toggle 3100. It will be observed from the invoice of FIGURE 2 that all total and sub-total values are followed by one or more symbols.

*Type now* toggle 3100 may also be reset by *and* gate 3120 to drop off or prevent typing of least significant digits in an output field where the program does not call for *enable T/W* and either ($\overline{\text{arm}}$) or ($\overline{\text{"A" register toggle}}$) is present.

The *type now* output potential is used to set the multiplier counter of FIGURE 28 to a count of 4 by setting toggle 2802 (FIGURE 28c) through *and* gate 2818 to effect the type out of a digit. The ($\overline{\text{type now}}$) potential is used to set the multiplier counter to a count of 1 by setting toggle 2800 through *and* gate 2831 to effect merely an internal transfer.

As explained above, to carry out internal transfer without type out, only two revolutions of the memory disk are required for transfer of each digit. Thus the multiplier counter counts 1, 0 successively for each digit. To carry out an internal transfer with type out, at least five revolutions of the disk are required. In this case, the multiplier counter counts 4, 3, 2, 1, 0 for each digit. The condition of *type now* toggle 3100 controls which sequence is to be carried out.

Last operation output circuit

A *last operation output* circuit 229 (FIGS. 5b and 31) comprises input gating, output gating, and a *last operation output* toggle 3130 (FIG. 31) arranged in the system for causing destruction of all information in the buffer register areas $B_1$–$B_3$ of memory disk of FIGURE 10, i.e., to clear these register areas by recording zeros in all orders.

After transfer of a value to the buffer register areas $B_1$–$B_3$ of the memory unit, the register areas $B_1$–$B_3$ are cleared upon entering the first carriage position within a field in which a value is to be entered at the typewriter and recorded in the register areas $B_1$–$B_3$ by setting *last operation output* toggle 3130 in response to an *output mode* potential applied on lead 3104 through *and* gate 3132, which potential is developed on lead 2932 in the sequencing circuit (FIG. 29b). With *last operation output* toggle 3130 in the unit condition, a *last operation output* potential is coupled by lead 2536 to *and* gate 2538 (FIG. 25). Upon entering a carriage position in which an *order* command is programmed such as carriage position 16, an *enable input* potential is developed from gate 2103 (FIG. 21) and applied on lead 2540 to gate 2538 (FIG. 25). *Arm* toggle 2500 is thereby set to the unit condition and an *arm-go* sequence is initiated which goes through the condition arm-go as explained above so that a *clear buffer register areas* $B_1$–$B_3$ potential is developed on lead 2934 in the sequencing circuit (FIG. 29b) and coupled to other portions of the system for clearing the register areas $B_1$–$B_3$. The *clear buffer register areas* $B_1$–$B_3$ potential on lead 3136 is applied to *and* gate 3138 (FIG. 31) for resetting *last operation output* toggle 3130 to the naught condition.

The *last operation output* toggle 3130 may be also set to the unit condition by *and* gate 3142 in response to a (*program one shot*) ($\overline{\text{go}}$) ($\overline{\text{seek B}}$) potential on lead 3144 generated in FIGURE 22 resulting from actuation of the *clear* key contacts 603 (FIG. 6) by clear key 402 of FIGURE 4a when the carriage is in an input field. The (*clear*) (*enable input*) potential generated by the circuit shown at the top of FIGURE 21 is applied by a circuit shown at the bottom of FIGURE 22 to trigger the *program one shot* circuit 2200 to thus generate the potential on lead 3144 to set *last operation output* toggle 3130 along with ($\overline{\text{go}}$) on lead 3146 and a digit clock pulse.

With *last operation output* toggle 3130 in the unit condition, the *arm-go* sequence may be initiated and carried out to produce a *clear buffer register areas* $B_1$–$B_3$ potential whenever the carriage is positioned in an entry field. Thus, if the operator makes a mistake in entering a value in the quantity or price field, the entire entry may be erased from the buffer register areas $B_1$–$B_3$ by depression of clear key 402, provided however, that the carriage is still within the respective entry field. If the carriage is not within an entry field, *last operation output* toggle remains in the naught condition and clearing of buffer register areas $B_1$–$B_3$ cannot be accomplished.

It should be observed that once carriage position 21 is reached, the quantity digits are entered into the Icand register areas $M_1$–$M_3$ (see FIGURE 10a) as a result of the command hole 334 in the program card of FIGURE 3b. Also the *enable input* potential is lost. Therefore, depression of clear key 402 would then be ineffective to correct a mistake in a number entered on the typewriter.

Where a non-return to zero method of recording is used in the magnetic memory unit, it is possible to correct a mistake made by the operator, by simply overtyping the mistake with the correct number as pointed out above. Such overtyping causes entry of the correct digit in buffer storage register areas $B_1$–$B_3$ and is effective to make the necessary correction in the memory unit so long as the entered digit has not been transferred out of buffer register areas $B_1$–$B_3$.

Another circuit for setting *last operation output* toggle 3130 to the unit condition occurs when the electric power to the system is first turned on or when the *reset* and *clear* keys 401 and 402 are depressed by the operator to thereby close contacts 602 and 603 (FIG. 6) and initiate a *clear toggles cycle*. The *clear toggles cycle* potential on lead 3147 is applied along with a *digit clock* pulse to *and* gate 3148 to set *last operation output* toggle 3130. The *clear toggles cycle* potential is produced on lead 2852 from *or* gate 2825 of (FIG. 28b). The buffer register areas $B_1$–$B_3$ on memory disk 204 in response thereto are cleared in the manner discussed above which follows tabbing of the carriage to an entry field.

Since some of the toggles assume a random condition upon first turning on the power to the system it is desirable to generate the *clear toggles* cycle potential on lead 2852 by a *clear toggles level* on lead 2882 (FIGURE 28a) from the power supply to clear out any erroneous recording which may be entered on the buffer register areas $B_1$–$B_3$ when the power is first turned on.

% /c and /m circuit

In the price entry field of the invoice sheet of FIGURE 2, it is possible to enter the price on the basis of 100 units (/c) or 1000 units (/m). The effect of typing such an entry is to cause the /c/m contacts 718 (see FIGURE 7) to close and thereby provide a /m key potential on lead 716 or a % /c key potential on lead 722. These potentials are supplied to set /m toggle 3310 or % /c toggle 3300 respectively.

/m toggle 3310 is set by *and* gate 3312 with *calculate* potential (from FIGURE 21) on lead 3304 and *enable input* potential (from FIGURE 21) on lead 3306, the labeled inputs on lead 3308 and a digit clock pulse when the /m key on the typewriter is depressed. This occurs in carriage position 63 and hence one carriage position in front of *Enter 2nd Factor Ier* program hole 316 (see FIGURE 3b), at carriage position 64. Program hole 316 is effective to cause the multiplication sequence to take place and when completed, an *Ier Tog→0* potential is generated on lead 2948 shown at the bottom of FIGURE 29b which is effective to reset /m toggle 3310 through *and* gate 3316 with the next index clock.

Input gates 3302 and 3314 for % /c toggle 3300 have identical input potentials to those applied to gates 3312 and 3316 excepting that a /c key potential is applied to *and* gate 3302.

The output potentials from %/c and /m toggles 3300 and 3310 are connected to the input gating (see FIGURE 15a) of the digit counter to set the counter for carrying out the Icand shift. If neither %/c nor /m toggle is set, the Icand (e.g., quantity entry on the invoice of FIGURE 2) is shifted through 9 positions as shown in FIGURE $10a_2$; with %/c toggle 3300 set, the Icand is shifted 11 positions; and with /m toggle 3310 set, the Icand is shifted 12 positions.

To set *digit counter* toggles 1500–1503 a *set counters for multiplication* potential generated in the circuit shown near the bottom of FIGURE 29b is applied on lead 1532 to the unit input *and* gates 1534, 1536, 1538 and 1540. It will be apparent from the circuit connections shown in FIGURE 15a that the *digit counter* toggles 1500–1503 of FIGURE 15b will be set to 7 (1110) if ($\overline{/c}+\overline{/m}$); to 9 (1001) if % /c; and to 10 (1010) if /m. These settings are effective to produce the 9, 11, or 12 position Icand shift respectively.

Extension circuit

An extension circuit (FIG. 34) comprises input gating, an *F register extension* toggle $X_{24}$, and a *multiplicand extension* toggle $X_{25}$ arranged in the system for controlling operation which involve recording values in the register areas $M_3$ and F. *Write* toggle 1300 is normally reset at pre-index time. From an inspection of FIGURE $10a_2$, it is apparent that write heads $W_1$ and $W_2$ will thus be gated off during the time that the sign digit is being recorded in the 11th digit area because of the displacement of white heads $W_1$ and $W_2$ from a quarter revolution position. The four bits of the eleventh order digit of the register area $T_3$ are reproduced in the head $R_3$ and transferred to *buffer storage* toggles 800–803. As the twelfth order (in which no value is recorded) is reproduced from the register area $T_3$, the eleventh order digit is transferred from buffer storage to the recording head $W_2$, which is displaced one digit area in the direction of rotation, for recording in the eleventh order of the register area $M_3$. Since the pre-index position of the disc occurs during the reproduction of fourth bit of the twelfth digit area of the register area $T_3$ and the recording of the fourth or possibly third bit in the 11th digit area of the register area $M_3$, the recording circuit (FIG. 13) and head gating circuit (FIG. 19) are controlled in response to output potentials from *multiplicand extension* toggle $X_{25}$ to maintain the recording operation throughout the 11th digit area and to end the recording at index time in response to the index pulse.

The *multiplicand extension* toggle $X_{25}$ is set during the *enter Icand cycle* each third quarter revolution by *and* gate 3400. It is also set during the *Icand shift mode* at the same rotational position by *and* gate 3402.

The *F register extension* toggle $X_{24}$ is set by *and* gate 3404 only during an accumulate cycle where the accumulation is to be entered into the F register.

Both *extension* toggles are reset by an *index clock* pulse on lead 3406.

Typewriter control circuit supplement

Referring now to FIGURE 35, additional circuits are shown which produce output signals which are used mainly to control the various functions of the typewriter. The *calculate hold* potential on lead 3500 is supplied as an input potential on lead 600 in FIGURE 6a to serve as the hold potential for *calculate* relay 601 when contacts 624 are closed. This potential is normally present so long as there is a program card in place in the typewriter program unit and all of the inputs to *and* gate 3501 are not present. It will be observed that when there is a potential present on all three input leads 3504, 3506 and 3508 to *and* gate 3501, the high output potential is inverted and therefore will close *and* gate 3510.

The *tab drive* potential on lead 3512 is applied as an input to *tab* solenoid 909 on FIGURE 9. This potential is present when there is an output from *and* gate 3502 which occurs during the *seek "B"* cycle explained above, by *and* gate 3514 during an *auto carriage cycle* when an *auto tab command* provided in horizontal column 26 of the program card of FIGURE 3b is present, and by *and* gate 3516 during the foot mode of operation when a *special auto tab command* in horizontal column 30 is present in the program card of FIGURE 3b.

The *carriage return drive* potential on lead 3518 is connected to the carriage return solenoid on FIGURE 9 at a time when an output potential is produced from *and* gate 3520 which requires in addition to the *auto C.R. command* in the number 27 horizontal column of the program card of FIGURE 3 an *auto carriage cycle* potential on lead 3522 which is generated by the gating circuit shown in FIGURES 29a and 29b.

The *keyboard lock drive* potential on lead 3522 is provided from *or* gate 3524 and applied to the *keyboard lock* solenoid in FIGURE 9. When the keyboard lock solenoid is energized, the typewriter keys cannot be depressed by the operator, as explained above in connection with FIGURE 9. During the time *output mode+symbol tog.* potential is produced from the circuit having its output at the center of the sheet containing FIGURE 29b, or during the time the (*arm*) (*go*) (*enable input*) potential produced the circuit having its output at the top of the sheet containing FIGURE 29b, the *keyboard lock drive* potential is present from *or* gate 3524. This causes the keyboard to be locked at all times when the electronic system is in a condition where actuation of the typewriter keys will interfere with the normal operation of the electronic system.

The *decimal point drive* potential on lead 3526 is provided when the *auto dec. command* in horizontal column 28 of the program card of FIGURE 3b is present. This potential is applied to the decimal point solenoid.

The *space drive* potential on lead 3528 is used to energize the *space* solenoid in FIGURE 9 under conditions when either *and* gate 3530 or *and* gate 3532 produces an output potential. The output from *and* gate 3530 is present when there is an *auto space command* hole present in the horizontal column 29 of the program card of FIGURE 3b. The output potential from *and* gate 3532 is present when a *decimal space* potential is provided on lead 3534 which is generated on lead 2624 of FIGURE 26 as the result of order "4" and order "8" commands in horizontal columns 3 and 4 of the program card. This particular operation is not programmed in the illustrated embodiment.

The *"A" hold* potential on lead 3536 is provided as an input signal to the circuit shown in FIGURE 6a to thereby provide a hold potential for the *enter A* relay 636.

The *error hold* potential on lead 3538 is supplied to typewriter circuit shown in FIGURE 6a to hold *error* relay 670 once it is energized. Release of *error* relay 670 is accomplished by the depression of *clear key* 402 on the typewriter (see FIGURES 1 and 4).

Power supply

Referring now to FIGURE 36, a power supply 3600 of any suitable type is provided to supply the various voltage levels used throughout the computer. A time delay device 3602 is provided having a heating element 3604 connected across the input voltage terminals through normally closed contacts 3606. When contacts 3608 of delay device 3602 close a few seconds after the main power switch 3610 is closed, relay 3612 becomes energized through a circuit including contacts 3608 and lead 3614 which is connected to the minus 20-volt terminal of the power supply 3600. After relay 3612 is energized, it is held in the energized condition by holding contact 3616.

When the equipment is first turned on, many of the toggles being bistable flip-flop circuits, randomly assume various conducting conditions. To prevent any internal operation which might result in the loss of certain information retained in the memory unit for subsequent use, special precautions are provided to start with a clear toggles operation. As the calculator of the present invention is only a small desk size unit and may be provided with a normal lamp cord type connection to a wall or floor plug, further precautions are provided to eliminate the possibility of destruction or alteration of the information in the accumulate registers A through F and to minimize steps necessary to place the sytem back in operation in the event of inadvertent disconnection of the operating power.

A clear toggles level potential on lead 3620 is provided at all times relay 3612 is de-energized which is effective to initiate a clear toggles cycle by the circuit shown in FIGURES 28a and 28c. As soon as relay 3612 energizes, the sequenced ground potential on lead 3622 is provided to the typewriter to energize the *type only* lamp shown in FIGURE 6a. If the plus key contact 604 or minus key contact 605 is closed, the circuit from the sequenced ground is used to illuminate the plus or minus lamp, respectively, both of which are shown in FIGURE 6b.

The write head voltage on lead 3624 from contacts 3626 of relay 3612 when energized, is applied to the center tap on the write head $W_1$ and $W_2$ shown in FIGURE 13. Thus, in addition to the circuits for gating the write heads, the write head voltage from lead 3624 of the power supply must also be present before information can be recorded into the memory unit.

If for any reason, such for example the situation where the plug may be inadvertently removed from the power supply during operation of the calculator, that the write head voltage should drop below a predetermined level less than that required for satisfactory signal strength, means are provided for disconnecting the circuit to lead 3624 to thereby prevent any recording by write heads $W_1$ or $W_2$.

Write head voltage on lead 3624 is supplied through a circuit including transistor 3630 which is in series with the windings of write heads $W_1$ and $W_2$. Transistors 3630 and 3632 are both PNP types with their bases connected through resistors 3634 and 3636 respectively to a plus 5-volt terminal of the power supply. The collectors of both transistors are connected to the minus 20-volt potential on lead 3614. The base of transistor 3630 is also connected to the emitter of transistor 3632 while the base of transistor 3632 is connected to the collector of transistor 3638. Transistor 3638 is an NPN type having its emitter connected to the minus 20-volt potential on lead 3614 and its base connected to a tap on a voltage divider which is connected to plus and minus 110-volt potential terminals of the power supply. This provides sufficient base current to transistor 3638 thereby causing transistor 3638 to conduct. The voltage drop across resistor 3636 in the collector circuit is thus sufficient to cause the base of transistor 3632 to be negative thereby causing that transistor to also conduct whereby its emitter potential, which is connected to the base of transistor 3630, also becomes negative. Transistor 3630 thus conducts and normally has a potential of approximately 19.5 volts on its emitter which is applied as the write head voltage on lead 3624.

When the input circuit to the power supply 3600 is broken, the magnitude of all the output voltage reduces toward zero. During power supply turn-off, the base of transistor 3638 stays relatively constant because of the 2 mf. capacitor while the voltage on lead 3614 drops to about minus 18. At this moment, conduction through transistor 3638 cuts off and its collector and the base of transistor 3632 become positive with respect to ground. This causes conduction through transistor 3632 to cut off, and the collector of transistor 3632 and the base of transistor 3630 to become positive relative to ground, to thereby cut off current conduction through transistor 3630.

The foregoing sequence takes place almost instantaneously when the voltage on conductor 3614 decreases from 20 volts to approximately 18 volts, and thereby precedes the drop out of relay 3612 as well as the de-energization of the other circuits in the calculator. Since other circuits may operate indiscriminately while the power supply voltage is decreasing, the immediate removal of operating voltage prevents the possibility that write heads $W_1$ and $W_2$ could be gated on and thereby inadvertently destroy or alter any of the information which may be in the memory unit.

Summary

From the preceding description of and taken in connection with the logic circuits shown in the drawings it will be apparent to one skilled in this art how to construct the device of the present invention. To better understand its manner of operation, particularly at those positions of the typewriter carriage where more than one function is programmed, the following tables may be useful:

INPUT/OUTPUT SEQUENCING (PART II)
[Table A]

| Arm | Go | Accumulate | Enter Product | Enter Icand | Enter Ier | Output | Automatic Carriage | Results |
|---|---|---|---|---|---|---|---|---|
| 0 | 0 | 0 | 0 | 0 | 0 | 0 | 0 | Program one shot fires. |
| *1 | 0 | 1 | 1 | 1 | 1 | 0 | 0/1 | Type # or – symbol 1 or 5 or 10 revolutions. |
| 1 | 1 | 1 | 1 | 1 | 1 | 0 | 0/1 | Accumulate in A–F registers 1 revolution. |
| 1 | 1 | *0 | 1 | 1 | 1 | 0 | 0/1 | Enter Product Registers 1 revolution. |
| 1 | 1 | 0 | *0 | 1 | 1 | 0 | 0/1 | Enter Icand Register 1 revolution. |
| 1 | 1 | 0 | 0 | *0 | 1 | 0 | 0/1 | Multiplication 46–90 revolutions. |
| 1 | 1 | 0 | 0 | 0 | 0 | 0 | 0/1 | Clear Buffer registers $B_1$–$B_3$ 1 revolution. |
| *0 | 1 | 0 | 0 | 0 | 0 | *1 | 0/1 | Output Mode (Type out or internal transfer) (25 or more revolutions). |
| 0 | 1 | 0 | 0 | 0 | 0 | *0 | 1 | Auto carriage function 1 revolution. |
| 0 | *0 | 0 | 0 | 0 | 0 | 0 | 0/1 | Finish. |

*Indicates where action occurs at pre-index time.

In the above table, the caption toggle is set or function programmed where indicated by a 1, and reset or completed, respectively, where indicated by a 0. The sequencing circuit, shown primarily in FIGURE 29, generates the various potentials in a succession to accomplish the various functions in the order indicated in the table. It will be observed that the sequence of operation of the electronic system is completed prior to the time an automatic carriage function is permitted to occur. Thus, the fact that an *automatic carriage return* command hole 320 (FIGURE 3b) is present at carriage positions 99 and 100, does not cause the carriage to return until other program commands present at the same carriage position have been completed.

The following two tables indicate the sequence for digit type in:

[Table B. When last operation output is set]

| Arm | Go | Last Operation Output | Results |
|---|---|---|---|
| 0 | 0 | 1 | |
| *1 | 0 | 1 | Upon detection of entry programs. |
| 1 | *1 | 1 | Clear Buffers 1-3. |
| *0 | 1 | *0 | |
| 0 | *0 | 0 | |

[Table C. When last operation output is not set]

| Arm | Go | Last Operation Output | Results |
|---|---|---|---|
| 0 | 0 | 0 | |
| *1 | 0 | 0 | Arm toggle is set from Digit One Shot. |
| *0 | *1 | 0 | Digit is entered into Buffer Registers $B_1$–$B_3$ and Arm toggle is reset because register toggles are not entered. |
| 0 | *0 | 0 | |

* See Table A for footnote.

Each value typed out in the gross amount column is, of course, entered in buffer registers $B_1$–$B_3$, and then transferred in accordance with the program at carriage positions 76 and 78 to the multiplicand register $M_1$–$M_3$ by the program command perforation in column 6, to the product primary register by the program command perforation in column 8, and to the C register (see FIGURE 10$a_1$) by the program command hole in column 11. When the discount % is typed in and programmed as the multiplier digit at carriage positions 81–85, *automatic minus* program command hole 305 causes the net amount to be calculated by subtraction of the multiplicand, which is initially shifted 11 decimal positions in Icand register areas $M_1$–$M_3$, and subtracted from the same gross amount value which had been transferred to the product primary register area $P_2$. If, as in the case of the *belaying pins* item on the invoice, there is no discount %, then the gross amount value entered in product primary register area $P_2$ is also typed out as the net amount. Otherwise, the gross amount value is reduced by the discount % as typed to produce in product primary register area $P_2$ the net amount.

The gross amount of reach item is added to accumulate register area C, and may be typed out as the *daily gross amount total* by the *select "C" register* command perforation 322 when the system is in the foot mode of operation.

Information may be entered into and typed out from the other accumulate registers A, B, D, E and F in analogous manners which are evident from the foregoing description and accompanying drawings. The information in the accumulate registers is destroyed not only by the reset cycle initiated by simultaneous closure of reset and clear keys 401 and 402 on the control panel of the typewriter, but also automatically upon type-out or internal transfer. For retention, it is necessary to program its return to the source register.

The six accumulate registers are uniquely located at diametrically opposite quarter track areas, and three are in the same quarter area as input buffer areas $B_1$–$B_3$. With the reproducing or reading heads and the write head for each track located at quarter revolution positions, an efficiently designed system is provided in terms of the number of transducers and the influence thereof on the cost of the memory unit, and the relative complication of the electronic logic circuits and their corresponding cost.

The program command functions as identified in FIGURE 3a provide a system with a flexibility of operation adaptable to produce typewritten invoices on a variety of formats to provide automatic branching and to permit the user to have more than one program card which may be easily substituted in the rear side of the typewriter each time the printed sheet to be used in the typewriter contains different columns of information or a relocation of the margins for the columns of information. The entire unit is adapted to fit in a desk no larger than an ordinary office desk. The only equipment on the upper surface being the typewriter. The usual drawer space may be available and the modest power consumption permits use of a cord and plug fitting into an ordinary floor or wall outlet.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an electronic computer: an input-output unit for transmitting and receiving data in discrete digit-by-digit fashion; a four stage buffer register; circuit means including an encoder for transmitting a single digit entry from the input-output unit as a four element coded digit in parallel to said buffer register; a memory unit including a recording transducer and a reproducing transducer; means for transmitting each said coded digit from said buffer register to said memory unit in serial form for recording by said recording transducer; means including said reproducing transducer for retrieving a discrete coded digit from said memory unit and for transmission in serial form to said buffer register; and decoding means connected between said buffer register and said input-output unit for transmitting said elements of each said retrieved discrete coded digit from said buffer register in parallel to said input-output unit.

2. The computer as defined in claim 1 wherein said input-output unit has a movable carriage and the decoding means comprises a relay for each stage of said buffer storage; a zero suppression relay having an energizing coil and a contact movable between two fixed contacts, one fixed contact being connected to a spacing solenoid for advancing said carriage without printing and the other fixed contact being connected to a zero printing solenoid; a contact on each of said decoding relays; and circuit means for connecting each of said decoding relay contacts in parallel to said zero suppression relay coil to thereby cause spacing of the carriage for all digit positions in an output field preceding the printing out of a non-zero digit.

3. An electronic computer as defined in claim 1 wherein said memory unit has a plurality of separate accumulate registers in combination with an operator's console; a first control means on the console and actuatable by an operator for clearing said registers; and a plurality of manually operable switches at a location remote from the position of the operator at said console, said plurality of switches being connected with circuit logic to be individual to said accumulate registers and effective to prevent clearing of said registers as determined by actuation of said switches.

4. The computer of claim 3 wherein the memory unit comprises a rotatable member and fixed transducer means for altering the information in the accumulate registers, and said switches are identified with an individual register and connected by logic circuits controlled by timing signals to prevent clearing of certain registers as determined by selected operation of said switches.

5. The computer as defined in claim 1 wherein the input-output unit is a typewriter.

6. The computer as defined in claim 1 wherein the memory unit contains two reproducing transducers, and the computer further contains circuit means connected to both of said reproducing transducers including an adder having two input terminals and an output terminal with said input terminals being connected to different ones of said reproducing transducers and said output terminal being connected to said buffer register for adding coded digits simultaneously retrieved by said two reproducing transducers and producing the sum in said buffer register.

7. The computer as defined in claim 3 wherein each coded digit is a binary decimal digit less than 10 and together with a corrector circuit coupled to said buffer register to correct each binary sum greater than 9 to a binary decimal digit less than 10 plus a carry to the next higher order.

8. The computer as defined in claim 4 wherein said corrector circuit comprises *and* gates coupled to the higher three orders of the four stage buffer register; gating means connected to said buffer register for producing a correction potential upon detection of a decimal digit greater than 9; and circuit connections for applying said correction potential to said *and* gates.

9. The computer as defined in claim 5 wherein the memory unit contains a magnetizable surface and each digit area on the memory unit surface consists of four bit areas for the four bits of each decimal digit plus one additional bit area; means for generating a timing pulse at the time when said additional bit area is in operative position with said reproducng transducers; and means for supplying said timing pulse to said *and* gates for providing an output from said corrector circuit.

10. The computer as defined in claim 3 wherein the adder circuit is a circuit for both adding and subtracting as determined by an add/subtract control potential, and further having means including a toggle circuit for producing said add/subtract control potential.

11. The computer as defined in claim 7 wherein said means for producing said add/subtract control potential comprises a minus key toggle actuated by a manually controlled switching means.

12. The computer as defined in claim 7 wherein said input-output unit has a movable carriage and said means for producing said add/subtract control potential comprises a minus command toggle actuated by a program command determined by the position of the movable carriage of the input-output unit.

13. The computer as defined in claim 3 wherein the adder circuit is a circuit for both adding and subtracting as determined by an add/subtract control potential, and further having means for producing said add/subtract control potential consisting of a minus key toggle, a minus command toggle and complement toggle together with output gating connected to each of said toggles for producing an *add* control potential when none or two of said toggles are set and for producing a subtract control potential when one or three of said toggles are set.

14. An electronic computer as defined in claim 2 wherein said memory unit has an input buffer register area and a plurality of accumulate register areas into which information may be stored, retrieved and destructed, and said typewriter has a bank of manually operable key controlled switch contacts for controlling operation of the computer; in combination with circuit means including a first switch contact in said bank for destroying information in said input buffer register area of said memory unit; a second switch contact in said bank which alone is incapable of destroying information in said memory unit; and means for connectng said first and second switch contacts together to destroy information in said accumulate register areas, the keys for operating said first and said second switch contacts being separated by another key to prevent inadvertent actuation of the keys for both of said first and second contacts by one finger.

15. The computer of claim 14 wherein the memory unit comprises a rotatable member having said registers and fixed transducer means for altering information in said registers together with a plurality of manually operable switches connected with circuit logic to said transducer means to be individual to said accumulate registers and effective to prevent destruction of information in the associated accumulate register.

16. The electronic computer as defined in claim 2 wherein the input-output unit comprises a record member having plural program instruction channels cooperating with sensing means for transmission of program signals at each of a plurality of positions of the typewriter carriage, said record member having two program fields corresponding to two separate plural digit numbers to be entered on said typewriter, the first of said fields denoting a multiplicand and the second of said fields denoting a multiplier and wherein said memory unit comprises plural register locations into which the digits of said numbers may be transmitted from said buffer register, each of said fields on the record member containing program instructions effective to control the location into which each of said digits is entered in said memory unit; and further including means for multiplying said two plural digit numbers together to produce a product in said memory unit; and means including a plurality of adjacently positioned "type-out" program instructions in said record member for retrieving said product from the memory unit and for typing said product, one digit at a time, there being a separate "type-out" program instruction in said record member for each position of the typewriter carriage where a digit of the product is to be typed.

17. The computer as defined in claim 16 wherein said means for multiplying said two plural digit numbers together includes a first instruction in said record member at a carriage position between said two program fields for processing the multiplicand through a first procedure prior to entry of the multiplier on the typewriter, and a second instruction in said record member at a carriage position following the second of said two program fields for processing the multiplier to effect multiplication of said multiplicand and said multiplier.

18. The computer as defined in claim 17 wherein the memory unit contains a plurality of separate accumulator registers, and said program means and record member contain separate instruction positions for each accumulator register, there being an accumulator register instruction in the record member at a carriage position following said "type-out" program instructions effective to cause the digit typed out to be entered into a designated accumulator register 19. In an electronic computer: an input-output unit comprising a typewriter having a carriage; a plurality of registers, program means including a coded record and circuit logic arranged to provide different programs to be selected for each carriage position; means for internally producing a value in one of said registers that is printed by said typewriter at predetermined carriage positions; means for optionally generating a signal to cause a characteristic symbol to be printed by the typewriter following printing of said value without obeying a program instruction provided at the carriage position following at the end of the value type-out to thereby advance the typewriter carriage to the next carriage position where a different program instruction is provided.

20. In an electronic data processing system having a plurality of accumulate registers, a typewriter as an input unit, and program means associated with the typewriter but remote from control by the typewriter operator and containing address codes for selecting into which of said accumulate registers a value entered at the typewriter will be directed, said address codes being positioned at locations corresponding with information columns on a sheet printed by the typewriter, the improvement wherein address codes command the direction of a typed value in one information column to two of said accumulate registers, said selection is normally incapacitated, and a key at the typewriter for actuation by the operator at the beginning of a line entry which capacities the address code selection of one of said two accumulate registers to receive the value entered in the line following actuation of said key.

21. The system as defined in claim 20 wherein a value entered to be controlled by said two address codes is always entered in the other of said two accumulate registers and is selectively entered in said one of said two registers only when said key is actuated.

22. In an electronic computer having a typewriter serving as an input unit; a multiple digit storage register; program means associated with the typewriter for controlling the position of each digit of a plural digit number in said storage register in accord with the position of each digit typed in an entry field; said programming means including a unique code for the decimal point and means for indicating an error to the operator if either a digit is typed in the decimal position or a decimal point is typed in a digit entry position.

23. The computer as defined in claim 14 wherein the error indicating means comprises a locked keyboard.

24. The computer as defined in claim 14 wherein the error indicating means comprises a circuit for detecting the presence of any digit simultaneously with the unique code from the program means and for detecting the selection of the decimal point in an entry field at a position where the unique code is not programmed.

25. The computer as defined in claim 14 further having circuits for transferring a plural digit number from said storage register to other portions of the computer; a decimal point shift key on the typewriter; and means responsive to actuation of said decimal point shift key for controlling said circuits to effect a shift in the decimal point before further processing of the transferred plural digit number.

26. The computer as defined in claim 20 wherein the decimal point shift key effects a two order decimal shift.

27. The computer as defined in claim 20 wherein the decimal point shift key effects a three order decimal shift.

28. The computer as defined in claim 16 together with a program means providing two entry fields, one for a multiplier and one for a multiplicand, and separate coding positions on said program means for each entry field to thereby permit freedom of decimal placement in the program means.

29. The computer as defined in claim 17 further having circuits for transferring the multiplicand from said storage register before effecting a multiplication; a decimal point shift key on the typewriter; and means responsive to actuation of said decimal point shift key for controlling said circuits to effect a shift in the decimal point of said multiplicand when transferred from said storage register.

30. The computer as defined in claim 18 wherein said storage register is a buffer register connected to receive all entry data from the typewriter; and means for clearing said buffer register in response to movement of the typwriter to an input field.

31. In an electronic computer having an input unit with a movable carriage and providing a printed record having a plurality of input fields where information entered on the input unit is applied to the computer and other fields where information entered on the input unit is printed and not applied to the computer; a buffer storage register for receiving the digits of a plural digit number from said input unit; means for generating a signal to clear said buffer register; and means responsive to positioning said carriage in one of said input fields for enabling said signal generation means.

32. The computer as defined in claim 23 wherein program means are associated with said carriage and the signal generating means is responsive to an instruction in a new program, said new program resulting in a transfer of a new information to said register.

33. In an electronic computer, an information modification system comprising the combination of: a cyclic memory having a plurality of register areas including a buffer register area, a multiplicand register area, a transfer register area, a product primary register area, and a product secondary register area; means for entering operands into said buffer register area; means for transferring a multiplicand operand in said buffer register area through said transfer register area to said multiplicand register area; means including said transfer registers for shifting said multiplicand operand to a predetermined position in said multiplicand register area as determined by the decimal point; means for entering a multi-digit multiplier operand into said buffer register area; means for successively detecting said multiplier digits; means for shifting the position of said multiplicand operand in said multiplicand register in correspondence with each successive detection of a multiplier digit; means including said product primary and secondary register areas for successively modifying, in response to each detection of a multiplier digit, the value in the product register areas by the multiplicand operand from the multiplicand register area a number of times equal to the value of the multiplier digit to produce a partial product in the product register areas after detection of each non-zero multiplier digit and a final product after the successive modifications following detection of the last multiplier digit.

34. The electronic computer as defined in claim 25 wherein the modification is by addition.

35. The electronic computer as defined in claim 25 wherein the modification is by subtraction.

36. In an electronic computer, an information modification system comprising the combination of: a cyclic memory having a plurality of register areas including a buffer register area, a multiplicand register area, a product primary register area, and a product secondary register area, a multiplier counter; means for entering a multiplicand operand into said buffer register area; means for transferring the multiplicand from said buffer register area to said multiplicand register area; means for entering a plural digit multiplier operand into said buffer register area; means for detecting the highest order digit of said multiplier and setting said multiplier counter as determined by the digit value; means in response to a setting of said multipler counter to a value other than zero for adding the multiplicand in said multiplicand register area with whatever value is in the product primary register area and entering the sum into the product secondary register area and for reducing the value in said multiplier counter by one to produce a new count means in response to a new count value other than zero for adding the multiplicand in the multiplicand register area with the sum in the product secondary register area and entering the resulting new sum into the product primary register area and for again reducing the value in the multiplier counter by one to produce a further new count; means for continuing additions of the multiplicand in the multiplicand register area to the values alternately in the product primary register area and in the product secondary register area until a total number of additions equal to the value of highest order digit of the multiplier have been performed thereby reducing the count in the multiplier counter to zero; means for shifting the position of all orders of the multiplicand operand in the multiplicand register to the next lower order position in the same register area; means for then detecting the second highest order digit of the multiplier; means for adding said shifted multiplicand with the values in the product product primary register and with the values in the product secondary register a number of times equal to the second highest order digit of the multiplier; means for successively shifting the position of the multiplicand operand in the multiplicand register area in response to the detection of each subsequent lower order multiplier digit and adding the shifted multiplicand operand with the values in the product primary and product secondary register areas a number of times equal to the detected multiplier digit to thereby produce a product of the multiplicand and multiplier operands.

37. In an electronic computer, an information modification system comprising the combination of a cyclic memory having a plurality of register areas including a multiplicand register area, a product primary register area, and a product secondary register area; means for entering a multiplicand into said multiplicand register area as an operand at a predetermined position in the multiplicand register area as determined by the decimal point; a register for storing a multiplier plural digit number; means for successively detecting said multiplier digits; means for shifting the position of the multiplicand operand in said multiplicand register area in correspondence with each successive detection of a multiplier digit; and means including said product primary and secondary register areas for successively modifying, in response to each detection of the multiplier digit, the value in said product register areas by the multiplicand operand from the multiplicand register area a number of times equal to the value of the multiplier digit to produce a partial product in the product register areas after detection of each non-zero multiplier digit and a final product after the successive modifications following the detection of the last multiplier digit.

38. The electronic computer as defined in claim 29 wherein said means for entering of the multiplicand in the multiplicand register area at the predetermined position includes a manually operable means to provide optional control of the decimal point position at the time of entering one of the multiplicand or multiplier operands into said computer.

39. The electronic computer as defined in claim 30 wherein the manually operable means is a key arranged to be depressed at the time of entry of said multiplier operand.

40. In an electronic computer of the type utilizing binary coded decimal digits, each digit being less than ten and respresented by a four bit code; a cyclic memory unit for storing such digits in digit areas each composed of five binary bit areas, four of which contain the four bit code; means for algebraically adding two plural digit numbers retrieved from said memory unit in a digit by digit manner including a four bit toggle register for receiving the binary sum of each digit order individually and a carry/borrow toggle; means responsive to the detection of a digit in said toggle register greater than nine for generating a correction potential during the time interval information from the fifth bit area is capable of being retrieved; means including gating circuits to said toggle register responsive to said correction potential for changing the digit indication in said toggle register from a value greater than nine to a value less than ten and for setting the carry/borrow toggle during said time interval; and means for recording said changed digit indication in said memory unit while retrieving the next higher order digits to be added together.

41. In a data processing system having a memory unit containing a plurality of non-mechanical storage registers each capable of storing a plural digit number and including a transfer storage register; circuit means for effecting the transfer of a value of a plural digit number from one of said registers including means for subtracting a selected plural digit number from zero to provide the complement in a transfer storage register; means for detecting a sign indicating potential for said plural digit number; and means responsive to said sign indicating potential for gating the transfer circuit means to cause transfer of the plural digit number if the sign is positive or the complement from the transfer register if the sign is negative.

42. The data processing system as defined in claim 33 together with a typewriter and a program unit associated with said typewriter, and wherein said program unit has means for capacitating the typewriter to receive and type-out selected digit from the transferred value.

43. The data processing system as defined in claim 34 wherein the program unit is programmed to cause type-out of all digits to the right of the first non-zero digit in the transferred value.

44. The data processing system as defined in claim 34 wherein the program unit is programmed to cause type-out of a predetermined number of digits of said transferred value less than the number of digit positions in said plural digit number.

45. The data processing system as defined in claim 34 wherein the location of the type-out command in the program unit is part of the address identifying from which storage register the plural digit number is to be selected, and the entire number is transferred even through less than all of the digits are typed-out.

46. In a data processing system having a memory unit containing an accumulate register wherein the algebraic sum resulting from a plurality of arithmetic operations is produced, said accumulate register having means for automatically providing a round off of a digit at a predetermined order position in said register; a transfer register; means for subtracting the contents in said accumulate register from zero to provide a complement and for storing said complement in said transfer register; means for producing a sign indicating potential corresponding to the sign indication in said accumulate register; means for making a correction to insure the correct round-off is made when the contents of the accumulate register are negative including means for adding a "one" to the least significant digit as a decomplement value is developed in the transfer register.

47. In a data processing system having an add-subtract circuit, a memory unit containing an accumulate register and a transfer register each having storage areas for a predetermined number of digits plus a sign indication, a memory unit read out circuit and an output printing unit; means for effecting the print-out of a value represented by the plural digit number stored in said accumulate register including means for reading out and subtracting from zero in said add-subtract circuit the plural digit number from said accumulate register to thereby provide a complement of the value in the accumulate register and for recording said complement in said transfer register; means for producing a potential corresponding to the sign indication from said accumulate register; and means responsive to said sign indicating potential for gating the read out circuit to cause printing by the output printing unit of the plural digit number from the accumulate register if the sign is positive or the complement from the transfer register if the sign is negative.

48. Apparatus for effecting type-out of a plural digit number from a register in a memory unit comprising: a buffer register for receiving said plural digit number digit by digit; a typewriter having a carriage and solenoid operated typebars; means including a decoding matrix for energizing the solenoid for one of said typebars in accordance with a digit in said buffer register; and means responsive to advance of the typewriter carriage to a new position for energizing circuits to replace in the buffer register the typed digit with the next successive digit of said plural digit number from the memory unit.

49. Apparatus as defined in claim 40 wherein said last mentioned means comprises means movable with the typewriter carriage for producing a unique electrical signal for successive adjacent positions of the carriage to energize said circuits.

50. Apparatus as defined in claim 40 wherein said circuits for replacing digits in said buffer register includes a counter circuit adapted to count through a predetermined number of places during the time required for printing each digit, and said means responsive to the advance of the typewriter circuit produces a signal for setting the counter circuit to thereby provide said next successive digit to the buffer register.

51. In an electronic computer having an output unit, a plurality of registers; program means including circuit logic for providing two courses of program action; means for internally producing a value in one of said registers that is reproduced by said output unit, including means to reproduce a characteristic symbol for negative values to follow reproduction of said value, and means responsive to reproduction of said characteristic symbol for selecting a first program action when said characteristic symbol is reproduced and a different program action when said characteristic symbol is not reproduced.

52. In an electronic computer having a memory unit comprising a member mounted for rotation and having a magnetizable surface; an input-output unit comprising a typewriter having a carriage movable in a step-by-step manner across a printing position; and circuit means for transmitting a digit entered on the typewriter to said memory unit and for transmitting a digit retrieved from said memory unit to said typewriter, the improvement comprising: program means including a sensing station comprising a plurality of parallel sensing elements and a coded record member having separate programming instruction channels for each of said sensing elements and being movable relative to one another concomitantly with step-by-step movement of the carriage in either direction, said coded record member further having a program field containing a plurality of adjacent program instructions corresponding to adjacent carriage positions; means effective in response to each of said program instructions to control the location into which each digit of a plural digit number entered on the typewriter is stored in said memory unit; and means for recording digits on the surface of said memory unit by a non-return-to-zero method whereby an erroneous digit entry may be corrected in the memory unit by repositioning the typewriter carriage at the location of the erroneous digit entry and then entering the correct digit.

53. In an electronic data processing system having a memory unit containing a plurality of accumulate registers, and a typewriter as an input unit, the combination of program means associated with the typewriter but remote from control by the typewriter operator and containing means defining a plurality of line entry fields including means for directing into selected ones of said accumulate registers a value entered in each of said entry fields at the typewriter, said directing means being normally disabled with respect to selection of a predetermined one of said registers; and a key at the typewriter for actuation by the operator at the beginning of a line of value entries; said key actuation enabling said directing means with respect to selection of said predetermined accumulate register to receive the value entered in a discrete one of said fields.

References Cited by the Examiner

UNITED STATES PATENTS

| | | | |
|---|---|---|---|
| 2,538,636 | 1/1951 | Williams | 235—159 |
| 2,931,691 | 4/1960 | Curtis | 346—74 |
| 2,953,300 | 9/1960 | O'Brian | 235—61.12 |
| 2,954,166 | 9/1960 | Eckdahl et al. | 235—159 |
| 2,977,178 | 3/1961 | Hook | 346—74 |
| 2,986,333 | 5/1961 | Thomas | 235—160 |
| 3,007,632 | 11/1961 | Dilling | 235—60.12 |
| 3,012,713 | 12/1961 | Richards | 235—60.12 |
| 3,018,956 | 1/1962 | Hosier | 235—157 |
| 3,019,977 | 2/1962 | Duinker | 235—157 |
| 3,026,029 | 3/1962 | Daniels | 235—61.12 |
| 3,028,085 | 4/1962 | Donan et al. | 235—159 |
| 3,029,412 | 4/1962 | Southard | 340—172.5 |
| 3,047,227 | 7/1962 | Thomas et al. | 235—153 |
| 3,053,449 | 9/1962 | Hoberg et al. | 235—160 X |
| 3,056,110 | 9/1962 | Cypser et al. | 340—172.5 |
| 3,105,636 | 10/1963 | Greene | 235—60.25 |
| 3,112,394 | 11/1963 | Close et al. | 235—159 X |
| 3,117,306 | 1/1964 | Reitfort | 340—172.5 |

MALCOLM A. MORRISON, *Primary Examiner.*

A. BERLIN, ROBERT C. BAILEY, *Examiners.*

R. R. SINCLAIR, M. P. ALLEN, *Assistant Examiners.*